United States Patent
Wang et al.

(10) Patent No.: US 12,250,465 B2
(45) Date of Patent: Mar. 11, 2025

(54) SYSTEMS, METHODS, AND DEVICES FOR PROCESSING IMAGE DATA FROM MULTIPLE IMAGE SENSORS

(71) Applicant: QUALCOMM Incorporated, San Diego, CA (US)

(72) Inventors: Shen-Ge Wang, Santa Clara, CA (US); Jian Ma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 17/844,600

(22) Filed: Jun. 20, 2022

(65) Prior Publication Data

US 2023/0031023 A1    Feb. 2, 2023

Related U.S. Application Data

(60) Provisional application No. 63/227,277, filed on Jul. 29, 2021.

(51) Int. Cl.
| | |
|---|---|
| *H04N 23/698* | (2023.01) |
| *H04N 23/45* | (2023.01) |
| *H04N 23/55* | (2023.01) |
| *H04N 23/67* | (2023.01) |
| *H04N 23/69* | (2023.01) |

(Continued)

(52) U.S. Cl.
CPC ........... *H04N 23/698* (2023.01); *H04N 23/45* (2023.01); *H04N 23/55* (2023.01); *H04N 23/675* (2023.01); *H04N 23/69* (2023.01); *H04N 23/73* (2023.01); *H04N 23/74* (2023.01); *H04N 23/80* (2023.01)

(58) Field of Classification Search
CPC ...... H04N 23/698; H04N 23/45; H04N 23/55; H04N 23/675; H04N 23/69; H04N 23/73; H04N 23/74; H04N 23/80
See application file for complete search history.

(56) References Cited

U.S. PATENT DOCUMENTS

| | | | |
|---|---|---|---|
| 9,007,428 B2 * | 4/2015 | Zhou | ............... H04N 23/698 348/36 |
| 10,084,959 B1 | 9/2018 | Yu et al. | |

(Continued)

OTHER PUBLICATIONS

International Search Report and Written Opinion—PCT/US2022/034395—ISA/EPO—Sep. 21, 2022.

*Primary Examiner* — Chiawei Chen
(74) *Attorney, Agent, or Firm* — QUALCOMM Incorporated

(57) ABSTRACT

Systems and techniques are described for large field of view imaging. A device's first image sensor captures a first image based on first light from a scene redirected by a light redirection element (e.g., a first prism and/or first reflective surface), and the device's second image sensor captures a second image based on second light from the scene redirected by the light redirection element (e.g., a second prism and/or second reflective surface). The device can modify the first image and/or second image using perspective distortion correction and/or to align one or more properties of two respective depictions of a shared portion of a scene in the two images. The one or more properties can include brightness, contrast, positioning, sharpness, tint, hue, and/or saturation. The device can generate a combined image with a large field of view and smooth transitions by combining the first image and the second image.

30 Claims, 37 Drawing Sheets

(51) Int. Cl.
*H04N 23/73* (2023.01)
*H04N 23/74* (2023.01)
*H04N 23/80* (2023.01)

(56) References Cited

U.S. PATENT DOCUMENTS

| | | | |
|---|---|---|---|
| 10,110,814 B1* | 10/2018 | Day | G06V 20/40 |
| 10,861,127 B1* | 12/2020 | Terree | H04N 23/815 |
| 10,878,536 B1* | 12/2020 | Stimm | H04N 19/59 |
| 11,006,041 B1* | 5/2021 | Ma | H04N 23/698 |
| 2012/0287333 A1* | 11/2012 | Huang | G03B 17/00 |
| | | | 348/E5.04 |
| 2014/0111650 A1* | 4/2014 | Georgiev | H04N 23/698 |
| | | | 348/159 |
| 2015/0116453 A1* | 4/2015 | Hirata | H04N 5/2628 |
| | | | 348/38 |
| 2015/0370040 A1 | 12/2015 | Georgiev et al. | |
| 2015/0373252 A1* | 12/2015 | Georgiev | H04N 23/58 |
| | | | 348/349 |
| 2016/0286121 A1* | 9/2016 | Georgiev | G02B 17/023 |
| 2017/0195564 A1* | 7/2017 | Appia | H04N 23/90 |
| 2018/0103196 A1 | 4/2018 | Lee et al. | |
| 2020/0275024 A1* | 8/2020 | Yen | H04N 25/61 |
| 2021/0080690 A1* | 3/2021 | Lee | H02K 41/0356 |
| 2021/0400193 A1* | 12/2021 | Ma | H04N 5/2624 |
| 2023/0025380 A1* | 1/2023 | Ma | H04N 25/41 |

* cited by examiner

1350

Receive A First Image Of A Scene Captured By A First Image Sensor, Wherein A First Light Redirection Element Redirects A First Light From A First Path To A Redirected First Path Toward The First Image Sensor, Wherein The First Image Sensor Captures The First Image Based On Receipt Of The First Light At The First Image Sensor
1355

Receive A Second Image Of The Scene Captured By A Second Image Sensor, Wherein A Second Light Redirection Element Redirects A Second Light From A Second Path To A Redirected Second Path Toward The Second Image Sensor, Wherein The Second Image Sensor Captures The Second Image Based On Receipt Of The Second Light At The Second Image Sensor, Wherein A Virtual Extension Of The First Path Beyond The First Light Redirection Element Intersects With A Virtual Extension Of The Second Path Intersect Beyond The Second Light Redirection Element
1360

Modify At Least One Of The First Image And The Second Image Using A Perspective Distortion Correction
1365

Generate A Combined Image From The First Image And The Second Image In Response To Modification Of The At Least One Of The First Image And The Second Image Using The Perspective Distortion Correction, Wherein The Combined Image Includes A Combined Image Field Of View That Is Larger Than At Least One Of A First Field Of View Of The First Image And A Second Field Of View Of The Second Image
1370

```
┌─────────────────────────────────────────────────────────────────────┐
│  Redirect, by a first light redirection element, a first light towards a first camera. 1402 │
│  ┌───────────────────────────────────────────────────────────────┐  │
│  │ Reflect, by a first mirror of the first light redirection element, the first light towards the │  │
│  │                        first camera. 1404                      │  │
│  │  ┌─────────────────────────────────────────────────────────┐  │  │
│  │  │ Refract, by a first prism of the first light redirection element, the first light. 1406 │  │  │
│  │  └─────────────────────────────────────────────────────────┘  │  │
│  └───────────────────────────────────────────────────────────────┘  │
└─────────────────────────────────────────────────────────────────────┘
                                    ▼
┌─────────────────────────────────────────────────────────────────────┐
│ Direct, by a first lens, the first light from the first light redirection element towards an │
│                    image sensor of the first camera. 1408           │
└─────────────────────────────────────────────────────────────────────┘
                                    ▼
┌─────────────────────────────────────────────────────────────────────┐
│     Capture a first image frame by the first camera based on the first light. 1410 │
└─────────────────────────────────────────────────────────────────────┘
                                    ▼
┌─────────────────────────────────────────────────────────────────────┐
│ Redirect, by a second light redirection element, a second light towards a second camera. │
│                                1412                                 │
│  ┌───────────────────────────────────────────────────────────────┐  │
│  │ Reflect, by a second mirror of the second light redirection element, the second light │  │
│  │                    towards the second camera. 1414             │  │
│  │  ┌─────────────────────────────────────────────────────────┐  │  │
│  │  │ Refract, by a second prism of the second light redirection element, the second │  │  │
│  │  │                         light. 1416                      │  │  │
│  │  └─────────────────────────────────────────────────────────┘  │  │
│  └───────────────────────────────────────────────────────────────┘  │
└─────────────────────────────────────────────────────────────────────┘
                                    ▼
┌─────────────────────────────────────────────────────────────────────┐
│ Direct, by a second lens, the second light from the second light redirection element towards │
│                an image sensor of the second camera. 1418           │
└─────────────────────────────────────────────────────────────────────┘
                                    ▼
┌─────────────────────────────────────────────────────────────────────┐
│   Capture a second image frame by the second camera based on the second light. 1420 │
└─────────────────────────────────────────────────────────────────────┘
                                    ▼
┌─────────────────────────────────────────────────────────────────────┐
│ Combine the first image frame and the second image frame to generate a combined image. │
│                                1422                                 │
└─────────────────────────────────────────────────────────────────────┘
```

FIG. 14

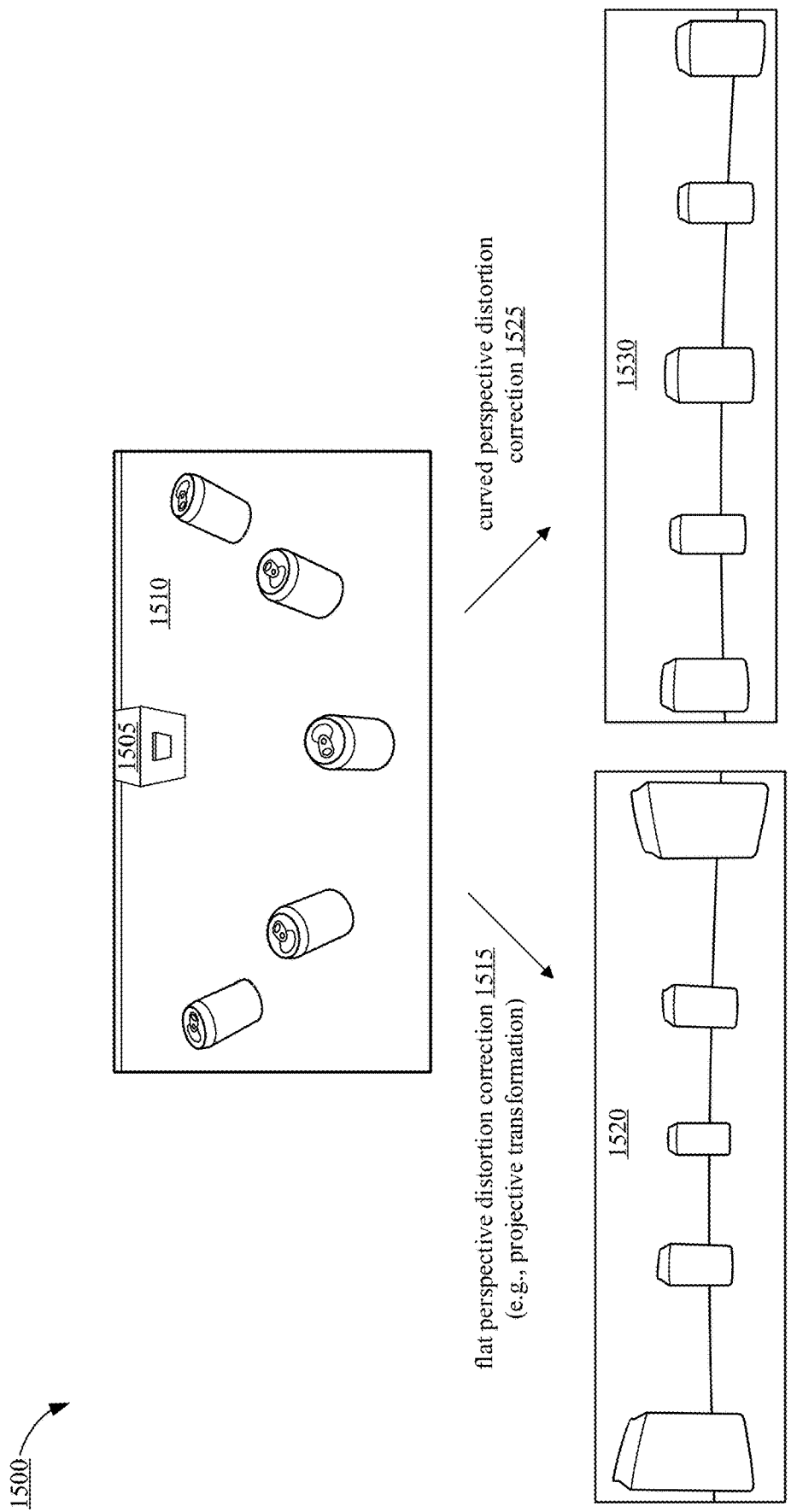

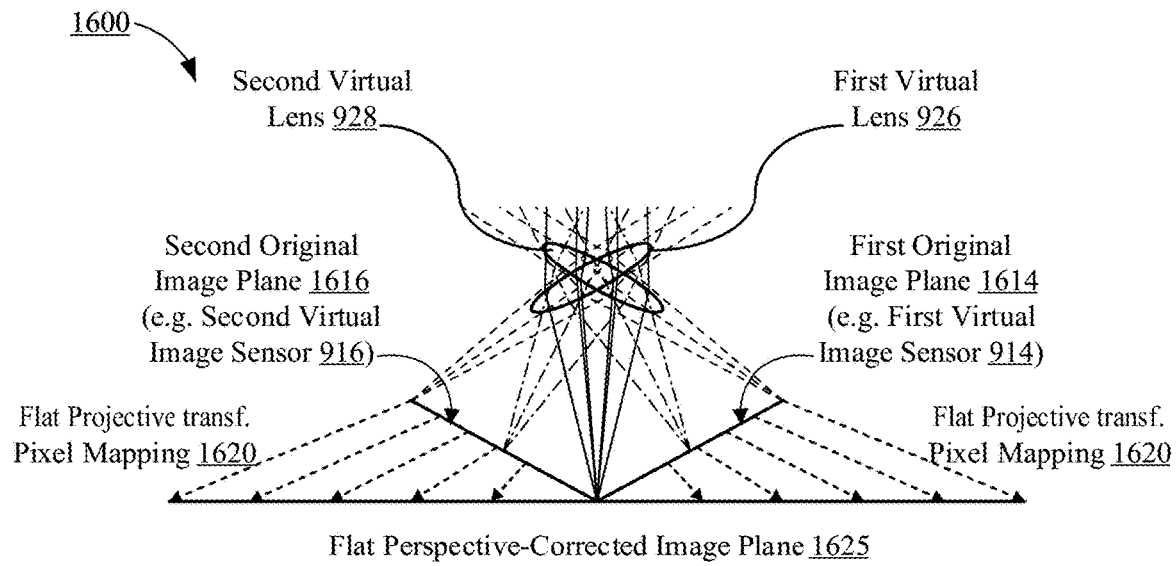
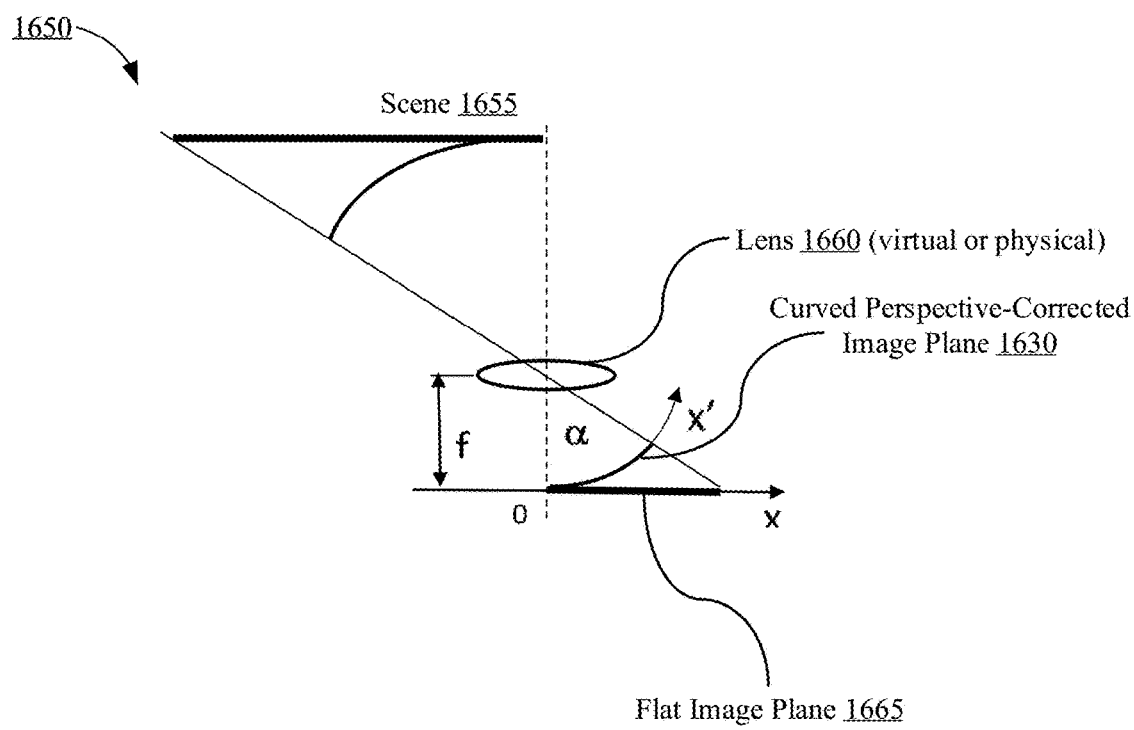
FIG. 16

1700
First Combined Image 1710 ($P = 0$)
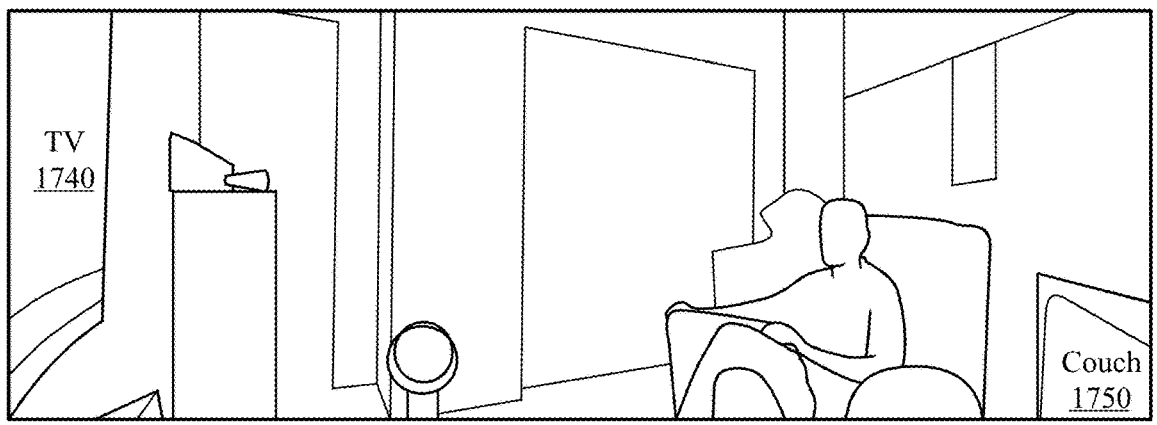
Second Combined Image 1720 ($P = 0.8$)
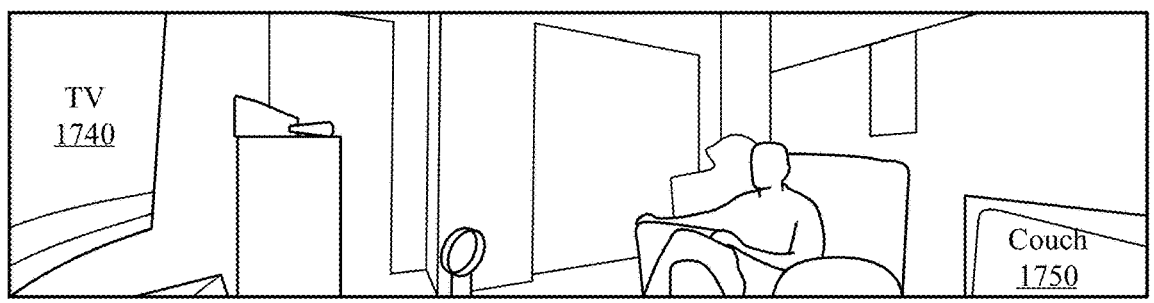
Third Combined Image 1730 ($P = 1.0$)
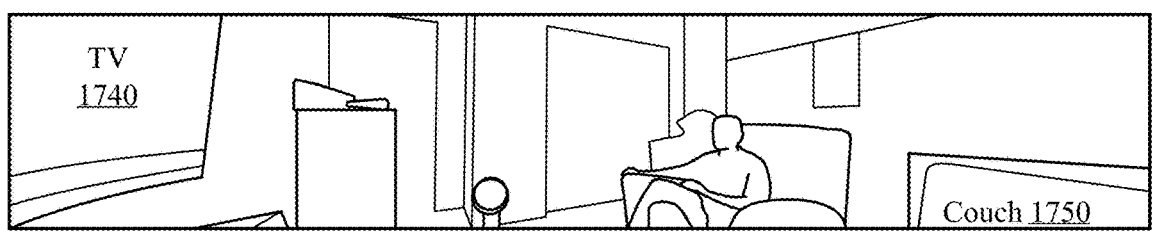
FIG. 17

1900

Receive A First Image Of A Scene Captured By A First Image Sensor, Wherein The First Image Corresponds To A Flat Planar Image Plane 1905

Identify A Curved Perspective-Corrected Image Plane
1910

Generate A Perspective-Corrected First Image At Least By Projecting Image Data Of The First Image From The Flat Planar Image Plane Corresponding To The First Image Onto The Curved Perspective-Corrected Image Plane
1915

FIG. 19

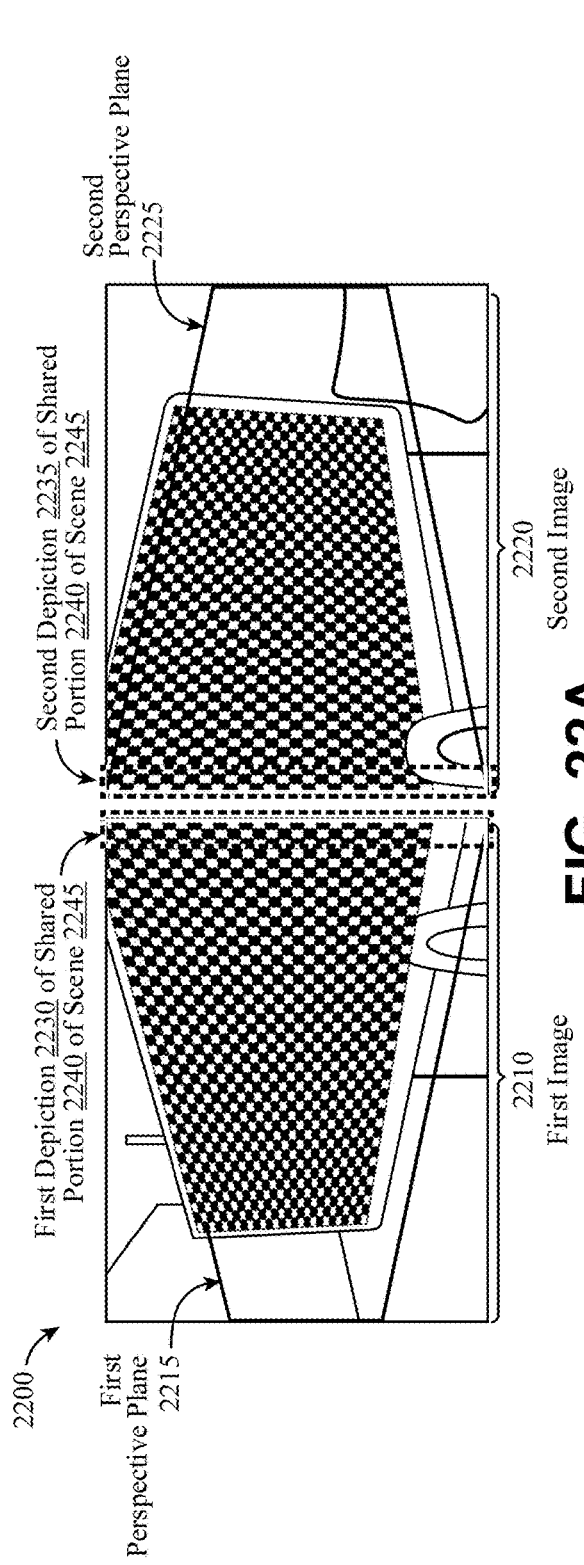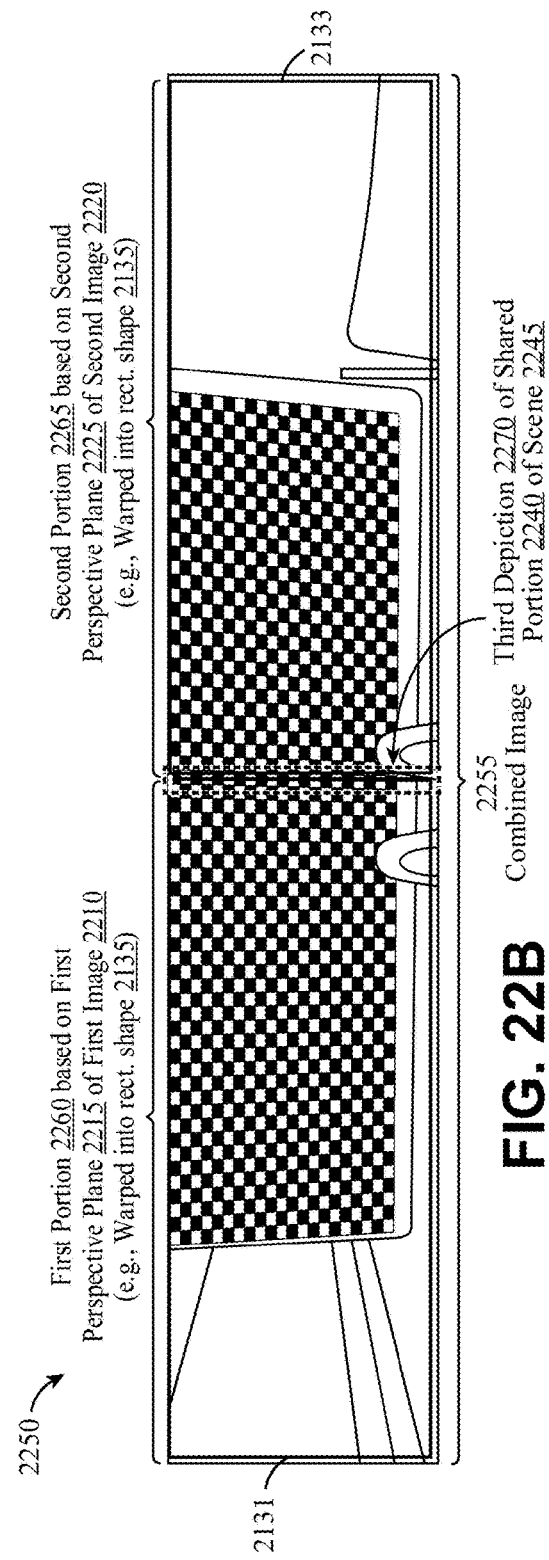
FIG. 22A
FIG. 22B

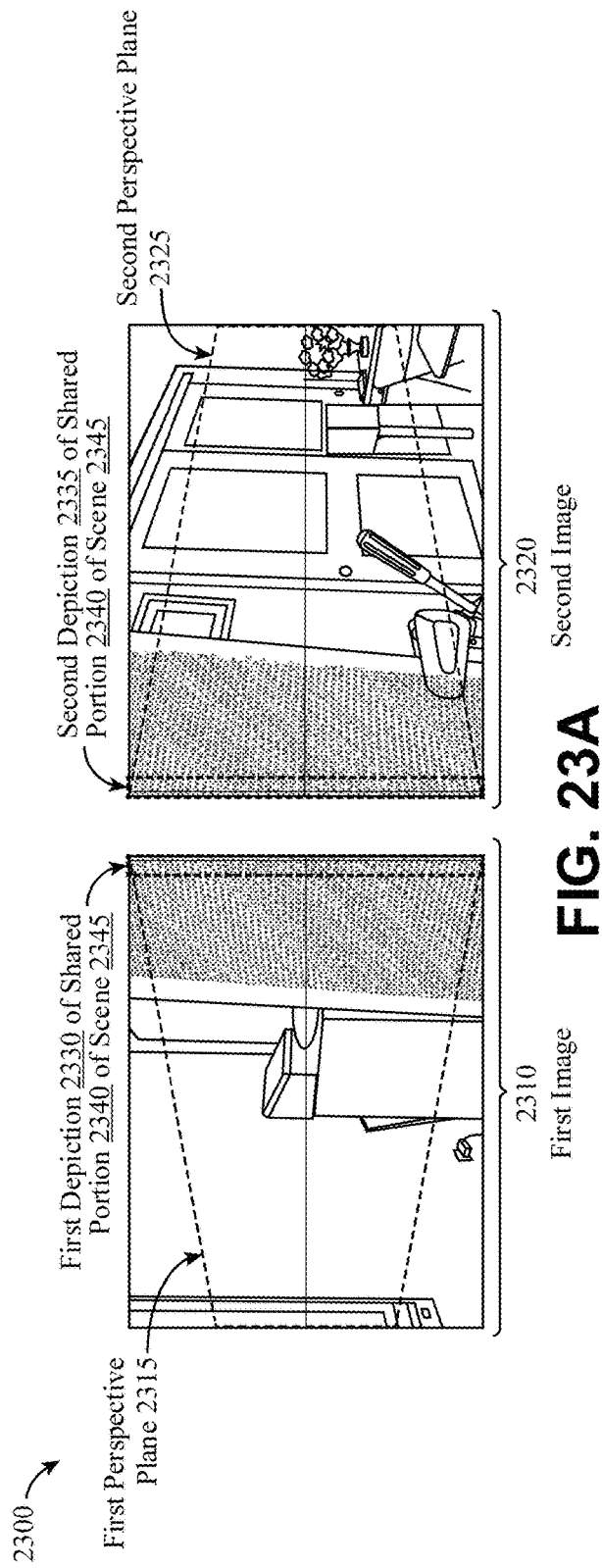
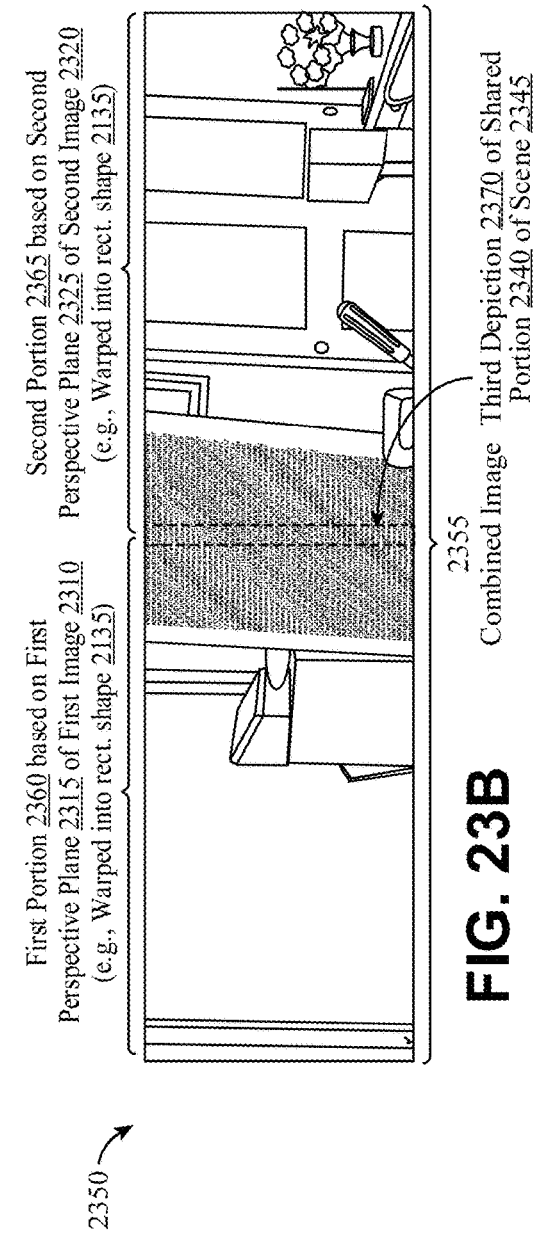
FIG. 23A
FIG. 23B

2800

Receive A First Image Of A Scene Captured By A First Image Sensor, Wherein One Or More Light Redirection Elements Are Configured To Redirect A First Light From A First Path To A Redirected First Path Toward The First Image Sensor, And Wherein The First Image Sensor Is Configured To Capture The First Image Based On Receipt Of The First Light At The First Image Sensor, The First Image Including A First Depiction Of A Portion Of The Scene
2805

Receive A Second Image Of The Scene Captured By A Second Image Sensor, Wherein The One Or More Light Redirection Elements Are Configured To Redirect A Second Light From A Second Path To A Redirected Second Path Toward The Second Image Sensor, And Wherein The Second Image Sensor Is Configured To Capture The Second Image Based On Receipt Of The Second Light At The Second Image Sensor, The Second Image Including A Second Depiction Of The Portion Of The Scene
2810

Modify At Least One Of The First Image Or The Second Image At Least In Part To Align A First Property Of The First Depiction Of The Portion Of The Scene With A Second Property Of The Second Depiction Of The Portion Of The Scene
2815

Generate A Combined Image From The First Image And The Second Image, Wherein The Combined Image Includes A Combined Image Field Of View That Is Larger Than At Least One Of A First Field Of View Of The First Image Or A Second Field Of View Of The Second Image
2820

FIG. 28

SYSTEMS, METHODS, AND DEVICES FOR PROCESSING IMAGE DATA FROM MULTIPLE IMAGE SENSORS

CROSS-REFERENCE TO RELATED APPLICATIONS

This application claims the benefit of U.S. Provisional Application No. 63/227,277, filed Jul. 29, 2021, the disclosures of which is hereby incorporated by reference, in its entirety and for all purposes.

TECHNICAL FIELD

This disclosure relates generally to image or video capture devices. For example, aspects of the present disclosure are related to a multiple camera system for generating an image.

BACKGROUND

Many devices include one or more cameras. For example, a smartphone or tablet includes a front facing camera that can be used to capture selfie images and a rear facing camera that can be used to capture an image of a scene (such as a landscape or other scenes of interest to a device user). A user may wish to capture an image of a scene that does not fit within a field of view of a camera. Some devices include multiple cameras with different fields of view based on a curvature of a camera lens directing light to the image sensor. The user may thus use the camera with the desired field of view of the scene based on the camera lens curvature to capture an image.

SUMMARY

Systems and techniques are described for digital imaging to generate an image with a large field of view. For example, an imaging device can include a first camera with a first image sensor that captures a first image based on first light redirected by one or more light redirection elements. The one or more light redirection elements can redirect the first light from a first path to a redirected first path toward the first camera, for instance using a first prism and/or a first reflective surface of the one or more light redirection elements. The imaging device can include a second camera with a second image sensor that captures a second image based on second light redirected by the one or more light redirection elements. The one or more light redirection elements can redirect the second light from a second path to a redirected second path toward the second camera, for instance using a second prism and/or a second reflective surface of the one or more light redirection elements. The first image sensor can capture a first image based on receipt of the first light. The second image sensor can capture a second image based on the second light. The first image can include a first depiction of a portion of the scene. The second image can include a second depiction of the portion of the scene. The imaging device can generate a combined image at least in part by combining the first image and the second image. The combined image can have a field of view that is larger than at least one of a first field of view of the first image or a second field of view of the second image.

Before combining the first image and the second image to form the combined image, the imaging device can modify the first image and/or the second image using perspective distortion correction. Before combining the first image and the second image to form the combined image, the imaging device can modify the first image and/or the second image to align one or more properties of the first depiction of the portion of the scene with the second depiction of the portion of the scene. The one or more properties can include brightness, contrast, positioning, tint, hue, saturation, sharpness, other image properties discussed herein, or a combination thereof. In one illustrative example, the imaging device can adjust a property (e.g., brightness) of at least a portion of the first image that includes the first depiction of the portion of the scene to align with a corresponding property (e.g., brightness) of at least a portion of the second image that includes the second depiction of the portion of the scene. This can reduce or avoid visual artifacts such as visible "seams" in the combined image caused by sudden changes in the property between two portions of the combined image corresponding to the first image and the second image, respectively, instead providing the combined image with smooth transitions in the property between the two portions of the combined image.

In one example, an apparatus for imaging is provided. The apparatus includes a memory and one or more processors coupled to the memory, the one or more processors (e.g., implemented in circuitry) and coupled to the memory. The one or more processors are configured to and can: receive a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; receive a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modify at least one of the first image or the second image at least in part to align a first property of the first depiction of the portion of the scene with a second property of the second depiction of the portion of the scene; and generate a combined image from the first image and the second image, wherein the combined image includes a combined image field of view that is larger than at least one of a first field of view of the first image or a second field of view of the second image.

In another example, a method of digital imaging is provided. The method includes receiving a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, wherein first image including a first depiction of a portion of the scene; receiving a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modifying at least one of the first image or the second image at least in part to align a first property of the first depiction of the portion of the scene with a second property of the second depiction of the portion of the scene; and generating a combined image from the first image and the second image, wherein the combined image includes a combined image field of view that is larger than at least one of a first field of view of the first image or a second field of view of the second image.

In another example, a non-transitory computer readable storage medium is provided that has stored thereon instructions that, when executed by one or more processors, cause the one or more processors to: receive a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; receive a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modify at least one of the first image or the second image at least in part to align a first property of the first depiction of the portion of the scene with a second property of the second depiction of the portion of the scene; and generate a combined image from the first image and the second image, wherein the combined image includes a combined image field of view that is larger than at least one of a first field of view of the first image or a second field of view of the second image.

In another example, an apparatus for digital imaging is provided. The apparatus includes means for receiving a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; means for receiving a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; means for modifying at least one of the first image or the second image at least in part to align a first property of the first depiction of the portion of the scene with a second property of the second depiction of the portion of the scene; and means for generating a combined image from the first image and the second image, wherein the combined image includes a combined image field of view that is larger than at least one of a first field of view of the first image or a second field of view of the second image.

In some aspects, the apparatus may be, may include, or may be part of a camera, a mobile device (e.g., a mobile handset, a smart phone, a mobile telephone, a portable gaming device, or another mobile device), a wireless communication device, a smart watch, a wearable device, a head-mounted display (HMD), an extended reality device (e.g., a virtual reality (VR) device, an augmented reality (AR) device, or a mixed reality (MR) device), a vehicle or a component or system of a vehicle, a personal computer, a laptop computer, a server computer, any combination thereof, and/or another device. In some aspects, the one or more processors include an image signal processor (ISP). In some aspects, the apparatus includes a camera or multiple cameras for capturing one or more images. In some aspects, the apparatus includes an image sensor that captures the image data. In some aspects, the apparatus further includes a display for displaying the image, one or more notifications associated with processing of the image, and/or other displayable data.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

Aspects of the present disclosure are illustrated by way of example, and not by way of limitation, in the figures of the accompanying drawings and in which like reference numerals refer to similar elements. Illustrative aspects of the present application are described in detail below with reference to the following figures:

FIG. 13B is a flow diagram illustrating an example method of digital imaging, in accordance with some examples;

FIG. 14 is a flow diagram illustrating an example process for capturing multiple image frames to be combined to generate a combined image frame, in accordance with some examples;

FIG. 15 is a conceptual diagram illustrating examples of a flat perspective distortion correction and a curved perspective distortion correction, in accordance with some examples;

FIG. 16 is a conceptual diagram illustrating pixel mapping from an image sensor image plane to a perspective-corrected image plane in a flat perspective distortion correction and in a curved perspective distortion correction, in accordance with some examples;

FIG. 17 is a conceptual diagram illustrating three example combined images of a scene that each have different degrees of curvature of curved perspective distortion correction applied, in accordance with some examples;

FIG. 19 is a flow diagram illustrating an example process for performing curved perspective distortion correction, in accordance with some examples;

FIG. 22A is a conceptual diagram illustrating an example of a first perspective plane of a first image and a second perspective plane of a second image, both depicting a scene with a checkerboard, in accordance with some examples;

FIG. 22B is a conceptual diagram illustrating an example of combined image generated using the first perspective plane of the first image and the second perspective plane of the second image, each warped into a rectangular shape, in accordance with some examples;

FIG. 23A is a conceptual diagram illustrating an example of a first perspective plane of a first image and a second perspective plane of a second image, both depicting a scene with a poster on which text is printed, in accordance with some examples;

FIG. 23B is a conceptual diagram illustrating an example of combined image generated using the first perspective plane of the first image and the second perspective plane of the second image, each warped into a rectangular shape, in accordance with some examples;

FIG. 28 is a flow diagram illustrating an example process for generating a combined image from multiple image frames.

DETAILED DESCRIPTION

Figure 1:
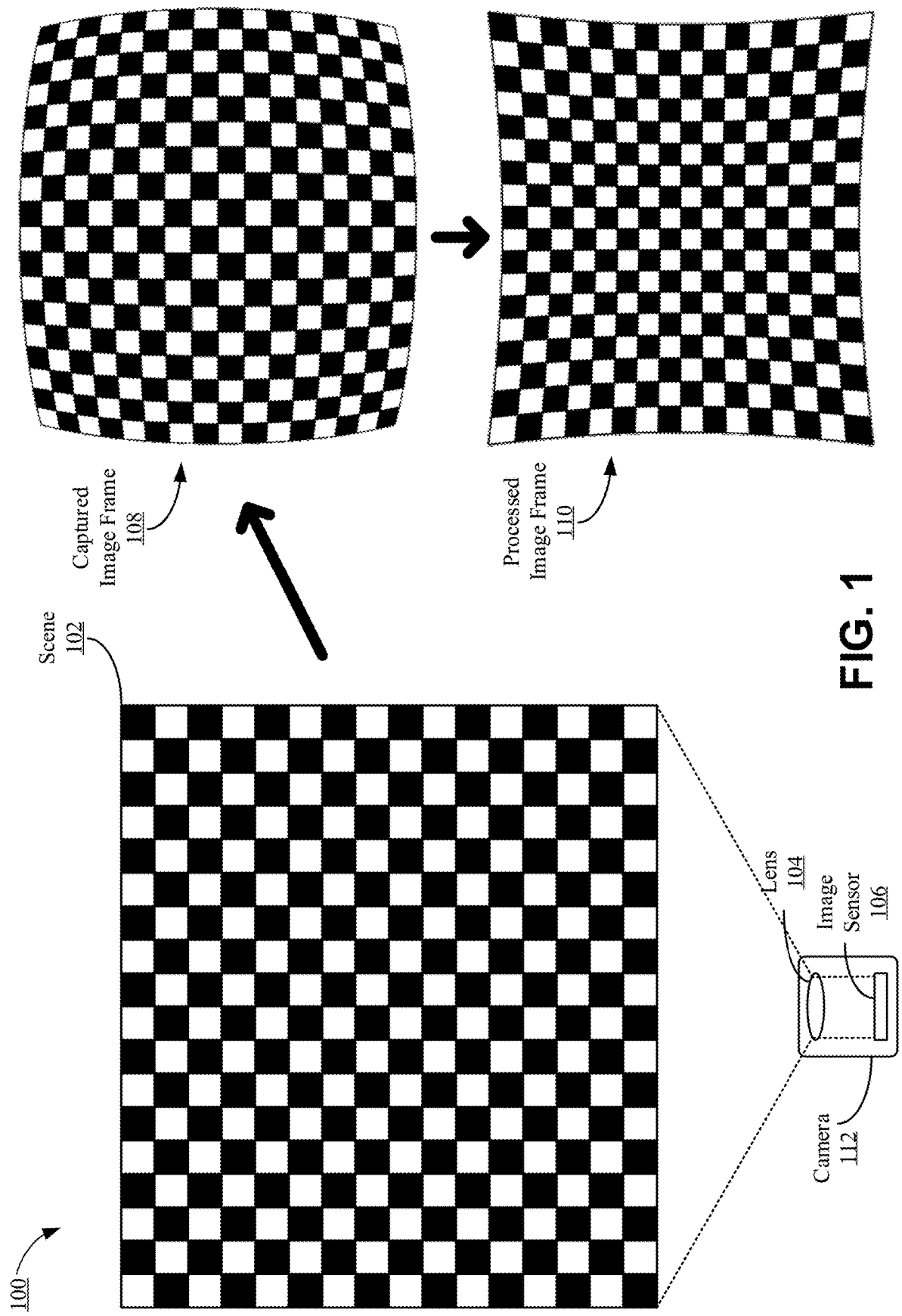
FIG. 1 is a conceptual diagram illustrating an example of a distortion in an image captured using a camera with a lens having lens curvature, in accordance with some examples.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

Certain aspects of this disclosure are provided below. Some of these aspects may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

Aspects of the present disclosure may be used for image or video capture devices, such as a camera. A camera is a device that receives light and captures image frames, such as still images or video frames, using an image sensor. The terms "image," "image frame," and "frame" are used interchangeably herein. Cameras can be configured with a variety of image capture and image processing settings. The different settings result in images with different appearances. Some camera settings are determined and applied before or during capture of one or more image frames, such as ISO, exposure time, aperture size, f/stop, shutter speed, focus, and gain. For example, settings or parameters can be applied to an image sensor for capturing the one or more image frames. Other camera settings can configure post-processing of one or more image frames, such as alterations to contrast, brightness, saturation, sharpness, levels, curves, or colors. For example, settings or parameters can be applied to a processor (e.g., an image signal processor or ISP) for processing the one or more image frames captured by the image sensor.

A smartphone, tablet, digital camera, or other device includes a camera to capture images or video of a scene. The camera has a maximum field of view based on an image sensor and one or more camera lenses. For example, a single lens or multiple lens system with more curvature in the camera lenses may allow a larger field of view of a scene to be captured by an image sensor. Some devices include multiple cameras with different fields of view based on curvatures of the focus lenses. For instance, a device may include a camera with a normal lens having a normal field of view, and a different camera with a wide-angle lens having a wider field of view. A user of the camera, or software application running on the camera's processor, can select between the different cameras based on field of view, to select the camera with a field of view that is optimal for capturing a particular set of images or video. For example, some smartphones include a telephoto camera, a wide angle camera, and an ultra-wide angle camera with different fields of view. Before capture, the user or software application may select which camera to use based on the field of view of each camera. Compensation for such distortion can be computationally expensive and inaccurate due to reliance on approximations. Applying distortion compensation can retain some of the original distortion, can overcompensate, and/or can introduce other image artifacts.

However, the ultra-wide angle camera may have a field of view that is less than a desired field of view of the scene to be captured. For example, many users want to capture images or video with a field of view of a scene larger than the field of view of the camera. A device manufacturer may increase the curvature of a camera lens to increase the field of view of the camera. However, the device manufacturer may also need to increase the size and complexity of the image sensor to accommodate the larger field of view.

Additionally, lens curvature introduces distortion into the captured image frames from the camera. For instance, lens curvature can introduce radial distortion, such as barrel distortion, pincushion distortion, or mustache distortion. Digital image manipulation can, in some cases, be used to perform software-based compensation for radial distortion by warping the distorted image with a reverse distortion. However, software-based compensation for radial distortion can be difficult and computationally expensive to perform. Moreover, software-based compensation generally relies on approximations and models that may not be applicable in all cases, and can end up warping the image inaccurately or incompletely. The resulting image with the compensation applied may still retain some radial distortion, may end up distorted in an opposite manner to the original image due to overcompensation, or may include other visual artifacts.

Systems and techniques are described for imaging to generate an image with a large field of view. For example, an imaging device can include a first camera with a first image sensor that captures a first image based on first light redirected by one or more light redirection elements. The one or more light redirection elements can redirect the first light from a first path to a redirected first path toward the first camera, for instance using a first prism and/or a first reflective surface of the one or more light redirection elements. The imaging device can include a second camera with a second image sensor that captures a second image based on second light redirected by the one or more light redirection elements. The one or more light redirection elements can redirect the second light from a second path to a redirected second path toward the second camera, for instance using a second prism and/or a second reflective surface of the one or more light redirection elements. The first image sensor can capture a first image based on receipt of the first light. The second image sensor can capture a second image based on the second light. The first image can include a first depiction of a shared portion of the scene. The second image can include a second depiction of the shared portion of the scene. The imaging device can generate a combined image at least in part by combining the first image and the second image. In some examples, the imaging device can combine the first image and the second image at least in part by aligning and stitching the first image and the second image together. The combined image can have a field of view that is larger than at least one of a first field of view of the first image or a second field of view of the second image.

Before combining the first image and the second image to form the combined image, the imaging device can modify the first image and/or the second image using perspective distortion correction, for instance to make the first image and the second image appear to view the photographed scene from the same angle. Before combining the first image and the second image to form the combined image, the imaging device can modify the first image and/or the second image to align one or more properties of the first depiction of the shared portion of the scene with the second depiction of the shared portion of the scene. The one or more properties can include brightness, contrast, positioning, tint, hue, saturation, sharpness, other image properties discussed herein, or a combination thereof. In one illustrative example, the imaging device can adjust a property (e.g., brightness) of at least a portion of the first image that includes the first depiction of the shared portion of the scene to align with a corresponding property (e.g., brightness) of at least a portion of the second image that includes the second depiction of the shared portion of the scene. This can reduce or avoid visual artifacts such as visible "seams" in the combined image caused by sudden changes in the property between two portions of the combined image corresponding to the first image and the second image, respectively, instead providing the combined image with smooth transitions in the property between the two portions of the combined image. In another illustrative example, the imaging device can warp at least a portion of the first image that includes the first depiction of the shared portion of the scene to align a property (e.g., positioning) of the first image with a corresponding property (e.g., positioning) of at least a portion of the second image that includes the second depiction of the shared portion of the scene. This can reduce or avoid visual artifacts such as visible "seams" in the combined image caused by misalignments in positioning of certain objects and/or visual features between two portions of the combined image corresponding to the first image and the second image, respectively, instead providing the combined image with smooth transitions in the property between the two portions of the combined image. In some aspects, the imaging device can modify both the first image and the second image to align a property, for instance to align the property for the first image and the property for the second image at a middle ground value, the middle ground values between starting values for the property corresponding to the first image and the second image.

The first camera, the second camera, and the one or more light redirection elements can be arranged so that a virtual extension of the first path beyond the one or more light redirection elements intersects with a virtual extension of the second path intersect beyond the one or more light redirection elements. The first camera, the second camera, and the one or more light redirection elements can be arranged so that first lens of the first camera and a second lens of the second camera virtually overlap based on the light redirection without physically overlapping.

The light redirection element can include a first prism coupled to a second prism along a coupling interface. The coupling interface can include edges cut and polished from corners of the first prism and the second prism. The coupling interface between the first prism and the second prism can include one or more coatings. The one or more coatings can include an epoxy, a glue, a cement, a mucilage, a paste, and/or another adhesive. The one or more coatings can include a colorant, such as a paint and/or a dye. The colorant can be non-reflective of light and/or absorbent of light.

In some examples, the device may use non-wide-angle lenses, rather than relying on wide-angle lenses with increased lens curvature, to generate the combined image having the large field of view. As a result, the cameras in the device can use lenses that do not introduce the radial distortion that wide-angle lenses and ultra-wide-angle lenses introduce, in which case there is little or no need to apply radial distortion compensation. Thus, generation of the combined image having the large field of view with the device can be both less computationally expensive and more accurate than producing a comparable image with a camera having a curved lens that introduces radial distortion and a processor that then compensates for that radial distortion. The individual cameras in the device can also each have a smaller and less complex image sensor than the image sensor in a camera with a curved lens that introduces radial distortion. Thus, the individual cameras in the device can draw less power, and require less processing power to process, than the camera with the curved lens that introduces radial distortion.

FIG. 1 is a conceptual diagram 100 illustrating an example of a distortion in an image captured using a camera 112 with a lens 104 having lens curvature. The distortion is based on the curvature of a lens 104. The camera 112 includes at least the lens 104 and the image sensor 106. The lens 104 directs light from the scene 102 to the image sensor 106. The image sensor 106 captures one or more image frames. Captured image frame 108 is an example image frame that depicts the scene 102 and that is captured by the image sensor 106 of the camera 112. The captured image frame 108 includes a barrel distortion, which is a type of radial distortion. The barrel distortion in the captured image frame 108 causes the center of the scene 102 to appear stretched in the captured image frame 108 with reference to the edges of the scene, while the corners of the scene 102 appear to be pinched toward the center in the captured image frame 108.

A device, such as the camera 112 or another image processing device, may process the captured image frame 108 using distortion compensation to reduce the barrel distortion. However, the processing may create its own distortion effects on the captured image frame 108. For example, the center of the scene 102 in the captured frame 108 may be normalized or otherwise adjusted with reference to the edges of the scene in the captured image frame 108. Adjusting the center may include stretching the corners of the scene in the captured image frame 108 to more closely resemble a rectangle (or the shape of the image sensor if different than a rectangle). An example processed image frame 110 generated by processing the captured image frame 108 using distortion compensation is illustrated in FIG. 1. The example processed image frame 110 illustrates an example in which the distortion compensation overcompensates for the barrel distortion and introduces a pincushion distortion, which is another type of radial distortion. Stretching the corners too much while processing the captured image frame 108 may introduce the pincushion distortion for instance. Processing an image using distortion compensation can also introduce other image artifacts.

The lens curvature of a lens 104 can be increased in order to increase the field of view for captured image frames by the image sensor 106. For example, wide-angle lenses, ultra-wide-angle lenses, and fisheye lenses all typically exhibit high levels of lens curvature that generally result in barrel distortion, other types of radial distortion, or other types of distortion. As a result, the distortion increases in each captured image frame 108 captured using such a lens, as in the barrel distortion illustrated in FIG. 1. The likelihood of distortion compensation to introduce distortions or other image artifacts into a processed image frame 110, such as the pincushion distortion illustrated in FIG. 1, also increases with increased curvature in the lens 104. Therefore, images captured and/or generated using a lens 104 with an increased lens curvature, including images with smaller fields of view than desired (e.g., a cropped image) are generally distorted or include artifacts.

Some devices also include a software function to generate images with a wider field of view using a single camera based on motion of the camera. For example, some camera applications include a camera-movement panoramic stitching mode to generate images with wider fields of view than the camera. For a camera-movement panoramic stitching mode, a user moves a camera while the camera captures a sequence of image frames until all of a scene is included in at least one of the image frames. The image frames are then stitched together to generate the wide angle image.

Figure 2:
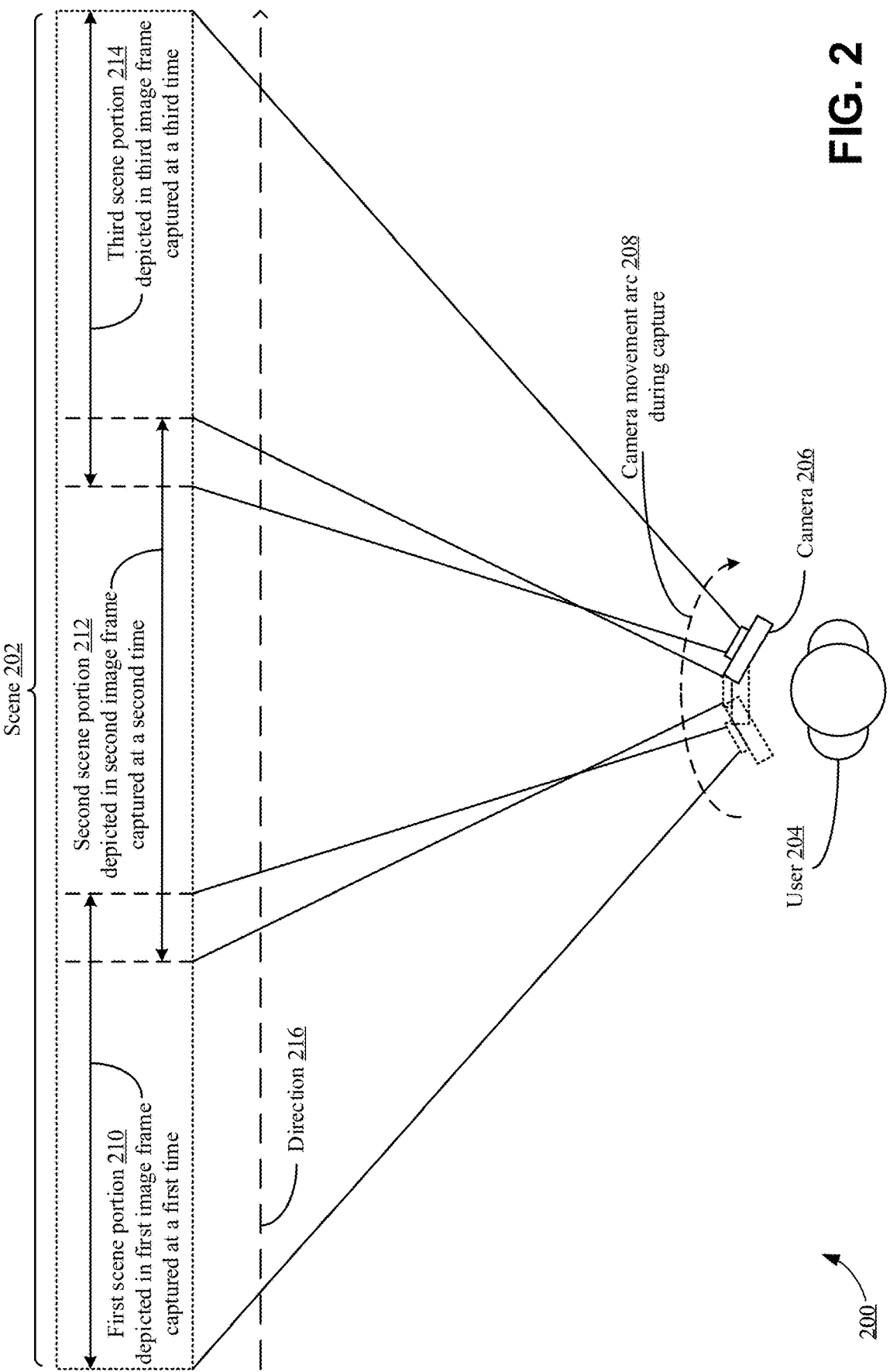
FIG. 2 is a conceptual diagram illustrating an example wide angle image capture based on a sequence of captures by a camera, in accordance with some examples.

FIG. 2 is conceptual diagram 200 illustrating an example wide angle image capture of a scene 202 based on a sequence of captures by a camera 206. The user 204 wishes to capture an image of the scene 202, but the field of view required to depict the entire scene 202 is greater than the field of view of the camera 206. Therefore, the user 204 places the camera 206 in a camera-movement panoramic stitching mode. The user 204 positions the camera 206 in a first position indicated by a first illustration of the camera 206 using dotted lines so that the field of view of the camera is directed towards first scene portion 210. The user 204 instructs the camera 206 to begin image frame capture (such as by pressing a shutter button), and the camera 206 captures a first image frame with the first scene portion 210. The user 204 moves the camera 206 (such as along the camera movement arc 208) to move the camera's field of view of the scene 102 along direction 216. After capturing the first image frame, the camera 206 captures a second image frame of the second scene portion 212 while the camera 206 is in a second position indicated by a second illustration of the camera 206 using dotted lines. The second position of the camera 206 is located further along the direction 216 than the first position of the camera 206. The second position of the camera 206 is located further along the camera movement arc 208 than the first position of the camera 206. The user continues to move the camera 206, and the camera 206 captures a third image frame of the third scene portion 214 while the camera 206 is in a third position indicated by an illustration of the camera 206 using solid lines. The third position of the camera 206 is located further along the direction 216 than the second position of the camera 206. The third position of the camera 206 is located further along the camera movement arc 208 than the second position of the camera 206. After panning the camera 206 along the camera movement arc 208 to capture image frames across the scene 202 during image frame capture, the user 204 may stop the image frame captures (such as by again pressing a shutter button or by letting go of a shutter button that was continually held during image frame capture). After capture of the sequence of image frames, the camera 206 or another device may stitch the sequence of image frames together to generate a combined image of the scene 102 having a wider field of view than each of the first image frame, the second image frame, and the third image frame. For example, the first image frame of the first scene portion 210, the second image frame of the second scene portion 212, and the third image frame of the third scene portion 214 (captured at different times) are stitched together to generate the combined image depicting the entire scene 202, which can be referred to as a wide angle image of the entire scene 202. While three image frames are shown, a camera-movement panoramic stitching mode may be used to capture and combine two or more image frames based on the desired field of view for the combined image.

Figure 3:
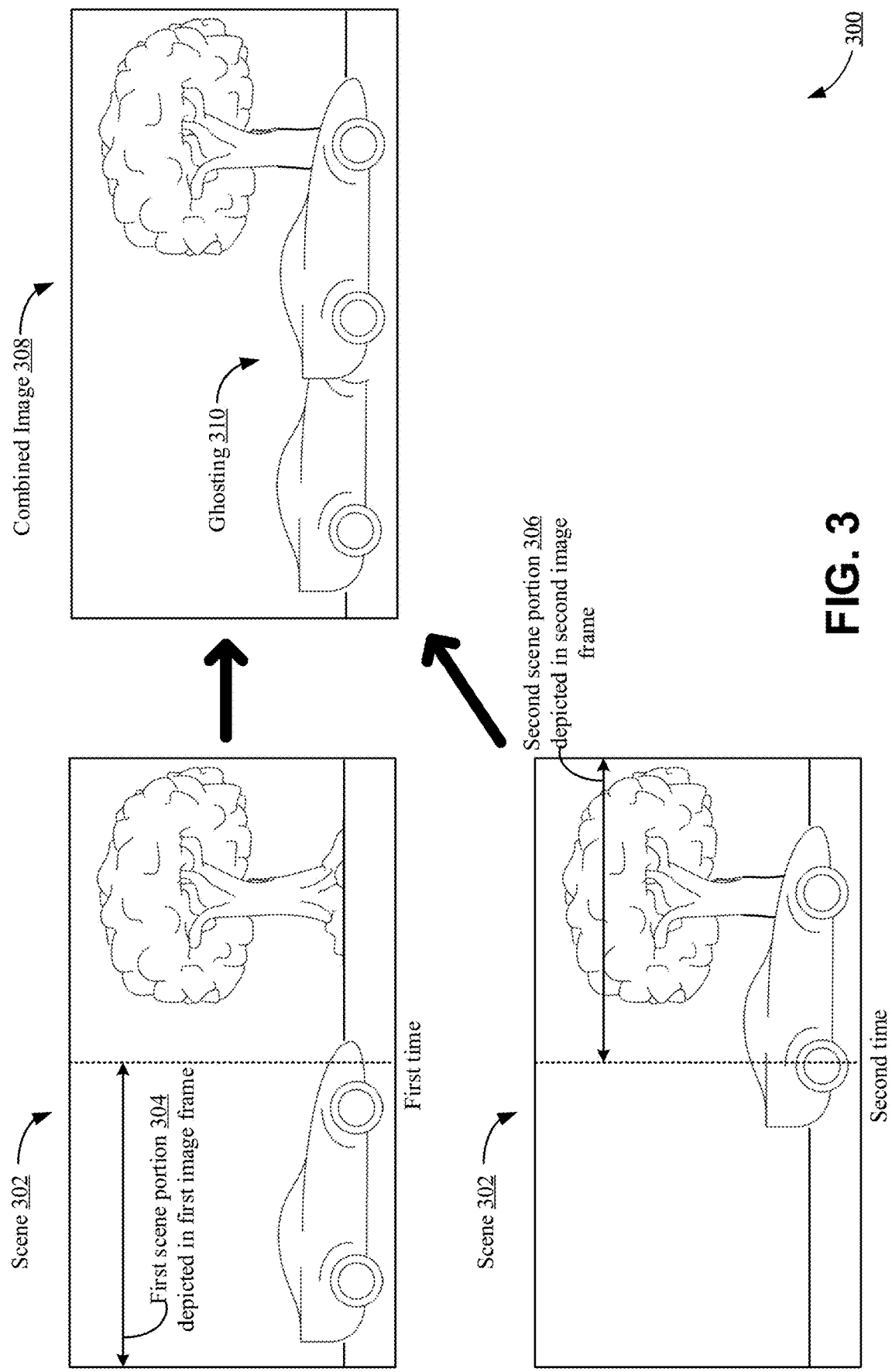
FIG. 3 is a conceptual diagram illustrating an example ghosting distortion in a wide angle image generated using panoramic stitching, in accordance with some examples.
Figure 4:
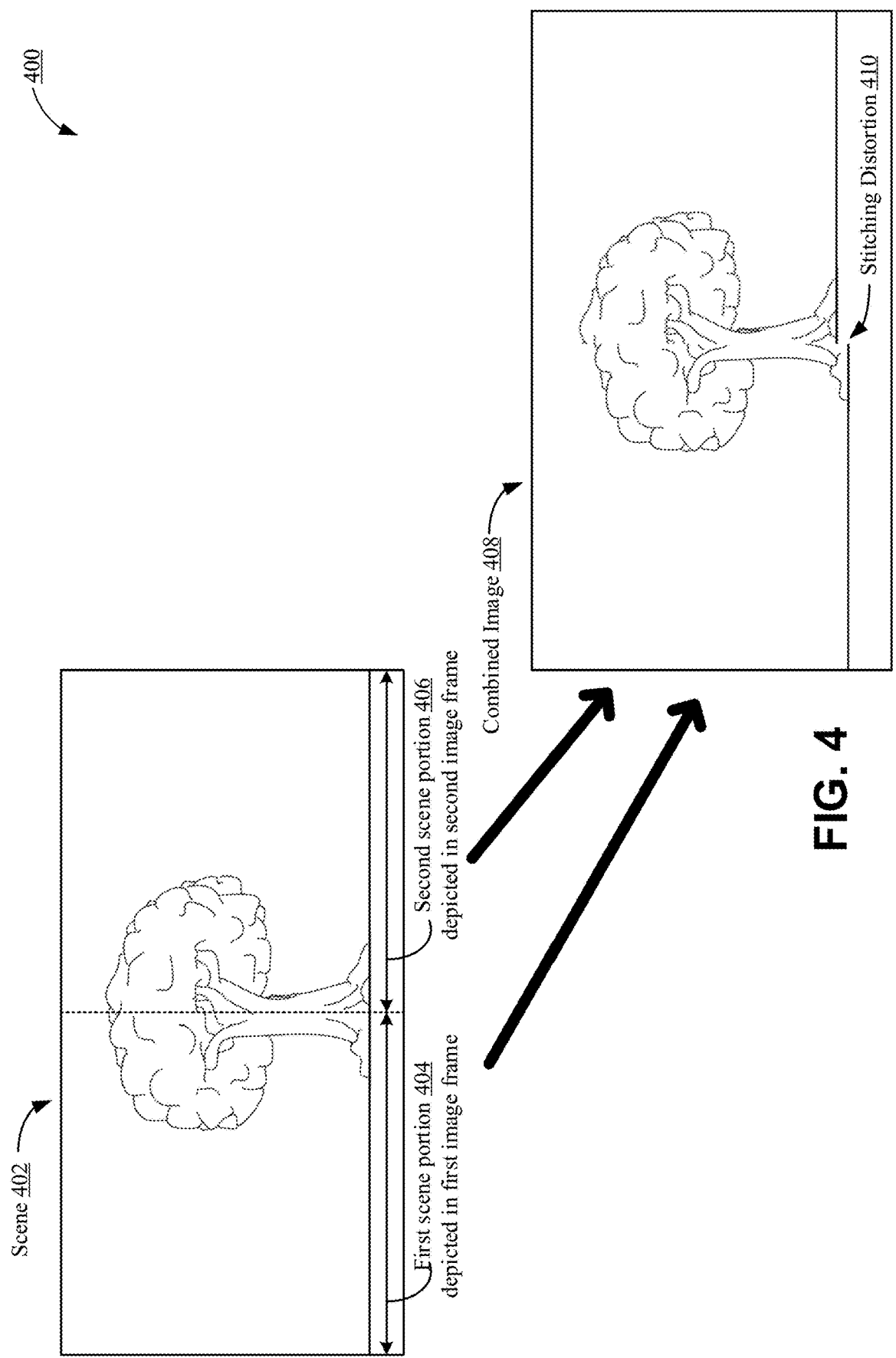
FIG. 4 is a conceptual diagram illustrating an example stitching distortion in a wide angle image generated using panoramic stitching, in accordance with some examples.

For example, the camera 206 or another device can identify that a first portion of the first image frame and a second portion of the second image frame both depict a shared portion of the scene 202. The shared portion of the scene 202 is illustrated between two dashed vertical lines that fall within both the first scene portion 210 and the second scene portion 212. The camera 206 or other device can identify the shared portion of the scene 202 within the first image and the second image by detecting features of shared portion the scene 202 within both the first image and the second image. The camera 206 or other device can align the first portion of the first image with the second portion of the second image. The camera 206 or other device can generate a combined image from the first image and the second image by stitching the first portion of the first image and the second portion of the second image together. The camera 206 can similarly stitch together the second image frame and the third image frame. For instance, the camera 206 or other device can identify a second shared portion of the scene 202 depicted in the third portion of the third image frame and a fourth portion of the second image frame. The camera 206 or other device can stitch together the third portion of the third image frame and the fourth portion of the second image frame. Since a sequence of image frames are captured over a period of time while the camera 206 is moving along the camera movement arc 208, the camera-movement panoramic stitching mode illustrated in FIG. 2 may be limited to generating still images and not video, since a succession of panoramic stitching combined images cannot be generated quickly enough to depict fluid movement. Additionally, the camera 206 being moved and the time lapse in capturing the sequence of image frames can introduce one or more distortions or artifacts into a generated image. Example distortions include ghosting distortions and stitching distortions. A ghosting distortion is an effect where multiple instances of a single object may appear in a final image. A ghosting distortion may be a result of local motion in the scene 202 during the sequence of image frame captures. An example of a ghosting distortion is illustrated in FIG. 3. A stitching distortion is an effect where edges may be broken or objects may be split, warped, overlaid, and so on where two image frames are stitched together. An example of a stitching distortion is illustrated in FIG. 4.

Distortions are also introduced by an entrance pupil of the camera changing depths from the scene when the camera is moved. In other words, moving the camera changes a position of a camera's entrance pupil with reference to the scene. An entrance pupil associated with an image sensor is the image of an aperture from a front of a camera (such as through one or more lenses preceding or located at the aperture to focus light towards the image sensor).

For the depths of objects in a scene to not change with reference to a moving camera between image captures, the camera needs to be rotated at an axis centered at the entrance pupil of the camera. However, when a person moves the camera, the person does not rotate the camera on an axis at the center of the entrance pupil. For example, the camera may be moved around an axis at the torso of the person moving the camera (or the rotation also includes translational motion). Since the camera rotation is not on an axis at the entrance pupil, the position of the entrance pupil changes between image frame captures, and the image frames are captured at different depths. A stitching distortion may be a result of parallax artifacts caused by stitching together image frames captured at different depths. A stitching distortion may also be a result of global motion (which also includes a change in perspective of the camera when capturing the sequence of image frames).

Distortions and artifacts can also be introduced into the combined image based on varying speeds of the user's movement of the camera 206 along the camera movement arc 208. For example, certain image frames may include motion blur in certain frames if motion of the camera 206 is fast. Likewise, if motion of the camera 206 is fast, the shared portion of the scene depicted in two consecutive image frames may be very small, potentially introducing distortions due to poor stitching. Distortions and artifacts can also be introduced into the combined image if certain camera settings of the camera 206, such as focus or gain, change between image frame captures during the camera movement arc 208. Such changes in camera settings can produce visible seams between images in the resulting combined image.

The figures illustrated herein depict each lens of each camera at a location of an entrance pupil for the camera. For example, this is the case in FIGS. 6-9, FIG. 11, and FIGS. 12A-12C. While a camera lens is illustrated as a single camera lens in the figures to prevent obfuscating aspects of the disclosure, the camera lens may represent a single element lens or a multiple element lens system of a camera. In addition, the camera may have a fixed focus, or the camera may be configured for autofocus (for which one or more camera lenses may move with reference to an image sensor). The present disclosure is not limited to a specific example of an entrance pupil or its location, or a specific example of a camera lens or its location depicted in the figures.

FIG. 3 is a conceptual diagram 300 illustrating an example ghosting distortion 310 in a wide angle image generated using panoramic stitching. Panoramic stitching can refer to the camera-movement panoramic stitching mode of operation in FIG. 2. A device, in a camera-movement panoramic stitching mode, is to generate an image 308 of the scene 302. The user positions the device so that the device's camera captures a first image frame including a first scene portion 304 at a first time. The user moves the device so that the device's camera captures a second image frame including the second scene portion 306 at a second time. The scene 302 includes a car moving from left to right in the scene 302. As a result of the car moving in scene 302, the first image frame includes a substantial portion of the car also included in the second image frame. When the two image frames are stitched together, the car may appear as multiple cars or portions of cars (illustrated as ghosting distortion 310) in the resulting image 308.

On the other hand, if the car in the scene 302 is moving from right to left instead of left to right, then the car may be at least partially omitted from the image 308 despite being present in the scene 302 during capture of the first image frame and/or during capture of the second image frame. For example, if the car is at least partially in the second scene portion 306 at the first time during capture of the first image frame, then the car may be at least partially omitted from the first image frame. If the car is at least partially in the first scene portion 304 at the second time during capture of the second image frame, then the car may be at least partially omitted from the second image frame. The combined image 308 may thus at least partially omit the car, and in some cases may include more than one copy of a partially omitted car. This type of omission represents another type of distortion or image artifact that can result from camera-movement panoramic stitching through motion of a camera 206 as illustrated in FIG. 2.

FIG. 4 is a conceptual diagram 400 illustrating an example stitching distortion 410 in a wide angle image generated using panoramic stitching. Panoramic stitching can refer to the camera-movement panoramic stitching mode of operation in FIG. 2. FIG. 4 further depicts a parallax artifact induced stitching distortion. A device, in the camera-movement panoramic stitching mode, can generate a combined image 408 of the scene 402. The user positions the device so that the device's camera 206 captures a first image frame including a first scene portion 404 at a first time. The user moves the device so that the device's camera 206 captures a second image frame including a second scene portion 406 at a second time. As a result of the camera 206 moving between image frame captures (with the position of the entrance pupil changing) and/or the change in perspective of the first image frame and the second image frame of the scene 402, there may exist parallax based and camera movement based artifacts or distortions when the two image frames are stitched together. For example, the combined image 408 is generated by stitching the first image frame and the second image frame together. As shown, a stitch distortion 410 exists where a left portion of the tree does not align with a right portion of the tree, and where a left portion of the ground does not align with a right portion of the ground. While the example stitching distortion 410 is illustrated as a lateral displacement between the portions of the scene captured in the two image frames, the stitching distortion 410 may also include a rotational displacement or warping caused by attempts to align the image frames during stitching. In this manner, lines that should be straight and uninterrupted in the scene may appear to break at an angle in a final image, lines that should be straight may appear curved near a stitch, lines that should be straight may suddenly change direction near a stitch, or objects may otherwise appear warped or distorted on one side of the stitch compared to the other side as a result of a rotation. Distortions from stitching are enhanced by the movement of the single camera to capture the image frames over time. For example, in some cases, stitching distortions may cause an object in the scene to appear stretched, squished, slanted, skewed, warped, distorted, or otherwise inaccurate in the combined image 408.

Another example distortion is a perspective distortion. Referring back to FIG. 2, the perspective of the camera 206 is from the right of the scene portion 210, and the perspective of the camera 206 is from the left of the scene portion 214. Therefore, horizontal edges (such as a horizon) may appear slanted in one direction in the first image frame, and the same horizontal edges (such as the horizon) may appear slanted in the opposite direction in the third image frame. A final image from the image frames stitched together may connect the opposite slanted edges via an arc. For example, a horizon in combined images generated using a camera-movement panoramic stitching mode can appear curved rather than flat. Such curvature is an example of a perspective distortion. To exacerbate the perspective distortion, the perspective varies based on the camera movement, which can be inconsistent between different instances of generating a wide angle image through camera-movement panoramic stitching. As a result, the camera perspectives during one sequence of captured image frames can differ from the camera perspectives during other sequences of captured image frames.

As described above, distortions caused by increasing a lens curvature to increase a field of view reduces the quality of the resulting images, which negatively impacts the user experience. Furthermore, distortions caused by capturing a sequence of image frames over time (in a camera-movement panoramic stitching mode) to generate a wide angle image reduces the quality of the resulting images, which negatively impacts the user experience. Additionally, a camera-movement panoramic stitching mode that entails capture of a sequence of image frames while a user manually moves the camera may prevent the camera from performing video capture or may cause parallax artifacts that are difficult to remove because of the camera movement. Therefore, there is a need for a means for generating a wide angle image with a large field of view (including a sequence of wide angle images with large fields of view for video) that prevent or reduce the above described distortions.

In some examples of panoramic stitching, multiple cameras are used to capture image frames, which can allow panoramic stitching to be performed without camera movement. Image frames captured by the different cameras can be stitched together to generate a combined image with a field of view greater than the field of view of any one camera of the multiple cameras. As used below, such a combined image (with a field of view greater than the field of view of any one camera of the multiple cameras) is referred to as a wide angle image. The multiple cameras may be positioned so that the center of their entrance pupils overlap (such as virtually overlap). In this manner, the multiple cameras or a device including the multiple cameras is not required to be moved (which may cause the position of one or more entrance pupils to change). As a result, no distortions caused by a device movement is introduced into the generated wide angle images. In some implementations, the multiple cameras are configured to capture image frames concurrently and/or contemporaneously. As used herein, concurrent capture of image frames may refer to contemporaneous capture of the image frames. As used herein, concurrent and/or contemporaneous capture of image frames may refer to at least a portion of the exposure windows overlapping for corresponding image frames captured by the multiple cameras. As used herein, concurrent and/or contemporaneous capture of image frames may refer to at least a portion of the exposure windows for corresponding image frames falling within a shared time window. The shared time window may, for example, have a duration of one or more picoseconds, one or more nanoseconds, one or more milliseconds, one or more centiseconds, one or more deciseconds, one or more seconds, or a combination thereof. In this manner, no or fewer distortions caused by a time lapse in capturing a sequence of image frames is introduced into the generated wide angle image.

In addition to overlapping the center of the entrance pupils, the cameras may be positioned with reference to each other to capture a desired field of view of a scene. Since the position of the cameras with reference to one another is known, a device may be configured to reduce or remove perspective distortions based on the known positioning. Additionally, because of images captured by multiple cameras capture concurrently and/or contemporaneously does not require each camera to capture a sequence of image frames as in the camera-movement panoramic stitching mode of FIG. 2, a device with multiple cameras may be configured to generate a wide angle video that includes a succession of wide angle video frames. Each video frame can be a combined image generated by stitching together two or more images from two or more cameras.

In the following description, numerous specific details are set forth, such as examples of specific components, circuits, and processes to provide a thorough understanding of the present disclosure. The term "coupled" as used herein means connected directly to or connected through one or more intervening components or circuits. Also, in the following description and for purposes of explanation, specific nomenclature is set forth to provide a thorough understanding of the present disclosure. However, it will be apparent to one skilled in the art that these specific details may not be required to practice the teachings disclosed herein. In other instances, well known circuits and devices are shown in block diagram form to avoid obscuring teachings of the present disclosure. Some portions of the detailed descriptions which follow are presented in terms of procedures, logic blocks, processing and other symbolic representations of operations on data bits within a computer memory. In the present disclosure, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving," "settling," "generating" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps are described below generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the example devices may include components other than those shown, including well-known components such as a processor, memory, and the like.

Aspects of the present disclosure are applicable to any suitable electronic device including or coupled to multiple image sensors capable of capturing images or video (such as security systems, smartphones, tablets, laptop computers, digital video and/or still cameras, image capture devices 2005A, image processing devices 2005B, image capture and processing system 2000, computing systems 2900, and so on). The terms "device" and "apparatus" are not limited to one or a specific number of physical objects (such as one smartphone, one camera controller, one processing system and so on). As used herein, a device may be any electronic device with one or more parts that may implement at least some portions of the disclosure. While the below description and examples use the term "device" to describe various aspects of the disclosure, the term "device" is not limited to a specific configuration, type, or number of objects. As used herein, an apparatus may include a device or a portion of the device for performing the described operations.

Depictions in the figures may not be drawn to scale or proportion, and implementations may vary in size or dimensions than as depicted in the figures. Some of the figures depict a camera lens indicating an entrance pupil of a camera. However, the lenses and entrances pupils may be in any suitable positioning with reference to each other (and the image sensors) to perform aspects of the present disclosure. A lens depicted in the figures may indicate a single element lens or a multiple element lens (even though a lens may appear to be depicted as a single element lens in the figures). Therefore, the present disclosure is not limited to examples explicitly depicted in the figures.

Figure 5:
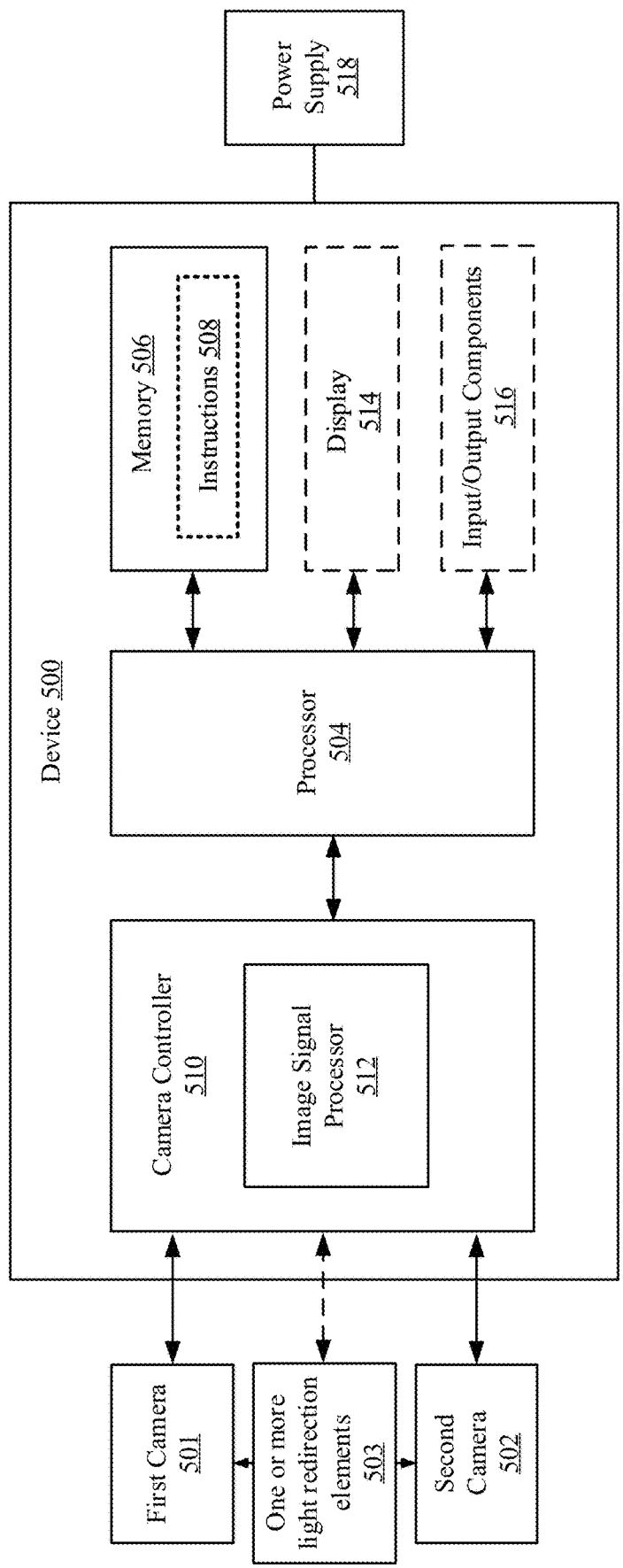
FIG. 5 is a block diagram illustrating an example device configured to generate one or more wide angle images, in accordance with some examples.

FIG. 5 is a block diagram illustrating an example device 500 configured to generate one or more wide angle images. The example device 500 includes (or is coupled to) a camera 501 and a camera 502. While two cameras are depicted, the device 500 may include any number of cameras (such as 3 cameras, 4 cameras, and so on). The first camera 501 and the second camera 502 may be included in a single camera module or may be part of separate camera modules for the device 500. In the example of a smartphone or tablet, the first camera 501 and the second camera 502 may be associated with one or more apertures on a same side of the device to receive light for capturing image frames of a scene. The first camera 501 and the second camera 502 may be positioned with reference to one another to allow capture of a scene by combining images from the with camera 501 and camera 502 to produce a field of view greater than the field of view of the first camera 501 and/or the second camera 502. In some implementations, the device 500 includes (or is coupled to) one or more light redirection elements 503. At least a first subset of the one or more light redirection elements 503 may redirect light towards the first camera 501. At least a second subset of the one or more light redirection elements 503 may redirect light towards the second camera 502. The first camera 501 can capture a first image based on incident light redirected by the one or more light redirection elements 503. The second camera 502 can capture a second image based on incident light redirected by the one or more light redirection elements 503. The device 500 may combine the first image and the second image in order to generate a combined image having a combined image field of view that is wider and/or larger than a first field of view of the first image, a second field of view of the second image, or both. The combined image may be referred to as a wide angle image. The combined image field of view may be referred to as a large field of view, a wide field of view, or a combination thereof.

The device 500 may generate the combined image by combining the first image and the second image, for instance by stitching together the first image and the second image without any need for movement of the first camera 501 and/or the second camera 502. For example, the device or another device can identify that a first portion of the first image captured by the first camera 501 and a second portion of the second image captured by the second camera 502 both depict a shared portion of the photographed scene. The device 500 can identify the shared portion of the scene within the first image and the second image by detecting features of shared portion the scene within both the first image and the second image. The device 500 can align the first portion of the first image with the second portion of the second image. The device 500 can generate the combined image from the first image and the second image by stitching the first portion of the first image and the second portion of the second image together.

The first camera 501 and the second camera 502 may be proprietary cameras, specialized cameras, or any type of cameras. In some aspects, the first camera 501 and the second camera 502 may be the same type of camera as one another. For instance, the first camera 501 and the second camera 502 may be the same make and model. In some aspects, the first camera 501 and the second camera 502 may be different types, makes, and/or models of cameras. While the examples below depict two similar cameras 501 and 502, any suitable number, types, or configurations of cameras may be used in performing aspects of the present disclosure. The first camera 501 and the second camera 502 may each be configured to receive and capture at least one spectrum of light, such as the visible light spectrum, the infrared light spectrum, the ultraviolet light spectrum, the microwave spectrum, the radio wave spectrum, the x-ray spectrum, the gamma ray spectrum, another subset of the electromagnetic spectrum, or a combination thereof.

The first camera 501, the second camera 502, and the one or more redirection elements 503 may be arranged such that the center of the entrance pupils associated with the first camera 501 and the second camera 502 virtually overlap. For example, each camera includes an image sensor coupled to one or more lenses to focus light onto the corresponding image sensor, and a lens and entrance pupil are at the same location for the camera. In using the one or more redirection elements 503, the first camera 501 and the second camera 502 may be arranged such that their lenses virtually overlap (e.g., the centers of their respective entrance pupils virtually overlap) without their lenses physically overlapping or otherwise occupying the same space. For example, light to be captured by the first camera 501 and the second camera 502 may be redirected (e.g., reflected and/or refracted) by the one or more redirection elements 503 so that the lenses of the first camera 501 and the second camera 502 can be physically separate while maintaining a virtual overlap of the lenses (e.g., a virtual overlap of the centers of the entrance pupils of the cameras). A parallax effect between image frames captured by the different camera 501 and 502 is reduced (or eliminated) as a result of the cameras' associated centers of the entrance pupils virtually overlapping.

As used herein, a virtual overlap may refer to a location that would include multiple objects (such as camera lenses) if the light is not redirected (such as described with reference to FIG. 7). For example, first lens of the first camera 501 and the second lens of the second camera 502 virtually overlapping can include a first virtual position of the first lens overlapping with a second virtual position of the second lens. A first light travels along a first path before the first light redirection element of the light redirection elements 503 redirects the first light away from the first path and toward the first camera 501. A second light travels along a second path before a second light redirection element of the light redirection elements 503 redirects the second light away from the second path and toward the second camera 502. A virtual extension of the first path beyond the first light redirection element intersects with the first virtual position of the first lens. A virtual extension of the second path beyond the second light redirection element intersects with the second virtual position of the first lens.

The device 500 may also include one or more additional lenses, one or more apertures, one or more shutters, or other suitable components that are associated with the first camera 501 and the second camera 502. The device 500 may also include a flash, a depth sensor, or any other suitable imaging components. While two cameras are illustrated as part of the device 500, the device 500 may include or be coupled to additional image sensors not shown. In this manner, wide angle imaging may include the use of more than two cameras (such as three or more cameras). The two cameras are illustrated for the examples below for clarity in explaining aspects of the disclosure, but the disclosure is not limited to the specific examples of using two cameras.

The example device 500 also includes a processor 504, a memory 506 storing instructions 508, and a camera controller 510. In some implementations, the device 500 may include a display 514, a number of input/output (I/O) components 516, and a power supply 518. The device 500 may also include additional features or components not shown. In one example, a wireless interface, which may include a number of transceivers and a baseband processor, may be included for a wireless communication device. In another example, one or more motion sensors (such as a gyroscope), position sensors (such as a global positioning system sensor (GPS)), and a sensor controller may be included in a device.

The memory 506 may be a non-transient or non-transitory computer readable medium storing computer-executable instructions 508 to perform all or a portion of one or more operations described in this disclosure. In some implementations, the instructions 508 include instructions for operating the device 500 in a wide angle capture mode using the first camera 501 and the second camera 502. The instructions 508 may also include other applications or programs executed by the device 500, such as an operating system, a camera application, or other applications or operations to be performed by the device 500. In some examples, the memory 506 stores image frames (as a frame buffer) for the first camera 501 and/or for the second camera 502.

In some examples, the memory 506 stores camera brightness uniformity calibration data. Using the camera brightness uniformity calibration data, the device 500 (e.g., the camera controller 510, the ISP 512, and/or the processor 504) can adjust brightness levels in a first image from the first camera 501 and/or brightness levels in a second image from the second camera 502. For instance, the device 500 can remove vignetting or other brightness non-uniformities from the first image, the second image, or both. The device 500 can also increase or decrease overall brightness in the first image, the second image, or both, so that overall brightness matches between the first image and second image. Such brightness adjustments can ensure that there is no visible seam in the combined image (e.g., between the portion of the combined image that is from the first image and the portion of the combined image that is from the second image). In some examples, the memory 506 stores perspective distortion correction data. The perspective distortion correction data can include data such as angles, distances, directions, amplitudes, distortion correction vectors, curvatures, or a combination thereof. Using the perspective distortion correction data, the device 500 (e.g., the camera controller 510, the ISP 512, and/or the processor 504) can perform perspective distortion correction (e.g., perspective distortion correction 1022, flat perspective distortion correction 1515, curved perspective distortion correction 1525).

The processor 504 may be one or more suitable processors capable of executing scripts or instructions of one or more software programs (such as instructions 508) stored within the memory 506. In some aspects, the processor 504 may be one or more general purpose processors that execute instructions 508. For example, the processor 504 may be an applications processor and may execute a camera application. In some implementations, the processor 504 is configured to instruct the camera controller 510 to perform one or more operations with reference to the first camera 501 and the second camera 502. In additional or alternative aspects, the processor 504 may include integrated circuits or other hardware to perform functions or operations without the use of software.

While shown to be coupled to each other via the processor 504 in the example of FIG. 5, the processor 504, the memory 506, the camera controller 510, the optional display 514, and the optional I/O components 516 may be coupled to one another in various arrangements. For example, the processor 504, the memory 506, the camera controller 510, the optional display 514, and/or the optional I/O components 516 may be coupled to each other via one or more local buses (not shown for simplicity).

If the device 500 includes a display 514, the display 514 may be any suitable display or screen allowing for user interaction and/or to present items for viewing by a user (such as captured images, video, or preview images from one or more of the first camera 501 and the second camera 502). In some aspects, the display 514 is a touch-sensitive display. The optional I/O components 516 may include any suitable mechanism, interface, or device to receive input (such as commands) from the user and to provide output to the user. For example, the I/O components 516 may include a graphical user interface (GUI), keyboard, mouse, microphone and speakers, a squeezable bezel, one or more buttons (such as a power button), a slider, or a switch.

The camera controller 510 may include an image signal processor (ISP) 512, which may be one or more image signal processors to process captured image frames provided by the one or more cameras 501 and 502. In some example implementations, the camera controller 510 (such as the image signal processor 512) may also control operation of the first camera 501 and the second camera 502. For example, the camera controller 510 (such as the image signal processor 512) may receive instructions from the processor 504 to perform wide angle imaging, and the camera controller 510 may initialize the first camera 501 and the second camera 502 and instruct the first camera 501 and the second camera 502 to capture one or more image frames that the camera controller 510 and/or processor 504 combine into a combined image using panoramic stitching for wide angle imaging. The camera controller 510 may control other aspects of the first camera 501 and the second camera 502, such as operations for performing one or more of automatic white balance, automatic focus, or automatic exposure operations.

In some aspects, the image signal processor 512 includes one or more processors configured to execute instructions from a memory (such as instructions 508 from the memory 506, instructions stored in a separate memory coupled to the image signal processor 512, or instructions provided by the processor 504). For example, the image signal processor 512 may execute instructions to process image frames from the first camera 501 and the second camera 502 to generate a wide angle image. In addition or alternative to the image signal processor 512 including one or more processors configured to execute software, the image signal processor 512 may include specific hardware to perform one or more operations described in the present disclosure. The image signal processor 512 alternatively or additionally may include a combination of specific hardware and the ability to execute software instructions.

While the image signal processor 512 is depicted as part of the camera controller 510, the image signal processor 512 may be separate from the camera controller 510. For example, the camera controller 510 to control the first camera 501 and the second camera 502 may be included in the processor 504 (such as embodied in instructions 508 executed by the processor 504 or embodied in one or more integrated circuits of the processor 504). The image signal processor 512 may be part of the image processing pipeline from an image sensor (for capturing image frames) to memory (for storing the image frames) and separate from the processor 504.

While the following examples for performing wide angle imaging or image capture are described with reference to the example device 500 in FIG. 5, any suitable device or apparatus may be used. For example, the device performing wide angle imaging may be a portion of the device 500 (such as a system on chip or components of an imaging processing pipeline). In another example, the device 500 may include a different configuration of components or additional components than as depicted.

The device 500 is configured to generate one or more wide angle images using the first camera 501 and the second camera 502. For example, the first camera 501 and the second camera 502 are configured to capture image frames, and the device 500 (such as the image signal processor 512) is configured to process the image frames to generate a wide angle image. As used herein, a wide angle image refers to an image with a wider field of view than the first camera 501 or the second camera 502. In processing the image frames, the device 500 combines the image frames to generate the wide angle image (which may also be referred to as a combined image). The first camera 501 and the second camera 502 may be positioned so that the centers of the associated entrance pupils virtually overlap. In this manner, parallax effects may be reduced or removed. Processing may also include reducing distortions in the image frames for the combined image (such as reducing perspective distortions based on the difference in positions between the first camera 501 and the second camera 502 and nonuniform brightness distortions caused by a configuration of one or more camera lenses focusing light onto the image sensor of camera 501 or 502). In some implementations, the first camera 501 and the second camera 502 may be configured to capture image frames concurrently and/or contemporaneously. In this manner, distortions caused by global motion or local motion may be reduced or removed. As noted above, image frames being captured concurrently and/or contemporaneously may refer to at least a portion of the exposure windows for the image frames overlapping. The exposure windows may overlap in any suitable manner. For example, start of frame (SOF) for the image frames may be coordinated, end of frame (EOF) for the image frames may be coordinated, or there exists a range of time during which all of the image frames are in their exposure window. As used herein, concurrent and/or contemporaneous capture of image frames may refer to at least a portion of the exposure windows for corresponding image frames falling within a shared time window. The shared time window may, for example, have a duration of one or more picoseconds, one or more nanoseconds, one or more milliseconds, one or more centiseconds, one or more deciseconds, one or more seconds, or a combination thereof.

In some implementations, the first camera 501 and the second camera 502 are configured to capture image frames to appear as if the image sensors of the first camera 501 and the second camera 502 border one another. In some implementations, a first camera 501 and a second camera 502 may be at an angle from one another to capture different portions of a scene. For example, if a smartphone is in a landscape mode, the first camera 501 and the second camera 502 may be neighboring each other horizontally and offset from each other by an angle. The first camera 501 may capture a right portion of the scene, and the second camera 502 may capture a left portion of the scene.

In some examples, the first camera 501, the second camera 502, or both are stationary. In some examples, the lens of the first camera 501, the lens of the second camera 502, or both are stationary. In some examples, the image sensor of the first camera 501, the image sensor of the second camera 502, or both are stationary. In some examples, each of the one or more light redirection elements 503 is stationary.

Figure 6:
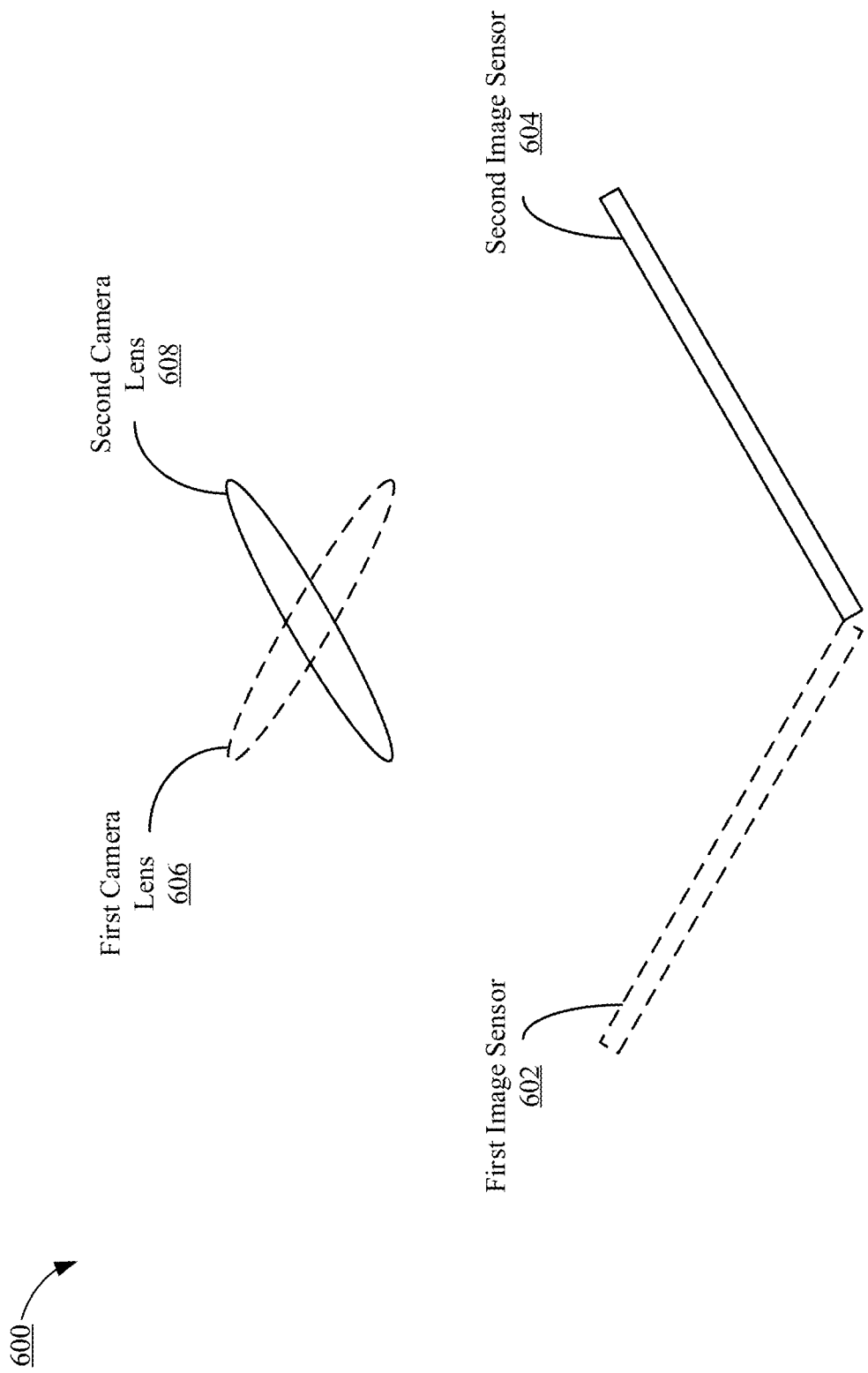
FIG. 6 is a conceptual diagram illustrating two image sensors and their associated lenses of two cameras for capturing image frames, in accordance with some examples.

FIG. 6 is a conceptual diagram 600 illustrating a first camera and a second camera. The first camera includes a first image sensor 602 and an associated first camera lens 606, which are illustrated using dashed lines in FIG. 6. The first camera lens 606 is located at the entrance pupil of the first camera. The second camera includes a second image sensor 604 and an associated second camera lens 608, which are illustrated using solid lines in FIG. 6. The second camera lens 608 is located at the entrance pupil of the second camera. As noted above, while a camera lens may be depicted as a single lens, the camera lens may be a single element lens or a multiple element lens system.

The conceptual diagram 600 may be an example of a conceptual configuration of the first camera 501 and the second camera 502 of the device 500. The conceptual depiction of the overlapping lenses 606 and 608 illustrates the entrance pupil of the first camera virtually overlapping with the entrance pupil of the second camera. The overlapping entrance pupil centers reduce or remove a parallax for image frames captured by the different image sensors 602 and 604. Corresponding image frames from the image sensors 602 and 604 may be combined to generate an image with a larger field of view than an individual image frame. For example, the images may be stitched together. As noted above, reducing or removing the parallax reduces the number and effect of artifacts or distortions that may exist in the combined image.

In some implementations, the field of view of the first image sensor 602 overlaps the field of view of the second image sensor 604. For example, a right edge of the first image sensor's field of view may overlap a left edge of the second image sensor's field of view.

Since the first image sensor 602 may capture a right portion of the scene in the wide angle image and the second image sensor 604 may capture a left portion of the scene in the wide angle image, the perspective of the wide angle image may be generated to be between the perspective of the first image sensor 602 and the perspective of the second image sensor 604. The image sensors 602 and 604 are not parallel to each other, and the image frames captured by the image sensors 602 and 604 include perspective distortions with reference to each other. To generate the wide angle image with a perspective between the two perspectives, the device 500 may perform perspective distortion correction on image frames from both image sensors 602 and 604 to generate image frames with a desired perspective. In some other implementations, the device 500 may perform perspective distortion correction on image frames from one image sensor to generate image frames with a similar perspective as the other image sensor. In this manner, a wide angle image may have a perspective of one of the image sensors.

In addition to reducing or removing parallax artifacts, the device 500 may reduce a perspective distortion with more success using the configuration shown in the conceptual diagram 600 than using a single camera in a camera-movement panoramic stitching mode that relies on a single camera that is physically moved (such as depicted in FIG. 2) or with more curvature of a camera lens to increase the field of view. Since the cameras have fixed positions with reference to each other, the angle between the image sensors 602 and 604 is static. Using the configuration shown in FIG. 6, the device 500 may process the captured image frames to reduce perspective distortion based on the angle. Since the angle is static, the perspective distortion may be corrected digitally (such as during processing of the captured image frames). For example, the device 500 may perform perspective distortion correction as a predefined filter (such as in the image signal processor 512) that is configured based on the angle between the image sensors 602 and 604. In contrast, angles between instances of an image sensor (for a camera-movement panoramic stitching mode that relies on a single camera that is physically moved as in FIG. 2) when being moved between image frame captures may vary depending on the device movement. Therefore, a device using a camera-movement panoramic stitching mode that relies on a single camera that is physically moved (as in FIG. 2) cannot use a predefined filter based on a static angle to remove perspective distortion, since the static angle does not exist. This makes perspective distortion very difficult and computationally expensive to compensate for in combined images generated using camera-movement panoramic stitching that relies on a single camera that is physically moved as in FIG. 2. A device 500 with fixed positions for the first camera 501, the second camera 502, and/or the one or more light redirection elements 503 can therefore perform perspective distortion correction more quickly, reliably, and at reduced computational expense.

Referring back to FIG. 6, the first camera and the second camera may have the same focal length. In this manner, the range of depths of the scene in focus is the same for the image sensors 602 and 604. However, the lenses 606 and 608 may not physically occupy the same space. In some implementations, a prism and/or a reflective surface may be configured to perform the functions of the spatially overlapped two lenses (without physical contact between separate lenses). For example, a prism and/or a reflective surface may be shaped to direct light from a first direction to the first camera lens 606 and direct light from a second direction to the second camera lens 608 such that the virtual images of the entrance pupils associated with the camera lenses 606 and 608 overlap at their centers.

In some other implementations, the cameras may be configured so that the center of the entrance pupils are virtually overlapping while the camera lenses of the cameras are spatially separated from one another. For example, one or more light redirection elements may be used to redirect light towards the camera lenses 606 and 608. Based on the properties and position of a light redirection element, the first camera lens 606 may be spatially separated from the second cameras lens 608 while the center of the entrance pupils virtually overlap. In this manner, the image sensors may still be configured to capture image frames that conform to the conceptual diagram 600 of having overlapping camera lens 606 and 608 in FIG. 6. In some implementations, the first image sensor 602 may be associated with a first redirection element, and the second image sensor 604 may be associated with a second redirection element. In some implementations, the first redirection element and the second redirection element may be the same redirection element (e.g., as in the redirection element 1210 of FIGS. 12A-12C).

As used herein, a redirection element may be any suitable element configured to redirect light traveling along a first path towards a second path. The redirection element may reflect or refract the light. In some implementations, the redirection element may include a mirror to reflect the light. As used herein, a mirror may refer to any suitable reflective surface (such as a reflective coating, mirrored glass, and so on).

Figure 7:
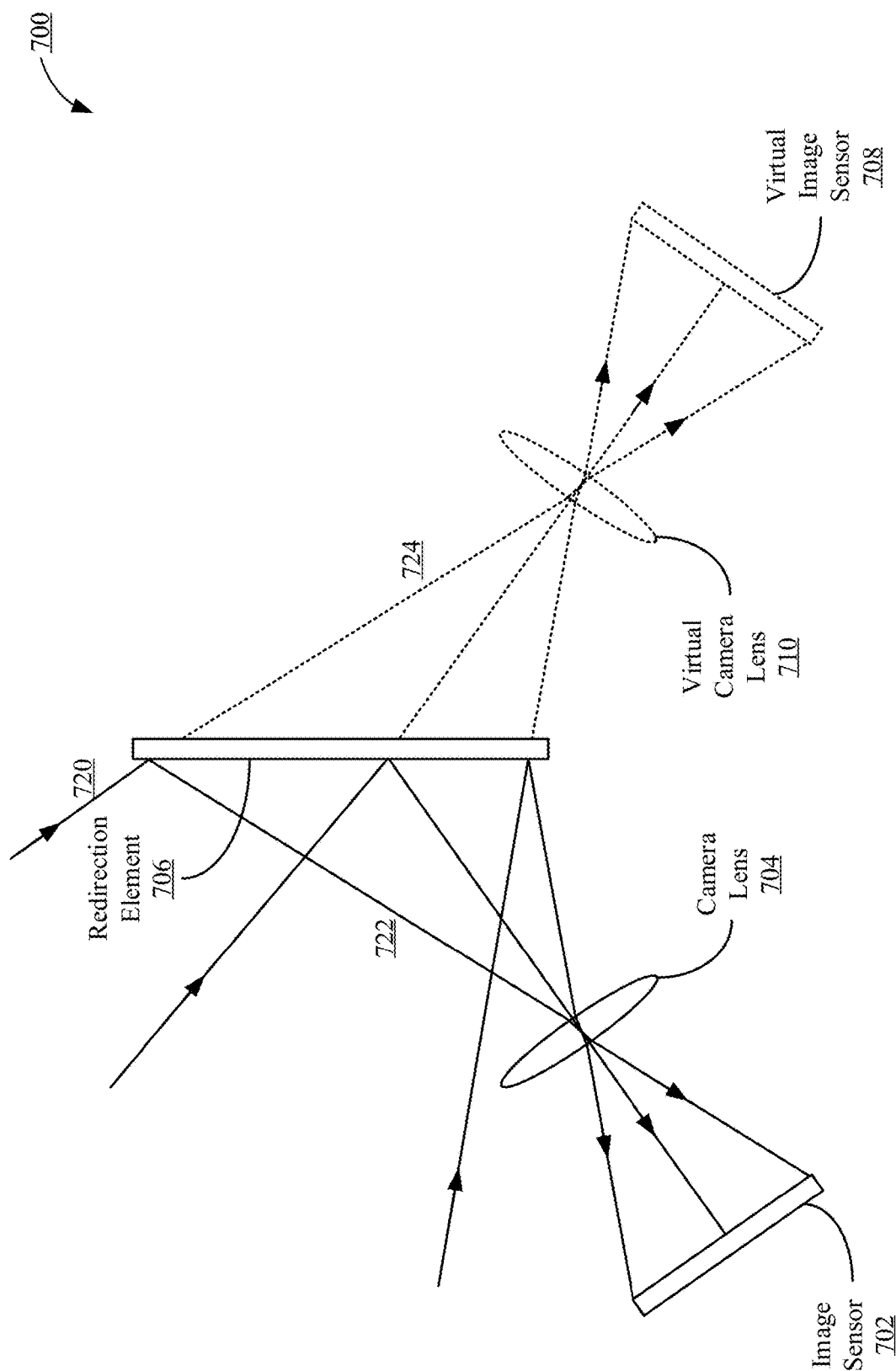
FIG. 7 is a conceptual diagram illustrating an example redirection element redirecting light to a camera lens and the change in position of the camera lens and associated image sensor based on the redirection element, in accordance with some examples.

FIG. 7 is a conceptual diagram 700 illustrating a redirection element 706 redirecting light to an image sensor 702 and the change in position of the image sensor 702 based on the redirection element 706. As depicted, the redirection element 706 may include a mirror to reflect the light received towards the lens 704 (and the image sensor 702). The path of the light is illustrated using solid lines with arrow indicators indicating direction of the light. If the redirection element 706 were removed, omitted, or otherwise did not exist, the light would instead travel to a location of the virtual image sensor 708 (via the virtual entrance pupil of the virtual camera lens 710) along an extension of the light's original path (illustrated using dotted lines) before the light was redirected by the light redirection element 706. For example, referring back to FIG. 6, the light to be directed to the second image sensor 604 approaches the location of the camera lens 608. Referring to FIG. 7, if a light redirection element 706 is used to direct light to the image sensor 702 through the camera lens 704, the image sensor 702 is positioned as depicted in FIG. 7 instead of at the position of the virtual image sensor 708 for the image sensor 702 to capture the same image frame. In this manner, the location of the camera lens 704 is as depicted in FIG. 7 instead of at the position of the virtual camera lens 710. In this manner, the lenses for multiple image sensors may be spatially separated with the lenses and/or entrance pupils still virtually overlapping.

For example, a first ray of light follows an initial path 720 before reaching the light redirection element 706 and being redirected onto a redirected path 722 directed to the camera lens 704 and the image sensor 702. The first ray of light reaches the camera lens 704 and the image sensor 702 along the redirected path 722. A virtual extension 724 of the initial path 720 beyond the light redirection element 706 is illustrated in a dotted line and is instead directed to, and reaches, the virtual camera lens 710 and the virtual image sensor 708. A second ray of light and a third ray of light are also illustrated in FIG. 7. The light redirection element 706 redirects the second ray of light and the third ray of light from their initial paths toward the camera lens 704 and the image sensor 702. The second ray of light and the third ray of light thus reach the camera lens 704 and the image sensor 702. Virtual extensions of the initial paths of the second ray of light and the third ray of light beyond the light redirection element 706 are illustrated using dotted lines and are instead directed to, and reach, the virtual camera lens 710 and the virtual image sensor 708.

The reflective surface (e.g., mirror) of the redirection element 706 can form a virtual image positioned behind the reflective surface (e.g., mirror) of the redirection element 706 (to the right of the of the redirection element 706 as illustrated in FIG. 7). The virtual camera lens 710 may be a virtual image of the camera lens 704 observed through the reflective surface (e.g., mirror) of the redirection element 706 from the direction of the initial path 720 are depicted in FIG. 7. The virtual image sensor 708 may be a virtual image of the image sensor 702 observed through reflective surface (e.g., mirror) of the redirection element 706 from the direction of the initial path 720 are depicted in FIG. 7.

Figure 8:
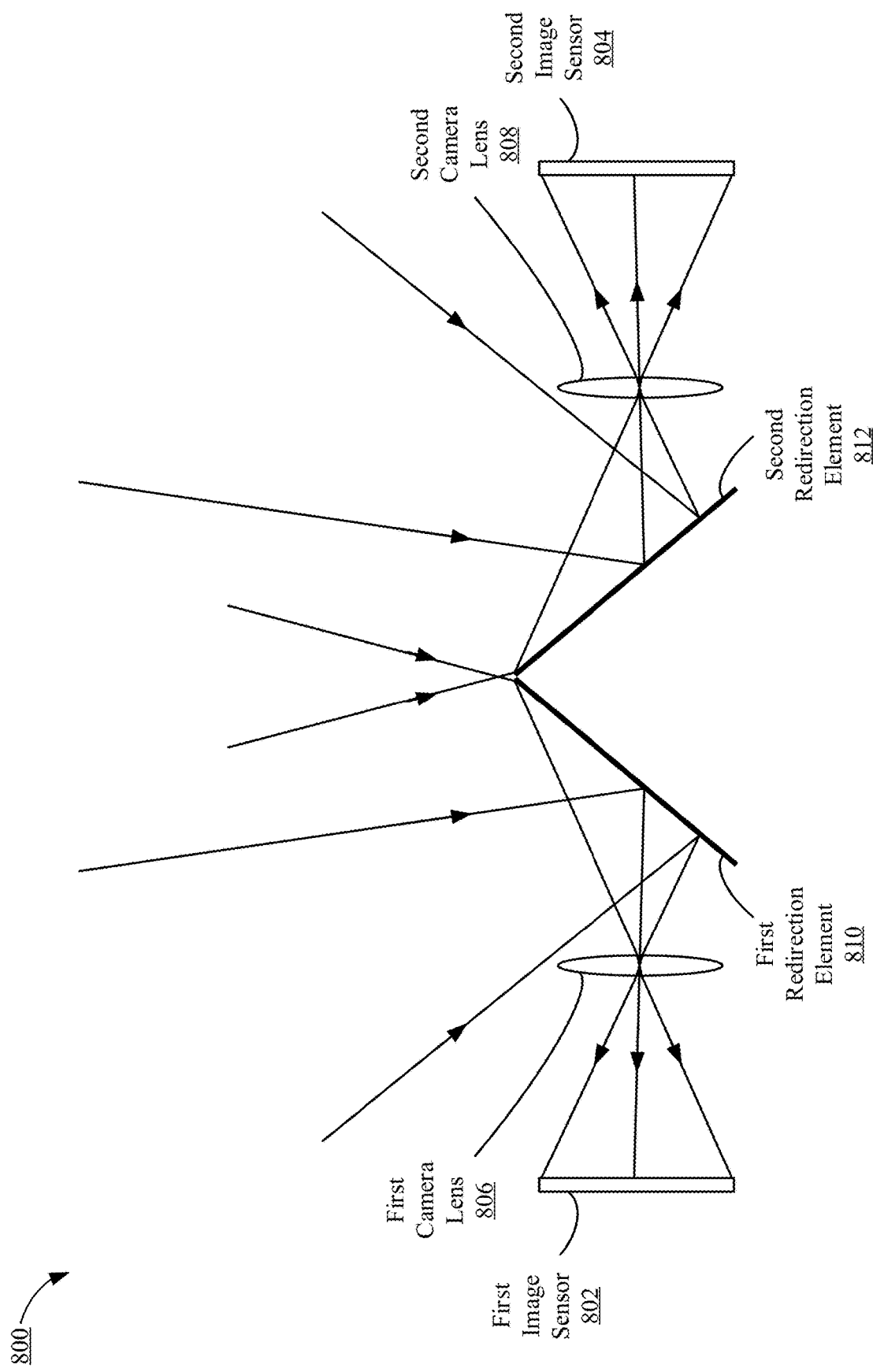
FIG. 8 is a conceptual diagram illustrating an example configuration of two cameras to generate a wide angle image using redirection elements including mirrors, in accordance with some examples.

FIG. 8 is a conceptual diagram 800 illustrating an example configuration of two cameras to generate a wide angle image using redirection elements 810 and 812. A first camera includes a first camera lens 806 (which may be one or more camera lenses) and a first image sensor 802. A second camera includes a second camera lens 808 (which may be one or more camera lenses) and a second image sensor 804.

The conceptual diagram 800 in FIG. 8 may achieve the same function as the conceptual diagram 600 in FIG. 6, where the first lens 806 and the second lens 808 virtually overlap (e.g., the center of the entrance pupils for the camera lenses 806 and 808 virtually overlap) while being physically spatially separated to remove or reduce parallax artifacts in combined images from image frames captured by the image sensors 802 and 804. In comparing the conceptual diagram 800 to the conceptual diagram 600 in FIG. 6, the first image sensor 802 (associated with the first redirection element 810) is configured to capture one portion of a scene, similar to the first image sensor 602. The second image sensor 804 (associated with the second redirection element 812) is configured to capture the other portion of the scene, similar to the second image sensor 604. The first camera lens 806 is spatially separated from the second camera lens 808, and the first image sensor 802 is spatially separated from the second image sensor 804 based on using the first redirection element 810 and the second redirection element 812.

In some implementations, the redirection elements 810 and 812 may be positioned on an outside of a device. For example, a component including the redirection elements may be coupled to the device 500 to direct light through one or more openings in the device 500 towards the image sensors of the first camera 501 and the second camera 502. In some examples, the device 500 may include the redirection elements disposed on an outer surface of the device 500. In some examples, the redirection elements may be disposed inside of a device. For example, the device may include one or more openings and/or apertures to allow light to enter the device (such as light from the scene to be captured for generating a wide angle image). The openings/apertures may include glass or another transparent material to allow light to pass, which may be shaped into one or more lenses. The opening may or may not include one or more lenses or other components to adjust the direction of light into the device. The redirection elements 810 and 812 may be positioned along the optical path between a device opening and the associated image sensor 802 or 804.

While the redirection elements 810 and 812 are illustrated as two separate mirrors, the redirection elements 810 and 812 may be one redirection element. For example, the redirection elements 810 and 812 may physically connect on one side to be one redirection element. Additionally, the arrangement of the image sensors 802 and 804 are illustrated as being oriented towards each other. For instance, the optical axes of the image sensors 802 and 804 may be aligned and/or may be parallel to one another. However, the image sensors and lenses may be arranged in any suitable manner to receive light from a desired field of view of a scene. For instance, the optical axes of the image sensors 802 and 804 may be not aligned and/or may be not parallel to one another and/or may be at an angle relative to one another. The present disclosure is not limited to the arrangement of the components in the depiction in FIG. 8.

In some implementations, the image sensors 802 and 804 are configured to capture an image frame concurrently and/or contemporaneously (such as at least a portion of the exposure windows overlapping for the image frames). In this manner, local motion and global motion is reduced (thus reducing distortions in a generated wide angle image). In some implementations, the image sensors 802 and 804 are configured to capture an image frame concurrently, contemporaneously, and/or within a shared time window. The shared time window may, for example, have a duration of one or more picoseconds, one or more nanoseconds, one or more milliseconds, one or more centiseconds, one or more deciseconds, one or more seconds, or a combination thereof. Additionally, since the angle between the image sensors 802 and 804 is static, a device may be configured to reduce perspective distortion based on the known angles.

In some implementations, light to the first image sensor 802 and light to the second image sensor 804 may be refracted (e.g., through a high refractive index medium) to reduce a perspective distortion and/or light vignetting at the camera aperture. Light propagating in a high refractive index material has a smaller divergence angle before existing the medium, reducing vignetting at a lens aperture that is located near the existing surface of the high refractive medium. Refraction may alternatively or additionally be used to adjust a field of view of the image sensors 802 and 804. For example, the field of view may be widened to widen the field of view of the wide angle image. In another example, the field of view may be shifted to allow for different spacings between the image sensors 802 and 804. Refraction may be used to allow further physical separation between the camera lenses 806 and 808 while still allowing the center of the entrance pupils to virtually overlap. For example, a prism may refract light intended for a respective image sensor, and the prism may affect the location of the entrance pupil associated with the image sensor. Based on the refraction, additional physical spacing between camera lenses may be allowed while still allowing a virtual overlap of the center of the entrance pupils. In some implementations, a redirection element may include a prism. At least one of the surfaces on the prism can include a reflective surface, such as a mirror. In this manner, one or more redirection elements including prisms may be configured to refract and/or reflect light directed towards the first image sensor 802 or the second image sensor 804.

Figure 9:
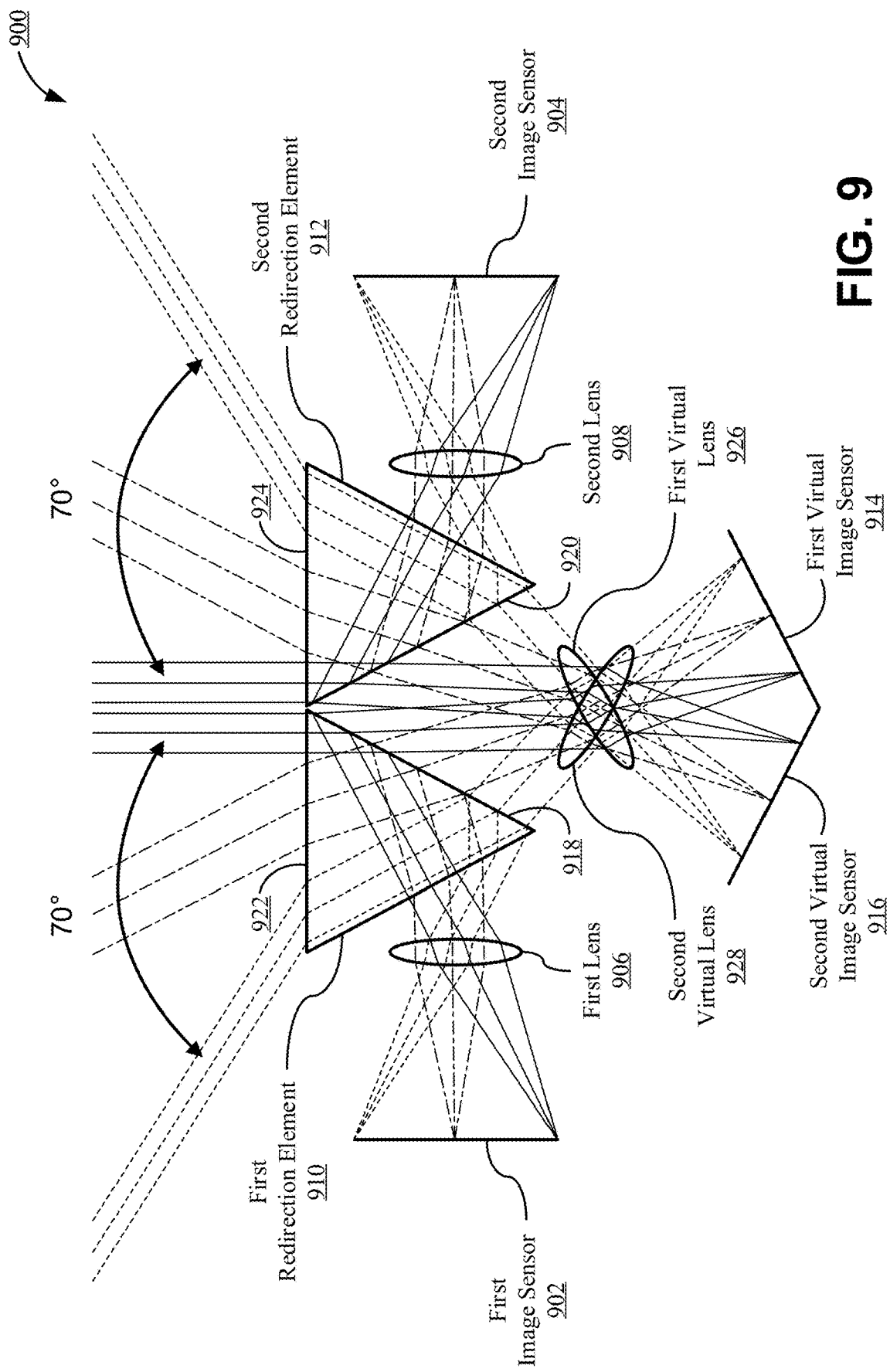
FIG. 9 is a conceptual diagram illustrating an example configuration of two cameras to generate a wide angle image using redirection elements including prisms, in accordance with some examples.

FIG. 9 is a conceptual diagram 900 illustrating an example configuration of two cameras and two redirection elements 910 and 912. The two cameras are used to generate a wide angle image. A first camera includes a first image sensor 902 and a first camera lens 906. A second camera includes a second image sensor 904 and a second camera lens 908.

The redirection elements 910 and 912 may include one or more prisms. Each prisms can include a high refractive index medium (e.g., having a refractive index above a threshold). As depicted, a first redirection element 910 redirects a first light (e.g., including one or more rays of light) from a first path that approaches the first redirection element 910 to a redirected first path towards the first image sensor 902. The first path may be referred to as the initial first path. A second redirection element 912 redirects a second light (e.g., including one or more rays of light) from a second path that approaches the second redirection element 912 to a redirected second path towards the second image sensor 904. The second path may be referred to as the initial second path. The location of the redirection elements 910 and 912 may be as described with reference to FIG. 8. For example, the redirection elements 910 and 912 may be outside of the device, or the redirection elements 910 and 912 may be inside of the device and configured to receive light passing through an opening in the device.

In FIG. 9, the first lens 906 may also represent the position of an aperture of, and/or the entrance pupil for, the first camera. The second lens 908 may also represent the position of an aperture of, and/or the entrance pupil for, the second camera. In the conceptual diagram 900, the first redirection element 910 includes a first prism, and the second redirection element 912 includes a second prism. The first prism is configured to refract the first light destined for the first image sensor 902 to redirect the first light from a prism-approaching first path to a refracted first path. The second prism is configured to refract the second light destined for the second image sensor 904 to redirect the second light from a prism-approaching second path to a refracted second path. In some implementations, the first redirection element 910 also includes a first mirror on side 918 of the first prism. The first mirror is configured to reflect the first light towards the first image sensor 902 by redirecting the first light from the refracted first path to a reflected first path. The second redirection element 912 also includes a second mirror on side 920 of the second prism. The second mirror is configured to reflect the second light towards the second image sensor 904 by redirecting the second light from the refracted second path to a reflected second path. After being reflected by the first mirror on side 918, the first light exits the first prism of the first redirection element 910.

Due to the refraction of the first prism, the first light may be redirected upon exiting the first prism, from the reflected first path to a post-prism first path. Similarly, after being reflected by the second mirror on side 920, the second light exits the second prism of the second redirection element 912. Due to the refraction of the second prism of the second redirection element 912, the second light may be redirected upon exiting the second prism, from the reflected second path to a post-prism second path.

In some examples, the first light may further be redirected (e.g., via refraction) from the post-prism first path to a post-lens first path by the first lens 906. In some examples, the second light may further be redirected (e.g., via refraction) from the post-prism second path to a post-lens second path by the second lens 908. In this manner, each redirection element 910 and 912 may include a prism, with one side of the prism including a reflective coating. Light passing through the prism and reaching the reflective coating is reflected or folded back towards the respective image sensor. In some other implementations, a redirection element may include separate reflective and refractive components. For example, the first mirror or the second mirror may be a separate component from the first prism and the second prism, respectively.

As used herein, a prism may refer to any suitable light refracting object, such as a glass or plastic prism of a suitable shape. Suitable shapes may include a triangular prism, hexagonal prism, and so on with angles of surfaces configured to refract light from the scene as desired. In some implementations, the redirection elements include an equilateral triangular prism (or other suitable sided triangular prism for refracting light). In the conceptual diagram 900, side 922 of the first redirection element 910 is approximately aligned on the same plane as side 924 of the second redirection element. The prisms may be configured so that each camera includes an approximately 70 degree angle of view (a field of view having an angle of approximately 70 degrees). In some implementations, the side 922 and/or side 924 are coated with an anti-reflective coating to prevent reflecting light to be captured by the image sensor 902 and 904. In some implementations, the prism surfaces that face the camera lenses are also coated with an anti-reflective coating to prevent light reflecting from these surfaces.

In some examples, the post-lens first path may be referred to as the redirected first path. In some examples, the post-prism first path may be referred to as the redirected first path. In some examples, the reflected first path may be referred to as the redirected first path. In some examples, the refracted first path may be referred to as the redirected first path. In some examples, the post-lens second path may be referred to as the redirected second path. In some examples, the post-prism second path may be referred to as the redirected second path. In some examples, the reflected second path may be referred to as the redirected second path. In some examples, the refracted second path may be referred to as the redirected second path. In some examples, the prism-approaching first path may be referred to as the first path or as the initial first path. In some examples, the refracted first path may be referred to as the first path or as the initial first path. In some examples, the prism-approaching second path may be referred to as the second path or as the initial second path. In some examples, the refracted second path may be referred to as the second path or as the initial second path.

The first prism or the second prism may be configured to refract light from a portion of the scene in order to adjust a focus distance. For example, the first prism and the second prism may be shaped such that the entrance and exit angles of light for the prisms allow the associated camera lenses 906 and 908 to be in different positions while still having the same effect of the conceptual diagram 600 in FIG. 6. In this manner, the lenses may be spatially separated while the entrance pupils' centers still virtually overlap (as depicted in FIG. 6). The virtual overlap in the centers of the entrance pupils of the first lens 906 and the second lens 908, illustrated as an actual overlap of the entrance pupils of the first virtual lens 926 and the second virtual lens 928, can provide the technical benefit of reducing or removing parallax artifacts in a combined image that might otherwise be present (and present a technical problem) if the entrance pupils did not virtually overlap as they do in FIG. 9. For example, as a result of the redirection elements 910 and 912, the first image sensor 902 can be conceptualized as the first virtual image sensor 914 if the first redirection element 910 does not exist, and the second image sensor 904 can be conceptualized as the second virtual image sensor 914 if the second redirection element 912 does not exist. Similarly, lenses 906 and 908 can be conceptualized as virtual lenses 926 and 928 if the redirection elements 910 and 912 do not exist. The overlapping virtual lenses 926 and 928 indicate overlapping entrance pupils, such as illustrated in FIG. 6.

The first virtual lens 926 can be conceptualized as a virtual position, orientation, and/or pose that the first lens 906 would have in order to receive the first light that the first lens 906 actually receives, if that first light had continued along a virtual extension of its first path (extending beyond the first redirection element 910) instead of being redirected toward the first lens 906 and the first image sensor 902 by the at least part of the first redirection element 910. The second virtual lens 928 can be conceptualized as a virtual position, orientation, and/or pose that the second lens 908 would have in order to receive the second light that the second lens 908 actually receives, if that second light had continued along a virtual extension of its second path (extending beyond the second redirection element 912) instead of being redirected toward the second lens 908 and the second image sensor 904 by the at least part of the second redirection element 912.

Similarly, the first virtual image sensor 914 can be conceptualized as a virtual position, orientation, and/or pose that the first image sensor 902 would have in order to receive the first light that the first image sensor 902 actually receives, if that first light had continued along a virtual extension of its first path instead of being redirected toward the first lens 906 and the first image sensor 902 by the at least part of the first redirection element 910. The second virtual image sensor 916 can be conceptualized as a virtual position, orientation, and/or pose that the second image sensor 904 would have in order to receive the second light that the second image sensor 904 actually receives, if that second light had continued along a virtual extension of its initial second path instead of being redirected toward the second lens 908 and the second image sensor 904 by the at least part of the second redirection element 912.

In some examples, the distance between the first redirection element 910 and the first lens 906 is equal to the distance between the first redirection element 910 and the first virtual lens 926. In some examples, the distance between the first redirection element 910 and the first image sensor 902 is equal to the distance between the first redirection element 910 and the first virtual image sensor 914. In some examples, the distance between the second redirection element 912 and the second lens 908 is equal to the distance between the second redirection element 912 and the second virtual lens 928. In some examples, the distance between the second redirection element 912 and the second image sensor 904 is equal to the distance between the second redirection element 912 and the second virtual image sensor 916.

In some examples, the optical distance between the side 918 (with a reflection surface) of the first redirection element 910 and the first lens 906 is about equal to the optical distance between the reflection surface of the first redirection element 910 and the first virtual lens 926. In some examples, the optical distance between the reflection surface of first redirection element 910 and the first image sensor 902 is about equal to the optical distance between the reflection surface of first redirection element 910 and the first virtual image sensor 914. In some examples, the optical distance between the reflection surface of the second redirection element 912 and the second lens 908 is about equal to the optical distance between the reflection surface of the second redirection element 912 and the second virtual lens 928. In some examples, the optical distance between the reflection surface of the second redirection element 912 and the second image sensor 904 is about equal to the optical distance between the second reflection surface of the redirection element 912 and the second virtual image sensor 916.

Identifying the virtual positions, orientations, and/or poses corresponding to the first virtual lens 926, the second virtual lens 928, the first virtual image sensor 914, and the second virtual image sensor 916 can include conceptual removal or omission of at least part of the first redirection element 910 and at least part the second redirection element 912, such as conceptual removal or omission of at least the reflective surface (e.g., mirror) on side 918 of the first prism, the reflective surface (e.g., mirror) on side 920 of the second prism, the first prism itself, the second prism itself, or a combination thereof. The prior path of the first light can include the path of the first light before the first light entered the first prism or the path of the first light after the first light entered the first prism but before the first light was redirected by the reflective surface (e.g., mirror) on side 918 of the first prism. The prior path of the second light can include the path of the second light before the second light entered the second prism or the path of the second light after the second light entered the second prism but before the second light was redirected by the reflective surface (e.g., mirror) on side 920 of the second prism.

The first virtual lens 926 can be referred to as a virtual lens of the first lens 906, a virtual position of the first lens 906, a virtual orientation of the first lens 906, a virtual pose of the first lens 906, or a combination thereof. The second virtual lens 928 can be referred to as a virtual lens of the second lens 908, a virtual position of the second lens 908, a virtual orientation of the second lens 908, a virtual pose of the second lens 908, or a combination thereof. The first virtual image sensor 914 can be referred to as a virtual image sensor of the first image sensor 902, a virtual position of the first image sensor 902, a virtual orientation of the first image sensor 902, a virtual pose of the first image sensor 902, or a combination thereof. The second virtual image sensor 916 can be referred to as a virtual image sensor of the second image sensor 904, a virtual position of the second image sensor 904, a virtual orientation of the second image sensor 904, a virtual pose of the second image sensor 904, or a combination thereof. Based on refraction, the spacing between the first camera lens 906 and the second camera lens 908 may be less than the spacing between the first camera lens 806 and the second camera lens 808 in FIG. 8 (in which the light redirection elements may not refract light). Similarly, the spacing between the first image sensor 902 and the second image sensor 904 may be less than the spacing between the first image sensor 802 and the second image sensor 804 in FIG. 8.

The reflective surface (e.g., minor) on side 918 of the first redirection element 910 can form a virtual image positioned behind the reflective surface (e.g., minor) on side 918 of the first redirection element 910 (below and to the right of the first redirection element 910 as illustrated in FIG. 9). The reflective surface (e.g., minor) on side 920 of the second redirection element 912 can form a virtual image positioned behind the reflective surface (e.g., mirror) on side 920 of the second redirection element 912 (below and to the left of the second redirection element 912 as illustrated in FIG. 9). The first virtual lens 926 may be a virtual image of the first lens 906 as observed through the reflective surface (e.g., minor) on side 918 of the first redirection element 910 from the direction of the light approaching the first redirection element 910 are depicted in FIG. 9. The first virtual image sensor 914 may be a virtual image of the first image sensor 902 as observed through the reflective surface (e.g., minor) on side 918 of the first redirection element 910 from the direction of the light approaching the first redirection element 910 are depicted in FIG. 9. The second virtual lens 928 may be a virtual image of the second lens 908 as observed through the reflective surface (e.g., mirror) on side 920 of the second redirection element 912 from the direction of the light approaching the second redirection element 912 are depicted in FIG. 9. The second virtual image sensor 916 may be a virtual image of the second image sensor 904 as observed through the reflective surface (e.g., mirror) on side 920 of the second redirection element 912 from the direction of the light approaching the second redirection element 912 are depicted in FIG. 9.

In some implementations, the first prism and the second prism are physically separated from each other (such as by ½ millimeter (mm)). The spacing may be to prevent the prisms from bumping each other and causing damage to the prisms. In some other implementations, the first prism and the second prism may be physically connected. For example, the first prism and the second prism may be connected at one of their corners so that the first redirection element 910 and the second redirection element 912 are the same redirection element with multiple prisms and mirrors for refracting and reflecting light for the first image sensor 902 and the second image sensor 904.

Similar to as described above with reference to FIG. 8, a perspective distortion may be reduced by performing a perspective distortion correction digitally to the image frames post-capture. The image frames (with the distortion corrected) may be combined (e.g., digitally) by a device to generate a wide angle image (which may also be referred to as a combined image). Similar to FIG. 8, the image sensors 902 and 904 may be configured to concurrently and/or contemporaneously capture image frames, and/or to capture image frames within a shared time window, to reduce distortions from motion or other distortions in the combined image.

As noted above, image frames captured by the image sensors 802, 804, 902, or 904 can include a perspective distortion. However, because the perspectives captured by the image sensors 802, 804, 902, and 904 are known and are static, perspective distortion compensation techniques can in some cases be applied consistently to every image captured by each of the image sensors 802, 804, 902, and 904.

Figure 10A:
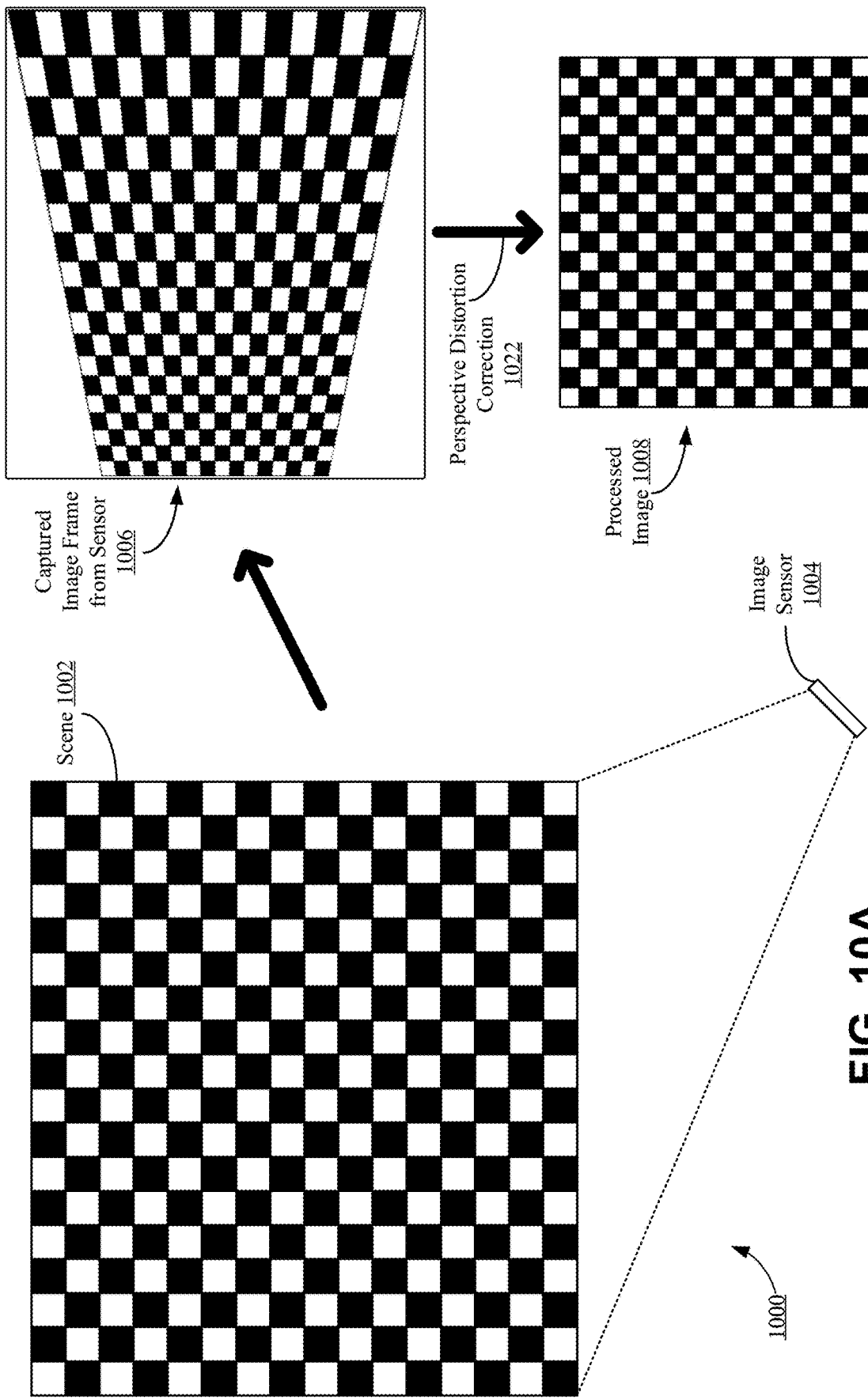
FIG. 10A is a conceptual diagram illustrating an example perspective distortion in an image frame captured by one or more of the cameras, in accordance with some examples.

FIG. 10A is a conceptual diagram 1000 illustrating an example perspective distortion in an image frame 1006 captured by the image sensor 1004. The image sensor 1004 may be an implementation of any of the image sensors in FIG. 8 or FIG. 9. As shown, the image sensor 1004 captures the scene 1002 at an angle with reference to perpendicular to the scene 1002. A lens (not pictured) may be positioned between the scene 1002 and the image sensor 1004. The lens may be any lens, such as the first camera lens 606, the second camera lens 608, the camera lens 704, the first camera lens 806, the second camera lens 808, the first lens 906, the second lens 908, the first lens 1106, the second lens 1108, the first lens 1206, the second lens 1208, the lens 1660, the lens 2015, or another lens. Since the right portion of the scene 1002 is closer to the image sensor 1004 than the left portion of the scene 1002, the captured image frame 1006 includes a perspective distortion. The perspective distortion is shown as the right portion of the scene 1002 in the image frame 1006 appearing larger than the left portion of the scene 1002 in the image frame 1006. Since the angle of the image sensor 1004 with reference to another image sensor is known (such as between image sensors 602 and 604 in the conceptual depiction in FIG. 6), the device 500 (such as the image signal processor 512) may perform a perspective distortion correction 1022 to generate the processed image 1008. The device 500 may modify the captured image frame 1006 using the perspective distortion correction 1022 to generate the processed image 1008. For instance, during perspective distortion correction 1022, the device 500 may map a trapezoidal area of the captured image frame 1006 onto a rectangular area (or vice versa), which may be referred to as a keystone perspective distortion correction, a keystone projection transformation, or keystoning. In some cases, perspective distortion correction 1022 may be referred to as perspective distortion, perspective transformation, projection distortion, projection transformation, transformation, warping, or some combination thereof.

In capturing the scene 1002, the image sensor 1004 may also capture areas outside of the scene 1002 (such as illustrated by the white triangles in the image frame 1006 from the sensor). In some implementations of a perspective distortion correction 1022, the device 500 processes the captured image frame 1006 so that the resulting processed image 1008 includes just the illustrated portions of the scene 1002, without the additional captured scene information in captured image frame 1006. The device 500 takes the left portion of the captured image frame 1006 including the illustrated portion of the scene 1002 (excluding the additional portions of the captured scene above and below the scene 1002 as illustrated by the white triangles) and adjusts the remainder of the captured image frame 1006 to the left portion of the scene 1002 in captured image frame 1006 to generate image 1008. The portion taken from the left of the captured image frame 1006 (corresponding to the illustrated portion of the scene 1002) may be based on a field of view of the image sensor, the common perspective to which the captured image frame 1006 is to be adjusted, and the perspective of the other image sensor capturing a different portion of the scene not illustrated. For example, based on the two perspectives of the cameras, the common perspective, and the field of view, the device 500 may use a range of image pixels in the left column of image pixels of the captured image frame 1006 for the processed image 1008.

Similarly, the portion taken from the right of the image frame 1006 (corresponding to the illustrated portion of the scene 1002) may be based on a field of view of the image sensor, the common perspective to which the image frame 1006 is to be adjusted, and the perspective of the other image sensor capturing a different portion of the scene not illustrated. For example, based on the two perspectives of the cameras, the common perspective, and the field of view, the device 500 may use a range of image pixels in the right column of image pixels of the captured image frame 1006 for the processed image 1008. In the example captured image frame 1006, all of the pixels in the furthest right column of the captured image frame 1006 include information from the illustrated portion of the scene 1002 (the white triangles indicating additional portions of the captured scene captured in the captured image frame 1006 end at the right column of image pixels in image frame 1006).

As shown, the illustrated portion of the scene 1002 is skewed in image frame 1006 from the smaller range of image pixels in the left column of image pixels of the image frame 1006 to the larger range of image pixels in the right column of image pixels of the image frame 1006. The rate at which the number of pixels in the range increase when moving through the columns of image pixels from left to right may be linear (which the device 500 may determine based on a linear regression of range of pixels based on the column or a defined mapping of range of pixels at each column). In this manner, the image pixels in a column of image pixels of the image frame 1006 to be used for the processed image 1008 may be a mapping based on the distance of the pixel column from the left column and from the right column. For example, if the image frame 1006 includes 100 columns of 100 pixels of scene information to be used for the image 1008 and the left column includes 50 pixels of scene information to be used for the image 1008, the 50th column may include approximately 75 pixels of scene information to be used for the image 1008 (0.5*50+ 0.5*100). In addition, the pixels of scene information to be used for the processed image 1008 may be centered at the center of the column of the image frame 1006. Continuing the previous example, the 50th column may include 12 or 13 pixels at the bottom of the column not to be used and may include 13 or 12 pixels at the top of the column not to be used.

Based on the desired common perspective for a combined image, the device may adjust the pixel values of a captured image frame (such as image frame 1006) using the selected pixels of scene information to generate the processed image 1008. The device 500 may generate the combined image in response to modification of the captured image frame 1006 to generate the processed image 1008. Adjusting the pixel values causes the horizontal lines that are parallel in the scene 1002 (which are shown as slanted to one another in the image frame 1006 because of perspective distortion) to again be parallel in the image 1008. To adjust pixel values for the image 1008 (so that, in the example, the horizontal lines are parallel in the image 1008), the device 500 may "stretch" pixel values in the image frame 1006 to cover multiple pixels. For example, stretching a pixel value in the image frame 1006 to cover multiple pixels values in the processed image 1008 may include using the pixel value at multiple pixel locations in the image 1008. Conversely, the device 500 may combine multiple pixel values in the image frame 1006 to be used for fewer pixel values in the image 1008 (such as by averaging or other combinatorial means). A binning or a filtering based (such as an averaging, median filtering, and so on) perspective distortion correction 1022 process may be applied to pixel values to adjust the captured image of the scene 1002 in image frame 1006 to generate the processed image 1008. In the example, the process is illustrated as being performed in the vertical direction. However, the process may also be applied in the horizontal direction to prevent the scene 1002 from appearing stretched in the processed image 1008. While some example filters for perspective distortion correction 1022 are described, any suitable filter may be used to combine pixel values to generate the processed image 1008 in the correction of perspective distortion. As a result of the perspective distortion correction, the processed image 1008 may be horizontally and/or vertically smaller or larger than the image frame 1006 (in terms of number of pixels).

While the implementations above describe determining a portion of an image frame to be adjusted in correcting perspective distortion, in some implementations, one or more image sensors may be configured to adjust the readout for an image frame based on a perspective distortion correction. For example, an image sensor 1004 may be configured to readout from specific image sensor pixels (such as excluding image sensor pixels capturing scene information in the white triangles of image frame 1006). In some implementations, a device may be configured to adjust which lines (or line portions) of pixels of the image sensor are to be readout based on the portion of the scene 1002 to be included in the processed image 1008. Perspective distortion may then be performed on the image frame (which includes only a subset of pixel data from the image sensor 1004). The perspective distortion function may be based on the number of pixels readout from the image sensor. Since image frames from both cameras include perspective distortion with reference to the intended perspective for the combined image, the device 500 may perform perspective distortion correction on image frames from both cameras.

Figure 10B:
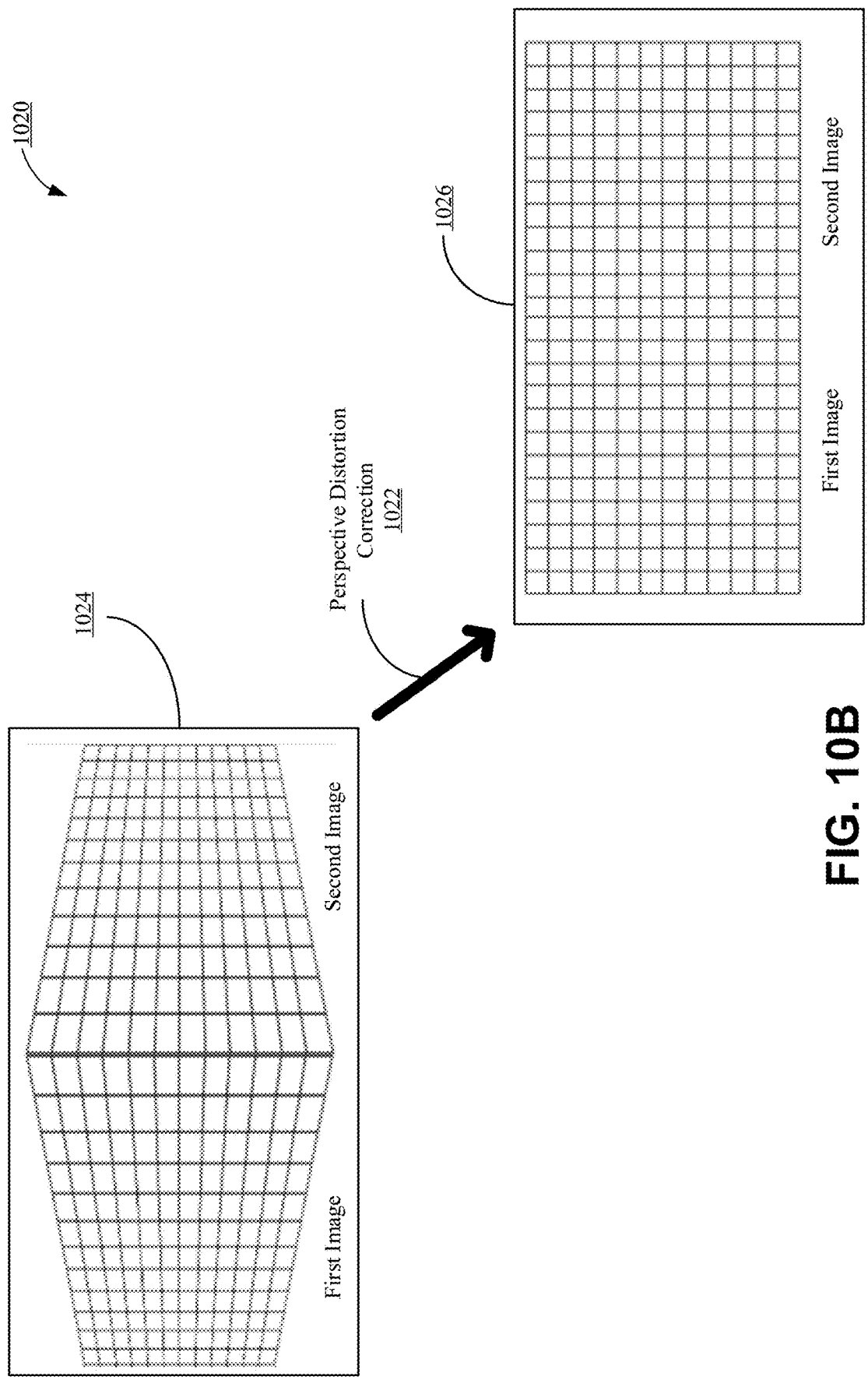
FIG. 10B is a conceptual diagram illustrating an example perspective distortion correction of two image frames to a common perspective, in accordance with some examples.

FIG. 10B is a conceptual diagram 1020 illustrating an example perspective distortion correction 1022 of two image frames 1024 to a common perspective for a combined image 1026. As shown in the two image frames 1024, the first image and the second image have a perspective distortion opposite one another. The device 500 is to correct the perspective distortion (using perspective distortion correction 1022) of each of the first image and the second image (such as described above) to a common perspective (such as shown in the combined image 1026). After correcting the perspective distortion, the device 500 may stitch corrected image 1 and corrected image 2 to generate the combined (wide-angle) image.

Stitching may be any suitable stitching process to generate the combined image. In some implementations, the field of view of the first camera 501 overlaps the field of view of the second camera 502. For example, the first camera 501, the second camera 502, and the one or more redirection elements 503 are arranged so that the fields of view overlap by ½ of a degree to 5 degrees. After correcting the perspective distortion, the device 500 uses the overlapping portions in the captured frames from the two cameras 501 and 502 to align and combine the two image frames to generate the combined image. Since an overlap exists, the device 500 may reduce stitching errors based on aligning the captured image frames. In some implementations, the device 500 may compensate for a change in overlap over time (such as if the device 500 is dropped or bumped, repeated temperature changes cause shifts in one or more components, and so on). For example, an overlap may begin at 5 degrees at device production, but over time, the overlap may increase to 7 degrees. The device 500 may use object detection and matching in the overlapping scene portion of the two image frames to align the image frames and generate the combined image (instead of using a static merging filter based on a fixed overlap and arrangement of components). Through alignment and matching of objects in the overlapping scene portion of two image frames, the device 500 may use any overlap (as long as of sufficient size, such as ½ of a degree) to stitch the image frames together to generate the combined image.

Figure 10C:
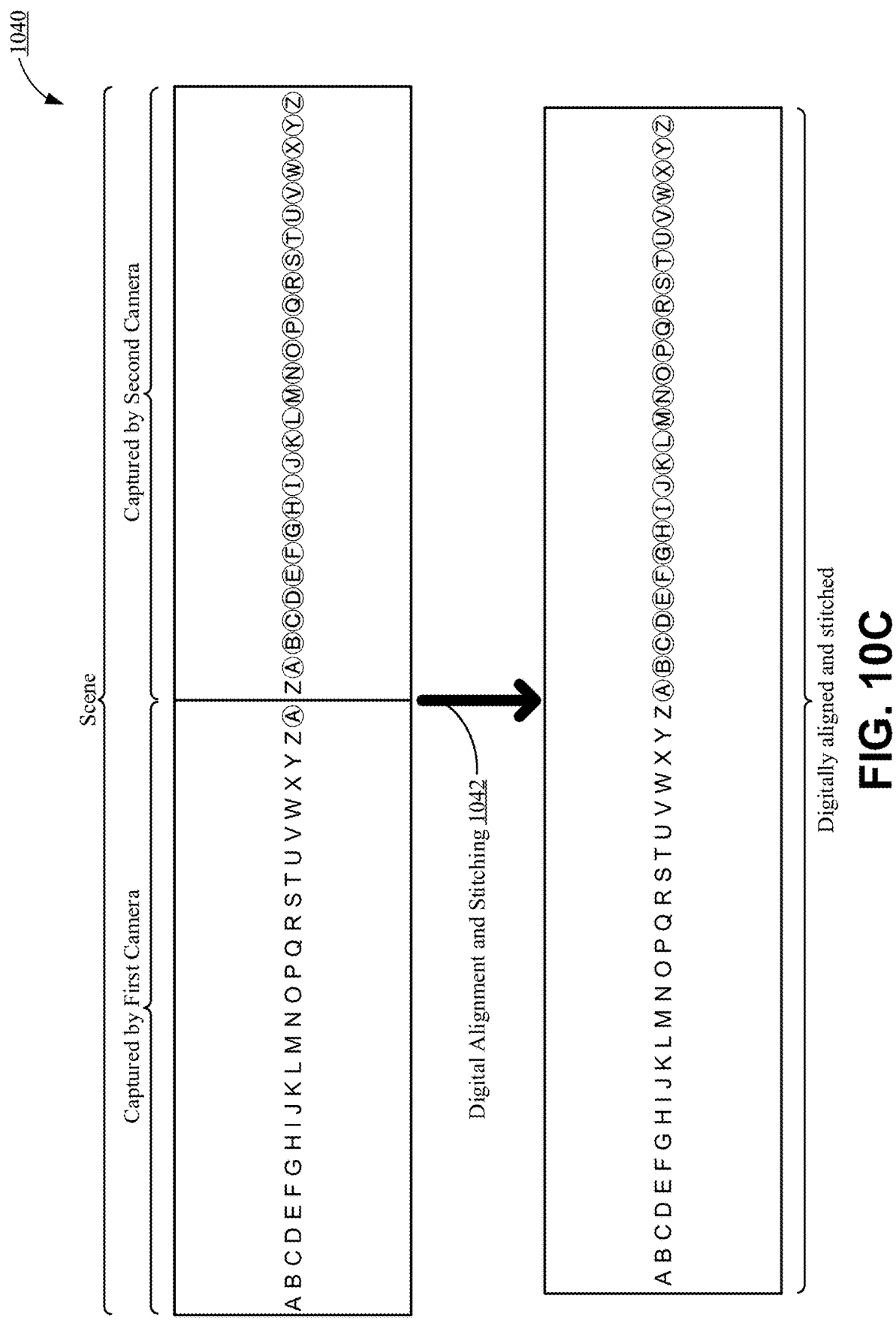
FIG. 10C is a conceptual diagram illustrating an example digital alignment and stitching of two image frames captured by two cameras to generate a wide angle image, in accordance with some examples.

FIG. 10C is a conceptual diagram 1040 illustrating an example digital alignment and stitching 1042 of two image frames captured by two cameras to generate a wide angle image. To illustrate operations of digital alignment and stitching, the scene is depicted as two instances of the English alphabet (from A-Z twice). The right instance of the alphabet in the scene is illustrated with each of its letters circled. The left instance of the alphabet in the scene with no circle around any of its letters. Camera 1 (such as the first camera 501) captures the left instance of the alphabet in the scene. Camera 2 (such as the second camera 502) captured the right instance of the alphabet in the scene. The overlapping fields of view of the two cameras may cause both cameras to capture the "Z(A)" (with the letter "A" circled) in the middle of the scene. The overlap is based on the angle between the two cameras (such as illustrated by virtual lenses and image sensors for lens 906 and sensor 902 for one camera and lens 908 and sensor 904 for the other camera in FIG. 9). The device 500 performs digital alignment and stitching 1042 by using object or scene recognition and matching towards the right edge of camera 1's image frame and towards the left edge of camera 2's image frame to align the matching objects/scene. Alignment may include shifting and/or rotating one or both image frames with reference to the other image frame to overlap pixels between the image frames until matching objects or portions of the scene overlap. With the image frames aligned based on matching objects/scene, the two image frames are stitched together to generate the digital aligned and stitched image (which may include saving the shifted and/or rotated image frames together as a combined image). Stitching may include averaging overlapping image pixel values, selecting one of the image pixel values as the combined image pixel value, or otherwise blending the image pixel values.

In addition to reducing stitching distortions and reducing perspective distortions, the device 500 may reduce a nonuniform brightness distortion in a combined image. One or more camera lenses can be configured to image the scene onto an image sensor. The relative illumination of the image formed by the lens can follow a low or minimum of of $I(\theta)=I_o \times \cos^4\theta$, where $\theta$ is the angle between the incoming ray and the normal of the lens, Io is a constant and $I(\theta)$ is the illumination of the image pixel illuminated by the incoming light at an angle of $\theta$. Light normal to the lens ($\theta=0$) will be focused to the center of the sensor, and light at the largest angle (say $\theta=30°$) will be focused onto the edge of the sensor). As such, the image brightness at the edge is)$\cos^4(30°)=0.56$ of the brightness at the center. Additionally, the light redirection components, such as the mirrors in FIG. 8 and the prisms in FIG. 9, may introduce vignetting that may further reduce the brightness of the image pixels near the edges. As a result, more light may reach the center of the image sensor than the edges of the image sensor. Not as much light may reach the edges (and especially the corner pixels) of the image sensor as the center of the image sensor. Captured image frames from the first camera 501 and the second camera 502 can thus have a non-uniform brightness across their image pixels. Vignetting or other brightness non-uniformities in a first image frame from the first camera 501 and/or in a second image frame from the second camera 502 can cause a visible seam in a combined image generated by combining the first image with the second image. Post-capture (such as before or after correcting the perspective distortion and/or before or after stitching the image frames together), the device 500 may correct the brightness non-uniformity of the image frames for the combined image. For example, the device 500 may adjust brightness in a first image frame from the first camera 501 to remove vignetting from the first image, may adjust brightness in a second image frame from the second camera 502 to remove vignetting from the second image, or both. The device 500 may make these brightness adjustments before the device 500 combines the first image and the second image to generate the combined image. Removal of vignetting through such brightness adjustments can ensure that there is no visible seam in the combined image (e.g., between the portion of the combined image that is from the first image and the portion of the combined image that is from the second image).

Figure 10D:
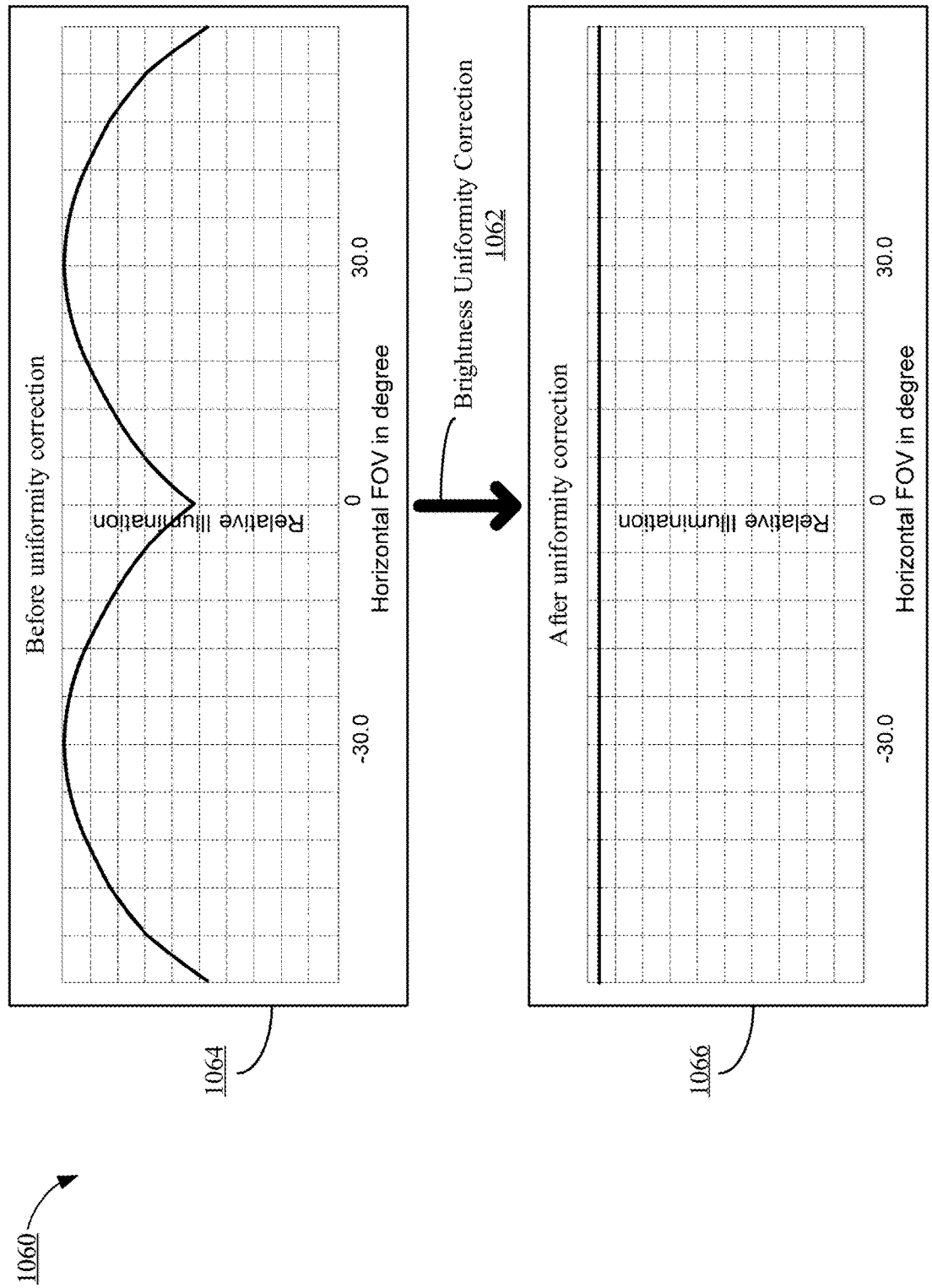
FIG. 10D is a conceptual diagram illustrating an example brightness uniformity correction of a wide angle image generated from two image frames captured by two cameras, in accordance with some examples.

Additionally, in some cases, the first camera 501 and the second camera 502, may receive unequal amounts of light, may process light and/or image data differently (e.g., due to differentces in camera hardware and/or software), and/or may be miscalibrated. Unequal levels of brightness or another image property between a first image frame from the first camera 501 and a second image frame from the second camera 502 can cause a visible seam in a combined image generated by combining the first image with the second image. In some examples, the device 500 may increase or decrease brightness in a first image frame from the first camera 501, may increase or decrease brightness in a second image frame from the second camera 502, or both. The device 500 may make these brightness adjustments before the device 500 combines the first image and the second image to generate the combined image. Such brightness adjustments can ensure that there is no visible seam in the combined image (e.g., between the portion of the combined image that is from the first image and the portion of the combined image that is from the second image). FIG. 10D is a conceptual diagram 1060 illustrating an example brightness uniformity correction 1062 of a wide angle image generated from two image frames captured by two cameras. The brightness uniformity correction 1062 can correct vignetting or other brightness non-uniformities as discussed above with respect to FIG. 10C. Graph 1064 shows the relative illumination of the image sensors based on the illumination at the center of the image sensors of the first camera 501 and the second camera 502. The center of each image sensor is illuminated the most (indicated by the image sensor centers being positioned at a 30 degree angle from the center of the combined image. This angle can be measured between the incoming light and the normal of the top surfaces of the prisms discussed herein (e.g., side 922 and side 924 in FIG. 9, side 1220 in FIGS. 12A-12C). In some examples, the lenses can be tilted with respect to the prisms' top surface normal by 30 degrees, for instance as indicated by the angles of the first virtual lens 926 and the second virtual lens 928 in FIG. 9. An incoming light of 30 degree can be normal to the lens, and can thus be focused at the center of the sensor and have the largest illumination/brightness in the resulting image. If each image sensor includes a 70 degree angle of view, the fields of view of the two image sensors may overlap by 10 degrees. The illumination of the image sensors decreases when moving from the centers of the image sensors (e.g., the centers corresponding to −30 degrees and 30 degrees respectively in the graph 1064) towards the edges of the image sensors (e.g., the edges indicated by 0 in the middle of the graph 1064 and the two ends of the graph 1064). While graph 1064 is shown along one axis of the image sensor for illustration purposes, the graph 1064 may include additional dimensions or may be graphed in other ways to indicate the change in illumination based on a two-dimensional image sensor.

In some implementations, an indication of the illumination of different portions of the image sensor based on the illumination of the image sensor center (such as a fraction, decimal or ratio indicating the difference for each portion) may be determined. For example, the graph 1064 may be known based on the type of camera or determined during calibration of the camera (with the graph 1064 being embodied to cover a two dimensional area for the image sensor). In some implementations, graph 1064 can be obtained during a calibration by capturing image frames of a test scene (such as a scene with a uniform background) using a uniform illumination. The pixel values of the processed image (without uniformity correction) may thus indicate the change in illumination relative to a location in the image. With such indications or the graph 1064 known for the first camera 501 and the second camera 502, the device performs a brightness uniformity correction 1062 to generate an image with a uniform correction (as shown in graph 1066).

In some implementations, the device 500 increases the brightness of image pixels in the image frame (such as increasing a luminance value in a YUV color space or similarly increasing RGB values in an RGB color space). The amount to increase the brightness of an image pixel may be to divide the current brightness value by the fraction of illumination between the associated image sensor pixel and the image sensor center (such as based on graph 1064). In this manner, each image pixel's brightness may be increased to be similar to an image pixel's brightness of the image sensor center (as shown in graph 1066).

The device 500 may thus generate a combined image including corrected perspective distortion, reduced stitching artifacts, and reduced brightness distortion (non-uniform brightness) using one or more redirection elements 503 to direct light to the first camera 501 and the second camera 502 for image frame capture.

Some implementations of the one or more redirection elements and cameras may cause a scattering noise in a combined image.

Figure 11:
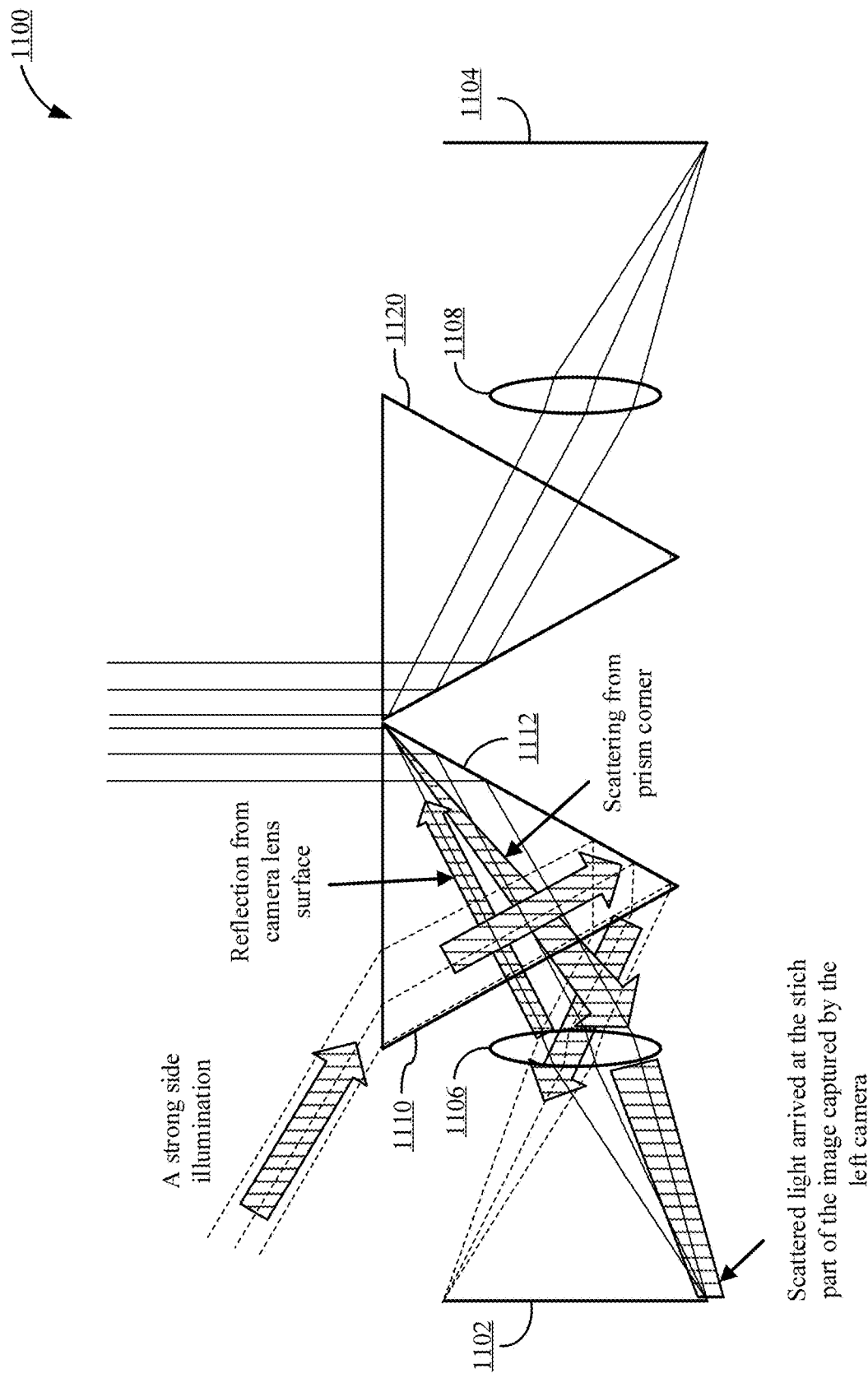
FIG. 11 is a conceptual diagram illustrating example light reflections from a camera lens that may cause scattering noise in a portion of an image frame, in accordance with some examples.

FIG. 11 is a conceptual diagram 1100 illustrating example light reflections from a first camera lens 1106 that may cause scattering noise in a portion of an image frame. A first camera includes a first image sensor 1102 and the first camera lens 1106. The first camera may be an aspect of the first camera in FIG. 9 (including a first image sensor 902 and a first camera lens 906). A first redirection element 1110 is positioned outside of the first camera to direct light towards the first image sensor 1102. As shown, light received at one side of the first redirection element 1110 is refracted by a first prism of the first redirection element 1110, reflected by a first mirror on the side 1112 of the first prism, and directed towards the camera lens 1106. The first camera lens 1106 may reflect a small portion of the light back towards the first prism through Fresnel reflection. The light received towards a top end of the image sensor 1102 indicates the remainder of the light that is allowed to pass through the lens 1106. The light reflected by the first camera lens 1106 passes back through the first prism towards the top-right edge of the prism. The top-right edge of the first prism may be referred to as the edge of the first prism that is closest to the second prism of a second redirection element 1120. The first prism and/or the second prism can include a high refractive index medium (e.g., having a refractive index above a threshold). While not shown, one or more edges of a prism of a redirection element may be chamfered (to mitigate cracking). The top-right edge of the prism (which may be chamfered) may reflect and scatter the light from the camera lens 1106 back towards the camera lens 1106, and the camera lens 1106 may direct the light towards the bottom end of the image sensor 1102. In this manner, light intended for one portion of the image sensor 1102 may be erroneously received by a different portion of the image sensor 1102. Light received in unintended locations of the image sensor 1102 may cause the first camera to capture image frames with distorted brightness in the form of scattering noise and related image artifacts. While the scattering noise is only shown for the first camera (with the first lens 1106 and first image sensor 1102) and the first redirection element 1110, the scattering noise may occur for the second camera (with the second lens 1108 and the second image sensor 1104) and the second redirection element 1120 as well. In addition, the scattering noise may occur in the portions of the image sensors corresponding to the overlapping fields of view for the cameras. Therefore, a combined image may include the scattering noise near the stitch line or location of one side of the combined image. This may result in a visible stitch line in the combined image, which is not desirable as it breaks the continuity in image data in the combined image.

One or more redirection elements 503 are configured to prevent redirecting light from a camera lens back towards the camera lens. For example, the redirection elements 1110 may be configured to prevent reflecting light from the camera lens 1106 back towards the camera lens 1106 (and similar for the other redirection element). In some implementations, a portion of one or more edges of the prism is prevented from scattering light. In preventing the portions from scattering light, one or more of the chamfered edges of the prism are prevented from scattering light. For example, a light absorbing coating may be applied to the top right chamfered edge of the prism in the example in FIG. 11). In some implementations, one or both of the other two corner edges of the prism (that are not in the illustrated light paths in FIG. 11 and which may or may not be chamfered) may also be coated with a light absorbing coating to prevent light scattering from the surfaces at these locations. In this manner, light received at the top-right edge of the left prism in FIG. 11 is absorbed and will not be scattered toward the camera lens 1106 and the sensor 1102. In some examples, the light absorbing coating may be opaque. In some examples, the light absorbing coating may be black, dark grey, or a dark color.

In some other implementations to reduce the scattering noise caused by reflections from the camera lenses and subsequently scattered by a prism edge, the first redirection element and the second redirection element may be combined into a single redirection element so that the top-right corner of the left prism and the top-left corner of the right prism are effectively eliminated (do not physically exist).

Figure 12A:
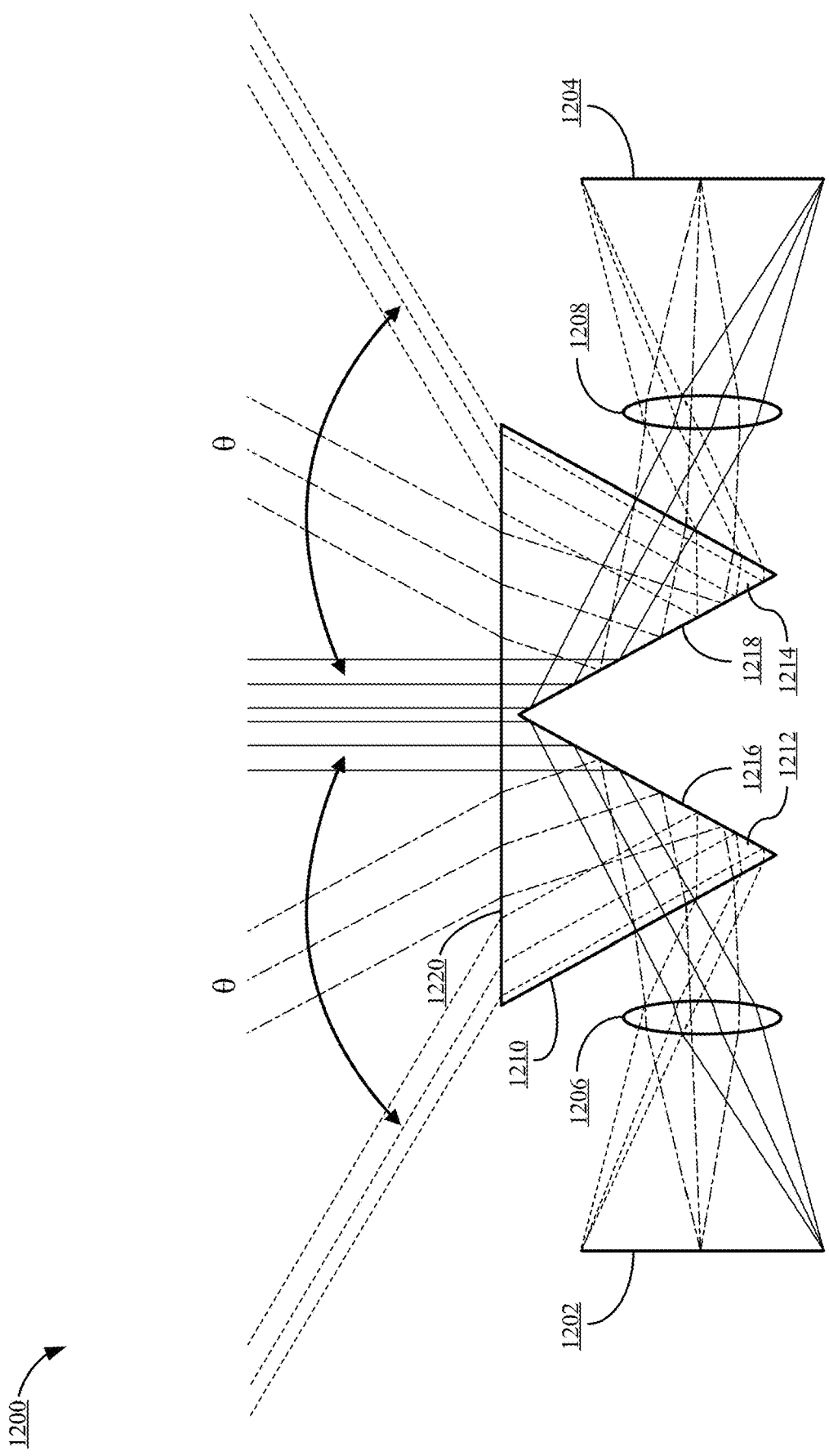
FIG. 12A is a conceptual diagram illustrating an example redirection element to redirect light to a first camera and to redirect light to a second camera, in accordance with some examples.

FIG. 12A is a conceptual diagram 1200 illustrating an example redirection element 1210 to redirect light to a first camera and to redirect light to a second camera. The first camera includes a first image sensor 1202 and a first camera lens 1206, and the first camera may be an example implementation of the first camera in FIG. 9. The second camera includes a second image sensor 1204 and a second camera lens 1208, and the second camera may be an example implementation of the second camera in FIG. 9. For example, the angle of view Theta for both cameras may be 70 degrees.

The redirection element 1210 includes a first prism 1212 to refract light intended for the first image sensor 1202 and a second prism 1214 to refract light intended for the second image sensor 1204. A first mirror may be on side 1216 of the first prism 1212, and a second mirror may be on side 1218 of the second prism 1214 (similar to redirection elements 910 and 912 in FIG. 9). The first prism 1212 and/or the second prism 1214 can include a high refractive index medium (e.g., having a refractive index above a threshold). The first prism 1212 and the second prism 1214 are contiguous. The first prism 1212 and the second prism 1214 are physically connected and/or joined and/or bridged at the top of sides 1216 and 1218. For example, the first prism 1212 and the second prism 1214 are connected so as to be overlapping at a top edge of both prisms. For instance, the edge of the first prism 1212 that is closest to the second prism 1214, and the edge of the second prism 1214 that is closest to the first prism 1212, overlap and are joined together. In some implementations, the overlapping section of the first prism 1212 and the second prism 1214 may have a height of ½ mm to 1 mm of the redirection element 1210. The overlapping section of the first prism 1212 and the second prism 1214 may be referred to as a bridge joining the first prism 1212 and the second prism 1214.

In this manner, light received near the center of the side 1220 of the redirection element may be reflected towards the first image sensor 1202 or the second image sensor 1204 based on which side 1216 or 1218 receives the light. Light reflected back by the camera lens 1206 and the camera lens 1208 towards the redirection element 1210 does not hit the prism corner edge (as illustrated in FIG. 11) since the prism corner edge does not exist in the redirection element 1210.

In some implementations of manufacturing the redirection element 1210, an injection molding of the desired shape (such as including two contiguous/overlapping triangular or equilateral triangular prisms) is filled with a plastic having a desired refractive index. After creating a plastic element shaped as desired, two surfaces of the plastic element have a reflective coating applied (such as sides 1216 and 1218). In some implementations, an anti-reflective coating is applied to the top side to receive light from the scene (such as side 1220). An anti-reflective coating may also be applied to the sides of the prisms oriented towards the camera lenses 1206 and 1208. In some implementations, a proximal side and a distal side of the redirection element 1210 also include a non-reflective and/or light-absorbing coating. In some examples, the coating may be opaque. In some examples, the coating may be black, dark grey, or a dark color. With the top corners of the first prism 1212 and the second prism 1214 closest to each other overlapping, the cameras may be positioned to ensure the virtual center of the first lens 1206 and the second lens 1208 virtually overlap while remaining physically separate as in FIG. 9 (e.g., the center of the first entrance pupil of the first lens 1206 and the center of the second entrance pupil of the second lens 1208 overlap as in FIG. 9). In some implementations, the orientations of the cameras are the same or similar as in FIG. 9 to ensure 0.5-5 degree overlap of the scenes at the center stitch area of the combined image of the two images captured by image sensor 1202 and the image sensor 1204. While not shown in FIG. 12A (or the other implementations of a prism of a redirection element), one or more of the corner edges may be chamfered to prevent cracking.

While virtual lenses corresponding to the first lens 1206 and the second lens 1208 are not illustrated in FIG. 12A, it should be understood that the positions of such virtual lenses would be similar to the positions of the first virtual lens 926 and the second virtual lens 928 of FIG. 9. While virtual image sensors corresponding to the first image sensor 1202 and the second image sensor 1204 are not illustrated in FIG. 12A, it should be understood that the positions of such virtual image sensors would be similar to the positions of the first virtual image sensor 914 and the second virtual image sensor 916 of FIG. 9. While virtual extensions of the prior paths of the first light and the second light beyond the first prism 1212 and the second prism 1214 toward the virtual lenses and the virtual image sensors are not illustrated in FIG. 12A, it should be understood that virtual extensions of the prior paths of the first light and the second light in FIG. 12A would appear similarly to the virtual extensions of the prior paths of the first light and the second light in FIG. 9.

Figure 12B:
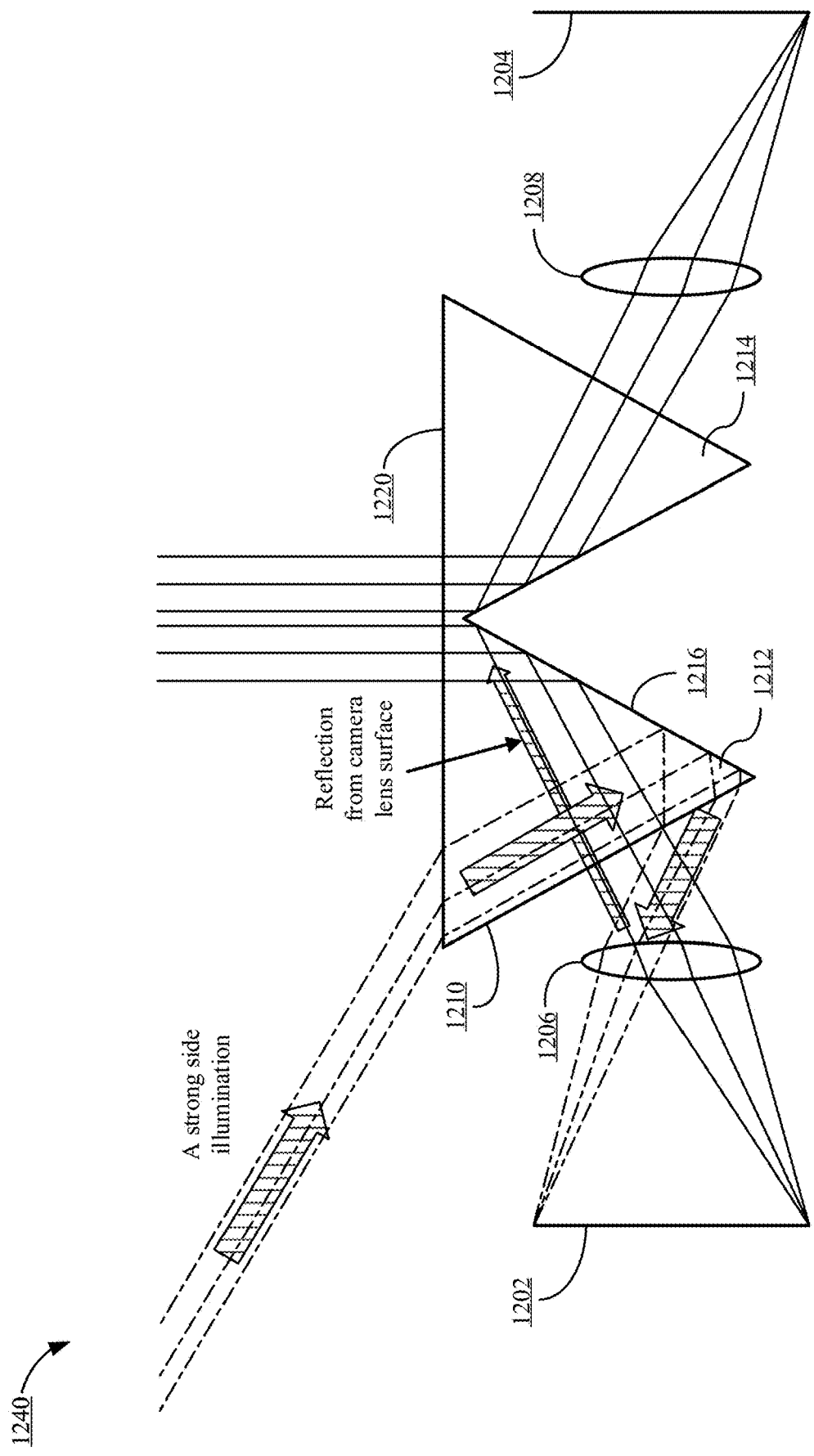
FIG. 12B is a conceptual diagram illustrating the redirection element in FIG. 12A that illustrates the elimination of light scattering from a prism edge, in accordance with some examples.

FIG. 12B is a conceptual diagram 1240 illustrating the redirection element in FIG. 12A that illustrates the elimination of light scattering from a prism edge (such as shown in FIG. 11). A strong side illumination entering the first prism 1212 is refracted and reflected by a reflective surface on side 1216. The reflected light exits the redirection element 1210 at a refraction angle and continues propagation towards lens 1206. The portion of light reflected from the lens surface through Fresnel reflection re-enters the first prism 1212 and propagates towards the top-center (where the first prism 1212 and the second prism 1214 overlap). Since the first prism 1212 (and the second prism 1214) does not include a corner edge at the top center of the redirection element 1210, there is no light scatter back towards the lens 1206. For example, the light reflected from the lens 1206 may continue to propagate and exit the redirection element 1210 on side 1220. A camera may be oriented with reference to the redirection element 1210 to ensure subsequent specular reflections from other prism surfaces (such as from side 1220) will not be received by its image sensor. While reduction of light scatter is illustrated with reference to the first prism 1212 in FIG. 12B, the same reduction of light scatter may occur for the second prism 1214 regarding light reflected by the second camera lens 1208 associated with the second image sensor 1204. Because the reflected light exits the redirection element 1210 on side 1220, the scattering noise and visible seam discussed with respect to FIG. 11 are reduced or eliminated using the redirection element 1210 with the overlapping joined prisms (the first prism 1212 and the second prism 1214) illustrated in FIGS. 12A-12C. Thus, use of the redirection element 1210 with the overlapping joined prisms (the first prism 1212 and the second prism 1214) increases image quality, both of images captured individually using the image sensors 1202 and 1204, and of combined images generated by stitching together images captured by the image sensors 1202 and 1204. Additionally, the first prism 1212 and the second prism 1214 are overlapping and joined in the redirection element 1210, the redirection element 1210 has the additional benefit of ensuring that the first prism 1212 and the second prism 1214 can be positioned relative to one another with precision, and do not get misaligned relative to one another without need for additional hardware controlling the relative positions of the first prism 1212 and the second prism 1214 to one another.

Figure 12C:
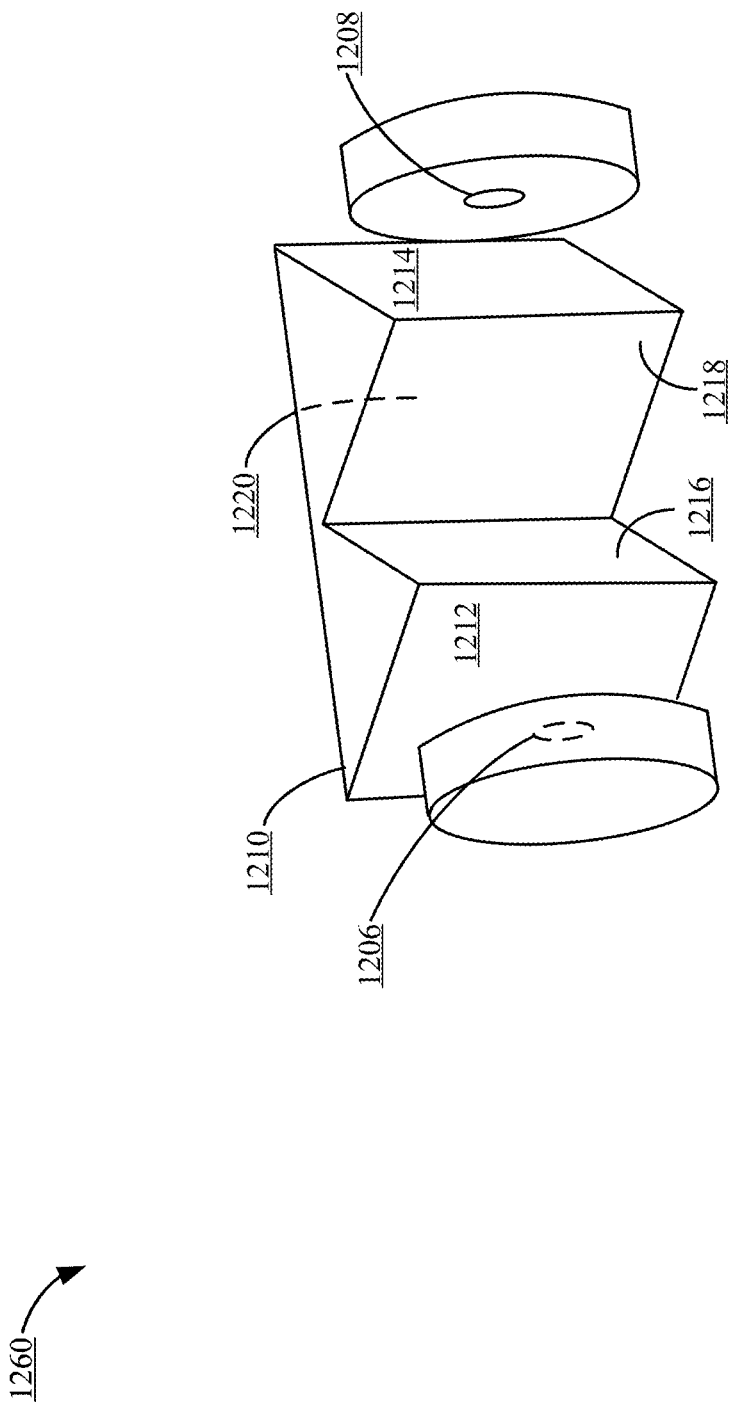
FIG. 12C is a conceptual diagram illustrating the redirection element in FIG. 12A from a perspective view, in accordance with some examples.

FIG. 12C is a conceptual diagram 1260 illustrating the redirection element in FIG. 12A from a perspective view. The light redirection element 1210 is illustrated in between a first camera and a second camera. The first camera includes the first lens 1206, which is hidden from view based on the perspective in the conceptual diagram 1260, but is still illustrated using dashed lines. The second camera includes the second lens 1208, which is hidden from view based on the perspective in the conceptual diagram 1260. The light redirection element 1210 includes the first prism 1212 and the second prism 1214. The first prism 1212 and the second prism 1214 are contiguous. The edge of the first prism 1212 closest to the second prism 1214 is joined to the edge of the second prism 1214 closest to the first prism 1212. Side 1216 of the first prism 1212 includes a reflective coating. Side 1218 of the second prism 1214 includes a reflective coating. The light redirection element 1210 includes a side 1220 that is hidden from view based on the perspective in the conceptual diagram 1260, but is still pointed to using a dashed line.

In some cases, the first prism 1212 may be referred to as a first light redirection element, and the second prism 1214 may be referred to as a second light redirection element. In some cases, an edge of the first light redirection element physically overlaps with, and is joined to, an edge of the second light redirection element. In some cases, an edge of the first prism physically overlaps with, and is joined to, an edge of the second prism. In some cases, the first side 1216 (having a reflective surface) of the first prism 1212 may be referred to as a first light redirection element, and the second side 1218 (having a reflective surface) of the second prism 1214 may be referred to as a second light redirection element. The redirection element 1210 may be referred to as a single light redirection element, where the first light redirection element and the second light redirection element are two distinct portions of the single light redirection element.

As shown above, one or more redirection elements may be used in directing light from a scene towards multiple cameras. The multiple cameras capture image frames to be combined to generate a wide angle image. Such as wide angle image includes less distortion caused by lens curvature and may have a wider angle of view than other single cameras for wide-angle imaging.

Before, concurrently with, contemporaneously with, and/or after combining a first image frame and a second image frame to generate a combined image, the device 500 may perform other processing filters on the combined image or the captured image frames. For example, the image frames may have different color temperatures or light intensities. Other example processing may include imaging processing filters performed during the image processing pipeline, such as denoising, edge enhancement, and so on. After processing the image, the device 500 may store the image, output the image to another device, output the image to a display 514, and so on. In some implementations, a sequence of wide angle images may be generated in creating a wide angle video. For example, the image sensors concurrently and/or contemporaneously capture a sequence of image frames, and the device 500 processes the associated image frames as described for each in the sequence of image frames to generate a sequence of combined images for a video. Example methods for generating a combined image are described below with reference to FIG. 13A, FIG. 13B, and FIG. 14. While the methods are described as being performed by the device 500 and/or by an imaging system, any suitable device may be used in performing the operations in the examples.

Figure 13A:
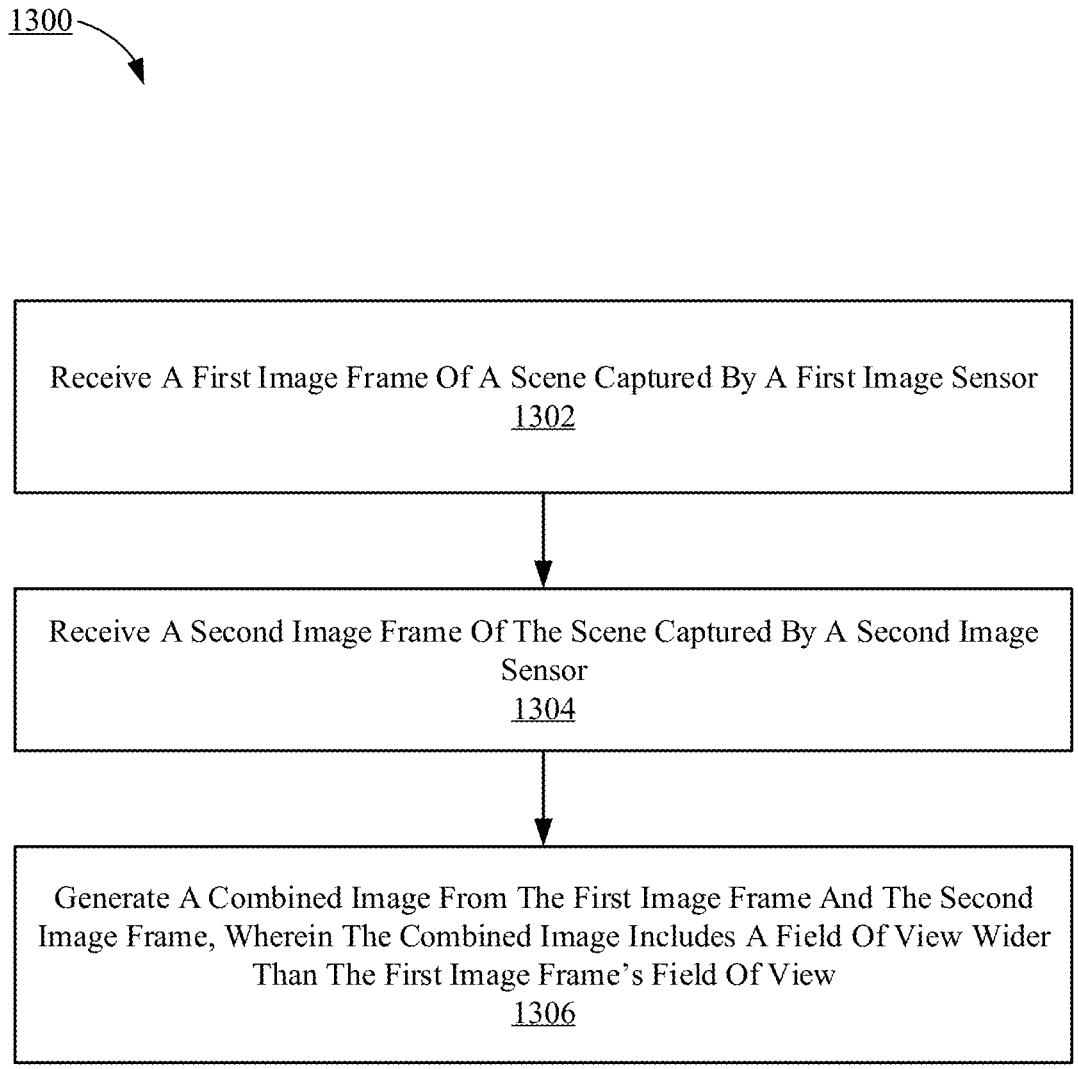
FIG. 13A is a flow diagram illustrating an example process for generating a combined image from multiple image frames, in accordance with some examples.

FIG. 13A is a flow diagram illustrating an example process 1300 for generating a combined image from multiple image frames. In some examples, the operations in the process 1300 may be performed by an imaging system. In some examples, the imaging system is the device 500. In some examples, the imaging system includes at least one of the camera 112, the camera 206, the device 500, the imaging architecture illustrated in conceptual diagram 600, the imaging architecture illustrated in conceptual diagram 700, the imaging architecture illustrated in conceptual diagram 800, the imaging architecture illustrated in conceptual diagram 900, the imaging architecture illustrated in conceptual diagram 1100, the imaging architecture illustrated in conceptual diagram 1200, the imaging architecture illustrated in conceptual diagram 1240, the imaging architecture illustrated in conceptual diagram 1260, the imaging architecture illustrated in conceptual diagram 1600, least one of an image capture and processing system 2000, an image capture device 2005A, an image processing device 2005B, an image processor 2050, a host processor 2052, an ISP 2054, a computing system 2900, the imaging system that performs the process 1350, the imaging system that performs the process 1400, the imaging system that performs the process 1900, the imaging system that performs the process 2800, one or more network servers of a cloud service, or a combination thereof.

At operation 1302, the imaging system may receive a first image frame of a scene captured by a first camera 501. For example, after the first camera 501 captures the first image frame (including a first portion of the scene), the image signal processor 512 may receive the first image frame. The first portion of the scene may be one side of the scene. At 1304, the device 500 may also receive a second image frame of the scene captured by a second camera 502. For example, after the second camera 502 captures the second image frame (including a second portion of the scene), the image signal processor 512 may receive the second image frame. The second portion of the scene may be the other side of the scene.

At operation 1306, the imaging system may generate a combined image from the first image frame and the second image frame. The combined image includes a field of view wider than the first image frame's field of view or the second image frame's field of view. For example, the first image frame and the second image frame may be stitched together (as described above). In some implementations, an overlap in the sides of the scene captured in the image frames is used to stitch the first image frame and the second image frame.

The combined image may have parallax effects reduced or removed based on virtually overlapping the centers of the entrance pupils of the first camera 501 and the second camera 502 capturing the first image frame and the second image frame based on one or more redirection elements 503 (such as redirection elements in FIG. 8, 9, or 12A-12C). In this manner, lenses or other components do not physically overlap while the entrance pupils' centers virtually overlap. In some implementations, the image frames are captured concurrently and/or contemporaneously by cameras 501 and 502 to reduce distortions caused by local motion or global motion.

While not shown in FIG. 13A, the imaging system may continue processing the combined image, including performing denoising, edge enhancement, or any other suitable image processing filter in the image processing pipeline. The resulting combined image may be stored in the memory 506 or another suitable memory, may be provided to another device, may be displayed on display 514, or may otherwise be used in any suitable manner.

FIG. 13B is a flow diagram illustrating an example process 1350 of digital imaging. In some examples, the operations in the process 1300 may be performed by an imaging system. In some examples, the imaging system is the device 500. In some examples, the imaging system includes at least one of the camera 112, the camera 206, the device 500, the imaging architecture illustrated in conceptual diagram 600, the imaging architecture illustrated in conceptual diagram 700, the imaging architecture illustrated in conceptual diagram 800, the imaging architecture illustrated in conceptual diagram 900, the imaging architecture illustrated in conceptual diagram 1100, the imaging architecture illustrated in conceptual diagram 1200, the imaging architecture illustrated in conceptual diagram 1240, the imaging architecture illustrated in conceptual diagram 1260, the imaging architecture illustrated in conceptual diagram 1600, least one of an image capture and processing system 2000, an image capture device 2005A, an image processing device 2005B, an image processor 2050, a host processor 2052, an ISP 2054, a computing system 2900, the imaging system that performs the process 1300, the imaging system that performs the process 1400, the imaging system that performs the process 1900, the imaging system that performs the process 2800, one or more network servers of a cloud service, or a combination thereof.

At operation 1355, the imaging system receives a first image of a scene captured by a first image sensor. A first light redirection element redirects a first light from a first path to a redirected first path toward the first image sensor. The first image sensor captures the first image based on receipt of the first light at the first image sensor. In some examples, the imaging system includes the first image sensor and/or the first light redirection element. In some examples, the first image sensor is part of a first camera. The first camera can also include a first lens. In some examples, the imaging system includes the first lens and/or the first camera.

Examples of the first image sensor of operation 1355 include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, another image sensor described herein, or a combination thereof. Examples of the first lens of operation 1355 include the lens 104, a lens of the camera 206, a lens of the first camera 501, a lens of the second camera 502, the first camera lens 606, the second camera lens 608, the camera lens 704, the first camera lens 806, the second camera lens 808, the first lens 906, the second lens 908, the first lens 1106, the second lens 1108, the first lens 1206, the second lens 1208, the lens 1660, the lens 2015, another lens described herein, or a combination thereof. Examples of the first light redirection element of operation 1355 include the light redirection element 706, the first light redirection element 810, the second light redirection element 812, the first light redirection element 910, the second light redirection element 912, the first prism of the first light redirection element 910, the second prism of the second light redirection element 912, the first reflective surface on side 918 of the light redirection element 910, the second reflective surface on side 920 of the second light redirection element 912, the first light redirection element 1110, the second light redirection element 1120, the first prism of the first light redirection element 1110, the second prism of the second light redirection element 1120, the first reflective surface on side 1112 of the first light redirection element 1110, the second reflective surface of the second light redirection element 1120, the light redirection element 1210, the first prism 1212 of the light redirection element 1210, the second prism 1214 of the light redirection element 1210, the first reflective surface on side 1216 of the first prism 1212 of the light redirection element 1210, the second reflective surface on side 1218 of the second prism 1214 of the light redirection element 1210, another prism described herein, another reflective surface described herein, another light redirection element described herein, or a combination thereof.

At operation 1360, the imaging system receives a second image of the scene captured by a second image sensor. A second light redirection element redirects a second light from a second path to a redirected second path toward the second image sensor. The second image sensor captures the second image based on receipt of the second light at the second image sensor. A virtual extension of the first path beyond the first light redirection element intersects with a virtual extension of the second path intersect beyond the second light redirection element. In some examples, the imaging system includes the second image sensor and/or the second light redirection element. In some examples, the second image sensor is part of a second camera. The second camera can also include a second lens. In some examples, the imaging system includes the second lens and/or the second camera.

Examples of the second image sensor of operation 1360 include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, another image sensor described herein, or a combination thereof. Examples of the second lens of operation 1360 include the lens 104, a lens of the camera 206, a lens of the first camera 501, a lens of the second camera 502, the first camera lens 606, the second camera lens 608, the camera lens 704, the first camera lens 806, the second camera lens 808, the first lens 906, the second lens 908, the first lens 1106, the second lens 1108, the first lens 1206, the second lens 1208, the lens 1660, the lens 2015, another lens described herein, or a combination thereof. Examples of the second light redirection element of operation 1360 include the light redirection element 706, the first light redirection element 810, the second light redirection element 812, the first light redirection element 910, the second light redirection element 912, the first prism of the first light redirection element 910, the second prism of the second light redirection element 912, the first reflective surface on side 918 of the light redirection element 910, the second reflective surface on side 920 of the second light redirection element 912, the first light redirection element 1110, the second light redirection element 1120, the first prism of the first light redirection element 1110, the second prism of the second light redirection element 1120, the first reflective surface on side 1112 of the first light redirection element 1110, the second reflective surface of the second light redirection element 1120, the light redirection element 1210, the first prism 1212 of the light redirection element 1210, the second prism 1214 of the light redirection element 1210, the first reflective surface on side 1216 of the first prism 1212 of the light redirection element 1210, the second reflective surface on side 1218 of the second prism 1214 of the light redirection element 1210, another prism described herein, another reflective surface described herein, another light redirection element described herein, or a combination thereof.

In some examples, the first lens and the second lens virtually overlap. In some examples, while the first lens and the second lens virtually overlap, the first lens and second lens do not physically overlap, do not spatially overlap, are physically separate, and/or are spatially separate. For example, the first lens 906 and the second lens 908 of FIG. 9 do not physically overlap, do not spatially overlap, are physically separate, and are spatially separate. Despite this, the first lens 906 and the second lens 908 virtually overlap, since the first virtual lens 926 (the virtual position of the first lens 906) overlaps with the second virtual lens 928 (the virtual position of the second lens 908). Though virtual lens positions for the first lens 1106 and the second lens 1108 are not illustrated in FIG. 11, the first lens 1106 and the second lens 1108 can also virtually overlap (e.g., the virtual lens position of the first lens 1106 can overlap with the virtual lens position of the second lens 1108). The first lens 1106 and the second lens 1108 do not physically overlap, do not spatially overlap, are physically separate, and are spatially separate. Though virtual lens positions for the first lens 1206 and the second lens 1208 are not illustrated in FIGS. 12A-12C, the first lens 1206 and the second lens 1208 can also virtually overlap (e.g., the virtual lens position of the first lens 1206 can overlap with the virtual lens position of the second lens 1208). The first lens 1206 and the second lens 1208 do not physically overlap, do not spatially overlap, are physically separate, and are spatially separate.

The first light redirection element can include a first reflective surface. Examples of the first reflective surface can include the reflective surface of the redirection element 706, the reflective surface of the first light redirection element 810, the reflective surface on side 918 of the first light redirection element 910, the reflective surface on side 1112 of the first light redirection element 1110, the reflective surface on side 1216 of the light redirection element 1210, another reflective surface described herein, or a combination thereof. To redirect the first light toward the first image sensor, the first light redirection element uses the first reflective surface to reflect the first light toward the first image sensor. Similarly, the second light redirection element can include a second reflective surface. Examples of the second reflective surface can include the reflective surface of the redirection element 706, the reflective surface of the second light redirection element 812, the reflective surface on side 920 of the second light redirection element 912, the reflective surface on the side of the second light redirection element 1120 closest to the side 1112 of the first light redirection element 1110, the reflective surface on side 1218 of the light redirection element 1210, another reflective surface described herein, or a combination thereof. To redirect the second light toward the second image sensor (e.g., second image sensor 904/1204), second light redirection element uses the second reflective surface to reflect the second light toward the second image sensor. The first reflective surface can be, or can include, a mirror. The second reflective surface can be, or can include, a mirror.

The first light redirection element can includes a first prism configured to refract the first light. The second light redirection element can include a second prism configured to refract the second light. In some examples, the first prism and the second prism are contiguous (e.g., as in FIGS. 12A-12C). For instance, the first prism and the second prism may be made of a single piece of plastic, glass, crystal, or other material. A bridge may join a first edge of the first prism and a second edge of the second prism. For instance, in FIGS. 12A-12C, the edge of the first prism between side 1220 and the side 1216 is joined, via a bridge, to the edge of the second prism between side 1220 and side 1218. The bridge can be configured to prevent reflection of light from the first edge of the first prism and/or the second edge of the second prism. For instance, as illustrated in FIGS. 12A-12C, the bridge joining the two prisms may prevent the scattering from the prism corner that is illustrated and labeled in FIG. 11.

The first prism can include at least one chamfered edge. For instance, in the first redirection element 910 of FIG. 9, the edge between side 922 and side 918 can be chamfered. The corresponding edge of the first prism in the first redirection element 1110 of FIG. 11 can be chamfered. The second prism can include at least one chamfered edge. For instance, in the second redirection element 912 of FIG. 9, the edge between side 924 and side 920 can be chamfered. The corresponding edge of the second prism in the second redirection element 1120 of FIG. 11 can be chamfered. The first prism can include at least one edge with a light-absorbing coating. For instance, in the first redirection element 910 of FIG. 9, the edge between side 922 and side 918 can have a light-absorbing coating. The corresponding edge of the first prism in the first redirection element 1110 of FIG. 11 can have a light-absorbing coating. The corresponding edge of the first prism 1212 in the redirection element 1210 of FIGS. 12A-12C (e.g., at and/or near the bridge joining the first prism 1212 with the second prism 1214) can have a light-absorbing coating. The second prism can include at least one edge with the light-absorbing coating. For instance, in the second redirection element 912 of FIG. 9, the edge between side 924 and side 920 can have a light-absorbing coating. The corresponding edge of the second prism in the second redirection element 1120 of FIG. 11 can have a light-absorbing coating. The corresponding edge of the second prism 1214 in the redirection element 1210 of FIGS. 12A-12C (e.g., at and/or near the bridge joining the first prism 1212 with the second prism 1214) can have a light-absorbing coating. The light-absorbing coating can be a paint, a lacquer, a material, or another type of coating. The light-absorbing coating can be opaque. The light-absorbing coating can be reflective or non-reflective. The light-absorbing coating can be black, dark grey, a dark color, a dark gradient, a dark pattern, or a combination thereof.

In some examples, the first path referenced in operations 1355 and 1360 refers to a path of the first light before the first light enters the first prism. Thus, the first path can be a path that has not yet been refracted by the first prism. For instance, in the context of FIG. 9, the first path may refer to the path of the first light before reaching the top side 922 of the first redirection element 910. In the context of FIG. 11, the first path may refer to the path of the first light before reaching the corresponding top side (not labeled) of the first redirection element 1110. In the context of FIGS. 12A-12C, the first path may refer to the path of the first light before reaching the corresponding top side 1220 of the first prism 1212 of the redirection element 1210. In some examples, the second path referenced in operations 1355 and 1360 refers to a path of the second light before the second light enters the second prism. Thus, the second path can be a path that has not yet been refracted by the second prism. For instance, in the context of FIG. 9, the second path may refer to the path of the second light before reaching the top side 924 of the second redirection element 912. In the context of FIG. 11, the second path may refer to the path of the second light before reaching the corresponding top side (not labeled) of the second redirection element 1120. In the context of FIGS. 12A-12C, the second path may refer to the path of the second light before reaching the corresponding top side 1220 of the second prism 1214 of the redirection element 1210.

In some examples, the first prism includes a first reflective surface configured to reflect the first light. In some examples, the second prism includes a second reflective surface configured to reflect the second light. The first reflective surface can be, or can include, a mirror. The second reflective surface can be, or can include, a mirror. In some examples, the first path referenced in operations 1355 and 1360 refers to a path of the first light after the first light enters the first prism but before the first reflective surface reflects the first light. Thus, the first path can already be refracted by the first prism, but not yet reflected by the first reflective surface. For instance, in the context of FIG. 9, the first path may refer to the path of the first light after passing through the top side 922 of the first redirection element 910 and entering the first redirection element 910 but before reaching the reflective surface on side 918 of the first redirection element 910. In the context of FIG. 11, the first path may refer to the path of the first light after entering the first redirection element 1110 but before reaching the reflective surface on side 1112 of the first redirection element 1110. In the context of FIGS. 12A-12C, the first path may refer to the path of the first light after passing through the top side 1220 of the first prism 1212 of the redirection element 1210 and entering the first prism 1212 of the redirection element 1210 but before reaching the reflective surface on side 1216 of the first prism 1212 of the redirection element 1210. In some examples, the second path referenced in operations 1355 and 1360 refers to a path of the second light after the second light enters the second prism but before the second reflective surface reflects the second light. Thus, the second path can already be refracted by the second prism, but not yet reflected by the second reflective surface. For instance, in the context of FIG. 9, the second path may refer to the path of the second light after passing through the top side 924 of the second redirection element 912 and entering the second redirection element 912 but before reaching the reflective surface on side 920 of the second redirection element 912. In the context of FIG. 11, the second path may refer to the path of the second light after entering the second redirection element 1120 but before reaching the reflective surface on the side of the second redirection element 1120 that is closest to the side 1112 of the first redirection element 1110. In the context of FIGS. 12A-12C, the second path may refer to the path of the second light after passing through the top side 1220 of the second prism 1214 of the redirection element 1210 and entering the second prism 1214 of the redirection element 1210 but before reaching the reflective surface on side 1218 of the second prism 1214 of the redirection element 1210.

In some examples, the first image and the second image are captured contemporaneously, concurrently, simultaneously, within a shared time window, within a threshold duration of time of one another, or a combination thereof. The first light redirection element can be fixed and/or stationary relative to the first image sensor. The second light redirection element can be fixed and/or stationary relative to the second image sensor. The first light redirection element can be fixed and/or stationary relative to the second light redirection element. The first light redirection element can be is fixed and/or stationary relative to a housing of the imaging system. The second light redirection element can be is fixed and/or stationary relative to the housing of the imaging system. For instance, the first image sensor, the first light redirection element, the second image sensor, and the second light redirection element can be arranged in a fixed and/or stationary arrangement as in the various image sensors and light redirection elements depicted in FIG. 8, FIG. 9, FIG. 11, FIGS. 12A-12C, variants of these described herein, or a combination thereof. The first light redirection element can in some cases be movable relative to the first image sensor and/or the second light redirection element and/or a housing the imaging system, for instance using a motor and/or an actuator. The second light redirection element can in some cases be movable relative to the second image sensor and/or the first light redirection element and/or a housing the imaging system, for instance using a motor and/or an actuator.

A first planar surface of the first image sensor can face a first direction, and a second planar surface of the second image sensor can face a second direction. The first direction may be an optical axis of the first image sensor and/or of a lens associated with the first image sensor and/or of a camera associated with the first image sensor. The second direction may be an optical axis of the second image sensor and/or of a lens associated with the second image sensor and/or of a camera associated with the second image sensor. The first direction and the second direction can be parallel to one another. The first camera can face the first direction as well. The second camera can face the second direction as well. The first direction and the second direction can point directly at one another. In some examples, the first planar surface of the first image sensor can face the second planar surface of the second image sensor. In some examples, the first camera can face the second camera. For example, the first image sensor 802 and the second image sensor 804 of FIG. 8 face one another, and face directions that are parallel to each other's respective directions. The first image sensor 902 and the second image sensor 904 of FIG. 9 face one another, and face directions that are parallel to each other's respective directions. The first image sensor 1102 and the second image sensor 1104 of FIG. 11 face one another, and face directions that are parallel to each other's respective directions. The first image sensor 1202 and the second image sensor 1204 of FIGS. 12A-12C face one another, and face directions that are parallel to each other's respective directions.

At operation 1365, the imaging system modifies the first image, the second image, or both the first and second images using a perspective distortion correction. The perspective distortion correction of operation 1365 may be referred to as perspective distortion. Examples of the perspective distortion correction of operation 1365 include the perspective distortion correction 1022 of FIG. 10A, the perspective distortion correction 1022 of FIG. 10B, the flat perspective distortion correction 1515 of FIG. 15, the curved perspective distortion correction 1525 of FIG. 15, the flat projective perspective transformation pixel mapping 1620 of FIG. 16, the curved perspective distortion correction of FIG. 16, the perspective distortion correction 2152 illustrated in FIG. 21A, the perspective distortion correction 2177 illustrated in FIG. 21B, another type of perspective distortion correction described herein, another type of perspective distortion described herein, or a combination thererof.

In some examples, to perform the modification(s) of operation 1365 of the first image and/or the second image, the imaging system modifies the first image from depicting a first perspective to depicting a common perspective using the perspective distortion correction. The imaging system modifies the second image from depicting a second perspective to depicting the common perspective using the perspective distortion correction. The common perspective can be between the first perspective and the second perspective. For instance, in FIG. 10B, the first image of the two image frames 1024 has its perspective angled to the right, while the second image of the two image frames 1024 has its perspective angled to the left. The common perspective, as visible in the first image portion of the combined image 1026 and the second image portion of the combined image 1026 is straight ahead, in between the right and left angles of the two image frames 1024. In FIG. 16, the first original image plane 1614 has its perspective angled slightly counter-clockwise, while the second original image plane 1616 has its perspective angled slightly clockwise. The common perspective, as visible in the flat perspective-corrected image plane 1625 (as mapped using the flat projective transformation pixel mapping 1620) is perfectly horizontal, in between the slightly counter-clockwise and slightly clockwise angles of the first original image plane 1614 and the second original image plane 1616.

In some examples, to perform the modification(s) of operation 1365 of the first image and/or the second image, the imaging system identifies depictions of one or more objects in image data (of the first image and/or the second image). The imaging system modifies the image data by projecting the image data based on the depictions of the one or more objects. In some examples, the imaging system can project the image data onto a flat perspective-corrected image plane (e.g., as part of a perspective distortion correction 1022, flat perspective distortion correction 1515, and/or flat projective transformation pixel mapping 1620 as in FIGS. 10A-10B, 15, and 16). In some examples, the imaging system can project the image data onto a curved perspective-corrected image plane (e.g., as part of a curved perspective distortion correction 1525 as in FIGS. 15, 16, 17, 18, and 19). For instance, in reference to FIG. 15, the imaging system (e.g., the dual-camera device 1505) identifies depictions the soda cans in the first image and second image. In the curved perspective distortion correction 1525, the imaging system (e.g., the dual-camera device 1505) modifies the image data by projecting the image data based on the depictions of the soda cans. In reference to FIG. 16, the imaging system (e.g., including the lens 1660) identifies depictions of one or more objects following a curve in the scene 1655 in the first image and second image. In the curved perspective distortion correction of FIG. 16, the imaging system (e.g., including the lens 1660) modifies the image data by projecting the image data based on the depictions of the one or more objects following a curve in the scene 1655. In reference to FIG. 17, the imaging system (not pictured) identifies depictions of one or more objects (e.g., TV 1740, couch 1750) in the scene 1655 in the first image and second image. In the different perspective distortion corrections of the three combined images 1710-1730, the imaging system can modify the image data by projecting the image data based on the depictions of the one or more objects (e.g., TV 1740, couch 1750).

In some examples, the imaging system modifies the first image and/or the second image using a brightness uniformity correction. For instance, the imaging system can remove vignetting and/or other brightness non-uniformities from the first image, the second image, or both. The brightness uniformity correction 1062 of FIG. 10D is an example of the brightness uniformity correction that the imaging system can use to modify the first image and/or the second image. The imaging system can also increase or decrease overall brightness in the first image, the second image, or both, so that overall brightness matches between the first image and second image. The imaging system can also increase or decrease other image properties (e.g., contrast, color saturation, white balance, black balance, color levels, histogram, etc.) in the first image, the second image, or both, so that these image properties match between the first image and second image. Such adjustments of brightness and/or other image properties can ensure that there is no visible seam in the combined image (e.g., between the portion of the combined image that is from the first image and the portion of the combined image that is from the second image). In some examples, the imaging system can perform the modifications relating to brightness uniformity correction after the modifications relating to perspective distortion correction of operation 1365. In some examples, the imaging system can perform the modifications relating to brightness uniformity correction before the modifications relating to perspective distortion correction of operation 1365. In some examples, the imaging system can perform the modifications relating to brightness uniformity correction contemporaneously with the modifications relating to perspective distortion correction of operation 1365.

At operation 1370, the imaging system generates a combined image from the first image and the second image. The imaging system can generate the combined image from the first image and the second image in response to the modification of the first image and/or the second image using the perspective distortion correction. The imaging system can generate the combined image from the first image and the second image in response to the modification of the first image and/or the second image using the brightness uniformity correction. The combined image includes a combined image field of view that is larger than a first field of view of the first image and/or a second field of view of the second image. For example, the combined image 1026 of FIG. 10B has a larger and/or wider field of view than a first field of view and a second field of view of the first and second images in the two image frames 1024. Similarly, the combined image of FIG. 10C has a larger and/or wider field of view than a first field of view and a second field of view of the first image captured by the first camera and second image captured by the second camera.

Generating the combined image from the first image and the second image can include aligning a first portion of the first image with a second portion of the second image. Generating the combined image from the first image and the second image can include stitching the first image and the second image together based on the first portion of the first image and the second portion of the second image being aligned. The digital alignment and stitching 1042 of FIG. 10C are an example of this alignment and stitching. The first portion of the first image and the second portion of the second image can at least partially match. For example, in reference to FIG. 10C, the first portion of the first image may be the portion of the first image captured by the first camera that includes the "Z(A)" (with the letter "A" circled) in the middle of the scene of FIG. 10C, and the second portion of the second image may be the portion of the second image captured by the second camera that includes the "Z(A)" (with the letter "A" circled) in the middle of the scene of FIG. 10C. The first portion of the first image and the second portion of the second image can match can overlap for stitching. The combined image can include the first portion of the first image, the second portion of the second image, or a merged image portion that merges or combines image data from the first portion of the first image with image data from the second portion of the second image.

As noted above, the imaging system may be the device 500. The device 500 may include at least the first camera 501 and the second camera 502 configured to capture the image frames for generating the combined image. The device 500 may also include the one or more redirection elements 503.

FIG. 14 is a flow diagram illustrating an example process 1400 for capturing multiple image frames to be combined to generate a combined image frame. In some examples, the operations in the process 1400 may be performed by an imaging system. In some examples, the imaging system is the device 500. In some examples, the imaging system includes the camera 112, the camera 206, the device 500, the imaging architecture illustrated in conceptual diagram 600, the imaging architecture illustrated in conceptual diagram 700, the imaging architecture illustrated in conceptual diagram 800, the imaging architecture illustrated in conceptual diagram 900, the imaging architecture illustrated in conceptual diagram 1100, the imaging architecture illustrated in conceptual diagram 1200, the imaging architecture illustrated in conceptual diagram 1240, the imaging architecture illustrated in conceptual diagram 1260, the imaging architecture illustrated in conceptual diagram 1600, least one of an image capture and processing system 2000, an image capture device 2005A, an image processing device 2005B, an image processor 2050, a host processor 2052, an ISP 2054, a computing system 2900, the imaging system that performs the process 1300, the imaging system that performs the process 1350, the imaging system that performs the process 1900, the imaging system that performs the process 2800, one or more network servers of a cloud service, or any combination thereof.

The operations in FIG. 14 may be an example implementation of the operations in FIG. 13A and/or FIG. 13B to be performed by the device 500. For example, the device 500 may use a configuration of cameras and redirection elements depicted in FIG. 8, 9, or 12A-12C (or other suitable redirection elements) to virtually overlap centers of entrance pupils of the first camera 501 and the second camera 502 (such as depicted in FIG. 6). Dashed boxes illustrate optional steps that may be performed.

At operation 1402, a first light redirection element redirects a first light towards the first camera 501. For example, a first light redirection element may redirect a portion of light received from an opening in the device. In some implementations, a first mirror of the first light redirection element reflects the first light towards the first camera 501 (operation 1404). In the example of FIG. 8, a mirror of the first light redirection element 810 may reflect the light from a first portion of the scene to the first camera lens 806. In the example of FIG. 9, the mirror on side 918 of the first prism may reflect the light from the first portion of the scene to the first camera lens 906. In the example of FIG. 12A, the mirror on side 1216 of the first prism 1212 of the redirection element 1210 may reflect the light from the first portion of the scene to the first camera lens 1206.

In some implementations, a first prism of the first light redirection element may also refract the first light (operation 1406). Referring back to the example of FIG. 9, a redirection element may include both a mirror and a prism. For example, a side of a triangular prism may include a reflective coating to reflect light passing through the prism. Referring back to the example of FIG. 12A, a redirection element may include multiple prisms, with one prism to refract the first light for the first camera 501.

In some implementations, a first lens directs the first light from the first light redirection element towards the first camera 501 (operation 1408). At operation 1410, the first camera 501 captures a first image frame based on the first light. At operation 1412, a second light redirection element redirects a second light towards the second camera 502. For example, a second light redirection element may redirect a portion of light received from the opening in the device. In some implementations, a second mirror of the second light redirection element reflects the second light towards the second camera 502 (operation 1414). In the example of FIG. 8, a mirror of the second redirection element 812 may reflect the light from a second portion of the scene towards the second camera lens 808. In the example of FIG. 9, the second mirror on side 920 of the second prism of the second redirection element 912 may reflect the light from the second portion of the scene to the second lens 908. In the example of FIG. 12A, the second mirror on side 1218 of the second prism of the redirection element 1210 may reflect the light from the second portion of the scene to the second lens 1208. In some implementations, a second prism of the second light redirection element may also refract the second light (operation 1416). Referring back to the example of FIG. 9, the second redirection element 912 may include both a mirror and a prism. For example, a side of a triangular prism may include a reflective coating to reflect light passing through the prism. Referring back to the example of FIG. 12A, the redirection element 1210 may include a second prism and second mirror for reflecting and refracting light towards the second camera lens 1208. Referring back to FIG. 14, in some implementations, the first redirection element and the second redirection element are the same redirection element. In some implementations, the redirection element includes multiple prisms and mirrors to redirect the first light and to redirect the second light. For example, the redirection element 1210 in FIG. 12A includes two triangular prisms (the first prism 1212 and the second prism 1214), such as equilateral triangular prisms, with mirrors on sides 1216 and 1218.

In some implementations, a second lens may direct the second light from the second light redirection element towards an image sensor of the second camera 502 (operation 1418). At operation 1420, the second camera 502 captures a second image frame based on the second light. As noted above, the first light redirection element and the second light redirection element (which may be separate or a single redirection element) may be positioned to allow the centers of the entrance pupils of the first camera 501 and the second camera 502 to virtually overlap. In this manner, parallax effects in the combined image may be reduced or removed. In some implementations, the second image frame is captured concurrently and/or contemporaneously with the first image frame. In this manner, multiple image frames may be concurrently and/or contemporaneously captured by the first camera 501 and the second camera 502 of the device 500 to reduce distortions in a combined image caused by global motion or local motion. The captured image frames may be provided to other components of the device 500 (such as the image signal processor 512) to process the image frames, including combining the image frames to generate a combined (wide angle) image in operation 1422, as described above).

An image frame as discussed herein can be referred to as an image, an image frame, a video frame, or a frame. An image as discussed herein can be referred to as an image, an image frame, a video frame, or a frame. A video frame as discussed herein can be referred to as an image, an image frame, a video frame, or a frame. A frame as discussed herein can be referred to as an image, an image frame, a video frame, or a frame.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium (such as the memory 506 in the example device 500 of FIG. 5) comprising instructions 508 that, when executed by the processor 504 (or the camera controller 510 or the image signal processor 512 or another suitable component), cause the device 500 to perform one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor.

The various illustrative logical blocks, modules, circuits, and instructions described in connection with the aspects disclosed herein may be executed by one or more processors, such as the processor 504 or the image signal processor 512 in the example device 500 of FIG. 5. Such processor(s) may include but are not limited to one or more digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structures or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

FIG. 15 is a conceptual diagram 1500 illustrating examples of a flat perspective distortion correction 1515 and a curved perspective distortion correction 1525. As discussed previously, perspective distortion correction can be used to appear to change the perspective, or angle of view, of the photographed scene. In the case of the perspective distortion correction 1022 of FIG. 10B, the perspective distortion correction is 1022 used so that the first image and the second image appear to share a common perspective, or a common angle of view, of the photographed scene.

The perspective distortion correction 1022 illustrated in the conceptual diagram 1020 of FIG. 10B is an example of a keystone perspective distortion correction, which is an example of a flat perspective distortion correction 1515. A keystone perspective distortion correction maps a trapezoidal area into a rectangular area, or vice versa. A flat perspective distortion correction maps a first flat (e.g., non-curved) two-dimensional area onto a second flat (e.g., non-curved) two dimensional area. The first flat (e.g., non-curved) two-dimensional area and the second flat (e.g., non-curved) two dimensional area may have different rotational orientations (e.g., pitch, yaw, and/or roll) relative to one another. A flat perspective distortion correction may be performed using matrix multiplication, in some examples.

A device 500 with one of the dual-camera architectures discussed herein (e.g., as illustrated in diagrams 900, 1100, 1200, 1240, and/or 1260) can produce a high quality combined image of many types of scenes using flat perspective distortion correction 1515. However, the device 500 can produce a combined image of certain types of scenes that appears visually warped and/or visually distorted when using flat perspective distortion correction 1515. For such types of scenes, use of a curved perspective distortion correction 1525 can produce a combined image with reduced or removed visual warping compared to use of flat perspective distortion correction 1515.

For example, the conceptual diagram 1500 illustrates a scene 1510 in which five soda cans are arranged in an arc partially surrounding a dual-camera device 1505, with each of the five soda cans approximately equidistant from the dual-camera device 1505. The dual-camera device 1505 is a device 500 with one of the dual-camera architectures discussed herein (e.g., as illustrated in diagrams 900, 1100, 1200, 1240, and/or 1260), that generates a combined image of the scene 1510 from two images of the scene 1510 respectively captured by the two cameras of the dual-camera device 1505 as discussed herein (e.g., as in the processes 1300, 1350, 1400, 1900, and/or 2800).

The dual-camera device 1505 uses flat perspective distortion correction 1515 to perform perspective correction while generating a first combined image 1520. The first combined image 1520 appears visually warped. For instance, despite the fact that the five soda cans in the scene 1510 are approximately equidistant from the dual-camera device 1505, the leftmost and rightmost soda cans in the first combined image 1520 appear larger than the three central soda cans in the first combined image 1520. The leftmost and rightmost soda cans in the first combined image 1520 also appear warped themselves, with their leftmost and rightmost sides appearing to have different heights. The leftmost and rightmost soda cans in the first combined image 1520 also appear to be farther apart from the three central soda cans in the first combined image 1520 than each of the three central soda cans in the first combined image 1520 are from one another.

The dual-camera device 1505 uses a curved transformation perspective distortion correction 1525 to perform perspective correction while generating a second combined image 1530. The second combined image 1530 reduces or removes all or most of the apparent visual warping in the first combined image 1520. For instance, the five soda cans in the scene 1510 appear more similar in size to one another in the second combined image 1530 than in the first combined image 1520. The leftmost and rightmost soda cans also appear less warped themselves in the second combined image 1530 than in the first combined image 1520. The spacing between all five soda cans in the scene 1510 appears to be more consistent in the second combined image 1530 than in the first combined image 1520.

The curved perspective distortion correction 1525 may be more optimal to use than the flat perspective distortion correction 1515 in a variety of types of scenes. For example, the curved perspective distortion correction 1525 may be more optimal to use than the flat perspective distortion correction 1515 in panorama scenes of a distant horizon captured from a high altitude (e.g., a tall building or mountain).

FIG. 16 is a conceptual diagram illustrating pixel mapping from an image sensor image plane to a perspective-corrected image plane in a flat perspective distortion correction 1515 and in a curved perspective distortion correction 1525. In particular, FIG. 16 includes a first diagram 1600 that is based on a dual-camera architecture such as that illustrated in conceptual diagrams 900, 1100, 1200, 1240, and/or 1260. The first diagram 1600 illustrates virtual beams of light passing through the first virtual lens 926 and reaching the first virtual image sensor 914. The first virtual image sensor 914 is also labeled as the first original image plane 1614, as the first original image plane 1614 represents the first image captured by the first image sensor 902/1102/1202 (not pictured). The first diagram 1600 also illustrates virtual beams of light passing through the second virtual lens 928 and reaching the second virtual image sensor 916. The second virtual image sensor 916 is also labeled as the second original image plane 1616, as the second original image plane 1616 represents the second image captured by the second image sensor 904/1104/1204 (not pictured).

The first diagram 1600 illustrates flat projective transformation pixel mapping 1620 dashed arrows that perform a flat perspective distortion correction 1515. The flat projective transformation pixel mapping 1620 may be referred to as flat transformation pixel mapping and/or projective transformation pixel mapping. The flat projective transformation pixel mapping 1620 dashed arrows project through various pixels of the first original image plane 1614 onto corresponding pixels of a perspective-corrected image plane 1625, and project through various pixels of the second original image plane 1616 onto corresponding pixels of the perspective-corrected image plane 1625. The perspective-corrected image plane 1625 represents the combined image generated by merging the first image with the second image after performing the flat perspective distortion correction 1515.

A second diagram 1650 in FIG. 16 illustrates an example of a curved perspective distortion correction 1525. A scene 1655, which may include both flat and curved portions, is photographed using a camera with a lens 1660. The lens 1660 may be a physical lens (such as lenses 704, 806, 808, 906, 908, 1106, 1108, 1206, and/or 1208), or may be a virtual lens (e.g., such as virtual lenses 710, 926, and/or 928). The camera captures an image of the scene 1655, the image captured on the flat image plane 1665. In some examples, the flat image plane 1665 is an original image plane (e.g., as in the first original image plane 1614 and/or the second original image plane 1616) representing capture of the image at a physical image sensor (such as image sensors 702, 802, 804, 902, 904, 1004, 1102, 1104, 1202, and/or 1204) and/or a virtual image sensor (e.g., such as virtual image sensors 708, 914, and/or 916). In some examples, the flat image plane 1665 is a flat perspective-corrected image plane 1625 as in the first diagram 1600. Points along the flat image plane 1665 are represented by a flat x axis. Points along the flat x axis can be found using the equation x=f·tan(α) for a given angle α. In the second diagram 1650, f is the focal length of the camera. In the second diagram 1650, a is the angle of view of the camera, or an angle within the angle of view of the camera. The angle of view of the camera may, for example, be 60 degrees. To perform curved perspective distortion correction 1525, pixels from the flat image plane 1665 are projected onto the curved perspective-corrected image plane 1630. Points along the curved perspective-corrected image plane 1630 are represented by a curved x' axis. Points along the curved x' axis can be found using the equation x'=f·α. Thus, any point along the curved x' axis is the same distance f away from the lens 1660, regardless of angle α.

In performing perspective correction on certain images, more nuanced control over the curvature of the curved perspective-corrected image plane 1630 may be useful. A more nuanced curved perspective distortion correction 1525 may be performed using the equation $$x'' = \frac{f \cdot \tan(P \cdot \alpha)}{P}.$$

Here, x" represents a variable-curvature perspective-corrected image plane that depends on a variable P. In this equation, P is a variable that can be adjusted to adjust the strength of the curvature of the variable-curvature perspective-corrected image plane. For example, when P=1, then x"=f·tan(α), making the curved perspective-corrected image plane 1630 flat and equivalent to the flat image plane 1665 (and to the flat x axis). When P=0, then x" is undefined—but the limit of as P approaches 0 is f·α. Thus, for the purposes of the curved perspective distortion correction 1525, x"=f·α when P=0, making the variable-curvature perspective-corrected image plane strongly curved and equivalent to the curved perspective-corrected image plane 1630 (and to the curved x' axis). If P is between 0 and 1, the variable-curvature perspective-corrected image plane is less curved than the curved perspective-corrected image plane 1630, but more curved than the flat image plane 1665. Examples of combined images generated using curved perspective distortion correction 1525 with a variable-curvature perspective-corrected image plane and P set to different values are provided in FIG. 17.

FIG. 17 is a conceptual diagram 1700 illustrating three example combined images (1710, 1720, and 1730) of a scene that each have different degrees of curvature of curved perspective distortion correction 1525 applied. The different degrees of curvature of curved perspective distortion correction 1525 are applied by mapping to a variable-curvature perspective-corrected image plane using the equation $$x'' = \frac{f \cdot \tan(P \cdot \alpha)}{P}$$

as discussed above.

In particular, the first combined image 1710 is generated by applying curved perspective distortion correction 1525 to map image pixels onto a strongly curved perspective-corrected image plane, because P=0. The second combined image 1720 is generated by applying curved perspective distortion correction 1525 to map image pixels onto a moderately curved perspective-corrected image plane, because P=0.8. The third combined image 1730 is generated by applying perspective distortion correction 1515 to map image pixels onto a flat perspective-corrected image plane, because P=1.

All three combined images (1710, 1720, and 1730) depict the same scene, which among other things, depicts a person sitting in a chair facing a TV 1740, the chair adjacent to a couch 1750. The person sitting in the chair is near the center of the photographed scene, while the TV 1740 is on the left-hand side of the photographed scene, and the couch 1750 is on the right-hand side of the photographed scene. In the first combined image 1710 (where P=0), the TV 1740 and the couch 1750 appear too strongly horizontally squished together, curved, and/or slanted toward the camera, and thus appear unnatural. In the third combined image 1730 (where P=1), the TV 1740 and the couch 1750 appear stretched out to the sides away from the seated person, and appear unnaturally long and horizontally-stretched relative to the other objects in the scene. In the second combined image 1720 (where P=0.8), the TV 1740 and the couch 1750 appear to naturally reflect the photographed scene.

Figure 18:
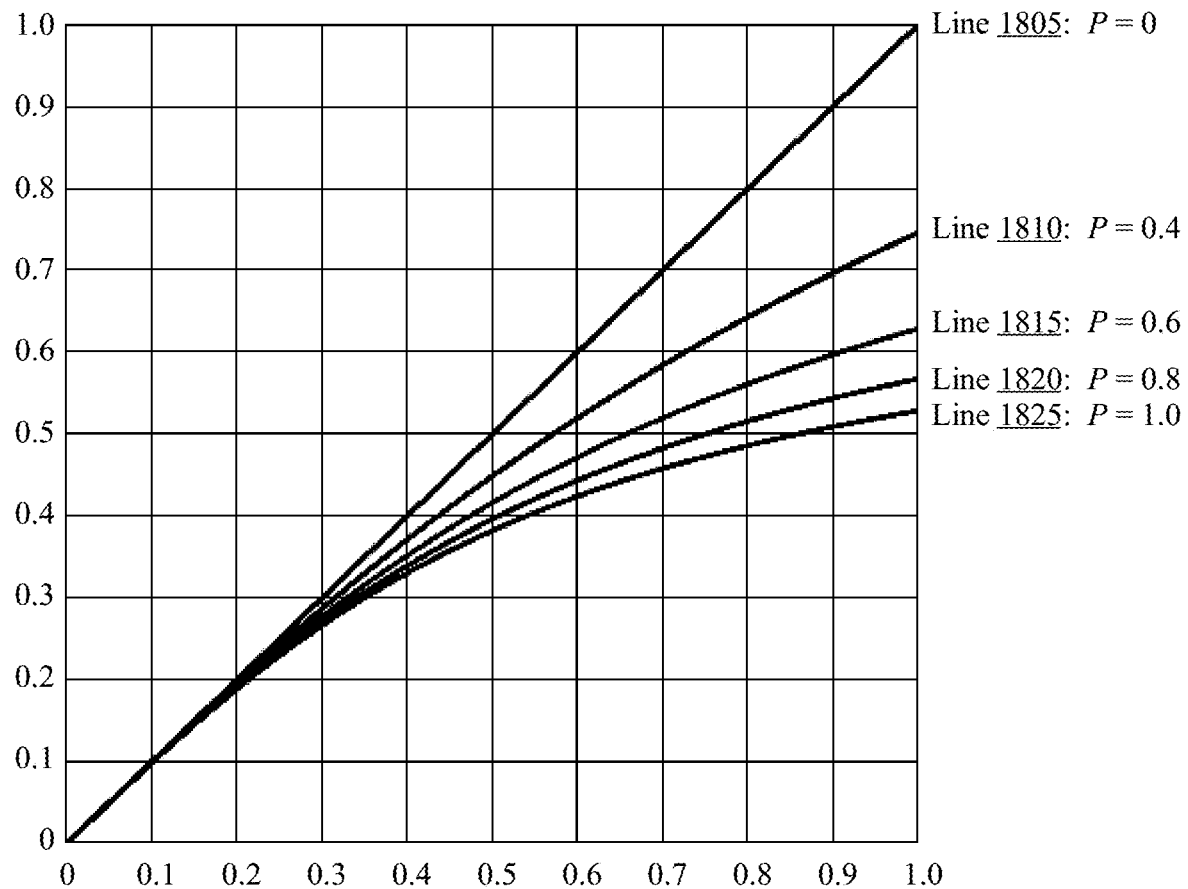
FIG. 18 is a conceptual diagram illustrating a graph comparing different degrees of curvature of curved perspective distortion correction with respect to a flat perspective distortion, in accordance with some examples.

FIG. 18 is a conceptual diagram illustrating a graph 1800 comparing different degrees of curvature of curved perspective distortion correction with respect to a flat perspective distortion. The different degrees of curvature of curved perspective distortion correction 1525 are applied by mapping to a variable-curvature perspective-corrected image plane using the equation $$x'' = \frac{f \cdot \tan(P \cdot \alpha)}{P}$$

as discussed above. The graph 1800 is based on the equation $$x'' = \frac{f \cdot \tan(P \cdot \alpha)}{P}.$$

The horizontal axis of the graph 1800 represents a normalized x with P=1, or the mapping output of the flat perspective correction with an angle range 0<=α<=65 degree, The vertical axis represents x", or the mapping outputs of the variable-curvature perspective correction with different degrees of curvatures in the same scale as the horizontal axis.

The graph 1800 illustrates five lines 1805, 1810, 1815, 1820, and 1825. The first line 1805 corresponds to P=0. The second line 1810 corresponds to P=0.4. The third line 1815 corresponds to P=0.6. The fourth line 1820 corresponds to P=0.8. The fifth line 1825 corresponds to P=1.0.

FIG. 19 is a flow diagram illustrating an example process 1900 for performing curved perspective distortion correction. In some examples, the operations in the process 1900 may be performed by an imaging system. In some examples, the imaging system is the device 500. In some examples, the imaging system includes the camera 112, the camera 206, the device 500, the imaging architecture illustrated in conceptual diagram 600, the imaging architecture illustrated in conceptual diagram 700, the imaging architecture illustrated in conceptual diagram 800, the imaging architecture illustrated in conceptual diagram 900, the imaging architecture illustrated in conceptual diagram 1100, the imaging architecture illustrated in conceptual diagram 1200, the imaging architecture illustrated in conceptual diagram 1240, the imaging architecture illustrated in conceptual diagram 1260, the imaging architecture illustrated in conceptual diagram 1600, least one of an image capture and processing system 2000, an image capture device 2005A, an image processing device 2005B, an image processor 2050, a host processor 2052, an ISP 2054, a computing system 2900, the imaging system that performs the process 1300, the imaging system that performs the process 1350, the imaging system that performs the process 1400, the imaging system that performs the process 2800, one or more network servers of a cloud service, or any combination thereof.

At operation 1905, the imaging system receives a first image of a scene captured by a first image sensor of a first camera. The first image corresponds to a flat planar image plane. In some examples, the first image corresponds to the flat planar image plane because the first image sensor corresponds to the flat planar image plane in shape and/or relative dimensions. In some examples, the first image corresponds to the flat planar image plane because the first image is projected onto the flat planar image plane using flat perspective distortion correction 1515.

At operation 1910, the imaging system identifies a curved perspective-corrected image plane. In some examples, the imaging system identifies the curved perspective-corrected image plane to be the curved perspective-corrected image plane 1630 of the diagram 1650 using the equation x'=f·α. In some examples, the imaging system imaging system identifies a curved perspective-corrected image plane to be a variable-curvature perspective-corrected image plane using the equation $$x'' = \frac{f \cdot \tan(P \cdot \alpha)}{P}.$$

At operation 1915, the imaging system generates a perspective-corrected first image at least by projecting image data of the first image from the flat planar image plane corresponding to the first image sensor onto the curved perspective-corrected image plane.

The process 1900 may be an example of the modification of the first image and/or the second image using perspective distortion of operation 1365. In some examples, the first image received in operation 1905 may be an example of the first image received in operation 1355, and the perspective-corrected first image of operation 1915 may be an example of the first image following the modifications using perspective distortion of operation 1365. In some examples, the first image received in operation 1905 may be an example of the second image received in operation 1360, and the perspective-corrected first image of operation 1915 may be an example of the second image following the modifications using perspective distortion of operation 1365.

In some examples, P may be predetermined. In the imaging system may receive user inputs from a user through a user interface of the imaging system, and the imaging system can determine P based on the user inputs. In some examples, the imaging system may automatically determine P by detecting that the scene appears warped in the first image, or is likely to appear warped if a flat perspective distortion correction 1515 alone is applied to the first image. In some examples, the imaging system may automatically determine P to fix or optimize the appearance of the scene in the first image when the imaging system determines that the scene appears warped in the first image, or is likely to appear warped if a flat perspective distortion correction 1515 alone is applied to the first image. In some examples, the imaging system may automatically determine P based on object distance, distribution, and surface orientation of objects and/or surfaces in the scene photographed in the first image. The imaging system may determine object distance, distribution, and/or surface orientation of objects and/or surfaces in the scene based on object detection and/or recognition using the first image and/or one or more other images captured by the one or more cameras of the imaging system. For example, the imaging system can use facial detection and/or facial recognition to identify human beings in the scene, how close those human beings are to the camera (e.g., based on the size of the face as determined via inter-eye distance or another measurement between facial features), which direction the human beings are facing, and so forth. The imaging system may determine object distance, distribution, and/or surface orientation of objects and/or surfaces in the scene based on one or more point cloud of the scene generated using one or more range sensors of the imaging system, such as one or more light detection and ranging (LIDAR) sensors, one or more radio detection and ranging (RADAR) sensors, one or more sound navigation and ranging (SONAR) sensors, one or more sound detection and ranging (SODAR) sensors, one or more time-of-flight (TOF) sensors, one or more structured light (SL) sensors, or a combination thereof.

In some examples, the imaging system may automatically determine P to fix or optimize the appearance of human beings, faces, or another specific type of object detected in the first image using object detection, object recognition, facial detection, or facial recognition. For example, the imaging system may determine that the first image includes a depiction of an office building. The imaging system may expect the office building to have a rectangular prism shape (e.g., a box). The imaging system may automatically determine P to make the office building appear as close to the rectangular prism shape as possible in the perspective-corrected first image, and for example so that the perspective-corrected first image removes or reduces any curves in the edges of the office building that appear in the first image. The imaging system may determine that the first image includes a depiction of a person's face. The imaging system may recognize the person's face based on a comparison to other pre-stored images of the person's face, and can automatically determine P to make the person's face as depicted in the perspective-corrected first image appear as close as possible to the pre-stored images of the person's face.

In some examples, the curved perspective distortion correction can be applied only to a portion of the first image, rather than to the entirety of the first image. For example, in the combined image 1520 depicting the five soda cans, the leftmost and rightmost soda cans in the combined image 1520 appear most warped. The curved perspective distortion correction can, in some examples, be applied only to the regions of the combined image 1520 that include the depictions of the leftmost and rightmost soda cans.

In some examples, the curved perspective distortion correction can be applied to reduce various types of distortion, including distortion brought about by wide-angle lenses and/or fisheye lenses.

Figure 20:
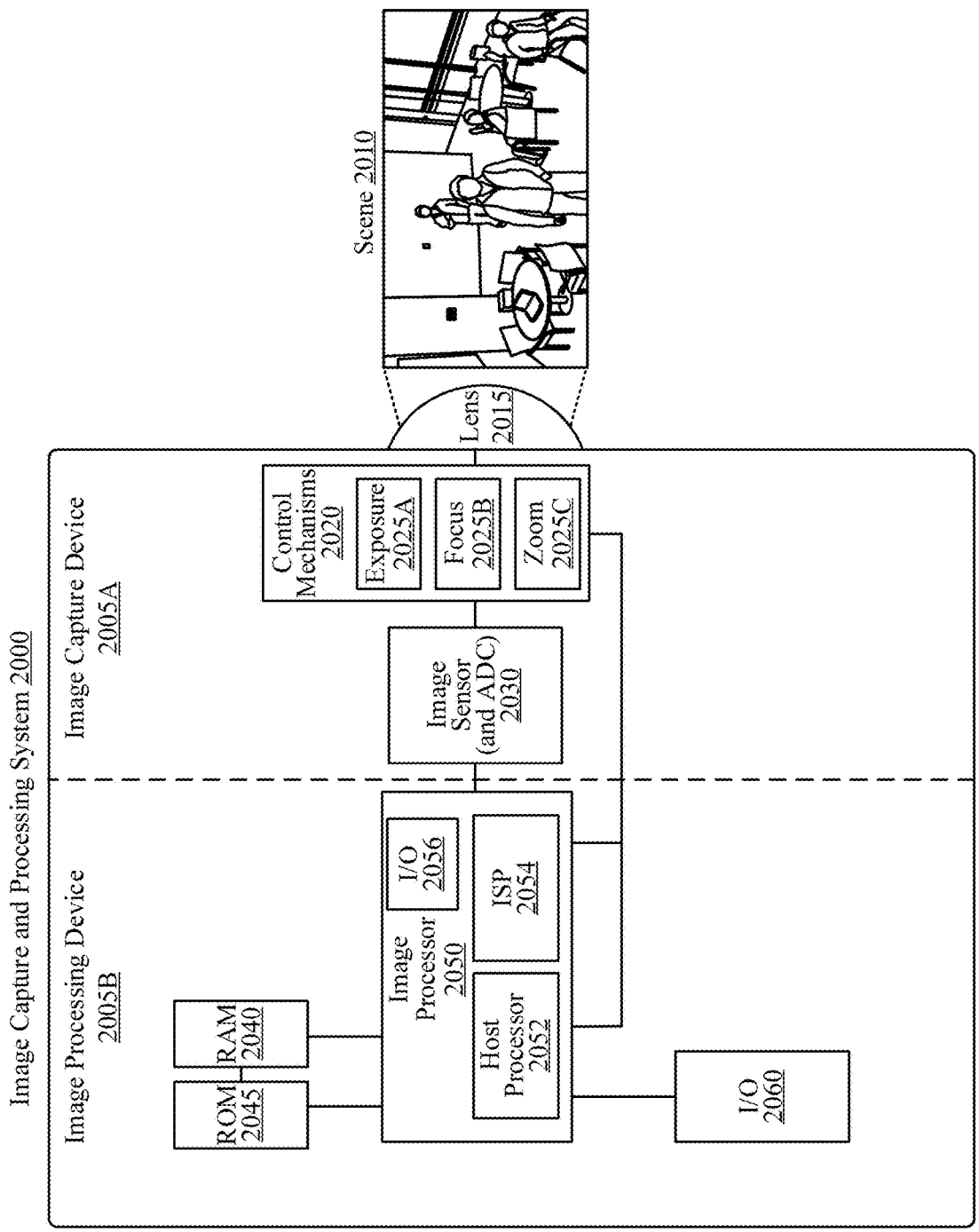
FIG. 20 is a block diagram illustrating an example of an architecture of an image capture and processing device, in accordance with some examples.

FIG. 20 is a block diagram illustrating an architecture of an image capture and processing system 2000. Each of the cameras, lenses, and/or image sensors discussed with respect to previous figures may be included in an image capture and processing system 2000. For example, the lens 104 and image sensor 106 of FIG. 1 can be included in an image capture and processing system 2000. The camera 206 of FIG. 2 can be an example of an image capture and processing system 2000. The first camera 501 and the second camera 502 of FIG. 5 can each be an example of an image capture and processing system 2000. The first camera lens 606 and the first image sensor 602 of FIG. 6 can be included in one image capture and processing system 2000, while the second camera lens 608 and the second image sensor 604 of FIG. 6 can be included in another image capture and processing system 2000. The camera lens 704 and the image sensor 702 of FIG. 7 can be included in an image capture and processing system 2000. The first camera lens 806 and the first image sensor 802 of FIG. 8 can be included in one image capture and processing system 2000, while the second camera lens 808 and the second image sensor 804 of FIG. 8 can be included in another image capture and processing system 2000. The first camera lens 906 and the first image sensor 902 of FIG. 9 can be included in one image capture and processing system 2000, while the second camera lens 908 and the second image sensor 904 of FIG. 9 can be included in another image capture and processing system 2000. The image sensor 1004 of FIG. 10A can be included in an image capture and processing system 2000. The first camera and the second camera of FIG. 10C can each be an example of an image capture and processing system 2000. The first camera lens 1106 and the first image sensor 1102 of FIG. 11 can be included in one image capture and processing system 2000, while the second camera lens 1108 and the second image sensor 1104 of FIG. 11 can be included in another image capture and processing system 2000. The first camera lens 1206 and the first image sensor 1202 of FIGS. 12A-12C can be included in one image capture and processing system 2000, while the second camera lens 1208 and the second image sensor 1204 of FIGS. 12A-12B can be included in another image capture and processing system 2000. The first lens and the first image sensor mentioned in the flow chart of example process 1300 of FIG. 13A can be included in one image capture and processing system 2000, while the second lens and the second image sensor mentioned in the flow chart of example process 1300 of FIG. 13A can be included in another image capture and processing system 2000. The first lens and the first image sensor mentioned in the flow chart of example process 1300 of FIG. 13B can be included in one image capture and processing system 2000, while the second lens and the second image sensor mentioned in the flow chart of example process 1300 of FIG. 13B can be included in another image capture and processing system 2000. The first camera mentioned in the flow chart of example process 1400 of FIG. 14 can be included in one image capture and processing system 2000, while the second camera mentioned in the flow chart of example process 1400 of FIG. 14 can be included in another image capture and processing system 2000.

The image capture and processing system 2000 includes various components that are used to capture and process images of scenes (e.g., an image of a scene 2010). The image capture and processing system 2000 can capture standalone images (or photographs) and/or can capture videos that include multiple images (or video frames) in a particular sequence. A lens 2015 of the system 2000 faces a scene 2010 and receives light from the scene 2010. The lens 2015 bends the light toward the image sensor 2030. The light received by the lens 2015 passes through an aperture controlled by one or more control mechanisms 2020 and is received by an image sensor 2030.

The one or more control mechanisms 2020 may control exposure, focus, and/or zoom based on information from the image sensor 2030 and/or based on information from the image processor 2050. The one or more control mechanisms 2020 may include multiple mechanisms and components; for instance, the control mechanisms 2020 may include one or more exposure control mechanisms 2025A, one or more focus control mechanisms 2025B, and/or one or more zoom control mechanisms 2025C. The one or more control mechanisms 2020 may also include additional control mechanisms besides those that are illustrated, such as control mechanisms controlling analog gain, flash, HDR, depth of field, and/or other image capture properties.

The focus control mechanism 2025B of the control mechanisms 2020 can obtain a focus setting. In some examples, focus control mechanism 2025B store the focus setting in a memory register. Based on the focus setting, the focus control mechanism 2025B can adjust the position of the lens 2015 relative to the position of the image sensor 2030. For example, based on the focus setting, the focus control mechanism 2025B can move the lens 2015 closer to the image sensor 2030 or farther from the image sensor 2030 by actuating a motor or servo (or other lens mechanism), thereby adjusting focus. In some cases, additional lenses may be included in the system 2000, such as one or more microlenses over each photodiode of the image sensor 2030, which each bend the light received from the lens 2015 toward the corresponding photodiode before the light reaches the photodiode. The focus setting may be determined via contrast detection autofocus (CDAF), phase detection autofocus (PDAF), hybrid autofocus (HAF), or some combination thereof. The focus setting may be determined using the control mechanism 2020, the image sensor 2030, and/or the image processor 2050. The focus setting may be referred to as an image capture setting and/or an image processing setting.

The exposure control mechanism 2025A of the control mechanisms 2020 can obtain an exposure setting. In some cases, the exposure control mechanism 2025A stores the exposure setting in a memory register. Based on this exposure setting, the exposure control mechanism 2025A can control a size of the aperture (e.g., aperture size or f/stop), a duration of time for which the aperture is open (e.g., exposure time or shutter speed), a sensitivity of the image sensor 2030 (e.g., ISO speed or film speed), analog gain applied by the image sensor 2030, or any combination thereof. The exposure setting may be referred to as an image capture setting and/or an image processing setting.

The zoom control mechanism 2025C of the control mechanisms 2020 can obtain a zoom setting. In some examples, the zoom control mechanism 2025C stores the zoom setting in a memory register. Based on the zoom setting, the zoom control mechanism 2025C can control a focal length of an assembly of lens elements (lens assembly) that includes the lens 2015 and one or more additional lenses. For example, the zoom control mechanism 2025C can control the focal length of the lens assembly by actuating one or more motors or servos (or other lens mechanism) to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 2015 in some cases) that receives the light from the scene 2010 first, with the light then passing through an afocal zoom system between the focusing lens (e.g., lens 2015) and the image sensor 2030 before the light reaches the image sensor 2030. The afocal zoom system may, in some cases, include two positive (e.g., converging, convex) lenses of equal or similar focal length (e.g., within a threshold difference of one another) with a negative (e.g., diverging, concave) lens between them. In some cases, the zoom control mechanism 2025C moves one or more of the lenses in the afocal zoom system, such as the negative lens and one or both of the positive lenses.

The image sensor 2030 includes one or more arrays of photodiodes or other photosensitive elements. Each photodiode measures an amount of light that eventually corresponds to a particular pixel in the image produced by the image sensor 2030. In some cases, different photodiodes may be covered by different color filters, and may thus measure light matching the color of the filter covering the photodiode. For instance, Bayer color filters include red color filters, blue color filters, and green color filters, with each pixel of the image generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors (e.g., image sensor 2030) may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 2030 may alternately or additionally include opaque and/or reflective masks that block light from reaching certain photodiodes, or portions of certain photodiodes, at certain times and/or from certain angles, which may be used for phase detection autofocus (PDAF). The image sensor 2030 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 2020 may be included instead or additionally in the image sensor 2030. The image sensor 2030 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 2050 may include one or more processors, such as one or more image signal processors (ISPs) (including ISP 2054), one or more host processors (including host processor 2052), and/or one or more of any other type of processor 2910 discussed with respect to the processing system 2900. The host processor 2052 can be a digital signal processor (DSP) and/or other type of processor. In some implementations, the image processor 2050 is a single integrated circuit or chip (e.g., referred to as a system-on-chip or SoC) that includes the host processor 2052 and the ISP 2054. In some cases, the chip can also include one or more input/output ports (e.g., input/output (I/O) ports 2056), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 2056 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 2052 can communicate with the image sensor 2030 using an I2C port, and the ISP 2054 can communicate with the image sensor 2030 using an MIPI port.

The image processor 2050 may perform a number of tasks, such as de-mosaicing, color space conversion, image frame downsampling, pixel interpolation, automatic exposure (AE) control, automatic gain control (AGC), CDAF, PDAF, automatic white balance, merging of image frames to form an HDR image, image recognition, object recognition, feature recognition, receipt of inputs, managing outputs, managing memory, or some combination thereof. The image processor 2050 may store image frames and/or processed images in random access memory (RAM) 2040/2020, read-only memory (ROM) 2045/2025, a cache, a memory unit, another storage device, or some combination thereof.

Various input/output (I/O) devices 2060 may be connected to the image processor 2050. The I/O devices 2060 can include a display screen, a keyboard, a keypad, a touchscreen, a trackpad, a touch-sensitive surface, a printer, any other output devices 2935, any other input devices 2945, or some combination thereof. In some cases, a caption may be input into the image processing device 2005B through a physical keyboard or keypad of the I/O devices 2060, or through a virtual keyboard or keypad of a touchscreen of the I/O devices 2060. The I/O 2060 may include one or more ports, jacks, or other connectors that enable a wired connection between the system 2000 and one or more peripheral devices, over which the system 2000 may receive data from the one or more peripheral device and/or transmit data to the one or more peripheral devices. The I/O 2060 may include one or more wireless transceivers that enable a wireless connection between the system 2000 and one or more peripheral devices, over which the system 2000 may receive data from the one or more peripheral device and/or transmit data to the one or more peripheral devices. The peripheral devices may include any of the previously-discussed types of I/O devices 2060 and may themselves be considered I/O devices 2060 once they are coupled to the ports, jacks, wireless transceivers, or other wired and/or wireless connectors.

In some cases, the image capture and processing system 2000 may be a single device. In some cases, the image capture and processing system 2000 may be two or more separate devices, including an image capture device 2005A (e.g., a camera) and an image processing device 2005B (e.g., a computing device coupled to the camera). In some implementations, the image capture device 2005A and the image processing device 2005B may be coupled together, for example via one or more wires, cables, or other electrical connectors, and/or wirelessly via one or more wireless transceivers. In some implementations, the image capture device 2005A and the image processing device 2005B may be disconnected from one another.

As shown in FIG. 20, a vertical dashed line divides the image capture and processing system 2000 of FIG. 20 into two portions that represent the image capture device 2005A and the image processing device 2005B, respectively. The image capture device 2005A includes the lens 2015, control mechanisms 2020, and the image sensor 2030. The image processing device 2005B includes the image processor 2050 (including the ISP 2054 and the host processor 2052), the RAM 2040, the ROM 2045, and the I/O 2060. In some cases, certain components illustrated in the image capture device 2005A, such as the ISP 2054 and/or the host processor 2052, may be included in the image capture device 2005A.

The image capture and processing system 2000 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the image capture and processing system 2000 can include one or more wireless transceivers for wireless communications, such as cellular network communications, 802.11 wi-fi communications, wireless local area network (WLAN) communications, or some combination thereof. In some implementations, the image capture device 2005A and the image processing device 2005B can be different devices. For instance, the image capture device 2005A can include a camera device and the image processing device 2005B can include a computing device, such as a mobile handset, a desktop computer, or other computing device.

While the image capture and processing system 2000 is shown to include certain components, one of ordinary skill will appreciate that the image capture and processing system 2000 can include more components than those shown in FIG. 20. The components of the image capture and processing system 2000 can include software, hardware, or one or more combinations of software and hardware. For example, in some implementations, the components of the image capture and processing system 2000 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the image capture and processing system 2000.

Figure 21A:
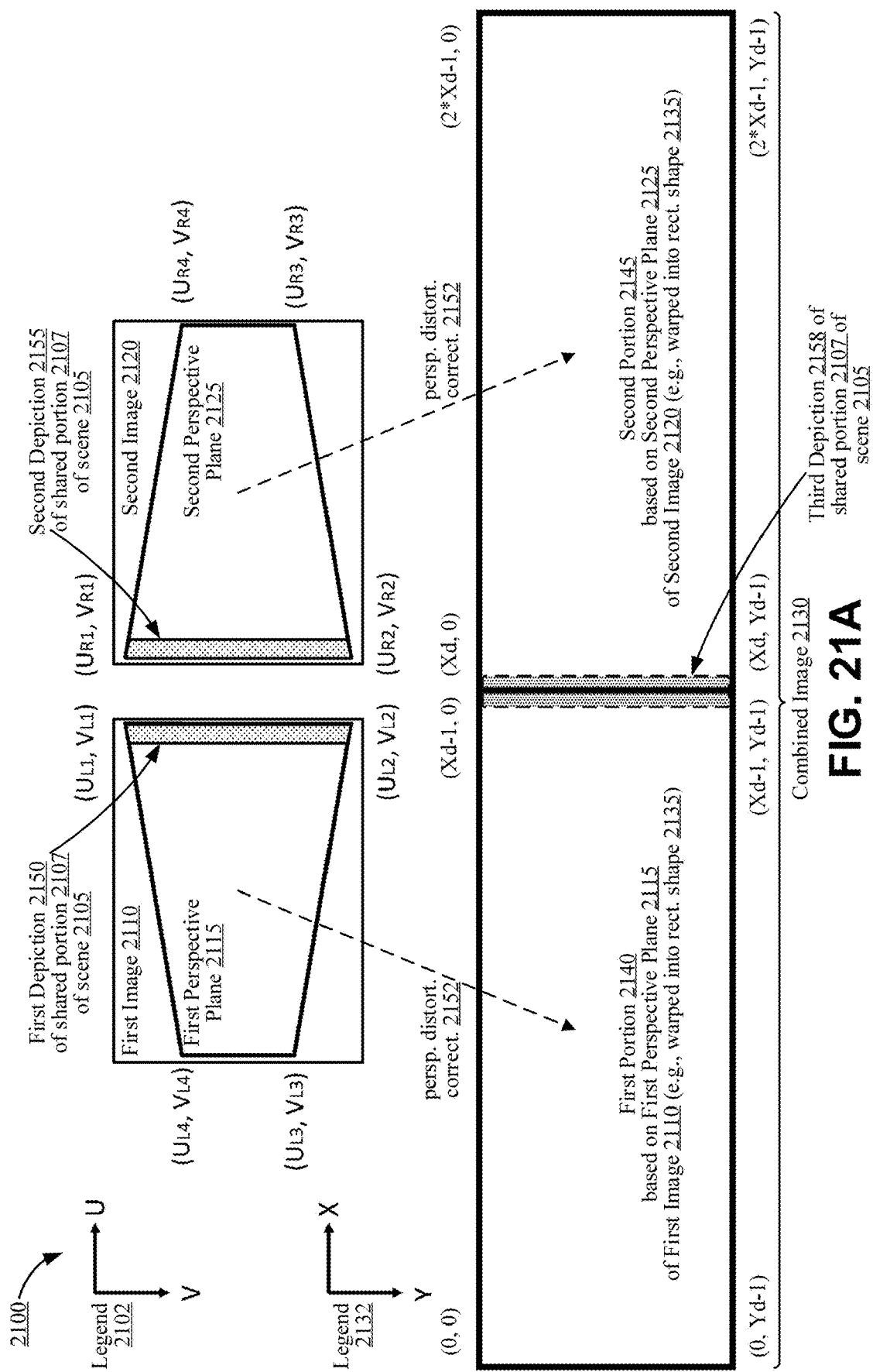
FIG. 21A is a conceptual diagram illustrating generation of a combined image based on a first perspective plane from a first image and a second perspective plane from a second image, each warped into a rectangular shape, in accordance with some examples.

FIG. 21A is a conceptual diagram 2100 illustrating generation of a combined image 2130 based on a first perspective plane 2115 from a first image 2110 and a second perspective plane 2125 from a second image 2120, each warped into a rectangular shape 2135. The first image 2110 may be rectangular. The second image 2120 may be rectangular. A legend 2102 is illustrated with a horizontal axis U and a vertical axis V.

The first image 2110 can be captured by a first image sensor. The second image 2120 can be captured by a second image sensor. The first image sensor and the second image sensor can be distinct image sensors. An imaging system that includes the first image sensor and the second image sensor can be configured so that light from a scene is redirected by one or more light redirection element(s) of the imaging system into the first image sensor and/or the second image sensor. Examples of the first image sensor and/or the second image sensor include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, the image sensor 2202, the image sensor 2204, another image sensor described herein, or a combination thereof. Examples of the second image sensor of operation 2810 can include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, another image sensor described herein, or a combination thereof.

An imaging device can perform a perspective distortion correction 2152 on the first image 2110 to generate a first portion 2140 of the combined image 2130. The imaging device can perform the perspective distortion correction 2152 on the second image 2120 to generate a second portion 2145 of the combined image 2130. Examples of the perspective distortion correction 2152 can include the perspective distortion correction 1022, the perspective distortion correction of operation 1365, the flat perspective distortion correction 1515, the curved perspective distortion correction 1525, flat projective transformation pixel mapping 1620, the perspective distortion correction 2177, the perspective distortion correction of FIGS. 22A-22B, the perspective distortion correction of FIGS. 23A-23B, another type of perspective distortion correction described herein, or a combination thereof. The first portion 2140 may be referred to as the left portion. The first image 2110 may be referred to as the left image. The second portion 2145 may be referred to as the right portion. The second image 2120 may be referred to as the right image.

As part of performing perspective distortion correction 2152 on the first image 2110, an imaging device may identify a first perspective plane 2115 within the first image 2110. The first perspective plane 2115 may be a quadrilateral. The first perspective plane 2115 may be a trapezoid (e.g., may be trapezoidal in shape). The first perspective plane 2115 may have one or more flat sides. The first perspective plane 2115 may have one or more curved sides (see, e.g., curved perspective distortion correction 1525). Coordinates (e.g., in pixels or units of distance) for the four corners of the first perspective plane 2115 are illustrated as $(U_{L1}, V_{L1})$, $(U_{L2}, V_{L2})$, $(U_{L3}, V_{L3})$, and $(U_{L4}, V_{L4})$. The first perspective plane 2115 may be "cut" or copied from the first image 2110. As part of the perspective distortion correction 2152, the imaging device may warp the first perspective plane 2115 into a rectangular shape 2135 to form a first portion 2140 of the combined image 2130. This warping into the rectangular shape 2135 is indicated by a dashed arrow.

As part of performing perspective distortion correction 2152 on the second image 2120, an imaging device may identify a second perspective plane 2125 within the second image 2120. The second perspective plane 2125 may be a quadrilateral. The second perspective plane 2125 may be a trapezoid (e.g., may be trapezoidal in shape). The second perspective plane 2125 may have one or more flat sides. The second perspective plane 2125 may have one or more curved sides (see, e.g., curved perspective distortion correction 1525). Coordinates (e.g., in pixels or units of distance) for the four corners of the second perspective plane 2125 are illustrated as $(U_{R1}, V_{R1})$, $(U_{R2}, V_{R2})$, $(U_{R3}, V_{R3})$, and $(U_{R4}, V_{R4})$. The second perspective plane 2125 may be "cut" or copied from the second image 2120. As part of the perspective distortion correction 2152, the imaging device may warp the second perspective plane 2125 into a rectangular shape 2135 to form a second portion 2145 of the combined image 2130. This warping into the rectangular shape 2135 is indicated by a dashed arrow.

The first image 2110 and the second image 2210 may both be images of a scene 2105. In some examples, the first image 2110 and the second image 2210 may include depictions of different portions of the scene 2105. For example, the first image 2110 can include depictions of portions of the scene 2105 to the left of certain portions of the scene 2105 that the second image 2120 includes depictions of. The second image 2120 can include depictions of portions of the scene 2105 to the right of certain portions of the scene 2105 that the first image 2110 includes depictions of. In some examples, the first image 2110 and the second image 2210 may both include depictions of a shared portion 2107 of the scene 2105. For instance, the first image 2110 can include a first depiction 2150 of the shared portion 2107 of the scene 2105. The second image 2120 can include a second depiction 2155 of the shared portion 2107 of the scene 2105. The first depiction 2150 of the shared portion 2107 of the scene 2105 is illustrated as a shaded quadrilateral (e.g., trapezoid) along the right-hand edge of the first image 2110. The first depiction 2150 of the shared portion 2107 of the scene 2105 may include an area that falls within the first perspective plane 2115 as illustrated in FIG. 21A. In some examples, first depiction 2150 of the shared portion 2107 of the scene 2105 may also include one or more areas of the first image 2110 that fall outside of the first perspective plane 2115, similarly to the first depiction 2230 of the shared portion 2240 of the scene 2245 of FIG. 22A or the first depiction 2330 of the shared portion 2340 of the scene 2345 of FIG. 23A. The second depiction 2155 of the shared portion 2107 of the scene 2105 is illustrated as a shaded quadrilateral (e.g., trapezoid) along the left-hand edge of the second image 2120. The second depiction 2155 of the shared portion 2107 of the scene 2105 may include an area that falls within the second perspective plane 2125 as illustrated in FIG. 21A. In some examples, second depiction 2155 of the shared portion 2107 of the scene 2105 may also include one or more areas of the second image 2120 that fall outside of the second perspective plane 2125, similarly to the second depiction 2235 of the shared portion 2240 of the scene 2245 of FIG. 22A or the second depiction 2335 of the shared portion 2340 of the scene 2345 of FIG. 23A. In some examples, the first depiction 2150 and the first depiction 2155 may be depictions of the shared portion 2107 of the scene 2105 from different perspectives and/or angles. This difference in perspectives and/or angles can be reduced or corrected using the perspective distortion correction 2152. In some examples, the first depiction 2150 of the shared portion 2107 of the scene 2105 may include depictions of one or more parts of the shared portion 2107 of the scene 2105 that are not included in the second depiction 2155 of the shared portion 2107 of the scene 2105. In some examples, the second depiction 2155 of the shared portion 2107 of the scene 2105 may include depictions of one or more parts of the shared portion 2107 of the scene 2105 that are not included in the first depiction 2150 of the shared portion 2107 of the scene 2105. An illustrative example of the first depiction 2150 of the shared portion 2107 of the scene 2105 in the context of FIG. 2 is a depiction, in the first image frame of FIG. 2, of the part of the first scene portion 210 of FIG. 2 that is also part of the second scene portion 212 of FIG. 2. The corresponding second depiction 2155 of the shared portion 2107 of the scene 2105 in the context of FIG. 2 can be a depiction, in the second image frame of FIG. 2, of the part of the second scene portion 212 of FIG. 2 that is also part of the first scene portion 210 of FIG. 2.

Another illustrative example of the first depiction 2150 of the shared portion 2107 of the scene 2105 in the context of FIG. 2 is a depiction, in the second image frame of FIG. 2, of the part of the second scene portion 212 of FIG. 2 that is also part of the third scene portion 214 of FIG. 2. The corresponding second depiction 2155 of the shared portion 2107 of the scene 2105 in the context of FIG. 2 can be a depiction, in the third image frame of FIG. 3, of the part of the third scene portion 214 of FIG. 2 that is also part of the second scene portion 212 of FIG. 2.

The combined image 2130 may be rectangular. The first portion 2140 of the combined image 2130 may be rectangular. The second portion 2145 of the combined image 2130 may be rectangular. A legend 2132 is illustrated with a horizontal axis X and a vertical axis Y. Coordinates (e.g., in pixels or units of distance) for the four corners of the first portion 2140 of the combined image 2130 are illustrated as $(0, 0)$, $(0, Y_d-1)$, $(X_d-1, 0)$, and $(X_d-1, Y_d-1)$. Coordinates (e.g., in pixels or units of distance) for the four corners of the second portion 2145 of the combined image 2130 are illustrated as $(X_d, 0)$, $(X_d, Y_d-1)$, $(2*X_d-1, 0)$, and $(2*X_d-1, Y_d-1)$. The perspective distortion correction 2152 can include mapping the coordinates for the four corners of the first perspective plane 2115 to the coordinates for the four corners of the first portion 2140. For instance, the perspective distortion correction 2152 can include mapping coordinate $(U_{L1}, V_{L1})$ of the first perspective plane 2115 to coordinate $(X_d-1, 0)$ of the first portion 2140, mapping coordinate $(U_{L2}, V_{L2})$ of the first perspective plane 2115 to coordinate $(X_d-1, Y_d-1)$ of the first portion 2140, mapping coordinate $(U_{L3}, V_{L3})$ of the first perspective plane 2115 to coordinate $(0, Y_d-1)$ of the first portion 2140, and/or mapping coordinate $(U_{L4}, V_{L4})$ of the first perspective plane 2115 to coordinate $(0, 0)$ of the first portion 2140. The perspective distortion correction 2152 can include mapping the coordinates for the four corners of the second perspective plane 2125 to the coordinates for the four corners of the second portion 2145. For instance, the perspective distortion correction 2152 can include mapping coordinate $(U_{R1}, V_{R1})$ of the second perspective plane 2125 to coordinate $(X_d, 0)$ of the second portion 2145, mapping coordinate $(U_{R2}, V_{R2})$ of the second perspective plane 2125 to coordinate $(X_d, Y_d-1)$ of the second portion 2145, mapping coordinate $(U_{R3}, V_{R3})$ of the second perspective plane 2125 to coordinate $(2*X_d-1, Y_d-1)$ of the second portion 2145, and/or mapping coordinate ($U_{R4}$, $V_{R4}$) of the second perspective plane 2125 to coordinate ($2*X_d-1$, 0) of the second portion 2145.

The imaging device can generate the combined image 2130 based on the first portion 2140 and the second portion 2145. To generate the combined image 2130, the imaging device can align features in the first depiction 2150 of the shared portion 2107 of the scene 2105 with features in the second depiction 2155 of the shared portion 2107 of the scene 2105. The combined image 2130 may include a third depiction 2158 of the shared portion 2107 of the scene 2105, illustrated in FIG. 21A as a shaded area bordered by a dashed line. The third depiction 2158 of the shared portion 2107 of the scene 2105 may be based on the first depiction 2150 of the shared portion 2107 of the scene 2105, the second depiction 2155 of the shared portion 2107 of the scene 2105, and/or a combination thereof (e.g., the first depiction 2150 merged with the second depiction 2155). In some examples, the third depiction 2158 of the shared portion 2107 of the scene 2105 may include depictions of one or more parts of the shared portion 2107 of the scene 2105 that are not included in the first depiction 2150 of the shared portion 2107 of the scene 2105 and/or in the second depiction 2155 of the shared portion 2107 of the scene 2105. In some examples, the first depiction 2150 of the shared portion 2107 of the scene 2105 and/or in the second depiction 2155 of the shared portion 2107 of the scene 2105 may include depictions of one or more parts of the shared portion 2107 of the scene 2105 that are not included in the third depiction 2158 of the shared portion 2107 of the scene 2105.

In some examples, the perspective distortion correction 2152 may include mapping or transforming of image data from the first perspective plane 2115 and the second perspective plane 2125, which are graphed along a U-V space defined by the U axis and the V axis of the legend 2102, to the first portion 2140 and the second portion 2145, which are graphed along an X-Y space defined by the X axis and the Y axss of the legend 2132. This mapping from the U-V space to the X-Y space of the perspective distortion correction 2152 can be governed by a function Fx and a function Fy. The functions Fx and Fy can be referred to as forward transform functions or forward mapping functions. In some examples, x=Fx(u, v), where x is a value along the X axis, u is a value along the U axis, and v is a value along the V axis. In some examples, y=Fy(u, v), where y is a value along the Y axis, u is a value along the U axis, and v is a value along the V axis. In some examples, perspective distortion correction 2152 may also include mapping or transforming from the X-Y space to the U-V space. This mapping from the X-Y space to the U-V space of the perspective distortion correction 2152 can be governed by a function Ru and a function Rv. The functions Ru and Rv can be referred to as reverse transform functions or reverse mapping functions. In some examples, u=Ru(x, y), where u is a value along the U axis, x is a value along the X axis, and y is a value along the Y axis. In some examples, v=Rv(x, y), where v is a value along the V axis, x is a value along the X axis, and y is a value along the Y axis.

While the legend 2102 defines a single U-V space with a single U axis and a single V axis, in some examples, two U-V spaces may exist. For instance, the first image 2110 and the first perspective plane 2115 may be graphed along a $U_L$-$V_L$ plane defined by a horizontal $U_L$ axis and a vertical $V_L$ axis. Similarly, the second image 2120 and the second perspective plane 2125 may be graphed along a $U_R$-$V_R$ plane defined by a horizontal $U_R$ axis and a vertical $V_R$ axis. The same functions Fx, Fy, Ru, and Rv may be used in such examples, with mapping being either between the $U_L$-$V_L$ plane and the X-Y plane, or between the $U_R$-$V_R$ plane and the X-Y plane. In the context of these examples and the functions Fx, Fy, Ru, and Rv, the value u may represent either a value along the $U_L$ axis or a value along the $U_R$ axis, and the value v may represent either a value along the $V_L$ axis or a value along the $V_R$ axis. The perspective distortion correction 2152 may include mapping or transforming of image data from the first perspective plane 2115 on the $U_L$-$V_L$ plane to the first portion 2140 on the X-Y plane using forward mapping functions Fx($u_L$, $v_L$) and Fy($u_L$, $v_L$), where $u_L$ is a value along the $U_L$ axis and $v_L$ is a value along the $V_L$ axis. The perspective distortion correction 2152 may include mapping or transforming of image data from the second perspective plane 2125 on the $U_R$-$V_R$ plane to the second portion 2145 on the X-Y plane using forward mapping functions Fx(uR, vR) and Fy($u_R$, $v_R$), where $u_R$ is a value along the $U_R$ axis and $v_R$ is a value along the $V_R$ axis.

Figure 21B:
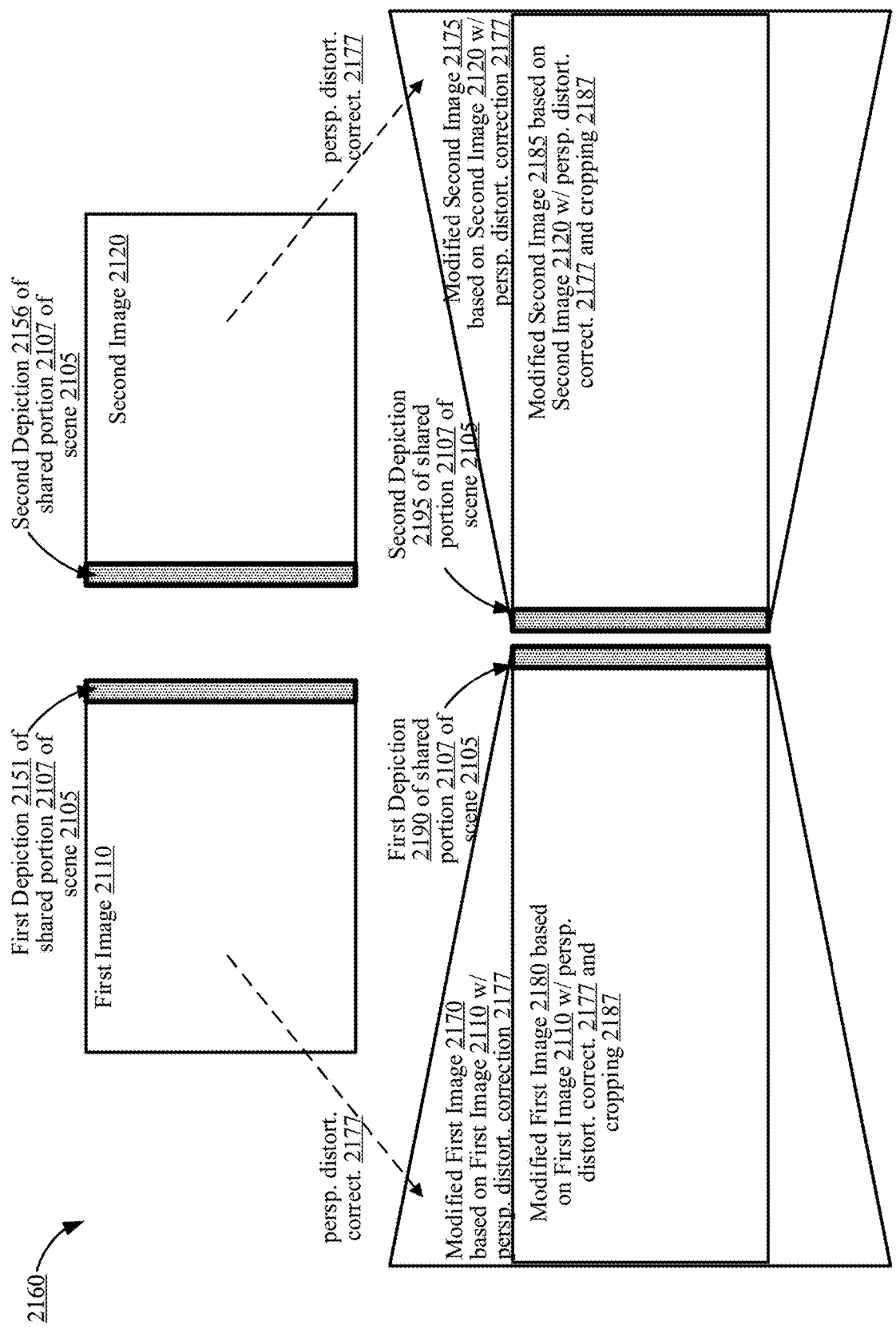
FIG. 21B is a conceptual diagram illustrating modified variants of the first image including a first depiction of a shared portion of a scene, and modified variants of the second image including a second depiction of the shared portion of the scene, in accordance with some examples.

FIG. 21B is a conceptual diagram 2160 illustrating modified variants (2170, 2180) of the first image 2110 including a first depiction 2190 of a shared portion 2107 of a scene 2105, and modified variants (2175, 2185) of the second image 2120 including a second depiction 2195 of the shared portion 2107 of the scene 2105. The first image 2110 and second image 2120 are illustrated in FIG. 21B. The first image 2110 includes the first depiction 2151 of the shared portion 2107 of the scene 2105. The first depiction 2151 of the shared portion 2107 of the scene 2105 is illustrated as a shaded rectangle along the right-hand edge of the first image 2110. The second image 2120 includes the second depiction 2156 of the shared portion 2107 of the scene 2105. The second depiction 2156 of the shared portion 2107 of the scene 2105 is illustrated as a shaded rectangle along the left-hand edge of the second image 2120. The first depiction 2151 of the shared portion 2107 of the scene 2105 may include the first depiction 2150 of the shared portion 2107 of the scene 2105. The second depiction 2156 of the shared portion 2107 of the scene 2105 may include the second depiction 2155 of the shared portion 2107 of the scene 2105.

An imaging device can perform the perspective distortion correction 2177 on the first image 2110 to generate a modified first image 2170. For instance, the imaging device can perform the perspective distortion correction 2177 by warping the first image 2110 to expand the left-hand side of the first image 2110 to generate the modified first image 2170. The imaging device can perform the perspective distortion correction 2177 on the second image 2120 to generate a modified second image 2175. For instance, the imaging device can perform the perspective distortion correction 2177 by warping the second image 2120 to expand the right-hand side of the second image 2120 to generate the modified second image 2175. Examples of the perspective distortion correction 2177 can include the perspective distortion correction 1022, the perspective distortion correction of operation 1365, the flat perspective distortion correction 1515, the curved perspective distortion correction 1525, flat projective transformation pixel mapping 1620, the perspective distortion correction 2152, the perspective distortion correction of FIGS. 22A-22B, the perspective distortion correction of FIGS. 23A-23B, another type of perspective distortion correction described herein, or a combination thereof. The modified first image 2170 may be a quadrilateral. The modified first image 2170 may be a trapezoid (e.g., may be trapezoidal in shape). The modified first image 2170 may have one or more flat sides. The modified first image 2170 may have one or more curved sides (see, e.g., curved perspective distortion correction 1525). The modified second image 2175 may be a quadrilateral. The modified second image 2175 may be a trapezoid (e.g., may be trapezoidal in shape). The modified second image 2175 may have one or more flat sides. The modified second image 2175 may have one or more curved sides (see, e.g., curved perspective distortion correction 1525).

The imaging device can perform cropping 2187 to crop the modified first image 2170 to generate the modified first image 2180. The imaging device can perform cropping 2187 to crop the modified second image 2175 to generate the modified second image 2185. In some examples, the cropping 2187 may be considered to be part of the perspective distortion correction 2177.

The modified first image 2180 includes the first depiction 2190 of the shared portion 2107 of the scene 2105. The first depiction 2190 of the shared portion 2107 of the scene 2105 is illustrated as a shaded rectangle along the right-hand edge of the modified first image 2180. The modified second image 2185 includes the second depiction 2195 of the shared portion 2107 of the scene 2105. The second depiction 2195 of the shared portion 2107 of the scene 2105 is illustrated as a shaded rectangle along the left-hand edge of the modified second image 2185. The first depiction 2151 of the shared portion 2107 of the scene 2105 may include the first depiction 2190 of the shared portion 2107 of the scene 2105, or a variant thereof before the perspective distortion correction 2177. The second depiction 2156 of the shared portion 2107 of the scene 2105 may include the second depiction 2195 of the shared portion 2107 of the scene 2105, or a variant thereof before the perspective distortion correction 2177.

The modified first image 2180 may be used as a first portion of a combined image, similarly to the first portion 2140 of the combined image 2130 of FIG. 21A. The modified second image 2185 may be used as a second portion of a combined image, similarly to the second portion 2145 of the combined image 2130 of FIG. 21A.

In some examples, the perspective distortion correction 2177 of FIG. 21B includes the perspective distortion correction 2152 of FIG. 21A. For instance, the perspective distortion correction 2177 may include mapping or transforming of image data from the first image 2110 on the U-V plane to the modified first image 2170 on the X-Y plane using forward mapping functions Fx(u, v) and Fy(u, v), where u is a value along the U axis and v is a value along the V axis. The perspective distortion correction 2177 may include mapping or transforming of image data from the second image 2120 on the U-V plane to the modified second image 2175 on the X-Y plane using forward mapping functions Fx(u, v) and Fy(u, v), where u is a value along the U axis and v is a value along the $V_R$ axis. The perspective distortion correction 2177 may include mapping or transforming of image data from the first image 2110 on the $U_L$-$V_L$ plane to the modified first image 2170 on the X-Y plane using forward mapping functions Fx($u_L$, $v_L$) and Fy($u_L$, $v_L$), where $u_L$ is a value along the $U_L$ axis and $v_L$ is a value along the $V_L$ axis. The perspective distortion correction 2177 may include mapping or transforming of image data from the second image 2120 on the $U_R$-$V_R$ plane to the modified second image 2175 on the X-Y plane using forward mapping functions Fx($u_R$, $v_R$) and Fy($u_R$, $v_R$), where $u_R$ is a value along the $U_R$ axis and $v_R$ is a value along the $V_R$ axis.

In some examples, the first depiction 2151 of the shared portion 2107 of the scene 2105 may include depictions of one or more parts of the shared portion 2107 of the scene 2105 that are not included in the first depiction 2150 of the shared portion 2107 of the scene 2105. In some examples, the first depiction 2150 of the shared portion 2107 of the scene 2105 may include depictions of one or more parts of the shared portion 2107 of the scene 2105 that are not included in the first depiction 2151 of the shared portion 2107 of the scene 2105. In some examples, the first depiction 2151 of the shared portion 2107 of the scene 2105 may include depictions of one or more parts of the shared portion 2107 of the scene 2105 that are not included in the first depiction 2190 of the shared portion 2107 of the scene 2105. In some examples, the first depiction 2190 of the shared portion 2107 of the scene 2105 may include depictions of one or more parts of the shared portion 2107 of the scene 2105 that are not included in the first depiction 2151 of the shared portion 2107 of the scene 2105. In some examples, the first depiction 2190 of the shared portion 2107 of the scene 2105 may include depictions of one or more parts of the shared portion 2107 of the scene 2105 that are not included in the first depiction 2150 of the shared portion 2107 of the scene 2105. In some examples, the first depiction 2150 of the shared portion 2107 of the scene 2105 may include depictions of one or more parts of the shared portion 2107 of the scene 2105 that are not included in the first depiction 2190 of the shared portion 2107 of the scene 2105.

In some examples, the second depiction 2156 of the shared portion 2107 of the scene 2105 may include depictions of one or more parts of the shared portion 2107 of the scene 2105 that are not included in the second depiction 2155 of the shared portion 2107 of the scene 2105. In some examples, the second depiction 2155 of the shared portion 2107 of the scene 2105 may include depictions of one or more parts of the shared portion 2107 of the scene 2105 that are not included in the second depiction 2156 of the shared portion 2107 of the scene 2105. In some examples, the second depiction 2156 of the shared portion 2107 of the scene 2105 may include depictions of one or more parts of the shared portion 2107 of the scene 2105 that are not included in the second depiction 2195 of the shared portion 2107 of the scene 2105. In some examples, the second depiction 2195 of the shared portion 2107 of the scene 2105 may include depictions of one or more parts of the shared portion 2107 of the scene 2105 that are not included in the second depiction 2156 of the shared portion 2107 of the scene 2105. In some examples, the second depiction 2195 of the shared portion 2107 of the scene 2105 may include depictions of one or more parts of the shared portion 2107 of the scene 2105 that are not included in the second depiction 2155 of the shared portion 2107 of the scene 2105. In some examples, the second depiction 2155 of the shared portion 2107 of the scene 2105 may include depictions of one or more parts of the shared portion 2107 of the scene 2105 that are not included in the second depiction 2195 of the shared portion 2107 of the scene 2105. In some examples, the shared portion 2107 of the scene 2105 can be referred to as an overlapping region. In some examples, the first depiction 2150, the first depiction 2151, the first depiction 2190, the second depiction 2155, the second depiction 2156, and/or the second depiction 2195 can be referred to as an overlapping region.

FIG. 22A is a conceptual diagram 2200 illustrating an example of a first perspective plane 2215 of a first image 2210 and a second perspective plane 2225 of a second image 2220, both depicting a scene 2245 with a checkerboard. The first image 2210 illustrates a left-hand portion of the scene 2245 with the checkerboard. The second image 2220 illustrates a right-hand portion of the scene 2245 with the checkerboard. The first image 2210 and the second image 2220 both include depictions of a shared portion 2240 of the scene 2245 with the checkerboard.

An imaging device can perform a perspective distortion correction on the first image 2210 to generate a first portion 2260 of the combined image 2130 of FIG. 22B. The imaging device can perform the perspective distortion correction 2152 on the first image 2110 to generate a second portion 2145 of the combined image 2130 of FIG. 22B. Examples of the perspective distortion correction 2152 can include the perspective distortion correction 1022, the perspective distortion correction of operation 1365, the flat perspective distortion correction 1515, the curved perspective distortion correction 1525, flat projective transformation pixel mapping 1620, the perspective distortion correction 2177, the perspective distortion correction of FIGS. 23A-23B, another type of perspective distortion correction described herein, or a combination thereof.

As part of performing perspective distortion correction on the first image 2210, an imaging device identifies a first perspective plane 2215 within the first image 2210. An example of the edges of the first perspective plane 2215 of the first image 2210 are outlined with lines in FIG. 22A. The first perspective plane 2215 can be an example of the first perspective plane 2115 of FIG. 21A. The first perspective plane 2215 may be a quadrilateral. The first perspective plane 2215 may be a trapezoid (e.g., may be trapezoidal in shape). The first perspective plane 2215 may have one or more flat sides. The first perspective plane 2215 may have one or more curved sides (see, e.g., curved perspective distortion correction 1525).

As part of performing perspective distortion correction on the second image 2220, an imaging device identifies a second perspective plane 2225 within the second image 2220. An example of the edges of the second perspective plane 2225 of the second image 2220 are outlined with lines in FIG. 22A. The second perspective plane 2225 can be an example of the second perspective plane 2125 of FIG. 21A. The second perspective plane 2225 may be a quadrilateral. The second perspective plane 2225 may be a trapezoid (e.g., may be trapezoidal in shape). The second perspective plane 2225 may have one or more flat sides. The second perspective plane 2225 may have one or more curved sides (see, e.g., curved perspective distortion correction 1525).

The first image 2210 includes a first depiction 2230 of the shared portion 2240 of the scene 2245. The second image 2220 includes a second depiction 2235 of the shared portion 2240 of the scene 2245. The first depiction 2230 of the shared portion 2240 of the scene 2245 is illustrated as a rectangle outlined with a dashed line along the right-hand edge of the first image 2210. In some examples, the first depiction 2230 of the shared portion 2240 of the scene 2245 may refer to the portion of the rectangle outlined with the dashed line that falls within the first perspective plane 2215. The second depiction 2235 of the shared portion 2240 of the scene 2245 is illustrated as a rectangle outlined with a dashed line along the left-hand edge of the second image 2220. In some examples, the second depiction 2235 of the shared portion 2240 of the scene 2245 may refer to the portion of the rectangle outlined with the dashed line that falls within the second perspective plane 2225.

FIG. 22B is a conceptual diagram 2250 illustrating an example of combined image 2255 generated using the first perspective plane 2215 of the first image 2210 and the second perspective plane 2225 of the second image 2220, each warped into a rectangular shape 2135. As part of the perspective distortion correction, the imaging device may warp the first perspective plane 2215 into a rectangular shape 2135 to form a first portion 2260 of the combined image 2130. As part of the perspective distortion correction, the imaging device may warp the second perspective plane 2225 into the rectangular shape 2135 to form a second portion 2265 of the combined image 2130. The edges of the first portion 2260 of the combined image 2130 are outlined with line 2131 in FIG. 22B. The edges of the second portion 2265 of the combined image 2130 are outlined with line 2133 in FIG. 22B.

The combined image 2255 is an example of the combined image 2130 of FIG. 21A. The first portion 2260 of the combined image 2255 is an example of the first portion 2140 of the combined image 2130 of FIG. 21A. The second portion 2265 of the combined image 2255 is an example of the second portion 2145 of the combined image 2130 of FIG. 21A. The combined image 2255 includes most of the first image 2210 and most of the second image 2220. The combined image 2255 includes most of the left-hand portion of the scene 2245 with the checkerboard and most of the right-hand portion of the scene 2245 with the checkerboard.

The combined image 2255 includes a third depiction 2270 of the shared portion 2240 of the scene 2245, illustrated in FIG. 22B as a rectangle outlined by a dashed line. The third depiction 2270 of the shared portion 2240 of the scene 2245 may be based on the first depiction 2230 of the shared portion 2240 of the scene 2245, the second depiction 2235 of the shared portion 2240 of the scene 2245, and/or a combination thereof (e.g., the first depiction 2230 merged with the second depiction 2235).

In some examples, the first depiction 2230 of the shared portion 2240 of the scene 2245 may include depictions of one or more parts of the shared portion 2240 of the scene 2245 that are not included in the second depiction 2235 of the shared portion 2240 of the scene 2245. In some examples, the second depiction 2235 of the shared portion 2240 of the scene 2245 may include depictions of one or more parts of the shared portion 2240 of the scene 2245 that are not included in the first depiction 2230 of the shared portion 2240 of the scene 2245. In some examples, the first depiction 2230 of the shared portion 2240 of the scene 2245 and/or the second depiction 2235 of the shared portion 2240 of the scene 2245 may include depictions of one or more parts of the shared portion 2240 of the scene 2245 that are not included in the third depiction 2270 of the shared portion 2240 of the scene 2245. In some examples, the third depiction 2270 of the shared portion 2240 of the scene 2245 may include depictions of one or more parts of the shared portion 2240 of the scene 2245 that are not included in the first depiction 2230 of the shared portion 2240 of the scene 2245 and/or the second depiction 2235 of the shared portion 2240 of the scene 2245.

In some examples, the shared portion 2240 of the scene 2245 can be referred to as an overlapping region. In some examples, the first depiction 2230, the second depiction 2235, and/or the third depiction 2270 can be referred to as an overlapping region.

FIG. 23A is a conceptual diagram 2300 illustrating an example of a perspective plane 2315 of a first image 2310 and a perspective plane 2325 of a second image 2320, both depicting a scene 2345 with a poster on which text is printed. The first image 2310 illustrates a left-hand portion of the scene 2345 with the poster on which the text is printed. The second image 2320 illustrates a right-hand portion of the scene 2345 with the poster on which the text is printed. The first image 2310 and the second image 2320 both include depictions of a shared portion 2340 of the scene 2345 with the poster on which the text is printed.

An imaging device can perform a perspective distortion correction on the first image 2310 to generate a first portion 2360 of the combined image 2130 of FIG. 23B. The imaging device can perform the perspective distortion correction 2152 on the first image 2110 to generate a second portion 2145 of the combined image 2130 of FIG. 23B. Examples of the perspective distortion correction 2152 can include the perspective distortion correction 1022, the perspective distortion correction of operation 1365, the flat perspective distortion correction 1515, the curved perspective distortion correction 1525, flat projective transformation pixel mapping 1620, the perspective distortion correction 2177, the perspective distortion correction of FIGS. 23A-23B, another type of perspective distortion correction described herein, or a combination thereof.

As part of performing perspective distortion correction on the first image 2310, an imaging device identifies a first perspective plane 2315 within the first image 2310. An example of the edges of the first perspective plane 2315 of the first image 2310 are outlined in thin black dashed lines in FIG. 23A. The first perspective plane 2315 can be an example of the first perspective plane 2115 of FIG. 21A. The first perspective plane 2315 may be a quadrilateral. The first perspective plane 2315 may be a trapezoid (e.g., may be trapezoidal in shape). The first perspective plane 2315 may have one or more flat sides. The first perspective plane 2315 may have one or more curved sides (see, e.g., curved perspective distortion correction 1525).

As part of performing perspective distortion correction on the second image 2320, an imaging device identifies a second perspective plane 2325 within the second image 2320. An example of the edges of the second perspective plane 2325 of the second image 2320 are outlined in thin black dashed lines in FIG. 23A. The second perspective plane 2325 can be an example of the second perspective plane 2125 of FIG. 21A. The second perspective plane 2325 may be a quadrilateral. The second perspective plane 2325 may be a trapezoid (e.g., may be trapezoidal in shape). The second perspective plane 2325 may have one or more flat sides. The second perspective plane 2325 may have one or more curved sides (see, e.g., curved perspective distortion correction 1525).

The first image 2310 includes a first depiction 2330 of the shared portion 2340 of the scene 2345. The second image 2320 includes a second depiction 2335 of the shared portion 2340 of the scene 2345. The first depiction 2330 of the shared portion 2340 of the scene 2345 is illustrated as a rectangle outlined with a thick black dashed line along the right-hand edge of the first image 2310. In some examples, the first depiction 2330 of the shared portion 2340 of the scene 2345 may refer to the portion of the rectangle outlined with the thick black dashed line that falls within the first perspective plane 2315. The second depiction 2335 of the shared portion 2340 of the scene 2345 is illustrated as a rectangle outlined with a thick black dashed line along the left-hand edge of the second image 2320. In some examples, the second depiction 2335 of the shared portion 2340 of the scene 2345 may refer to the portion of the rectangle outlined with the thick black dashed line that falls within the second perspective plane 2325.

FIG. 23B is a conceptual diagram 2350 illustrating an example of combined image 2355 generated using the perspective plane 2315 of the first image 2310 and the perspective plane 2325 of the second image 2320, each warped into a rectangular shape 2135. As part of the perspective distortion correction, the imaging device may warp the first perspective plane 2315 into a rectangular shape 2135 to form a first portion 2360 of the combined image 2130. As part of the perspective distortion correction, the imaging device may warp the second perspective plane 2325 into the rectangular shape 2135 to form a second portion 2365 of the combined image 2130.

The combined image 2355 is an example of the combined image 2130 of FIG. 21A. The first portion 2360 of the combined image 2355 is an example of the first portion 2140 of the combined image 2130 of FIG. 21A. The second portion 2365 of the combined image 2355 is an example of the second portion 2145 of the combined image 2130 of FIG. 21A. The combined image 2355 includes most of the first image 2310 and most of the second image 2320. The combined image 2355 includes most of the left-hand portion of the scene 2345 with the poster on which the text is printed and most of the right-hand portion of the scene 2345 with the poster on which the text is printed.

The combined image 2355 includes a third depiction 2370 of the shared portion 2340 of the scene 2345, illustrated in FIG. 23B as a rectangle outlined by a thin black dashed line. The third depiction 2370 of the shared portion 2340 of the scene 2345 may be based on the first depiction 2330 of the shared portion 2340 of the scene 2345, the second depiction 2335 of the shared portion 2340 of the scene 2345, and/or a combination thereof (e.g., the first depiction 2330 merged with the second depiction 2335).

In some examples, the first depiction 2330 of the shared portion 2340 of the scene 2345 may include depictions of one or more parts of the shared portion 2340 of the scene 2345 that are not included in the second depiction 2335 of the shared portion 2340 of the scene 2345. In some examples, the second depiction 2335 of the shared portion 2340 of the scene 2345 may include depictions of one or more parts of the shared portion 2340 of the scene 2345 that are not included in the first depiction 2330 of the shared portion 2340 of the scene 2345. In some examples, the first depiction 2330 of the shared portion 2340 of the scene 2345 and/or the second depiction 2335 of the shared portion 2340 of the scene 2345 may include depictions of one or more parts of the shared portion 2340 of the scene 2345 that are not included in the third depiction 2370 of the shared portion 2340 of the scene 2345. In some examples, the third depiction 2370 of the shared portion 2340 of the scene 2345 may include depictions of one or more parts of the shared portion 2340 of the scene 2345 that are not included in the first depiction 2330 of the shared portion 2340 of the scene 2345 and/or the second depiction 2335 of the shared portion 2340 of the scene 2345.

Figures 24A, 24B:
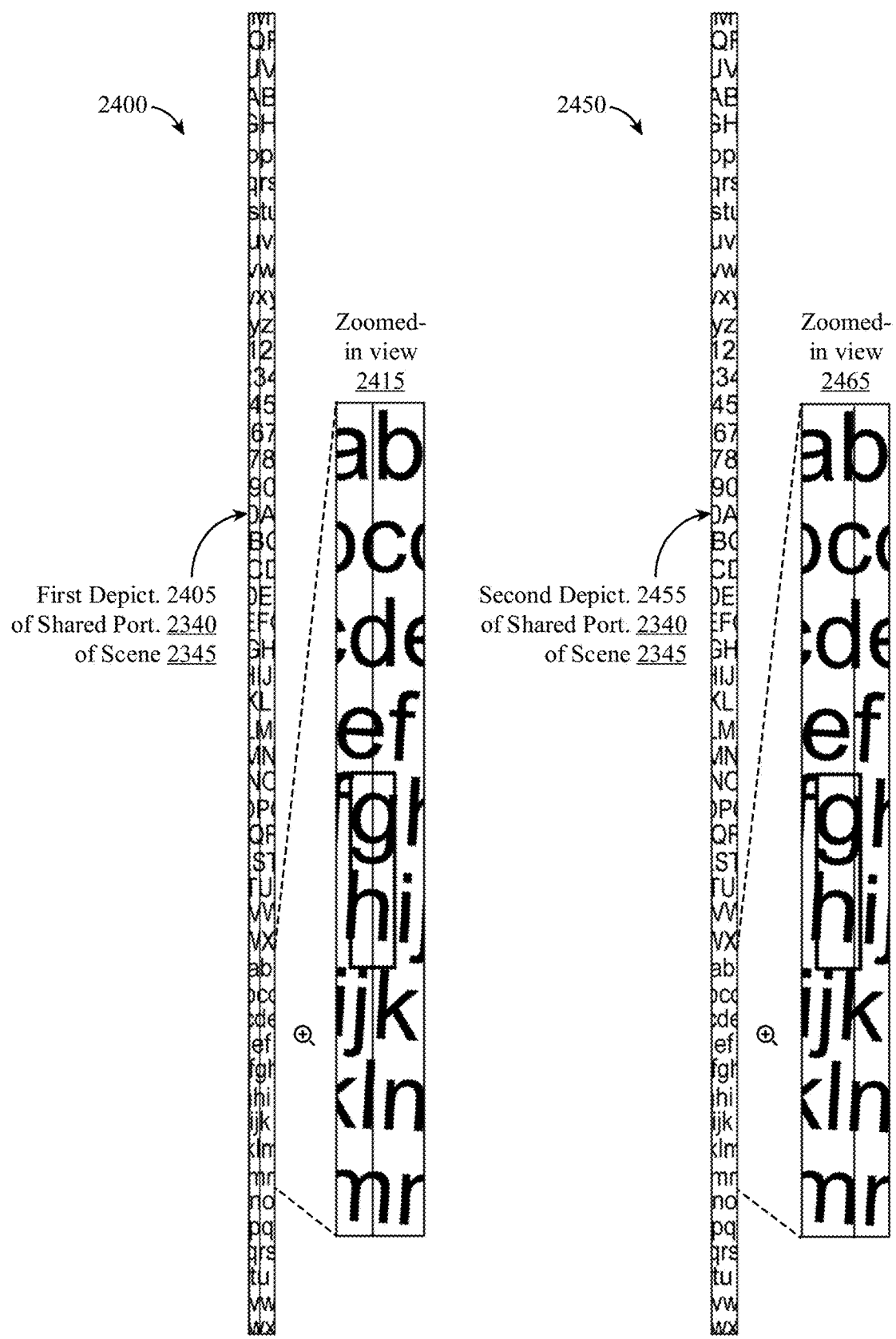
FIG. 24A is a conceptual diagram illustrating a first depiction of a shared portion of the scene of FIGS. 23A-23B, in accordance with some examples.
FIG. 24B is a conceptual diagram illustrating a second depiction of the shared portion of the scene of FIGS. 23A-23B, in accordance with some examples.

FIG. 24A is a conceptual diagram 2400 illustrating a first depiction 2405 of a shared portion 2340 of the scene 2345 of FIGS. 23A-23B. The first depiction 2405 of the shared portion 2340 of the scene 2345 is an enlarged copy of the first depiction 2330 of the shared portion 2340 of the scene 2345 of FIG. 23B, with a vertical line added down the horizontal center to illustrate how certain characters in the text of the poster are aligned within the first depiction 2330 of the shared portion 2340 of the scene 2345, and thus within the first depiction 2405 of the shared portion 2340 of the scene 2345. The vertical line can be the stitching line, which may be where the first portion 2360 of the combined image 2355 is to be stitched to the second portion 2365 of the combined image 2355. A zoomed-in view 2415 of the first depiction 2405 of the shared portion 2340 of the scene 2345 provides an even more enlarged view of the first depiction 2405 of the shared portion 2340 of the scene 2345 focused on a small portion of the first depiction 2405 of the shared portion 2340 of the scene 2345 that is indicated by dashed lines connecting the zoomed-in view 2415 to the first depiction 2405 of the shared portion 2340 of the scene 2345.

The vertical line in the center of the first depiction 2405 of the shared portion 2340 of the scene 2345 is also visible in the zoomed-in view 2415. A red box is also added to the zoomed-in view 2415. The red box includes a depiction of a lowercase "g" above a depiction of a lowercase "h" in the zoomed-in view 2415.

FIG. 24B is a conceptual diagram 2450 illustrating a second depiction 2455 of the shared portion 2340 of the scene 2345 of FIGS. 23A-23B. The second depiction 2455 of the shared portion 2340 of the scene 2345 is an enlarged copy of the second depiction 2335 of the shared portion 2340 of the scene 2345 of FIG. 23B, with a vertical line added down the horizontal center to illustrate how certain characters in the text of the poster are aligned within the second depiction 2335 of the shared portion 2340 of the scene 2345, and thus within the second depiction 2455 of the shared portion 2340 of the scene 2345. The vertical line can be the stitching line, which may be where the first portion 2360 of the combined image 2355 is to be stitched to the second portion 2365 of the combined image 2355. A zoomed-in view 2465 of the second depiction 2455 of the shared portion 2340 of the scene 2345 provides an even more enlarged view of the second depiction 2455 of the shared portion 2340 of the scene 2345 focused on a small portion of the second depiction 2455 of the shared portion 2340 of the scene 2345 that is indicated by dashed lines connecting the zoomed-in view 2465 to the second depiction 2455 of the shared portion 2340 of the scene 2345. The vertical line in the center of the second depiction 2455 of the shared portion 2340 of the scene 2345 is also visible in the zoomed-in view 2465. A red box is also added to the zoomed-in view 2465. The red box includes a depiction of a lowercase "g" above a depiction of a lowercase "h" in the zoomed-in view 2465.

A comparison between the first depiction 2405 and the second depiction 2455 of the shared portion 2340 of the scene 2345 illustrates that the first depiction 2405 and the second depiction 2455 of the shared portion 2340 of the scene 2345 are not identical to one another, and include differences. A comparison between the zoomed-in view 2415 and the zoomed-in view 2465 even more clearly illustrates that the first depiction 2405 and the second depiction 2455 of the shared portion 2340 of the scene 2345 are not identical to one another, and include differences. For instance, in the zoomed-in-view 2415 of FIG. 24A, the characters of text are darker and clearer than in the zoomed-in-view 2465 of FIG. 24B. In the zoomed-in-view 2465 of FIG. 24B, the characters of text are lighter and more blurry than in the zoomed-in-view 2415 of FIG. 24A. In the zoomed-in-view 2415 of FIG. 24A, the lowercase "g" and lowercase "h" in the red box is generally centered around the vertical line representing the horizontal center of the first depiction 2405 in the zoomed-in view 2415. On the other hand, in the zoomed-in view 2465 of FIG. 24B, the lowercase "g" and lowercase "h" in the red box is generally to the left of the vertical line representing the horizontal center of the depiction 2455.

The differences between the first depiction 2405 and the second depiction 2455 of the shared portion 2340 of the scene 2345 can cause visual artifacts in the combined image 2355 if not corrected. For example, the combined image 2355 may include a visible seam between the brightness/darkness and/or blurriness/clarity of the characters of text between the first portion 2360 of the combined image 2355 and the second portion 2365 of the combined image 2355. The seam may be visible at the third depiction 2370 of the shared portion 2340 of the scene 2345. In some examples, the combined image 2355 may be missing certain portions of certain characters of text on the poster, may include duplicates of certain portions of certain characters of text on the poster, may include ghosting distortion (e.g., as in the ghosting distortion 310 of FIG. 3), may include stitching distortion (e.g., as in the stitching distortion 410 of FIG. 4), may include warped copies of certain characters of text on the poster, or a combination thereof. Such visual artifacts may be visible at the third depiction 2370 of the shared portion 2340 of the scene 2345.

In some examples, an imaging device can modify the first portion 2360 of the combined image 2355 and/or modify the second portion 2365 of the combined image 2355 to offset the differences in brightness between the first depiction 2330 and the second depiction 2335 of the shared portion 2340 of the scene 2345. In some examples, an imaging device can modify the first portion 2360 of the combined image 2355 and/or modify the second portion 2365 of the combined image 2355 to offset the differences in positioning of the patterns (of text characters) between the first depiction 2330 and the second depiction 23365 of the shared portion 2340 of the scene 2345. The imaging device can modify the first portion 2360 of the combined image 2355 by modifying the first image 2310 and/or the first perspective plane 2315 and/or the first portion 2360. The imaging device can modify the second portion 2365 of the combined image 2355 by modifying the second image 2320 and/or the second perspective plane 2325 and/or the second portion 2365.

Figure 25A:
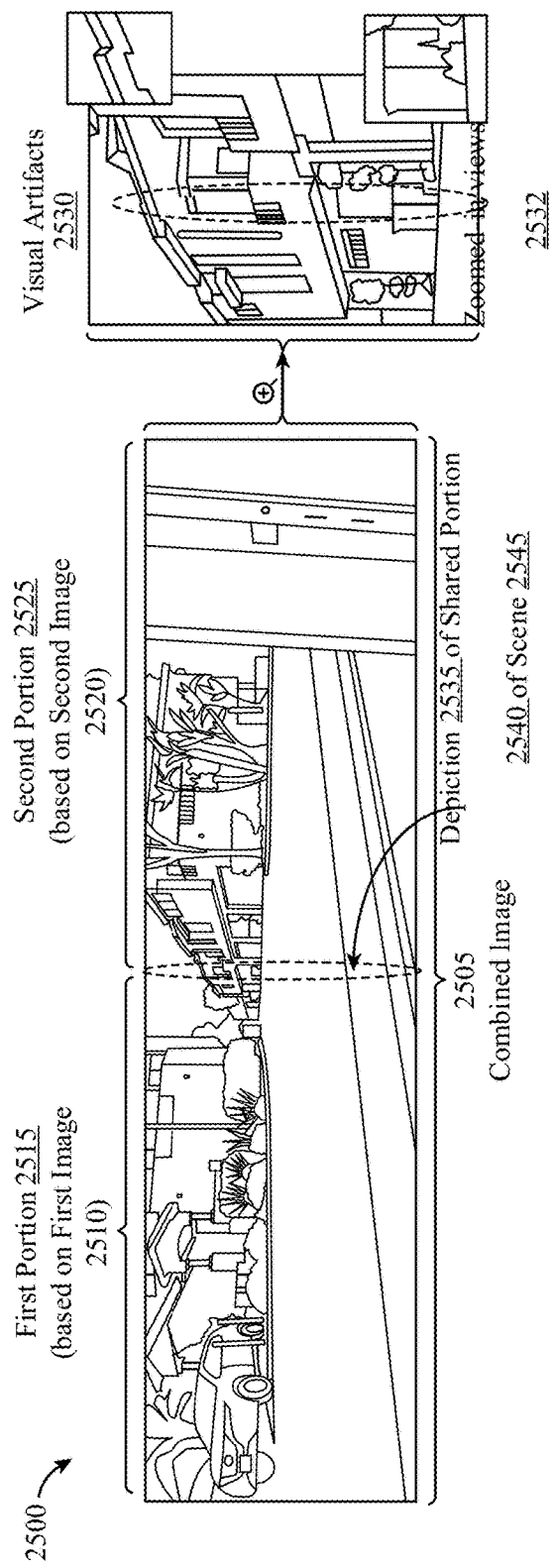
FIG. 25A is a conceptual diagram illustrating an example of a combined image that depicts a suburban neighborhood scene, that is generated by stitching together a first image and a second image, and that includes visual artifacts, in accordance with some examples.
Figure 25B:
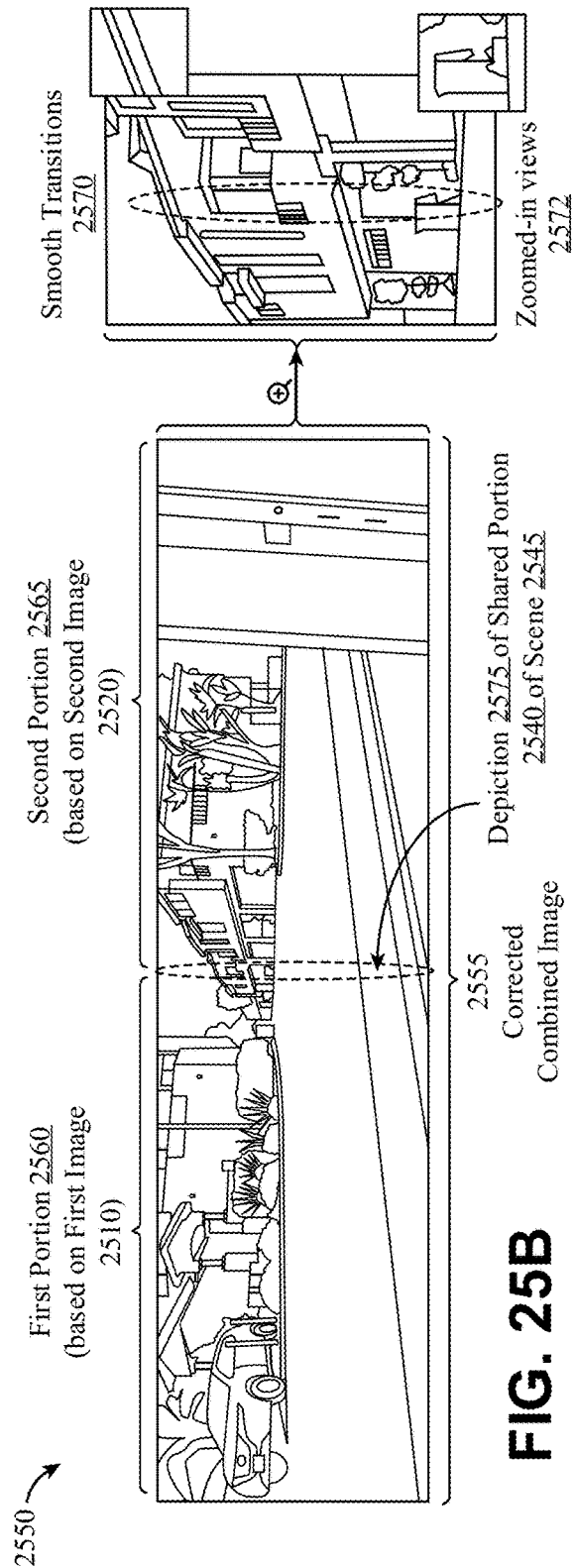
FIG. 25B is a conceptual diagram illustrating an example of a corrected combined image that depicts the suburban neighborhood scene of FIG. 25A, that is generated by stitching together the first image and the second image with corrections, and that includes smooth transitions without visual artifacts, in accordance with some examples.

In some examples, the imaging device can warp at least a portion of the first image 2310 to align the positioning of patterns (e.g., of characters) in the first depiction 2330 of the shared portion 2340 of the scene 2345 with the positioning of patterns (e.g., of characters) in the second depiction 2335 of the shared portion 2340 of the scene 2345 of the second image 2320. In some examples, the imaging device can warp at least a portion of the second image 2320 to align the positioning of patterns (e.g., of characters) in the second depiction 2335 of the shared portion 2340 of the scene 2345 with the positioning of patterns (e.g., of characters) in the first depiction 2330 of the shared portion 2340 of the scene 2345 of the first image 2310. In some examples, the imaging device can warp at least a portion of the first image 2310 and at least a portion of the second image 2320 to align the positioning of patterns (e.g., of characters) in the first depiction 2330 and the second depiction 2335 of the shared portion 2340 of the scene 2345 with a "middle ground" positioning of patterns (e.g., of characters). The middle ground positioning of the patterns may be between (e.g., halfway between) the positioning of the patterns in the first depiction 2330 of the shared portion 2340 of the scene 2345 and the positioning of the patterns in the second depiction 2335 of the shared portion 2340 of the scene 2345. Other examples of position-based modifications are illustrated in FIGS. 25A-25B.

Figure 26A:
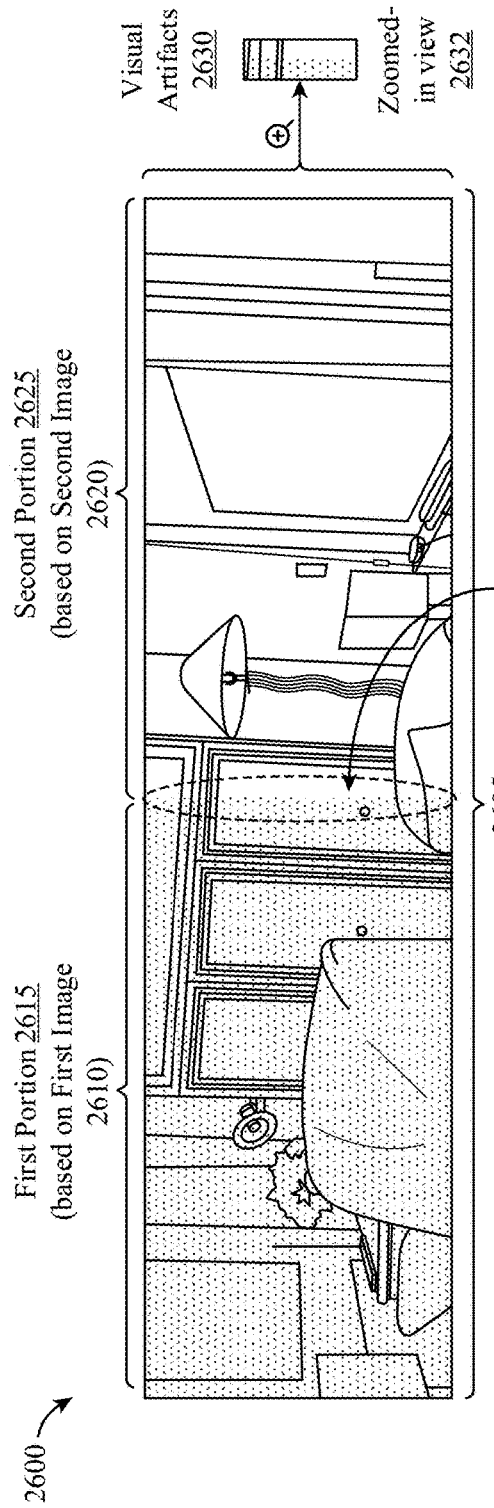
FIG. 26A is a conceptual diagram illustrating an example of a combined image that depicts a living room scene, that is generated by stitching together a first image and a second image, and that includes visual artifacts, in accordance with some examples.
Figure 26B:
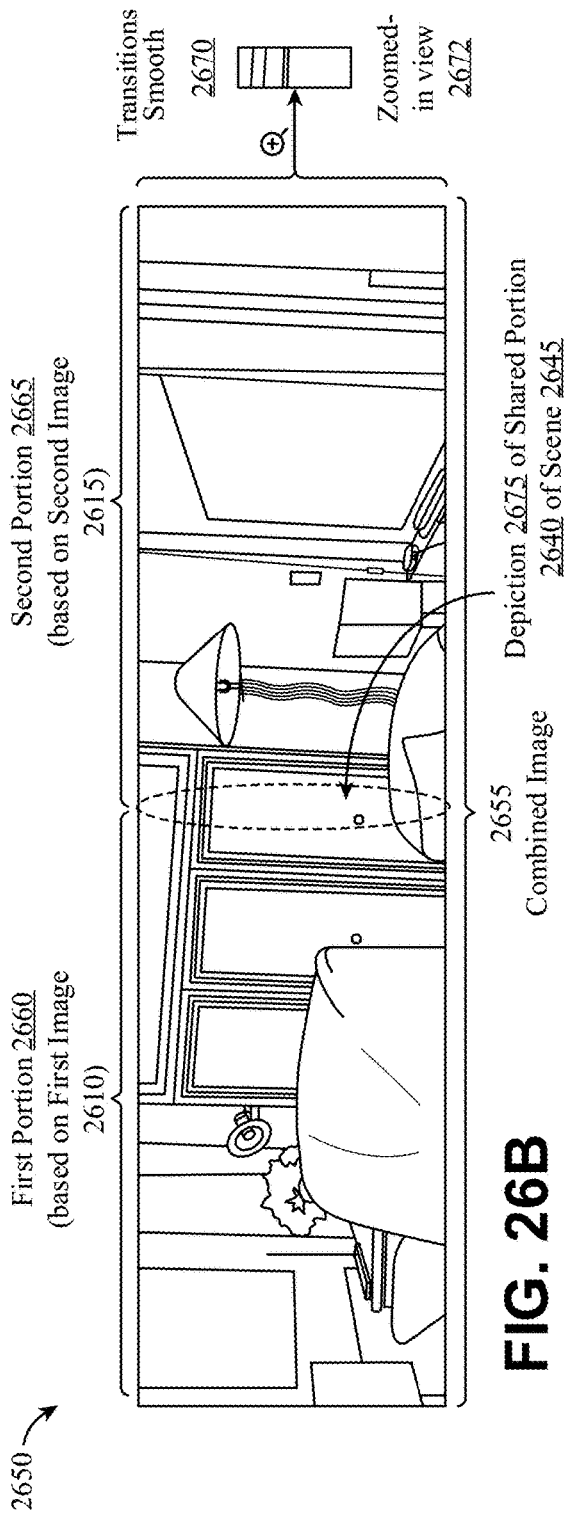
FIG. 26B is a conceptual diagram illustrating an example of a corrected combined image that depicts the living room scene of FIG. 26A, that is generated by stitching together the first image and the second image with corrections, and that includes smooth transitions without visual artifacts, in accordance with some examples.

In some examples, the imaging device can modify at least a portion of the first image 2310 to align the brightness and/or clarity of the text characters in the first depiction 2330 of the shared portion 2340 of the scene 2345 with the brightness and/or clarity of the text characters in the second depiction 2335 of the shared portion 2340 of the scene 2345 of the second image 2320. In some examples, the imaging device can modify at least a portion of the second image 2320 to align the brightness and/or clarity of the text characters in the second depiction 2335 of the shared portion 2340 of the scene 2345 with the brightness and/or clarity of the text characters in the first depiction 2330 of the shared portion 2340 of the scene 2345 of the first image 2310. In some examples, the imaging device can modify at least a portion of the first image 2310 and at least a portion of the second image 2320 to align the brightness and/or clarity of the text characters in the first depiction 2330 and the second depiction 2335 of the shared portion 2340 of the scene 2345 with a "middle ground" brightness and/or clarity of the text characters. The middle ground brightness and/or clarity of the text characters may be between (e.g., halfway between) the brightness and/or clarity of the text characters in the first depiction 2330 of the shared portion 2340 of the scene 2345 and the brightness and/or clarity of the text characters in the second depiction 2335 of the shared portion 2340 of the scene 2345. Other examples of brightness-based modifications are illustrated in FIGS. 26A-26B.

Brightness may be modified by changing exposure settings, gain settings, exposure compensation settings, flash settings, or a combination thereof. Changes to exposure settings can include, for example, changes to a size of the aperture (e.g., aperture size or f/stop), changes to a duration of time for which the aperture is open (e.g., exposure time or shutter speed), changes to a sensitivity of an image sensor (e.g., ISO speed or film speed), changes to an analog gain applied, or any combination thereof.

In some examples, the shared portion 2340 of the scene 2345 can be referred to as an overlapping region. In some examples, the first depiction 2330, the second depiction 2335, the first depiction 2405, the second depiction 2455, and/or the third depiction 2370 can be referred to as an overlapping region.

In the context of FIG. 21A, in some examples, the imaging device can modify at least a portion of a first image 2110 to align a property of at least a first depiction 2150 of a shared portion 2107 of a scene 2105 with the a corresponding property of at least the second depiction 2155 of the shared portion 2107 of the scene 2105 of the second image 2120. In some examples, the imaging device can modify at least a portion of the second image 2120 to align the property in the second depiction 2155 of the shared portion 2107 of the scene 2105 with the corresponding property in the first depiction 2150 of the shared portion 2107 of the scene 2105 of the first image 2110. In some examples, the imaging device can modify at least a portion of the first image 2110 and at least a portion of the second image 2120 to align the properties in the first depiction 2150 and the second depiction 2155 of the shared portion 2107 of the scene 2105 with a "middle ground" value for the property. The middle ground value for the property may be between (e.g., halfway between) a first value for the property in the first depiction 2150 of the shared portion 2107 of the scene 2105 and a second value for the property in the second depiction 2155 of the shared portion 2107 of the scene 2105.

In some examples, modifications to the first image 2110 and/or the second image 2120 can be performed after certain other modifications, such as after perspective distortion correction 2152. For instance, the modifications to the first image 2110 and/or the second image 2120 can be performed to the first perspective plane 2115 and/or to the second perspective plane 2125, before or after the imaging system warps the first perspective plane 2115 and/or warps the second perspective plane 2125 into the rectangular shape 2135 (e.g., into the first portion 2140 and into the second portion 2145, respectively).

In some examples, regardless of modifications to brightness settings, the imaging system can apply the same white balance setting for capturing the first image 2110 and capturing the second image 2120, in order to avoid visible stitch line visual artifacts in the combined image 2130 caused by differences in color temperature and/or shade of white between the first image 2110 and the second image 2120. In some examples, regardless of modifications to brightness settings, the imaging system can apply the same black balance setting for capturing the first image 2110 and for capturing the second image 2120, in order to avoid visible stitch line visual artifacts in the combined image 2130 caused by differences in color temperature and/or shade of black between the first image 2110 and the second image 2120.

In some examples, the imaging system can use auto-focus to focus the first image sensor that captures the first image 2110 on a region or point in the scene that is in the shared portion 2107 of the scene 2105, or that is within a threshold distance (e.g., within the first image 2110 and/or within the scene 2105 itself) of the shared portion 2107 of the scene 2105. In some examples, the imaging system can use auto-focus to focus the second image sensor that captures the second image 2120 on a region or point in the scene that is in the shared portion 2107 of the scene 2105, or that is within a threshold distance (e.g., within the second image 2120 and/or within the scene 2105 itself) of the shared portion 2107 of the scene 2105. For instance, in the context of FIGS. 23A-23B and FIGS. 24A-24B, the imaging system can use auto-focus to focus the first image sensor and the second image sensor on region(s) of the scene that depict the poster on which the text is printed. Thus, the imaging system can use auto-focus to focus the first image sensor and the second image sensor close to the center of the combined image 2130 rather than close to the respective centers of the first image 2110 and second image 2120.

FIG. 25A is a conceptual diagram 2500 illustrating an example of a combined image 2505 that depicts a suburban neighborhood scene, that is generated by stitching together a first image 2510 and a second image 2520, and that includes visual artifacts 2530. The combined image 2505 includes a first portion 2515 based on the first image 2510. The first portion 2515 and the first image 2510 may be referred to as the left portion and the left image, respectively. The combined image 2505 includes a second portion 2525 based on the second image 2520. The second portion 2525 and the second image 2520 may be referred to as the right portion and the right image, respectively. The first image 2510, and thus the left portion 2515, illustrates a left-hand portion of the scene 2545 with the suburban neighborhood. The second image 2520, and thus the second portion 2525, illustrates a right-hand portion of the scene 2545 with the suburban neighborhood.

The first image 2510 and the second image 2520 both include depictions (not pictured) of a shared portion 2540 of the scene 2545 with the suburban neighborhood. The combined image 2505 includes a depiction 2535 of the shared portion 2540 of the scene 2545 with the suburban neighborhood. The depiction 2535 of the shared portion 2540 of the scene 2545 includes visual artifacts 2530, as visible in the zoomed-in views 2532 of the combined image 2505. For instance, the zoomed-in views 2532 of the combined image 2505 highlight that the slanted roof of one of the houses in the combined image 2505 does not follow a straight line, but a jagged one instead, and appears to have discontinuities. The zoomed-in views 2532 of the combined image 2505 highlight that portions of a trash can are duplicated, appearing similar to the ghosting distortion 310 of FIG. 3 and/or the stitching distortion 410 of FIG. 4. Some of the zoomed-in views 2532 include alterations such as increased brightness or contrast to make the visual artifacts 2530 more clearly visible for the sake of illustration.

FIG. 25B is a conceptual diagram 2550 illustrating an example of a corrected combined image 2555 that depicts the suburban neighborhood scene of FIG. 25A, that is generated by stitching together the first image 2510 and the second image 2520 with corrections, and that includes smooth transitions 2570 without visual artifacts 2530. The corrected combined image 2555 includes a first portion 2560 based on the first image 2510. The first portion 2560 may be referred to as the left portion. The first portion 2560 is similar to the first portion 2515, but may include corrections to correct the visual artifacts 2530. The combined image 2505 includes a second portion 2565 based on the second image 2520. The second portion 2565 may be referred to as the right portion. The second portion 2565 is similar to the second portion 2525, but may include corrections to correct the visual artifacts 2530.

The corrected combined image 2555 includes a depiction 2575 of the shared portion 2540 of the scene 2545 with the suburban neighborhood. The depiction 2575 of the shared portion 2540 of the scene 2545 is similar to the depiction 2535 of the shared portion 2540 of the scene 2545. The corrected combined image 2555 includes smooth transitions 2570 between the first portion 2560 and the second portion 2565, including in the depiction 2575 of the shared portion 2540 of the scene 2545. The corrected combined image 2555 reduces or eliminates the visual artifacts 2530 that were present in the combined image 2505, including in the depiction 2575 of the shared portion 2540 of the scene 2545. The zoomed-in views 2572 of the corrected combined image 2555 highlight these smooth transitions 2570 between the first portion 2560 and the second portion 2565, as well as the lack of visual artifacts 2530 in the depiction 2575 of the shared portion 2540 of the scene 2545 and otherwise in the corrected combined image 2555. For instance, the zoomed-in views 2532 of the corrected combined image 2555 highlight that the slanted roof of one of the houses in the corrected combined image 2555 follows a straight line, with no apparent jags or discontinuities. The zoomed-in views 2572 of the corrected combined image 2555 highlight that the trash can no longer includes any duplicated portions, ghosting distortion 310 as in FIG. 3, and/or stitching distortion 410 of FIG. 4. Some of the zoomed-in views 2572 include alterations such as increased brightness or contrast to make the smooth transitions 2570 (and lack of the visual artifacts 2530 from the combined image 2505) more clearly visible for the sake of illustration.

In some examples, the shared portion 2540 of the scene 2545 can be referred to as an overlapping region. In some examples, the depiction 2535 and/or the depiction 2575 can be referred to as an overlapping region.

With respect to FIG. 21A, an imaging device can detect a difference — or offset — between positions of certain patterns between the first depiction 2150 of the shared portion 2107 of the scene 2105 and the second depiction 2155 of the shared portion 2107 of the scene 2105. The imaging device can detect the offset along or near (e.g., within a threshold distance of) a stitching line along which the first portion 2140 of the combined image 2130 is stitched to the second portion 2145 of the combined image 2130. In some examples, the imaging device can detect the offset using one or more pattern matching algorithms, such as normalized cross-correlation (NCC). In some examples, the pattern matching algorithms can use one or more trained machine learning (ML) systems to perform pattern matching. For example, the one or more trained machine learning (ML) systems can include one or more trained neural networks (NNs), one or more trained convolutional neural networks (CNNs), one or more trained support vector machines (SVMs), one or more trained random forests (RFs), or a combination thereof.

For example, in the context of FIGS. 24A-24B, the imaging system can use the one or more pattern matching algorithms to detect the pattern with the lowercase "g" above the lowercase "h" in the red-outlined boxes in the zoomed in view 2415 of FIG. 24A and in the zoomed in view 2465 of FIG. 24B. The imaging system can determine, based on the position of this pattern in the first depiction 2405 of the shared portion 2340 of the scene 2345 relative to the position of this pattern in the second depiction 2455 of the shared portion 2340 of the scene 2345, an offset between the position of this pattern in the first depiction 2405 and the position of this pattern in the second depiction 2455. The offset can include a small vertical offset (position shift) and a small horizontal offset (position shift). The horizontal offset (position shift) is clearly visible relative to the vertical stitching line in the zoomed in views 2415 and 2465 of FIGS. 24A-24B.

Referring to the coordinate systems defined with respect to the legend 2102 and the legend 2132 of FIG. 21A, and assuming a center of a pattern in the first depiction 2150 of the shared portion 2107 of the scene 2105 is on the stitching line at vertical position Y, a horizontal offset dX and a vertical offset dY at vertical position Y can be defined by the center position the matched pattern in the second depiction 2155 of the shared portion 2107 of the scene 2105. The imaging system can determine all offsets of all Y positions along the stitching line, and can apply these offsets using the perspective distortion corrections Ru and Rv. For instance, correction of the first depiction 2150 and/or the second depiction 2155 of the shared portion 2107 of the scene 2105 can be denoted by the equations: U=Ru (X+dX, Y+dY) and V=Ru (X+dX, Y+dY). This then achieves smooth transitions, such as the smooth transitions 2570, without seams, ghosting distortion 310, stitching distortion 410, or other visual artifacts (e.g., visual artifacts 2530).

In some cases, the imaging system can perform the pattern matching for a limited number of vertical Y positions along the stitching line, and the offsets (dX and dY) of the rest positions can be determined by interpolation based on the offsets (dX and dY) determined for the limited number of vertical Y positions along the stitching line.

In some examples, the imaging system can fail to identify matching patterns using the one or more pattern matching algorithms. For example, if the depictions 2150 and/or 2155 of the shared portion 2107 of the scene 2105 are relatively flat and/or noisy, the one or more pattern matching algorithms can fail to find a pattern match (e.g., NCC detection can end with no correlation peak(s) found). In some examples, the imaging system can successfully identify more than one matching pattern using the one or more pattern matching algorithms, for instance if a tiled or repeating texture or other pattern is depicted in the depictions 2150 and/or 2155 of the shared portion 2107 of the scene 2105. In both such cases, the imaging system can rely on interpolation. If the one or more pattern matching algorithms can fail to find a pattern match due to flat and/or noisy image areas, any visual artifacts that might result from interpolation may be less noticeable than in other areas.

The imaging system does not need to apply the dynamic offset correction (e.g., the offset warp) to the entire image (e.g., first image 2110 or second image 2120). In some examples, the imaging system applies the correction to a correction zone defined by (Xd, Xd+W), where Xd is the horizontal position of the stitching line in the display and W is a width of a correction zone. The correction (e.g., the dynamic offset correction) can be progressively faded or tapered to zero, as in a gradient, as the horizontal position X moves away from the stitching line. In such cases, correction can be denoted using the equations: U=Ru (X+dX', Y+dY') and V=Rv (X+dX', Y+dY'), where dX'=dX*(1.0−|X−Xd|/W) and dY'=dY*(1.0−|X−Xd|W).

Figure 27A:
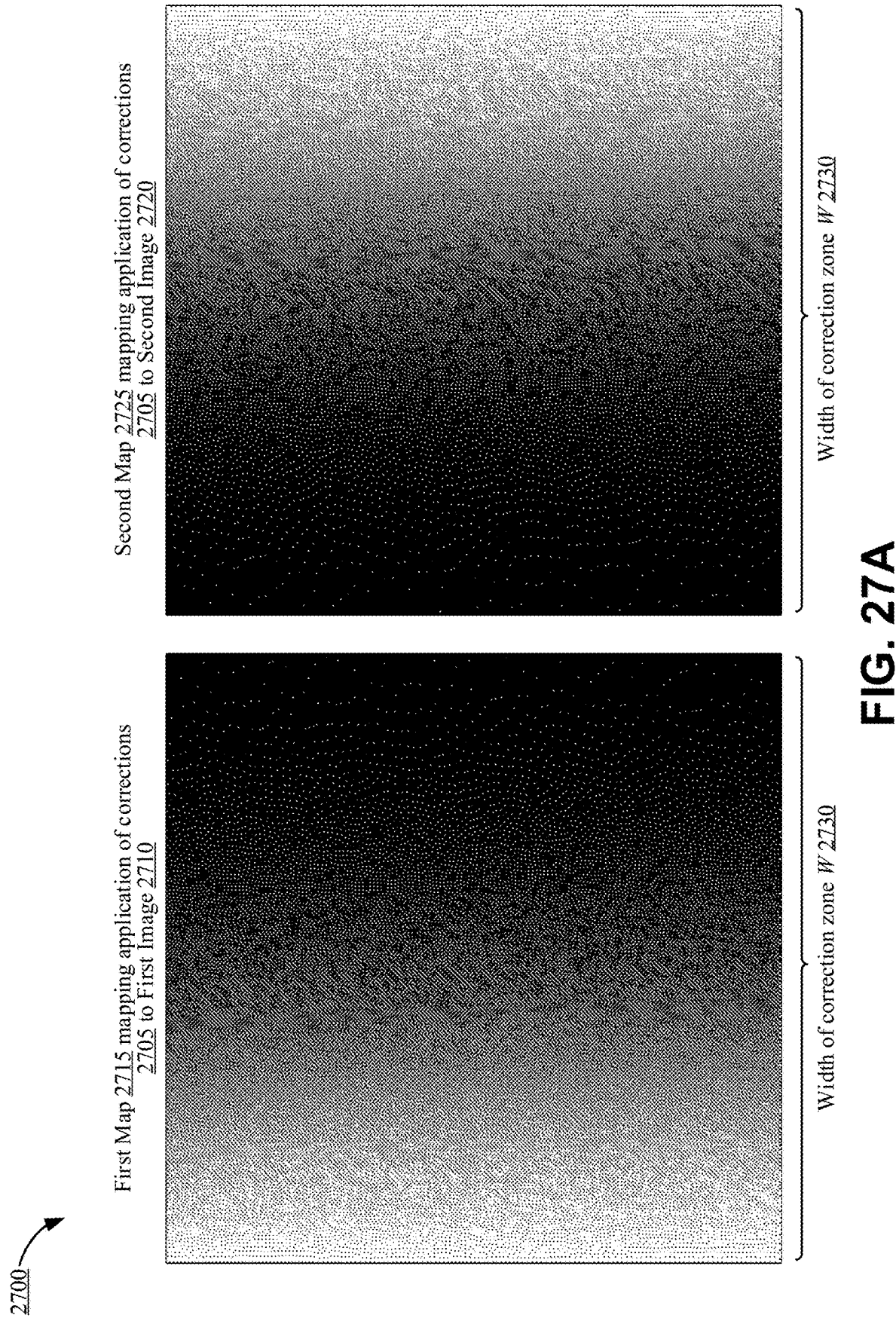
FIG. 27A is a conceptual diagram illustrating a first map mapping application of corrections to a first image and a second map mapping application of the corrections to a second image, in accordance with some examples.
Figure 27B:
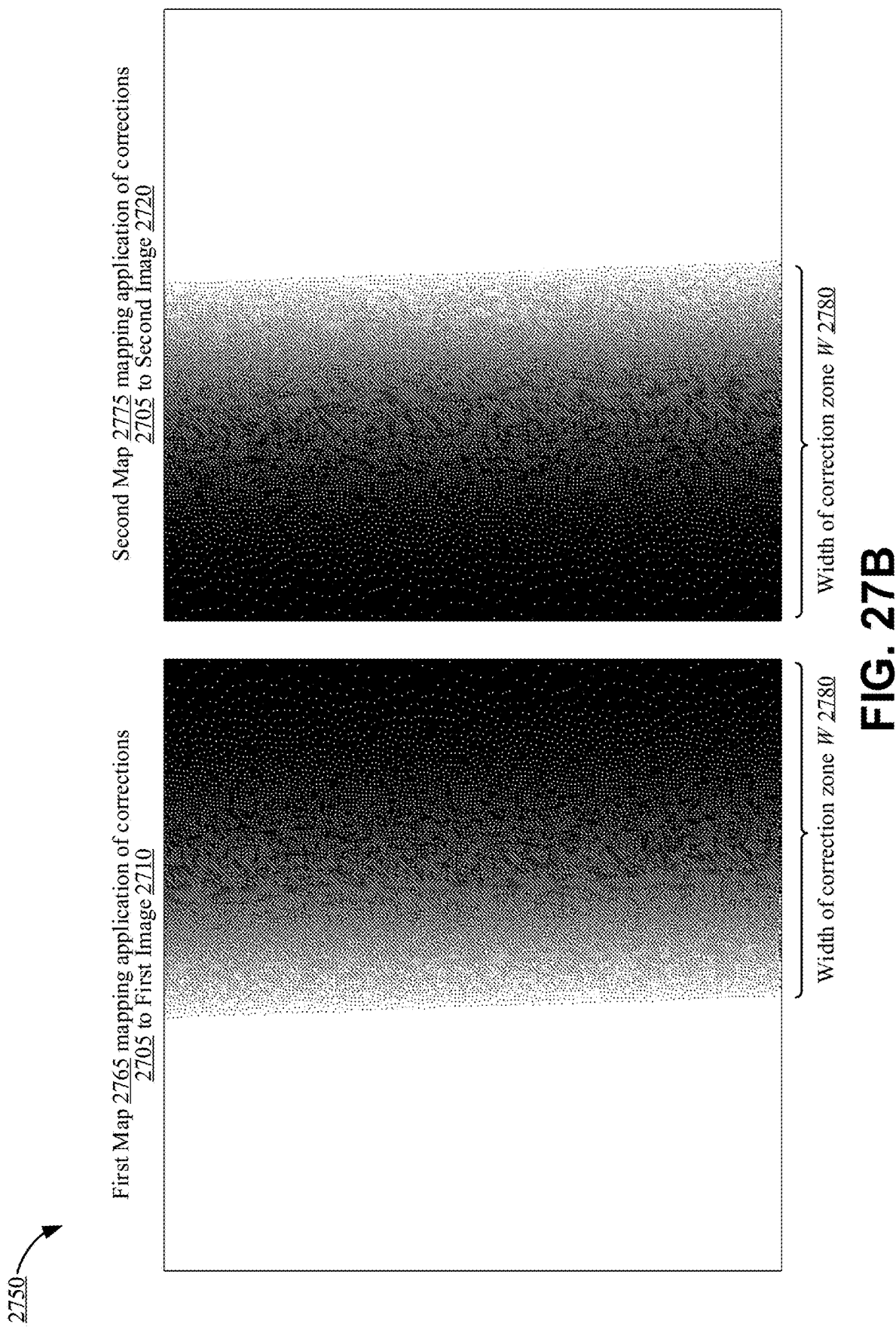
FIG. 27B is a conceptual diagram illustrating a first map mapping application of corrections to a first image and a second map mapping application of the corrections to a second image, in accordance with some examples.

Examples of application of the dynamic offset correction according to a correction zone W are illustrated in FIGS. 27A-27B. For instance, FIG. 27A illustrates examples of a first map 2715 and a second map 2725 that map application of corrections 2705 to a first image 2710 and a second image 2720, respectively. In the first map 2715 and the second map 2725, the value for the width of the correction zone W2730 matches the width of the first image 2710 and the second image 2720, respectively. FIG. 27B illustrates examples of a first map 2765 and a second map 2775 that map application of corrections 2705 to the first image 2710 and the second image 2720, respectively. In the first map 2765 and the second map 2775, the value for the width of the correction zone W2780 is approximately half of the width of the first image 2710 and approximately half of width of the second image 2720, respectively. The corrections 2705 can include the dynamic offset corrections discussed above.

The imaging system can apply the correction can be applied to both the first image 2110 and the second image 2120. Once the offsets dX and dY are determined, one may apply offsets dX/2 and dY/2 to the second image 2120 and −dX/2 and −dY/2 to the first image 2110, or vice versa. The offset corrections may be referred to as dynamic stitching.

The dynamic offset correction is applied in the combined image 2555 of FIG. 25B, but is not applied in the combined image 2505 of FIG. 25A.

FIG. 26A is a conceptual diagram 2600 illustrating an example of a combined image 2605 that depicts a living room scene, that is generated by stitching together a first image 2610 and a second image 2620, and that includes visual artifacts 2630. The combined image 2605 includes a first portion 2615 based on the first image 2610. The first portion 2615 and the first image 2610 may be referred to as the left portion and the left image, respectively. The combined image 2605 includes a second portion 2625 based on the second image 2620. The second portion 2625 and the second image 2620 may be referred to as the right portion and the right image, respectively. The first image 2610, and thus the left portion 2615, illustrates a left-hand portion of the scene 2645 with the living room. The second image 2620, and thus the second portion 2625, illustrates a right-hand portion of the scene 2645 with the living room.

The first image 2610 and the second image 2620 both include depictions (not pictured) of a shared portion 2640 of the scene 2645 with the living room. The combined image 2605 includes a depiction 2635 of the shared portion 2640 of the scene 2645 with the living room. The depiction 2635 of the shared portion 2640 of the scene 2645 includes visual artifacts 2630, as visible in the zoomed-in view 2632 of the combined image 2605. The zoomed-in view 2632 is an enlarged portion of the cabinet depicted in the combined image 2605. The zoomed-in view 2632 of the combined image 2605 highlights that there is a brightness difference between the first portion 2615 of the combined image 2605 and the second portion 2625 of the combined image 2605, resulting in visual artifacts 2630. The visual artifacts include a vertical visual seam between the first portion 2615 and the second portion 2625 within the depiction 2635 of the shared portion 2640 of the scene 2645. In particular, the zoomed-in view 2632 of the combined image 2605 highlights that the first portion 2615 of the combined image 2605 is darker than the second portion 2625 of the combined image 2605, and that the second portion 2625 of the combined image 2605 is thus brighter than the first portion 2615 of the combined image 2605. The zoomed-in view 2632 includes alterations such as increased brightness or contrast to make the visual artifacts 2630 more clearly visible for the sake of illustration.

FIG. 26B is a conceptual diagram 2650 illustrating an example of a corrected combined image 2655 that depicts the living room scene of FIG. 26A, that is generated by stitching together the first image 2610 and the second image 2620 with corrections, and that includes smooth transitions 2670 without visual artifacts 2630. The corrected combined image 2655 includes a first portion 2660 based on the first image 2610. The first portion 2660 may be referred to as the left portion. The first portion 2660 is similar to the first portion 2615, but may include corrections to correct the visual artifacts 2630. The combined image 2605 includes a second portion 2665 based on the second image 2620. The second portion 2665 may be referred to as the right portion. The second portion 2665 is similar to the second portion 2625, but may include corrections to correct the visual artifacts 2630.

The corrected combined image 2655 includes a depiction 2675 of the shared portion 2640 of the scene 2645 with the living room. The depiction 2675 of the shared portion 2640 of the scene 2645 is similar to the depiction 2635 of the shared portion 2640 of the scene 2645. The corrected combined image 2655 includes smooth transitions 2670 between the first portion 2660 and the second portion 2665, including in the depiction 2675 of the shared portion 2640 of the scene 2645. The corrected combined image 2655 reduces or eliminates the visual artifacts 2630 that were present in the combined image 2605, including in the depiction 2675 of the shared portion 2640 of the scene 2645. The zoomed-in view 2672 of the corrected combined image 2655 highlight these smooth transitions 2670 between the first portion 2660 and the second portion 2665, as well as the lack of visual artifacts 2630 in the depiction 2675 of the shared portion 2640 of the scene 2645 and otherwise in the corrected combined image 2655. For instance, the zoomed-in view 2632 of the corrected combined image 2655 highlights that the brightness of the first portion 2615 of the corrected combined image 2655 and the brightness of the second portion 2625 of the corrected combined image 2655 match, and/or are aligned. Thus, no vertical visual seam is visible between the first portion 2615 and the second portion 2625 within the depiction 2675 of the shared portion 2640 of the scene 2645 of the corrected combined image 2655 or otherwise in the corrected combined image 2655. The zoomed-in view 2672 includes alterations such as increased brightness or contrast to make the smooth transitions 2670 (and lack of the visual artifacts 2630 from the combined image 2605) more clearly visible for the sake of illustration.

In some examples, the shared portion 2640 of the scene 2645 can be referred to as an overlapping region. In some examples, the depiction 2635 and/or the depiction 2675 can be referred to as an overlapping region.

A stitching seam may be visually noticeable by the brightness and/or color difference, as in the visual artifacts 2630 in the combined image 2605. As discussed earlier, the imaging device can modify at least a portion of the first image 2110 to align properties such as brightness and/or clarity and/or colors in the first depiction 2150 of the shared portion 2107 of the scene 2105 with corresponding properties (e.g., brightness and/or clarity and/or colors) in the second depiction 2155 of the shared portion 2107 of the scene 2105 of the second image 2120, or vice versa. Properties such as brightness, clarity, colors, and the like, may be modified by changing exposure settings, gain settings, exposure compensation settings, flash settings, color saturation settings, tint settings, hue settings, contrast settings, sharpness settings, or a combination thereof.

For instance, the imaging system can detect an overall brightness difference detected by comparing the average brightness of the first depiction 2150 of the shared portion 2107 of the scene 2105 with the second depiction 2155 of the shared portion 2107 of the scene 2105. The imaging system can adjust camera exposure(s) of the first image sensor and/or the second image sensor to correct such an overall brightness difference. However, in some cases, the brightness difference might vary at different vertical positions along the stitching line. For example, if a strong point lighting source is located on the left or the right side of the camera, uneven brightness differences can be observed at different vertical positions along and/or near the stitching line. The imaging system can determine the brightness difference(s) at least in part by calculating the average brightness for each vertical Y position on the stitching line for both the first depiction 2150 of the shared portion 2107 of the scene 2105 and the second depiction 2155 of the shared portion 2107 of the scene 2105. Assuming the averaged brightness at vertical position Y for the first depiction 2150 is BL(Y) and averaged brightness at vertical position Y for the second depiction 2155 is BR(Y), we define the gain correcting function C(Y) using the equation: $C(Y) = sqrt(BR(Y)/BL(Y))$. The imaging system can apply a dynamic gain correction to the first image 2110 using the equation $R'G'B'(X, Y) = R'G'B'(X, Y)*C(Y)$. The imaging system can apply the dynamic gain correction to the second image 2120 using the equation $R'G'B'(X, Y) = R'G'B'(X, Y)/C(Y)$. The imaging system can apply the dynamic gain corrections as well as the dynamic offset corrections (the dynamic stitching(described earlier together to correct for both brightness and positioning.

The dynamic gain correction equations provided above are applied in a linear color space. If the first image 2110 and/or the second image 2120 are in a non-linear color space, such as the one after a gamma correction, the imaging system can apply a de-gamma process should before applying the dynamic gain correction. Similarly to the dynamic offset correction, the imaging system does not need to apply the dynamic gain correction to the entire image (e.g., first image 2110 or second image 2120). In some examples, the imaging system applies the dynamic gain correction to a correction zone defined by (Xd, Xd+W), where Xd is the horizontal position of the stitching line in the display and W is a width of a correction zone. The correction (e.g., the dynamic offset correction) can be progressively faded or tapered to zero, as in a gradient, as the horizontal position X moves away from the stitching line. In such cases, correction can be denoted using the equation: $C'(X, Y) = 1.0 + (C(Y) - 1.0)*(1.0 - |X - Xd|/W)$. The imaging system can apply the correction to the first image 2110 according to the equation $R'G'B'(X, Y) = R'G'B'(X, Y)*C'(X, Y)$. The imaging system can apply the dynamic gain correction to the second image 2120 according to the equation $R'G'B'(X, Y) = R'G'B'(X, Y)/C'(X, Y)$.

Examples of application of the dynamic gain correction according to a correction zone W are illustrated in FIGS. 27A-27B. For instance, FIG. 27A illustrates examples of a first map 2715 and a second map 2725 that map application of corrections 2705 to a first image 2710 and a second image 2720, respectively. In the first map 2715 and the second map 2725, the value for the width of the correction zone W 2730 matches the width of the first image 2710 and the second image 2720, respectively. FIG. 27B illustrates examples of a first map 2765 and a second map 2775 that map application of corrections 2705 to the first image 2710 and the second image 2720, respectively. In the first map 2765 and the second map 2775, the value for the width of the correction zone W2780 is approximately half of the width of the first image 2710 and approximately half of width of the second image 2720, respectively. The corrections 2705 can include the dynamic gain corrections discussed above.

In some examples, the imaging system may have a false detection of the brightness difference of the two overlapping areas. For example, when a real object with high contrast vertical line coincidently aligned with the stitch line in the middle and the capturing of the left and right images is not synchronized, a false brightness difference might be arisen and result false correction artifact. The possible sources of false correction include unsynchronized capturing, misalignment of stitching, non-linearity of the brightness in calculation and others. Since the brightness difference at the image stitch line due to uneven illumination is normally very small, e.g. <10% even with a very strong illumination on one side, implement of dynamic gain correction with the threshold can effectively avoid or reduce the false correction artifacts. In some examples, a maximum correction threshold (e.g., C(Y)<2.0) can be used.

In some examples, the correcting function C(Y) is a smooth function. In some examples, after calculating all C(Y) correction values, the imaging system applies a spatial low-pass filter to the result.

The dynamic gain correction is applied in the combined image 2655 of FIG. 26B, but is not applied in the combined image 2605 of FIG. 26A.

Equations similar to those recited above for the dynamic gain correction can be used for corrections aligning other properties between the first image 2110 and the second image 2120. These properties include, for example, brightness, contrast, tint, hue, saturation, other image properties discussed herein, or a combination thereof. For example, the imaging system can perform dynamic offset corrections, dynamic gain corrections, dynamic brightness corrections, dynamic contrast corrections, dynamic tint corrections, dynamic hue corrections, dynamic saturation corrections, or a combination thereof.

FIG. 27A is a conceptual diagram illustrating a first map 2715 mapping application of corrections 2705 to a first image 2710 and a second map 2725 mapping application of the corrections 2705 to a second image 2720. In the first map 2715 and the second map 2725, the value for the width of the correction zone W 2730 matches the width of the first image 2710 and the second image 2720, respectively. The corrections 2705 can include, for example, dynamic offset corrections, dynamic gain corrections, dynamic brightness corrections, dynamic contrast corrections, dynamic tint corrections, dynamic hue corrections, dynamic saturation corrections, or a combination thereof. The first map 2715 includes a gradient from black at the right side of the first image 2710 (at or near the stitching line) to white at the left side of the first image 2710 (farthest away from the stitching line). The second map 2725 includes a gradient from black at the left side of the second image 2720 (at or near the stitching line) to white at the right side of the second image 2720 (farthest away from the stitching line). Black represents a maximum amount of correction. White represents no correction. Darker shares of grey represent larger amounts of correction than lighter shades of grey. A multiplier M may control the strength of the application of the corrections, with the value of M changing from 1 (maximum amount of correction) to zero (no correction). Because the width of the correction zone W 2730 matches the width of the first image 2710 and the second image 2720, the first map 2715 and the second map 2725 only reach white (no correction) right at the left side of the first image 2710 (farthest away from the stitching line) and the right side of the second image 2720 (farthest away from the stitching line).

FIG. 27B is a conceptual diagram illustrating a first map 2765 mapping application of corrections 2705 to a first image 2710 and a second map 2775 mapping application of the corrections 2705 to a second image 2720. In the first map 2765 and the second map 2775, the value for the width of the correction zone W2780 is approximately half of the width of the first image 2710 and approximately half of width of the second image 2720, respectively. The corrections 2705 can include, for example, dynamic offset corrections, dynamic gain corrections, dynamic brightness corrections, dynamic contrast corrections, dynamic tint corrections, dynamic hue corrections, dynamic saturation corrections, or a combination thereof. The first map 2765 includes a gradient from black at the right side of the first image 2710 (at or near the stitching line) to white at the left side of the first image 2710 (farthest away from the stitching line). The second map 2775 includes a gradient from black at the left side of the second image 2720 (at or near the stitching line) to white at the right side of the second image 2720 (farthest away from the stitching line). Black represents a maximum amount of correction. White represents no correction. Darker shares of grey represent larger amounts of correction than lighter shades of grey. A multiplier M may control the strength of the application of the corrections, with the value of M changing from 1 (maximum amount of correction) to zero (no correction). Because the width of the correction zone W 2780 is half of the width of the first image 2710 and the second image 2720, the first map 2715 and the second map 2725 reach white (no correction) approximately halfway into the first image 2710 (at the horizontal center) and approximately halfway into the second image 2720 (at the horizontal center).

FIG. 28 is a flow diagram illustrating an example process 2800 for generating a combined image from multiple image frames. In some examples, the operations in the process 2800 may be performed by an imaging system. In some examples, the imaging system is the device 500. In some examples, the imaging system includes the camera 112, the camera 206, the device 500, the imaging architecture illustrated in conceptual diagram 600, the imaging architecture illustrated in conceptual diagram 700, the imaging architecture illustrated in conceptual diagram 800, the imaging architecture illustrated in conceptual diagram 900, the imaging architecture illustrated in conceptual diagram 1100, the imaging architecture illustrated in conceptual diagram 1200, the imaging architecture illustrated in conceptual diagram 1240, the imaging architecture illustrated in conceptual diagram 1260, the imaging architecture illustrated in conceptual diagram 1600, least one of an image capture and processing system 2000, an image capture device 2005A, an image processing device 2005B, an image processor 2050, a host processor 2052, an ISP 2054, a computing system 2900, the imaging system that performs the process 1300, the imaging system that performs the process 1350, the imaging system that performs the process 1400, the imaging system that performs the process 1900, one or more network servers of a cloud service, or any combination thereof.

At operation 2805, the imaging system is configured to, and can, receive a first image of a scene captured by a first image sensor. One or more light redirection elements are configured to, and can, redirect a first light from a first path to a redirected first path toward the first image sensor. The first image sensor is configured to, and can, capture the first image based on receipt of the first light at the first image sensor. The first image includes a first depiction of a portion of the scene.

At operation 2810, the imaging system is configured to, and can, receive a second image of the scene captured by a second image sensor. The one or more light redirection elements are configured to, and can, redirect a second light from a second path to a redirected second path toward the second image sensor. The second image sensor is configured to, and can, capture the second image based on receipt of the second light at the second image sensor. The second image includes a second depiction of the portion of the scene. The portion of the scene represented in the first depiction and the second depiction may be referred to as a shared portion of the scene. In some examples, the portion of the scene may be an entirety of the scene. In some examples, the portion of the scene may be a subset of the scene.

In some aspects, the imaging system can include the first image sensor, the second image sensor, the one or more light redirection elements, or a combination thereof. Examples of the first image sensor of operation 2805 can include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, another image sensor described herein, or a combination thereof. Examples of the second image sensor of operation 2810 can include the image sensor 106, the image sensor of the camera 206, the image sensor of the first camera 501, the image sensor of the second camera 502, the first image sensor 602, the second image sensor 604, the image sensor 702, the first image sensor 802, the second image sensor 804, the first image sensor 902, the second image sensor 904, the image sensor 1004, the first image sensor 1102, the second image sensor 1104, the first image sensor 1202, the second image sensor 1204, the image sensor 2030, another image sensor described herein, or a combination thereof.

Examples of the one or more light redirection elements of operation 2805 and operation 2810 can include the light redirection element 706, the first light redirection element 810, the second light redirection element 812, the first light redirection element 910, the second light redirection element 912, the first prism of the first light redirection element 910, the second prism of the second light redirection element 912, the first reflective surface on side 918 of the light redirection element 910, the second reflective surface on side 920 of the second light redirection element 912, the first light redirection element 1110, the second light redirection element 1120, the first prism of the first light redirection element 1110, the second prism of the second light redirection element 1120, the first reflective surface on side 1112 of the first light redirection element 1110, the second reflective surface of the second light redirection element 1120, the light redirection element 1210, the first prism 1212 of the light redirection element 1210, the second prism 1214 of the light redirection element 1210, the first reflective surface on side 1216 of the first prism 1212 of the light redirection element 1210, the second reflective surface on side 1218 of the second prism 1214 of the light redirection element 1210, another described herein, another reflective surface described herein, another light redirection element described herein, or a combination thereof.

In some aspects, the one or more light redirection elements include a first reflective surface. To redirect the first light toward the first image sensor, the one or more light redirection elements use the first reflective surface to reflect the first light toward the first image sensor. In some aspects, the one or more light redirection elements include a second reflective surface. To redirect the second light toward the second image sensor, the one or more light redirection elements use the second reflective surface to reflect the second light toward the second image sensor. In some aspects, the first reflective surface and the second reflective surface are fixed relative to one another. Examples of each of the first reflective surface and the second reflective surface can include the reflective surface of the redirection element 706, the reflective surface of the first light redirection element 810, the reflective surface on side 918 of the first light redirection element 910, the reflective surface on side 1112 of the first light redirection element 1110, the reflective surface on side 1216 of the light redirection element 1210, another reflective surface described herein, or a combination thereof.

In some examples, the one or more light redirection elements can include a first prism and/or a second prism. To redirect the first light from the first path to the redirected first path toward the first image sensor, the one or more light redirection elements can use the first prism to refract the first light. The first prism can include the first reflective surface on at least one of the surfaces and/or sides of the first prism (e.g., side 918, side 920, side 1112, side 1216, side 1218). To redirect the second light from the second path to the redirected second path toward the second image sensor, the one or more light redirection elements can use the second prism to refract the second light. The second prism can include the second reflective surface on at least one of the surfaces and/or sides of the second prism (e.g., side 918, side 920, side 1112, side 1216, side 1218). Examples of the each of the first prism and the second prism can include the first light redirection element 910, the second light redirection element 912, the first prism of the first light redirection element 910, the second prism of the second light redirection element 912, the first light redirection element 1110, the second light redirection element 1120, the first prism of the first light redirection element 1110, the second prism of the second light redirection element 1120, the first prism 1212 of the light redirection element 1210, the second prism 1214 of the light redirection element 1210, another prism described herein, or a combination thereof.

In some aspects, the first path includes a path of the first light before the first light enters the first prism and the first prism refracts the first light. In some aspects, the second path includes a path of the second light before the second light enters the second prism and the second prism refracts the second light. In the context of FIG. 9, the first path of the first light may be the path of the first light before entering side 922 of the first light redirection element 910. In the context of FIG. 9, the second path of the second light may be the path of the second light before entering side 924 of the second light redirection element 912. In the context of FIGS. 12A-12C, the first path of the first light may be the path of the first light before entering side 1220 of the light redirection element 1210. In the context of FIGS. 12A-12C, the second path of the second light may be the path of the second light before entering side 1220 of the light redirection element 1210.

In some aspects, the first path includes a path of the first light after the first light enters the first prism and the first prism refracts the first light and/or before a first reflective surface of the one or more light redirection elements reflects the first light. In some aspects, the second path includes a path of the second light after the second light enters the second prism and the second prism refracts the second light and/or before a second reflective surface of the one or more light redirection elements reflects the second light. In the context of FIG. 9, the first path of the first light may be the path of the first light after entering side 922 of the first light redirection element 910 and/or before reflecting off of the reflective surface at side 918 of the first light redirection element 910. In the context of FIG. 9, the second path of the second light may be the path of the second light after entering side 924 of the second light redirection element 912 and/or before reflecting off of the reflective surface at side 920 of the second light redirection element 912. In the context of FIGS. 12A-12C, the first path of the first light may be the path of the first light after entering side 1220 of the light redirection element 1210 and/or before reflecting off of the reflective surface at side 1216 of the light redirection element 1210. In the context of FIGS. 12A-12C, the second path of the second light may be the path of the second light after entering side 1220 of the light redirection element 1210 and/or before reflecting off of the reflective surface at side 1218 of the light redirection element 1210.

The first prism and the second prism can be fixed relative to one another. The first prism and/or the second prism can be fixed relative to the first image sensor and/or the second image sensor. The first image sensor and/or the second image sensor can be fixed relative to the first prism and/or the second prism. The first reflective surface and the second reflective surface can be fixed relative to one another. The first reflective surface and/or the second reflective surface can be fixed relative to the first image sensor and/or the second image sensor. The first image sensor and/or the second image sensor can be fixed relative to the first reflective surface and/or the second reflective surface. The first reflective surface and/or the second reflective surface can be fixed relative to the first prism and/or the second prism. The first prism and/or the second prism can be fixed relative to the first reflective surface and/or the second reflective surface.

In some examples, the first light can pass through a first lens before reaching the first image sensor. In some examples, the second light can pass through a second lens before reaching the second image sensor. Examples of each of the first lens and/or second lens can include the lens 104, a lens of the camera 206, a lens of the first camera 501, a lens of the second camera 502, the first camera lens 606, the second camera lens 608, the camera lens 704, the first camera lens 806, the second camera lens 808, the first lens 906, the second lens 908, the first lens 1106, the second lens 1108, the first lens 1206, the second lens 1208, the lens 1660, another lens described herein, or a combination thereof.

The first image sensor can be configured to, and can, capture a first image of the scene based on receipt of the first light at the first image sensor. The second image sensor can be configured to, and can capture a second image of the scene based on receipt of the second light at the second image sensor. Examples of each of the first image and/or the second image include at least the first image frame of FIG. 3, the second image frame of FIG. 3, the first image frame of FIG. 4, the second image frame of FIG. 4, an image captured by the first camera 501, an image captured by the second camera 502, an image captured by the first image sensor 602, an image captured by the second image sensor 604, an image captured by the image sensor 702, an image captured by the first image sensor 802, an image captured by the second image sensor 804, an image captured by the first image sensor 902, an image captured by the second image sensor 904, the first image of FIG. 10B, the second image of FIG. 10B, the first image of FIG. 10C, the second image of FIG. 10C, an image captured by the first image sensor 1102, an image captured by the second image sensor 1104, an image captured by the first image sensor 1202, an image captured by the second image sensor 1204, the first image frame of operation 1302, the second image frame of operation 1304, the first image of operation 1355, the second image of operation 1360, the first image frame of operation 1410, the second image frame of operation 1420, the first image of operation 1905, the perspective-corrected first image of operation 1915, an image captured by the image capture and processing system 2000, the first image 2110, the second image 2120, the first perspective plane 2115, the second perspective plane 2125, the first portion 2140, the second portion 2145, the modified first image 2170, the modified second image 2175, the modified first image 2180, the modified second image 2185, the first image 2210, the second image 2220, the first perspective plane 2215, the second perspective plane 2225, the first portion 2260, the second portion 2265, the first image 2310, the second image 2320, the first perspective plane 2315, the second perspective plane 2325, the first portion 2360, the second portion 2365, the first image 2510, the second image 2520, the first portion 2515, the second portion 2525, the first image 2610, the second image 2620, the first portion 2615, the second portion 2625, first image 2710, the second image 2720, another image discussed herein, or a combination thereof.

In some aspects, the first image and the second image are captured contemporaneously. In some aspects, the first light reaches the first image sensor and the second light reaches the second image sensor contemporaneously. In some aspects, the first light reaches a first lens corresponding to the first image sensor and the second light reaches a second lens corresponding to the second image sensor contemporaneously. In some aspects, the first light is redirected (e.g., refracted, reflected, and/or otherwise redirected) using at least one of the one or more light redirection elements (e.g., first prism 1212) and the second light is redirected (e.g., refracted, reflected, and/or otherwise redirected) using at least one of the one or more light redirection elements (e.g., second prism 1214) contemporaneously.

In some aspects, the one or more light redirection elements are fixed relative to the first image sensor and the second image sensor. In some aspects, a first planar surface of the first image sensor faces a first direction, and a second planar surface of the second image sensor faces a second direction that is parallel to the first direction. For example, in FIG. 8, the first direction that the first image sensor 802 faces is parallel to, and faces, the second direction that the second image sensor 804 faces. In FIG. 9, the first direction that the first image sensor 902 faces is parallel to, and faces, the second direction that the second image sensor 904 faces. In FIG. 11, the first direction that the first image sensor 1102 faces is parallel to, and faces, the second direction that the second image sensor 1104 faces. In FIGS. 12A-12C, the first direction that the first image sensor 1202 faces is parallel to, and faces, the second direction that the second image sensor 1204 faces. In some aspects, the imaging system can modify the first image and/or the second image using a brightness uniformity correction, for instance as in FIG. 10D.

Examples of the portion of the scene include the overlap between the first scene portion 210 and the second scene portion 212, the overlap between the second scene portion 212 and the third scene portion 214, the portion 2107 of the scene 2105, the portion 2240 of the scene 2245, the portion 2340 of the scene 2345, the portion 2540 of the scene 2545, the portion 2640 of the scene 2645, another portion of a scene discussed herein, or a combination thereof. Examples of each of the first depiction of the portion of the and the second depiction of the portion of the scene can include the first depiction 2150 of the portion 2107 of the scene 2105, the second depiction 2155 of the portion 2107 of the scene 2105, the first depiction 2151 of the portion 2107 of the scene 2105, the second depiction 2156 of the portion 2107 of the scene 2105, the first depiction 2190 of the portion 2107 of the scene 2105, the second depiction 2195 of the portion 2107 of the scene 2105, the first depiction 2230 of the portion 2240 of the scene 2245, the second depiction 2235 of the portion 2240 of the scene 2245, the third depiction 2270 of the portion 2240 of the scene 2245, the first depiction 2330 of the portion 2340 of the scene 2345, the second depiction 2335 of the portion 2340 of the scene 2345, the third depiction 2370 of the portion 2340 of the scene 2345, the first depiction 2405 of the portion 2340 of the scene 2345, the zoomed-in view 2415, the second depiction 2455 of the portion 2340 of the scene 2345, the zoomed-in view 2465, the depiction 2535 of the portion 2540 of the scene 2545, the depiction 2575 of the portion 2540 of the scene 2545, the depiction 2635 of the portion 2640 of the scene 2645, the depiction 2675 of the portion 2640 of the scene 2645, another depiction of a portion of a scene discussed herein, or a combination thereof.

In some aspects, a virtual extension of the first path beyond the light redirection element intersects with a virtual extension of the second path beyond the light redirection element. An example of such an intersection is illustrated at the intersection of the first virtual lens 926 and the second virtual lens 928 in FIG. 9.

At operation 2815, the imaging system is configured to, and can, modify the first image and/or the second image at least in part to align a first property of the first depiction of the portion of the scene with a second property of the second depiction of the portion of the scene.

The first property of the first depiction of the portion of the scene is a brightness of the first depiction of the portion of the scene. In some aspects, the second property of the second depiction of the portion of the scene is a brightness of the second depiction of the portion of the scene. To align the first property with the second property, the imaging system can align the brightness of the first depiction of the portion of the scene with the brightness of the second depiction of the portion of the scene. An example in which the imaging system aligns the brightness of the first depiction of the portion of the scene with the brightness of the second depiction of the portion of the scene is illustrated in FIG. 26B. In comparison, in FIG. 26A, the brightness of the first depiction of the portion of the scene and the brightness of the second depiction of the portion of the scene are misaligned as highlighted in the zoomed-in view 2632.

In some aspects, the first property of the first depiction of the portion of the scene is a contrast of the first depiction of the portion of the scene. In some aspects, the second property of the second depiction of the portion of the scene is a contrast of the second depiction of the portion of the scene. To align the first property with the second property, the imaging system can align the contrast of the first depiction of the portion of the scene with the contrast of the second depiction of the portion of the scene.

In some aspects, the first property of the first depiction of the portion of the scene is a hue of the first depiction of the portion of the scene. In some aspects, the second property of the second depiction of the portion of the scene is a hue of the second depiction of the portion of the scene. To align the first property with the second property, the imaging system can align the hue of the first depiction of the portion of the scene with the hue of the second depiction of the portion of the scene.

In some aspects, the first property of the first depiction of the portion of the scene is a tint of the first depiction of the portion of the scene. In some aspects, the second property of the second depiction of the portion of the scene is a tint of the second depiction of the portion of the scene. To align the first property with the second property, the imaging system can align the tint of the first depiction of the portion of the scene with the tint of the second depiction of the portion of the scene. An example in which the imaging system aligns the tint of the first depiction of the portion of the scene with the tint of the second depiction of the portion of the scene is illustrated in FIG. 26B. In comparison, in FIG. 26A, the tint of the first depiction of the portion of the scene and the tint of the second depiction of the portion of the scene are misaligned as highlighted in the zoomed-in view 2632.

In some aspects, the first property of the first depiction of the portion of the scene is a saturation of the first depiction of the portion of the scene. In some aspects, the second property of the second depiction of the portion of the scene is a saturation of the second depiction of the portion of the scene. To align the first property with the second property, the imaging system can align the saturation of the first depiction of the portion of the scene with the saturation of the second depiction of the portion of the scene.

In some aspects, the first property of the first depiction of the portion of the scene is a sharpness of the first depiction of the portion of the scene. In some aspects, the second property of the second depiction of the portion of the scene is a sharpness of the second depiction of the portion of the scene. To align the first property with the second property, the imaging system can align the sharpness of the first depiction of the portion of the scene with the sharpness of the second depiction of the portion of the scene. By comparing and using the contrast associated with the first image sensor and the contrast associated with the second image sensor in the portion of the scene (e.g., and adjusting the autofocus based on this), the imaging system can align the sharpness.

In some aspects, the first property of the first depiction of the portion of the scene is a positioning of one or more features of the scene in the first depiction of the portion of the scene. In some aspects, the second property of the second depiction of the portion of the scene is a positioning of the one or more features of the scene in the second depiction of the portion of the scene. To align the first property with the second property, the imaging system can align the positioning of the one or more features in the first depiction of the portion of the scene with the positioning of the one or more features in the second depiction of the portion of the scene.

The one or more features can include one or more patterns. To align the positioning of the first depiction of the portion of the scene with the positioning of the second depiction of the portion of the scene, the imaging system can align a position of a first depiction of a pattern in the first depiction of the portion of the scene with a position of a second depiction of the pattern in the second depiction of the portion of the scene. The imaging system can detect the one or more features in the first depiction of the portion of the scene and/or in the second depiction of the portion of the scene using feature detection and/or feature extraction and/or feature recognition. The imaging system can detect the one or more patterns in the first depiction of the portion of the scene and/or in the second depiction of the portion of the scene using pattern detection and/or pattern extraction and/or pattern recognition. Examples of the one or more features and/or of the one or more patterns include features and/or patterns in the text on the poster depicted in the first image 2310 and the second image 2320, the "g" and "h" characters in the red box in the zoomed-in view 2415 and in the zoomed-in view 2465, the roof of the house highlighted in the zoomed-in views 2532, the roof of the house highlighted in the zoomed-in views 2572, the trash can highlighted in the zoomed-in views 2532, the trash can highlighted in the zoomed-in views 2572, other features or patterns discussed herein, or combinations thereof.

The imaging system can recognize the first depiction of the pattern in the first depiction of the portion of the scene. The imaging system can recognize the second depiction of the pattern in the second depiction of the portion of the scene. The imaging system can use normalized cross-correlation (NCC) to recognize the first depiction of the pattern in the first depiction of the portion of the scene. The imaging system can use normalized cross-correlation (NCC) to recognize the second depiction of the pattern in the second depiction of the portion of the scene. The imaging system can use interpolation to align the positioning of the one or more features in the first depiction of the portion of the scene with the positioning of the one or more features in the second depiction of the portion of the scene. For instance, the imaging system can use interpolation for areas that are between recognized patterns. The imaging system can use interpolation where a pattern in the first depiction of the portion of the scene matches multiple patterns in the second depiction of the portion of the scene, or vice versa. The imaging system can use interpolation where a pattern in the first depiction of the portion of the scene does not match any patterns in the second depiction of the portion of the scene with sufficient confidence (e.g., with confidence less than a minimum confidence threshold). The imaging system can use interpolation where a pattern in the second depiction of the portion of the scene does not match any patterns in the first depiction of the portion of the scene with sufficient confidence (e.g., with confidence less than a minimum confidence threshold).

In some aspects, the first property of the first depiction of the portion of the scene is a focus setting associated with the first image sensor for capture of the first image. In some aspects, the second property of the second depiction of the portion of the scene is a focus setting associated with the second image sensor for capture of the second image. In some aspects, the imaging system can set a focus setting associated with the first image sensor for capture of the first image using auto-focus to focus on the portion of the scene, or on a point in the scene within a threshold distance of the portion of the scene. In some aspects, the imaging system can set a focus setting associated with the second image sensor for capture of the second image using auto-focus to focus on the portion of the scene, or on a point in the scene within a threshold distance of the portion of the scene.

In some aspects, the first property of the first depiction of the portion of the scene is an exposure setting associated with the first image sensor for capture of the first image. In some aspects, the second property of the second depiction of the portion of the scene is an exposure setting associated with the second image sensor for capture of the second image. In some aspects, the imaging system can set an exposure setting associated with the first image sensor for capture of the first image using auto-exposure based on the portion of the scene, or on a point in the scene within a threshold distance of the portion of the scene. In some aspects, the imaging system can set an exposure setting associated with the second image sensor for capture of the second image using auto-exposure based on the portion of the scene, or on a point in the scene within a threshold distance of the portion of the scene. For instance, the imaging system can align the brightness and/or tint of the first depiction of the portion of the scene with the brightness and/or tint of the second depiction of the portion of the scene as in FIG. 26B (in comparison to FIG. 26A) by adjusting the exposure settings associated with the first image sensor and/or by adjusting the exposure settings associated with the second image sensor.

In some aspects, the first property of the first depiction of the portion of the scene is a white balance setting associated with the first image sensor for capture of the first image. In some aspects, the second property of the second depiction of the portion of the scene is a white balance setting associated with the second image sensor for capture of the second image. In some aspects, the imaging system can set a white balance setting associated with the first image sensor for capture of the first image using auto-white-balance based on the portion of the scene, or on a point in the scene within a threshold distance of the portion of the scene. In some aspects, the imaging system can set a white balance setting associated with the second image sensor for capture of the second image using auto-white-balance based on the portion of the scene, or on a point in the scene within a threshold distance of the portion of the scene. For instance, the imaging system can align the brightness and/or tint of the first depiction of the portion of the scene with the brightness and/or tint of the second depiction of the portion of the scene as in FIG. 26B (in comparison to FIG. 26A) by adjusting the white balance settings associated with the first image sensor and/or by adjusting the white balance settings associated with the second image sensor.

To modify the first image, the imaging system can apply a correction to at least a portion of the first image at a gradient strength that tapers based on distance from a stitching line. To modify the second image, the imaging system can apply the correction to at least a portion of the second image at a gradient strength that tapers based on distance from a stitching line. Examples of the gradient strengths that taper based on distance from the stitching line are illustrated in the first map 2715, the second map 2725, the first map 2765, and/or the second map 2775.

At operation 2820, the imaging system is configured to, and can, generate a combined image from the first image and the second image, wherein the combined image includes a combined image field of view that is larger than a first field of view of the first image and/or a second field of view of the second image.

In some aspects, the imaging system can modify the first image and/or the second image using a perspective distortion correction. The imaging system can be configured to generate the combined image from the first image and the second image in response to modifying at least the one of the first image and the second image using the perspective distortion correction. Examples of the perspective distortion correction can include the perspective distortion correction 1022, the perspective distortion correction of operation 1365, the flat perspective distortion correction 1515, the curved perspective distortion correction 1525, flat projective transformation pixel mapping 1620, the perspective distortion correction 2177, the perspective distortion correction of FIGS. 22A-22B, the perspective distortion correction of FIGS. 23A-23B, another type of perspective distortion correction described herein, or a combination thereof. In some aspects, to modify the first image and/or the second image using the perspective distortion correction, the imaging system can modify the first image from depicting a first perspective to depicting a common perspective using the perspective distortion correction, and can modify the second image from depicting a second perspective to depicting the common perspective using the perspective distortion correction. The common perspective can be between the first perspective and the second perspective. Examples of each of the first perspective and the second perspective can include the perspectives corresponding to each of the first original image plane 1614, the second original image plane 1616, the flat image plane 1665, another perspective plane or image plane discussed herein, or a combination thereof. The common perspective can, for example, correspond to the flat perspective-corrected image plane 1625, the curved perspective-corrected image plane 1630, or a combination thereof.

To modify the first image and/or the second image using the perspective distortion correction, the imaging system can identify depictions of one or more objects in image data of the first image and/or the second image, and can modify the image data at least in part by projecting the image data based on the depictions of the one or more objects.

In some aspects, the imaging system can generate the combined image from the first image and the second image at least in part by aligning a first portion of the first image with a second portion of the second image, and stitching the first image and the second image together based on the first portion of the first image and the second portion of the second image being aligned.

In some aspects, to generate the combined image from the first image and the second image, the imaging system can align a first portion of the first image with a second portion of the second image, and stitch the first image and the second image together based on the first portion of the first image and the second portion of the second image being aligned. The first portion of the first image can include the first depiction of the portion of the scene. The second portion of the second image can include the second depiction of the portion of the scene.

In some aspects, the imaging system can include: means for receiving a first image of a scene captured by a first image sensor, wherein one or more light redirection elements are configured to redirect a first light from a first path to a redirected first path toward the first image sensor, and wherein the first image sensor is configured to capture the first including based on receipt of the first light at the first image sensor, the first image including a first depiction of a portion of the scene; means for receiving a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; means for modifying at least one of the first image or the second image at least in part to align a first property of the first depiction of the portion of the scene with a second property of the second depiction of the portion of the scene; and means for generating a combined image from the first image and the second image, wherein the combined image includes a combined image field of view that is larger than at least one of a first field of view of the first image or a second field of view of the second image.

In some examples, the means for receiving the first image can include the first image sensor 1202, the second image sensor 1204, the image sensor 2202, the image sensor 2204, another image sensor described herein, or a combination thereof. In some examples, the means for receiving the second image can include the first image sensor 1202, the second image sensor 1204, the image sensor 2202, the image sensor 2204, another image sensor described herein, or a combination thereof. In some examples, the means for modifying at least one of the first image or the second image can include the ISP 512, the processor 504, the computing system 2900, the processor 2910, another processor discussed herein, or a combination thereof. In some examples, the means for generating the combined image can include the ISP 512, the processor 504, the computing system 2900, the processor 2910, another processor discussed herein, or a combination thereof.

Figure 29:
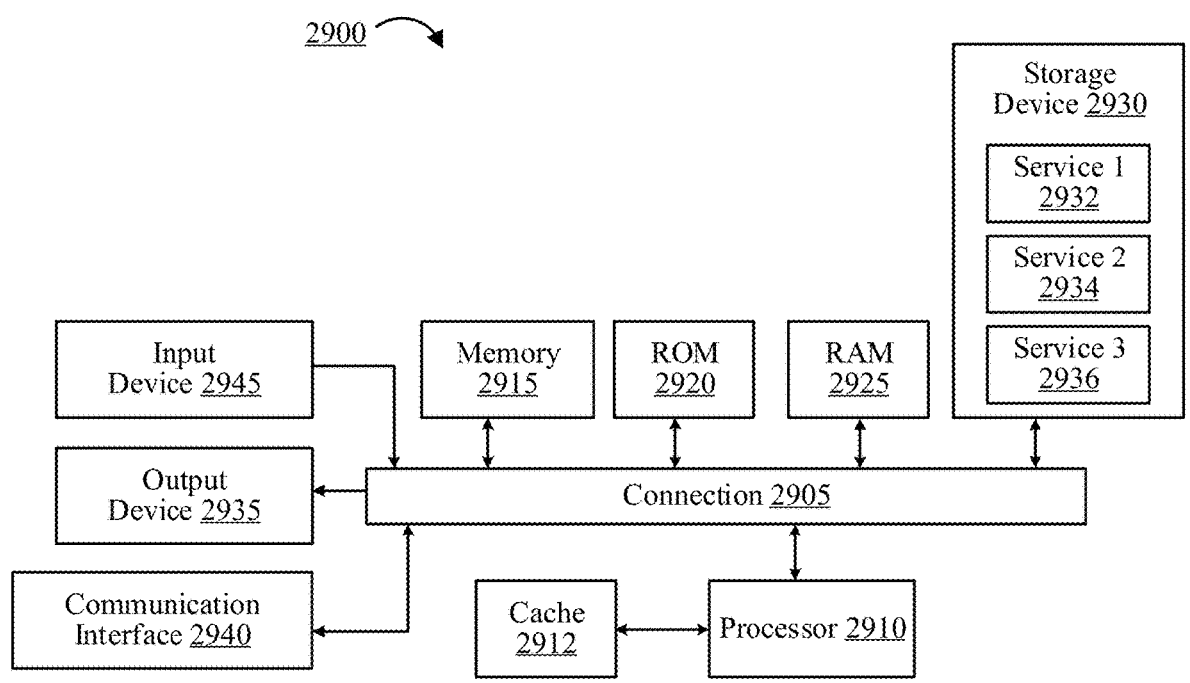
FIG. 29 is a block diagram illustrating an example of a system for implementing certain aspects of the present technology.

FIG. 29 is a diagram illustrating an example of a system for implementing certain aspects of the present technology. In particular, FIG. 29 illustrates an example of computing system 2900, which can be for example any computing device making up internal computing system, a remote computing system, a camera, or any component thereof in which the components of the system are in communication with each other using connection 2905. Connection 2905 can be a physical connection using a bus, or a direct connection into processor 2910, such as in a chipset architecture. Connection 2905 can also be a virtual connection, networked connection, or logical connection.

In some aspects, computing system 2900 is a distributed system in which the functions described in this disclosure can be distributed within a datacenter, multiple data centers, a peer network, etc. In some aspects, one or more of the described system components represents many such components each performing some or all of the function for which the component is described. In some aspects, the components can be physical or virtual devices.

Example system 2900 includes at least one processing unit (CPU or processor) 2910 and connection 2905 that couples various system components including system memory 2915, such as read-only memory (ROM) 2920 and random access memory (RAM) 2925 to processor 2910. Computing system 2900 can include a cache 2912 of high-speed memory connected directly with, in close proximity to, or integrated as part of processor 2910.

Processor 2910 can include any general purpose processor and a hardware service or software service, such as services 2932, 2934, and 2936 stored in storage device 2930, configured to control processor 2910 as well as a special-purpose processor where software instructions are incorporated into the actual processor design. Processor 2910 may essentially be a completely self-contained computing system, containing multiple cores or processors, a bus, memory controller, cache, etc. A multi-core processor may be symmetric or asymmetric.

To enable user interaction, computing system 2900 includes an input device 2945, which can represent any number of input mechanisms, such as a microphone for speech, a touch-sensitive screen for gesture or graphical input, keyboard, mouse, motion input, speech, etc. Computing system 2900 can also include output device 2935, which can be one or more of a number of output mechanisms. In some instances, multimodal systems can enable a user to provide multiple types of input/output to communicate with computing system 2900. Computing system 2900 can include communications interface 2940, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2940 may also include one or more Global Navigation Satellite System (GNSS) receivers or transceivers that are used to determine a location of the computing system 2900 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2930 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/

L5/L#), resistive random-access memory (RRAM/ReRAM), phase change memory (PCM), spin transfer torque RAM (STT-RAM), another memory chip or cartridge, and/or a combination thereof.

The storage device 2930 can include software services, servers, services, etc., that when the code that defines such software is executed by the processor 2910, it causes the system to perform a function. In some aspects, a hardware service that performs a particular function can include the software component stored in a computer-readable medium in connection with the necessary hardware components, such as processor 2910, connection 2905, output device 2935, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some aspects the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Individual aspects may be described above as a process or method which is depicted as a flowchart, a flow diagram, a data flow diagram, a structure diagram, or a block diagram. Although a flowchart may describe the operations as a sequential process, many of the operations can be performed in parallel, concurrently, or contemporaneously. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific aspects thereof, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the aspects disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

As noted above, while the present disclosure shows illustrative aspects, it should be noted that various changes and modifications could be made herein without departing from the scope of the appended claims. Additionally, the functions, steps or actions of the method claims in accordance with aspects described herein need not be performed in any particular order unless expressly stated otherwise. Furthermore, although elements may be described or claimed in the singular, the plural is contemplated unless limitation to the singular is explicitly stated. Accordingly, the disclosure is not limited to the illustrated examples and any means for performing the functionality described herein are included in aspects of the disclosure.

Illustrative aspects of the disclosure include:

Aspect 1. An apparatus for imaging, the apparatus comprising: a memory; and one or more processors configured to: receive a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; receive a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modify at least one of the first image or the second image at least in part to align a first property of the first depiction of the portion of the scene with a second property of the second depiction of the portion of the scene; and generate a combined image from the first image and the second image, wherein the combined image includes a combined image field of view that is larger than at least one of a first field of view of the first image or a second field of view of the second image.

Aspect 2. The apparatus of Aspect 1, wherein the first property of the first depiction of the portion of the scene is a brightness of the first depiction of the portion of the scene, and wherein the second property of the second depiction of the portion of the scene is a brightness of the second depiction of the portion of the scene.

Aspect 3. The apparatus of any of Aspects 1 to 2, wherein the first property of the first depiction of the portion of the scene is a contrast of the first depiction of the portion of the scene, and wherein the second property of the second depiction of the portion of the scene is a contrast of the second depiction of the portion of the scene.

Aspect 4. The apparatus of any of Aspects 1 to 3, wherein the first property of the first depiction of the portion of the scene is a hue of the first depiction of the portion of the scene in the first image, and wherein the second property of the second depiction of the portion of the scene is a hue of the second depiction of the portion of the scene in the second image.

Aspect 5. The apparatus of any of Aspects 1 to 4, wherein the first property of the first depiction of the portion of the scene is a tint of the first depiction of the portion of the scene in the first image, and wherein the second property of the second depiction of the portion of the scene is a tint of the second depiction of the portion of the scene in the second image.

Aspect 6. The apparatus of any of Aspects 1 to 5, wherein the first property of the first depiction of the portion of the scene is a saturation of the first depiction of the portion of the scene in the first image, and wherein the second property of the second depiction of the portion of the scene is a saturation of the second depiction of the portion of the scene in the second image.

Aspect 7. The apparatus of any of Aspects 1 to 6, wherein the first property of the first depiction of the portion of the scene is a sharpness of the first depiction of the portion of the scene in the first image, and wherein the second property of the second depiction of the portion of the scene is a sharpness of the second depiction of the portion of the scene in the second image.

Aspect 8. The apparatus of any of Aspects 1 to 7, wherein the first property of the first depiction of the portion of the scene is a positioning of one or more features of the scene in the first depiction of the portion of the scene in the first image, and wherein the second property of the second depiction of the portion of the scene is a positioning of the one or more features of the scene in the second depiction of the portion of the scene in the second image.

Aspect 9. The apparatus of any of Aspects 1 to 8, wherein the one or more processors are configured to align a position of a first depiction of a pattern in the first depiction of the portion of the scene with a position of a second depiction of the pattern in the second depiction of the portion of the scene.

Aspect 10. The apparatus Aspect 9, wherein the one or more processors are configured to: recognize the first depiction of the pattern in the first depiction of the portion of the scene; and recognize the second depiction of the pattern in the second depiction of the portion of the scene.

Aspect 11. The apparatus Aspect 10, wherein, to recognize the first depiction of the pattern in the first depiction of the portion of the scene and to recognize the second depiction of the pattern in the second depiction of the portion of the scene, the one or more processors are configured to use normalized cross-correlation (NCC).

Aspect 12. The apparatus of any of Aspects 8 to 11, wherein the one or more processors are configured to align, using interpolation, the positioning of the one or more features in the first depiction of the portion of the scene with the positioning of the one or more features in the second depiction of the portion of the scene.

Aspect 13. The apparatus of any of Aspects 1 to 12, wherein the first property of the first depiction of the portion of the scene is a focus setting associated with the first image sensor for capture of the first image, and wherein the second property of the second depiction of the portion of the scene is a focus setting associated with the second image sensor for capture of the second image.

Aspect 14. The apparatus any of Aspects 1 to 13, wherein the one or more processors are configured to: set a focus setting associated with the first image sensor for capture of the first image using auto-focus to focus on the portion of the scene; and set a focus setting associated with the second image sensor for capture of the second image using auto-focus to focus on the portion of the scene.

Aspect 15. The apparatus of any of Aspects 1 to 14, wherein the first property of the first depiction of the portion of the scene is an exposure setting associated with the first image sensor for capture of the first image, and wherein the second property of the second depiction of the portion of the scene is an exposure setting associated with the second image sensor for capture of the second image.

Aspect 16. The apparatus of any of Aspects 1 to 15, wherein the one or more processors are configured to: set an exposure setting associated with the first image sensor for capture of the first image using auto-exposure based on the portion of the scene; and set an exposure setting associated with the second image sensor for capture of the second image using auto-exposure based on the portion of the scene.

Aspect 17. The apparatus of any of Aspects 1 to 16, wherein the first property of the first depiction of the portion of the scene is a white balance setting associated with the first image sensor for capture of the first image, and wherein the second property of the second depiction of the portion of the scene is a white balance setting associated with the second image sensor for capture of the second image.

Aspect 18. The apparatus of any of Aspects 1 to 17, wherein the one or more processors are configured to set a white balance setting associated with the first image sensor for capture of the first image using auto-white-balance based on the portion of the scene; and set a white balance setting associated with the second image sensor for capture of the second image using auto-white-balance based on the portion of the scene.

Aspect 19. The apparatus of any of Aspects 1 to 18, wherein: to modify the first image, the one or more processors are configured to apply a correction to at least a portion of the first image at a gradient strength that tapers based on distance from a stitching line; and to modify the second image, the one or more processors are configured to apply the correction to at least a portion of the second image at a gradient strength that tapers based on distance from a stitching line.

Aspect 20. The apparatus of any of Aspects 1 to 19, wherein the one or more processors are configured to: modify at least one of the first image or the second image using a perspective distortion correction; and generate the combined image from the first image and the second image in response to modifying at least the one of the first image and the second image using the perspective distortion correction.

Aspect 21. The apparatus of Aspect 20, wherein the one or more processors are configured to modify at least one of the first image or the second image at least in part to align the first property of the first depiction of the portion of the scene with the second property of the second depiction of the portion of the scene after modifying at least one of the first image or the second image using the perspective distortion correction.

Aspect 22. The apparatus of any of Aspects 20 to 21, wherein, to modify at least one of the first image or the second image using the perspective distortion correction, the one or more processors are configured to: modify the first image from depicting a first perspective to depicting a common perspective using the perspective distortion correction; and modify the second image from depicting a second perspective to depicting the common perspective using the perspective distortion correction, wherein the common perspective is between the first perspective and the second perspective.

Aspect 23. The apparatus of any of Aspects 20 to 22, wherein, to modify at least one of the first image or the second image using the perspective distortion correction, the one or more processors are configured to: identify depictions of one or more objects in image data of at least one of the first image or the second image; and modify the image data at least in part by projecting the image data based on the depictions of the one or more objects.

Aspect 24. The apparatus of any of Aspects 1 to 23, wherein, to generate the combined image from the first image and the second image, the one or more processors are configured to: align a first portion of the first image with a second portion of the second image; and stitch the first image and the second image together based on the first portion of the first image and the second portion of the second image being aligned.

Aspect 25. The apparatus of Aspect 24, wherein the first portion of the first image includes the first depiction of the portion of the scene, wherein the second portion of the second image includes the second depiction of the portion of the scene.

Aspect 26. The apparatus of any of Aspects 1 to 25, wherein a virtual extension of the first path beyond the one or more light redirection elements intersects with a virtual extension of the second path beyond the one or more light redirection elements.

Aspect 27. The apparatus of any of Aspects 1 to 26, further comprising: the first image sensor; the second image sensor; and the one or more light redirection elements.

Aspect 28. The apparatus of any of Aspects 1 to 27, wherein: the one or more light redirection elements include a first reflective surface, wherein, to redirect the first light toward the first image sensor, the one or more light redirection elements use the first reflective surface to reflect the first light toward the first image sensor; and the one or more light redirection elements include a second reflective surface, wherein, to redirect the second light toward the second image sensor, the one or more light redirection elements use the second reflective surface to reflect the second light toward the second image sensor.

Aspect 29. The apparatus of Aspect 28, wherein the first reflective surface and the second reflective surface are fixed relative to one another.

Aspect 30. The apparatus of any of Aspects 1 to 29, wherein: the one or more light redirection elements include a first prism, wherein, to redirect the first light toward the first image sensor, the one or more light redirection elements use the first prism to refract the first light; and the one or more light redirection elements include a second prism, wherein, to redirect the second light toward the second image sensor, the one or more light redirection elements use the second prism to refract the second light.

Aspect 31. The apparatus of Aspect 30, wherein the first path includes a path of the first light before the first light enters the first prism and the first prism refracts the first light, wherein the second path includes a path of the second light before the second light enters the second prism and the second prism refracts the second light.

Aspect 32. The apparatus of Aspect 31, wherein the first path includes a path of the first light after the first light enters the first prism and the first prism refracts the first light but before a first reflective surface of the one or more light redirection elements reflects the first light, wherein the second path includes a path of the second light after the second light enters the second prism and the second prism refracts the second light but before a second reflective surface of the one or more light redirection elements reflects the second light.

Aspect 33. The apparatus of any of Aspects 30 to 32, wherein the first prism and the second prism are fixed relative to one another.

Aspect 34. The apparatus of any of Aspects 1 to 33, wherein the one or more light redirection elements are fixed relative to the first image sensor and the second image sensor.

Aspect 35. The apparatus of any of Aspects 1 to 34, wherein the first image and the second image are captured contemporaneously, and wherein the first light reaches the first image sensor and the second light reaches the second image sensor contemporaneously.

Aspect 36. The apparatus of any of Aspects 1 to 35, wherein a first planar surface of the first image sensor faces a first direction, wherein a second planar surface of the second image sensor faces a second direction that is parallel to the first direction.

Aspect 37. The apparatus of any of Aspects 1 to 36, wherein the one or more processors are configured to: modify at least one of the first image or the second image using a brightness uniformity correction.

Aspect 38. The apparatus of any of Aspects 1 to 37, further comprising: the first image sensor that captures the first image.

Aspect 39. The apparatus of any of Aspects 1 to 38, further comprising: the second image sensor that captures the second image.

Aspect 40. The apparatus of any of Aspects 1 to 39, further comprising: the one or more light redirection elements.

Aspect 41. A method for imaging, the method comprising: receiving a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; receiving a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modifying at least one of the first image or the second image at least in part to align a first property of the first depiction of the portion of the scene with a second property of the second depiction of the portion of the scene; and generating a combined image from the first image and the second image, wherein the combined image includes a combined image field of view that is larger than at least one of a first field of view of the first image or a second field of view of the second image.

Aspect 42. The method of Aspect 41, wherein the first property of the first depiction of the portion of the scene is a brightness of the first depiction of the portion of the scene, and wherein the second property of the second depiction of the portion of the scene is a brightness of the second depiction of the portion of the scene.

Aspect 43. The method of any of Aspects 41 to 42, wherein the first property of the first depiction of the portion of the scene is a contrast of the first depiction of the portion of the scene, and wherein the second property of the second depiction of the portion of the scene is a contrast of the second depiction of the portion of the scene.

Aspect 44. The method of any of Aspects 41 to 43, wherein the first property of the first depiction of the portion of the scene is a hue of the first depiction of the portion of the scene in the first image, and wherein the second property of the second depiction of the portion of the scene is a hue of the second depiction of the portion of the scene in the second image.

Aspect 45. The method of any of Aspects 41 to 44, wherein the first property of the first depiction of the portion of the scene is a tint of the first depiction of the portion of the scene in the first image, and wherein the second property of the second depiction of the portion of the scene is a tint of the second depiction of the portion of the scene in the second image.

Aspect 46. The method of any of Aspects 41 to 45, wherein the first property of the first depiction of the portion of the scene is a saturation of the first depiction of the portion of the scene in the first image, and wherein the second property of the second depiction of the portion of the scene is a saturation of the second depiction of the portion of the scene in the second image.

Aspect 47. The method of any of Aspects 41 to 46, wherein the first property of the first depiction of the portion of the scene is a sharpness of the first depiction of the portion of the scene in the first image, and wherein the second property of the second depiction of the portion of the scene is a sharpness of the second depiction of the portion of the scene in the second image.

Aspect 48. The method of any of Aspects 41 to 47, wherein the first property of the first depiction of the portion of the scene is a positioning of one or more features of the scene in the first depiction of the portion of the scene in the first image, and wherein the second property of the second depiction of the portion of the scene is a positioning of the one or more features of the scene in the second depiction of the portion of the scene in the second image.

Aspect 49. The method of any of Aspects 41 to 48, further comprising: aligning a position of a first depiction of a pattern in the first depiction of the portion of the scene with a position of a second depiction of the pattern in the second depiction of the portion of the scene.

Aspect 50. The apparatus Aspect 49, further comprising: recognizing the first depiction of the pattern in the first depiction of the portion of the scene; and recognizing the second depiction of the pattern in the second depiction of the portion of the scene.

Aspect 51. The apparatus Aspect 50, wherein recognizing the first depiction of the pattern in the first depiction of the portion of the scene and recognizing the second depiction of the pattern in the second depiction of the portion of the scene include using normalized cross-correlation (NCC).

Aspect 52. The method of any of Aspects 48 to 51, further comprising: aligning, using interpolation, the positioning of the one or more features in the first depiction of the portion of the scene with the positioning of the one or more features in the second depiction of the portion of the scene.

Aspect 53. The method of any of Aspects 41 to 52, wherein the first property of the first depiction of the portion of the scene is a focus setting associated with the first image sensor for capture of the first image, and wherein the second property of the second depiction of the portion of the scene is a focus setting associated with the second image sensor for capture of the second image.

Aspect 54. The apparatus any of Aspects 41 to 53, further comprising: setting a focus setting associated with the first image sensor for capture of the first image using auto-focus to focus on the portion of the scene; and setting a focus setting associated with the second image sensor for capture of the second image using auto-focus to focus on the portion of the scene.

Aspect 55. The method of any of Aspects 41 to 54, wherein the first property of the first depiction of the portion of the scene is an exposure setting associated with the first image sensor for capture of the first image, and wherein the second property of the second depiction of the portion of the scene is an exposure setting associated with the second image sensor for capture of the second image.

Aspect 56. The method of any of Aspects 41 to 55, further comprising: setting an exposure setting associated with the first image sensor for capture of the first image using auto-exposure based on the portion of the scene; and setting an exposure setting associated with the second image sensor for capture of the second image using auto-exposure based on the portion of the scene.

Aspect 57. The method of any of Aspects 41 to 56, wherein the first property of the first depiction of the portion of the scene is a white balance setting associated with the first image sensor for capture of the first image, and wherein the second property of the second depiction of the portion of the scene is a white balance setting associated with the second image sensor for capture of the second image.

Aspect 58. The method of any of Aspects 41 to 57, further comprising: setting a white balance setting associated with the first image sensor for capture of the first image using auto-white-balance based on the portion of the scene; and setting a white balance setting associated with the second image sensor for capture of the second image using auto-white-balance based on the portion of the scene.

Aspect 59. The method of any of Aspects 41 to 58, wherein modifying the first image includes applying a correction to at least a portion of the first image at a gradient strength that tapers based on distance from a stitching line; and modifying the second image includes applying the correction to at least a portion of the second image at a gradient strength that tapers based on distance from a stitching line.

Aspect 60. The method of any of Aspects 41 to 59, further comprising: modifying at least one of the first image or the second image using a perspective distortion correction; and generating the combined image from the first image and the second image in response to modifying at least the one of the first image and the second image using the perspective distortion correction.

Aspect 61. The method of Aspect 60, further comprising: modifying at least one of the first image or the second image at least in part to align the first property of the first depiction of the portion of the scene with the second property of the second depiction of the portion of the scene after modifying at least one of the first image or the second image using the perspective distortion correction.

Aspect 62. The method of any of Aspects 60 to 61, wherein modifying at least one of the first image or the second image using the perspective distortion correction includes modifying the first image from depicting a first perspective to depicting a common perspective using the perspective distortion correction; and modify the second image from depicting a second perspective to depicting the common perspective using the perspective distortion correction, wherein the common perspective is between the first perspective and the second perspective.

Aspect 63. The method of any of Aspects 60 to 62, wherein modifying at least one of the first image or the second image using the perspective distortion correction includes identifying depictions of one or more objects in image data of at least one of the first image or the second image; and modifying the image data at least in part by projecting the image data based on the depictions of the one or more objects.

Aspect 64. The method of any of Aspects 41 to 63, wherein generating the combined image from the first image and the second image includes aligning a first portion of the first image with a second portion of the second image; and stitching the first image and the second image together based on the first portion of the first image and the second portion of the second image being aligned.

Aspect 65. The method of Aspect 64, wherein the first portion of the first image includes the first depiction of the portion of the scene, wherein the second portion of the second image includes the second depiction of the portion of the scene.

Aspect 66. The method of any of Aspects 41 to 65, wherein a virtual extension of the first path beyond the one or more light redirection elements intersects with a virtual extension of the second path beyond the one or more light redirection elements.

Aspect 67. The method of any of Aspects 41 to 66, further comprising: the first image sensor; the second image sensor; and the one or more light redirection elements.

Aspect 68. The method of any of Aspects 41 to 67, wherein: the one or more light redirection elements include a first reflective surface, wherein, to redirect the first light toward the first image sensor, the one or more light redirection elements use the first reflective surface to reflect the first light toward the first image sensor; and the one or more light redirection elements include a second reflective surface, wherein, to redirect the second light toward the second image sensor, the one or more light redirection elements use the second reflective surface to reflect the second light toward the second image sensor.

Aspect 69. The method of Aspect 68, wherein the first reflective surface and the second reflective surface are fixed relative to one another.

Aspect 70. The method of any of Aspects 41 to 69, wherein: the one or more light redirection elements include a first prism, wherein, to redirect the first light toward the first image sensor, the one or more light redirection elements use the first prism to refract the first light; and the one or more light redirection elements include a second prism, wherein, to redirect the second light toward the second image sensor, the one or more light redirection elements use the second prism to refract the second light.

Aspect 71. The method of Aspect 70, wherein the first path includes a path of the first light before the first light enters the first prism and the first prism refracts the first light, wherein the second path includes a path of the second light before the second light enters the second prism and the second prism refracts the second light.

Aspect 72. The method of Aspect 71, wherein the first path includes a path of the first light after the first light enters the first prism and the first prism refracts the first light but before a first reflective surface of the one or more light redirection elements reflects the first light, wherein the second path includes a path of the second light after the second light enters the second prism and the second prism refracts the second light but before a second reflective surface of the one or more light redirection elements reflects the second light.

Aspect 73. The method of any of Aspects 70 to 72, wherein the first prism and the second prism are fixed relative to one another.

Aspect 74. The method of any of Aspects 41 to 73, wherein the one or more light redirection elements are fixed relative to the first image sensor and the second image sensor.

Aspect 75. The method of any of Aspects 41 to 74, wherein the first image and the second image are captured contemporaneously, and wherein the first light reaches the first image sensor and the second light reaches the second image sensor contemporaneously.

Aspect 76. The method of any of Aspects 41 to 75, wherein a first planar surface of the first image sensor faces a first direction, wherein a second planar surface of the second image sensor faces a second direction that is parallel to the first direction.

Aspect 77. The method of any of Aspects 41 to 76, further comprising: modifying at least one of the first image or the second image using a brightness uniformity correction.

Aspect 78. The method of any of Aspects 41 to 77, further comprising: the first image sensor that captures the first image.

Aspect 79. The method of any of Aspects 41 to 78, further comprising: the second image sensor that captures the second image.

Aspect 80. The method of any of Aspects 41 to 79, further comprising: the one or more light redirection elements.

Aspect 81. An apparatus for imaging, the apparatus comprising: means for receiving a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; means for receiving a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; means for modifying at least one of the first image or the second image at least in part to align a first property of the first depiction of the portion of the scene with a second property of the second depiction of the portion of the scene; and means for generating a combined image from the first image and the second image, wherein the combined image includes a combined image field of view that is larger than at least one of a first field of view of the first image or a second field of view of the second image.

Aspect 82. The apparatus of Aspect 81, further comprising: means for performing operations according to any one of Aspects 2 to 40, and/or any one of Aspects 42 to 80.

Aspect 83: A non-transitory computer-readable medium having stored thereon instructions that, when executed by one or more processors, cause the one or more processors to: receive a first image of a scene captured by a first image sensor, wherein one or more light redirection elements are configured to redirect a first light from a first path to a redirected first path toward the first image sensor, and wherein the first image sensor is configured to capture the first image based on receipt of the first light at the first image sensor, the first image including a first depiction of a portion of the scene; receive a second image of the scene captured by a second image sensor, wherein the one or more light redirection elements are configured to redirect a second light from a second path to a redirected second path toward the second image sensor, and wherein the second image sensor is configured to capture the second image based on receipt of the second light at the second image sensor, the second image including a second depiction of the portion of the scene; modify at least one of the first image or the second image at least in part to align a first property of the first depiction of the portion of the scene with a second property of the second depiction of the portion of the scene; and generate a combined image from the first image and the second image, wherein the combined image includes a combined image field of view that is larger than at least one of a first field of view of the first image or a second field of view of the second image.

Aspect 84: The non-transitory computer-readable medium of Aspect 83, further comprising operations according to any of Aspects 2 to 40, and/or any of Aspects 42 to 80.

What is claimed is:

1. An apparatus for imaging, the apparatus comprising:

a memory; and one or more processors configured to:

receive a first image of a scene captured by a first image sensor, wherein a refractive object and a first light redirection element are configured to redirect a first light from a first path to a redirected first path toward the first image sensor, and wherein the first image sensor is configured to capture the first image based on receipt of the first light at the first image sensor, the first image including a first depiction of a portion of the scene;

receive a second image of the scene captured by a second image sensor, wherein the refractive object and a second light redirection element are configured to redirect a second light from a second path to a redirected second path toward the second image sensor, and wherein the second image sensor is configured to capture the second image based on receipt of the second light at the second image sensor, the second image including a second depiction of the portion of the scene;

modify the first image to generate a modified first image;

modify the second image to generate a modified second image, wherein a first property of the first depiction of the portion of the scene in the modified first image aligns with a second property of the second depiction of the portion of the scene in the modified second image; and combine the modified first image and the modified second image to generate a combined image.

2. The apparatus of claim 1, wherein:

the first property of the first depiction of the portion of the scene is a brightness of the first depiction of the portion of the scene in the modified first image, and the second property of the second depiction of the portion of the scene is a brightness of the second depiction of the portion of the scene in the modified second image;

the first property of the first depiction of the portion of the scene is a contrast of the first depiction of the portion of the scene in the modified first image, and the second property of the second depiction of the portion of the scene is a contrast of the second depiction of the portion of the scene in the modified second image;

the first property of the first depiction of the portion of the scene is a hue of the first depiction of the portion of the scene in the modified first image, and the second property of the second depiction of the portion of the scene is a hue of the second depiction of the portion of the scene in the modified second image;

the first property of the first depiction of the portion of the scene is a tint of the first depiction of the portion of the scene in the modified first image, and the second property of the second depiction of the portion of the scene is a tint of the second depiction of the portion of the scene in the modified second image;

the first property of the first depiction of the portion of the scene is a saturation of the first depiction of the portion of the scene in the modified first image, and the second property of the second depiction of the portion of the scene is a saturation of the second depiction of the portion of the scene in the modified second image;

the first property of the first depiction of the portion of the scene is a sharpness of the first depiction of the portion of the scene in the modified first image, and the second property of the second depiction of the portion of the scene is a sharpness of the second depiction of the portion of the scene in the modified second image;

the first property of the first depiction of the portion of the scene is a positioning of one or more features of the scene in the first depiction of the portion of the scene in the modified first image, and the second property of the second depiction of the portion of the scene is a positioning of the one or more features of the scene in the second depiction of the portion of the scene in the modified second image;

the first property of the first depiction of the portion of the scene is a focus setting associated with the first image sensor for capture of the first image, and the second property of the second depiction of the portion of the scene is a focus setting associated with the second image sensor for capture of the second image;

the first property of the first depiction of the portion of the scene is an exposure setting associated with the first image sensor for capture of the first image, and the second property of the second depiction of the portion of the scene is an exposure setting associated with the second image sensor for capture of the second image; or the first property of the first depiction of the portion of the scene is a white balance setting associated with the first image sensor for capture of the first image, and the second property of the second depiction of the portion of the scene is a white balance setting associated with the second image sensor for capture of the second image.

3. The apparatus of claim 2, wherein the one or more processors are configured to align, using interpolation, the positioning of the one or more features in the first depiction of the portion of the scene in the modified first image with the positioning of the one or more features in the second depiction of the portion of the scene in the modified second image.

4. The apparatus of claim 1, wherein the one or more processors are configured to align a position of a first depiction of a pattern in the first depiction of the portion of the scene in the modified first image with a position of a second depiction of the pattern in the second depiction of the portion of the scene in the modified second image.

5. The apparatus of claim 1, wherein the one or more processors are configured to:
set a focus setting associated with the first image sensor for capture of the first image using auto-focus to focus on the portion of the scene; and
set a focus setting associated with the second image sensor for capture of the second image using auto-focus to focus on the portion of the scene.

6. The apparatus of claim 1, wherein the one or more processors are configured to:
set an exposure setting associated with the first image sensor for capture of the first image using auto-exposure based on the portion of the scene; and
set an exposure setting associated with the second image sensor for capture of the second image using auto-exposure based on the portion of the scene.

7. The apparatus of claim 1, wherein the one or more processors are configured to:
set a white balance setting associated with the first image sensor for capture of the first image using auto-white-balance based on the portion of the scene; and
set a white balance setting associated with the second image sensor for capture of the second image using auto-white-balance based on the portion of the scene.

8. The apparatus of claim 1, wherein, to modify the first image to generate the modified first image, the one or more processors are configured to apply a correction to at least a portion of the modified first image at a gradient strength that tapers based on distance from a stitching line; and
wherein, to modify the second image to generate the modified second image, the one or more processors are configured to apply the correction to at least a portion of the modified second image at a gradient strength that tapers based on distance from a stitching line.

9. The apparatus of claim 1, wherein, to modify the first image to generate the modified first image, the one or more processors are configured to modify the first image from depicting a first perspective to depicting a common perspective using a perspective distortion correction; and
wherein, to modify the second image to generate the modified second image, the one or more processors are configured to modify the second image from depicting a second perspective to depicting the common perspective using the perspective distortion correction.

10. The apparatus of claim 1, wherein, to generate the combined image from the modified first image and the modified second image, the one or more processors are configured to:
stitch the modified first image and the second image together based on a first portion of the first image and a second portion of the second image.

11. The apparatus of claim 10, wherein the first portion of the first image includes the first depiction of the portion of the scene, wherein the second portion of the second image includes the second depiction of the portion of the scene.

12. The apparatus of claim 1, wherein a virtual extension of the first path beyond the first light redirection element intersects with a virtual extension of the second path beyond the second light redirection element.

13. The apparatus of claim 1, further comprising:
the first image sensor;
the second image sensor;
the refractive object;
the first light redirection element; and
the second light redirection element.

14. The apparatus of claim 1, wherein the first light redirection element is a first reflective surface to reflect the first light toward the first image sensor while the first light is refracted through the refractive object; and wherein the second light redirection element is a second reflective surface to reflect the second light toward the second image sensor while the second light is refracted through the refractive object.

15. The apparatus of claim 1, wherein the refractive object includes a prism to refract the first light and to refract the second light.

16. The apparatus of claim 1, wherein the first path includes a path of the first light before the first light enters the refractive object and the refractive object refracts the first light, wherein the second path includes a path of the second light before the second light enters the refractive object and the refractive object refracts the second light.

17. The apparatus of claim 1, wherein the first path includes a path of the first light after the first light enters the refractive object and the refractive object refracts the first light but before a first light redirection element reflects the first light, wherein the second path includes a path of the second light after the second light enters the refractive object and the refractive object refracts the second light but before a second light redirection element reflects the second light.

18. The apparatus of claim 1, wherein the one or more processors are configured to cause the first image and the second image to be captured contemporaneously.

19. The apparatus of claim 1, wherein a first planar surface of the first image sensor faces a first direction, and wherein a second planar surface of the second image sensor faces a second direction that is parallel to the first direction.

20. The apparatus of claim 1, wherein the modified first image has a different shape than the first image, and wherein the modified second image has a different shape than the second image.

21. The apparatus of claim 1, wherein, to modify the first image to generate the modified first image, the one or more processors are configured to crop the first image; and wherein, to modify the second image to generate the modified second image, the one or more processors are configured to crop the second image.

22. The apparatus of claim 1, wherein, to modify the first image to generate the modified first image, the one or more processors are configured to correct a first distortion in the first image; and wherein, to modify the second image to generate the modified second image, the one or more processors are configured to correct a second distortion in the second image, wherein a lens shape is associated with at least one of the first distortion or the second distortion.

23. The apparatus of claim 1, wherein the combined image includes a combined image field of view that is larger than at least one of a first field of view of the first image or a second field of view of the second image.

24. A method for imaging, the method comprising:

receiving a first image of a scene captured by a first image sensor, wherein a refractive object and a first light redirection element are configured to redirect a first light from a first path to a redirected first path toward the first image sensor, and wherein the first image sensor is configured to capture the first image based on receipt of the first light at the first image sensor, the first image including a first depiction of a portion of the scene;

receiving a second image of the scene captured by a second image sensor, wherein refractive object and a second light redirection element are configured to redirect a second light from a second path to a redirected second path toward the second image sensor, and wherein the second image sensor is configured to capture the second image based on receipt of the second light at the second image sensor, the second image including a second depiction of the portion of the scene;

modifying the first image to generate a modified first image;

modifying the second image to generate a modified second image, wherein a first property of the first depiction of the portion of the scene in the modified first image aligns with a second property of the second depiction of the portion of the scene in the modified second image; and combining the modified first image and the modified second image to generate a combined image.

25. The method of claim 24, wherein:

the first property of the first depiction of the portion of the scene is a brightness of the first depiction of the portion of the scene in the modified first image, and the second property of the second depiction of the portion of the scene is a brightness of the second depiction of the portion of the scene in the modified second image;

the first property of the first depiction of the portion of the scene is a contrast of the first depiction of the portion of the scene in the modified first image, and the second property of the second depiction of the portion of the scene is a contrast of the second depiction of the portion of the scene in the modified second image;

the first property of the first depiction of the portion of the scene is a hue of the first depiction of the portion of the scene in the modified first image, and the second property of the second depiction of the portion of the scene is a hue of the second depiction of the portion of the scene in the modified second image;

the first property of the first depiction of the portion of the scene is a tint of the first depiction of the portion of the scene in the modified first image, and the second property of the second depiction of the portion of the scene is a tint of the second depiction of the portion of the scene in the modified second image;

the first property of the first depiction of the portion of the scene is a saturation of the first depiction of the portion of the scene in the modified first image, and the second property of the second depiction of the portion of the scene is a saturation of the second depiction of the portion of the scene in the modified second image;

the first property of the first depiction of the portion of the scene is a sharpness of the first depiction of the portion of the scene in the modified first image, and the second property of the second depiction of the portion of the scene is a sharpness of the second depiction of the portion of the scene in the modified second image;

the first property of the first depiction of the portion of the scene is a positioning of one or more features of the scene in the first depiction of the portion of the scene in the modified first image, and the second property of the second depiction of the portion of the scene is a positioning of the one or more features of the scene in the second depiction of the portion of the scene in the modified second image;

the first property of the first depiction of the portion of the scene is a focus setting associated with the first image sensor for capture of the first image, and the second property of the second depiction of the portion of the scene is a focus setting associated with the second image sensor for capture of the second image;

the first property of the first depiction of the portion of the scene is an exposure setting associated with the first image sensor for capture of the first image, and the second property of the second depiction of the portion of the scene is an exposure setting associated with the second image sensor for capture of the second image; or the first property of the first depiction of the portion of the scene is a white balance setting associated with the first image sensor for capture of the first image, and the second property of the second depiction of the portion of the scene is a white balance setting associated with the second image sensor for capture of the second image.

26. The method of claim 25, further comprising aligning, using interpolation, the positioning of the one or more features in the first depiction of the portion of the scene in the modified first image with the positioning of the one or more features in the second depiction of the portion of the scene in the modified second image.

27. The method of claim 24, further comprising aligning a position of a first depiction of a pattern in the first depiction of the portion of the scene in the modified first image with a position of a second depiction of the pattern in the second depiction of the portion of the scene in the modified second image.

28. The method of claim 24, further comprising:
setting a focus setting associated with the first image sensor for capture of the first image using auto-focus to focus on the portion of the scene; and
setting a focus setting associated with the second image sensor for capture of the second image using auto-focus to focus on the portion of the scene.

29. The method of claim 24, further comprising:
setting an exposure setting associated with the first image sensor for capture of the first image using auto-exposure based on the portion of the scene; and
setting an exposure setting associated with the second image sensor for capture of the second image using auto-exposure based on the portion of the scene.

30. The method of claim 24, further comprising:
setting a white balance setting associated with the first image sensor for capture of the first image using auto-white-balance based on the portion of the scene; and
setting a white balance setting associated with the second image sensor for capture of the second image using auto-white-balance based on the portion of the scene.

* * * * *